United States Patent
Holmes et al.

(10) Patent No.: US 12,522,849 B2
(45) Date of Patent: Jan. 13, 2026

(54) MICROBIAL PRODUCTION OF CANNABINOIDS

(71) Applicant: Amyris, Inc., Emeryville, CA (US)

(72) Inventors: Victor F. Holmes, Emeryville, CA (US); John E. Hung, Emeryville, CA (US); Irina A. Koryakina, Emeryville, CA (US); Andrew P. Klein, Emeryville, CA (US); Yi Xiong, Emeryville, CA (US); William E. Draper, Emeryville, CA (US); Hailley S. Warbington, Emeryville, CA (US)

(73) Assignee: Amyris, Inc., Emeryville, CA (US)

( * ) Notice: Subject to any disclaimer, the term of this patent is extended or adjusted under 35 U.S.C. 154(b) by 432 days.

(21) Appl. No.: 18/022,063

(22) PCT Filed: Aug. 19, 2021

(86) PCT No.: PCT/US2021/046780
§ 371 (c)(1),
(2) Date: Feb. 17, 2023

(87) PCT Pub. No.: WO2022/040475
PCT Pub. Date: Feb. 24, 2022

(65) Prior Publication Data
US 2023/0304049 A1    Sep. 28, 2023

Related U.S. Application Data

(60) Provisional application No. 63/067,633, filed on Aug. 19, 2020.

(51) Int. Cl.
| | |
|---|---|
| C12P 7/42 | (2006.01) |
| C12N 1/18 | (2006.01) |
| C12N 9/00 | (2006.01) |
| C12N 9/02 | (2006.01) |
| C12N 9/10 | (2006.01) |
| C12N 9/88 | (2006.01) |

(52) U.S. Cl.
CPC .............. *C12P 7/42* (2013.01); *C12N 1/185* (2021.05); *C12N 9/0004* (2013.01); *C12N 9/1029* (2013.01); *C12N 9/88* (2013.01); *C12N 9/93* (2013.01); *C12Y 121/03008* (2015.07); *C12Y 404/01026* (2015.07)

(58) Field of Classification Search
CPC .................. C12Y 203/01206; C12N 15/52
See application file for complete search history.

(56) References Cited

U.S. PATENT DOCUMENTS

| 9,546,362 B2 | 1/2017 | Page et al. |
| 2018/0334692 A1 | 11/2018 | Barr et al. |
| 2020/0017889 A1 | 1/2020 | Poulos et al. |
| 2022/0315969 A1* | 10/2022 | Noble ............... C12N 9/88 |

FOREIGN PATENT DOCUMENTS

| WO | WO-2018/200888 A1 | 11/2018 |
| WO | WO-2020102541 A1 | 5/2020 |
| WO | WO-2020161682 A1 | 8/2020 |
| WO | WO-2020232553 A1 | 11/2020 |

OTHER PUBLICATIONS

GenBank Entry GAY07129.1, "long-chain-fatty-acid—CoA ligase [*Pseudonocardia* sp. N23]," Oct. 4, 2017, available <https://www.ncbi.nlm.nih.gov/protein/1251395795> (2 pages).
International Search Report and Written Opinion for International Application No. PCT/US21/46780, mailed Feb. 2, 2022 (13 pages).
"Prenyltransferase stbC {EC0:0000303," retrieved from EBI accession No. A0A193PS58, accessed Jun. 17, 2020 (2 pages).
Li et al., "Biosynthesis of LL-Z1272β: Discovery of a New Member of NRPS-like Enzymes for Aryl-Aldehyde Formation," Chembiochem. 17(10): 904-907 (May 2016).
"Olivetolic acid cyclase {ECO: 0000303," retrieved from EBI accession No. I6WU39 accessed Feb. 6, 2013 (4 pages).
Gagne et al., "Identification of olivetolic acid cyclase from Cannabis sativa reveals a unique catalytic route to plant polyketides," Proc Natl Acad Sci USA. 109(31): 12811-6 (Jul. 2012).

\* cited by examiner

*Primary Examiner* — Tekchand Saidha
(74) *Attorney, Agent, or Firm* — Clark & Elbing LLP

(57) ABSTRACT

The compositions and methods of the disclosure can be used to produce a cannabinoid in a host cell, such as a yeast cell. For example, the disclosure features host cells (e.g., yeast cells) modified to express one or more enzymes of a cannabinoid biosynthetic pathway, such as an acyl activating enzyme (AAE), a tetraketide synthase (TKS), a cannabigerolic acid synthase (CBGaS), and/or an olivetolic acid cyclase (OAC).

18 Claims, 11 Drawing Sheets
Specification includes a Sequence Listing.

SCBGA (sesquicannabigerolic acid)

CBGA (cannabigerolic acid)

Library size:
4 homologs × 67 = 268 chimeras

MICROBIAL PRODUCTION OF CANNABINOIDS

SEQUENCE LISTING

The instant application contains a Sequence Listing which has been submitted electronically in ASCII format and is hereby incorporated by reference in its entirety. Said ASCII copy, created on May 19, 2021 is named 51494-008WO2_Sequence_Listing_8_11_2021_ST25 and is 275,941 bytes in size.

BACKGROUND OF THE INVENTION

Cannabinoids are chemical compounds such as cannabigerols (CBG), cannabichromens (CBC), cannabidiol (CBD), tetrahydrocannabinol (THC), cannabinol (CBN), cannabinodiol (CBDL), cannabicyclol (CBL), cannabielsoin (CBE), cannabitriol (CBT), and tetrahydrocannabinolic acid (THCa), which are produced by the *Cannabis* plant. Cannabinoids may be used to improve various aspects of human health. However, producing cannabinoids in preparative amounts and in high yield has been challenging. There remains a need for compositions and methods capable of preparing cannabinoids with high efficiency and chemical selectivity.

SUMMARY OF THE INVENTION

The present disclosure provides compositions and methods for producing a cannabinoid in a host cell, such as a yeast cell. For example, using the compositions and methods described herein, a yeast cell may be modified to express one or more enzymes of a cannabinoid biosynthetic pathway, such as an acyl activating enzyme (AAE), a tetraketide synthase (TKS), a cannabigerolic acid synthase (CBGaS), and/or an olivetolic acid cyclase (OAC), among others described herein. The yeast cell may then be cultured, for example, in the presence of an agent that regulates expression of the one or more enzymes. The yeast cell may be incubated for a time sufficient to allow for biochemical synthesis of a cannabinoid, and the cannabinoid may then be separated from the yeast cell.

In one aspect, the disclosure features a host cell capable of producing a cannabinoid. The host cell may contain one or more heterologous nucleic acids that each, independently, encode an acyl activating enzyme (AAE) having an amino acid sequence that is at least 85% identical to the amino acid sequence of any one of SEQ ID NOS: 1-24. In some embodiments, the AAE has an amino acid sequence that is at least 85% identical to the amino acid sequence of any one of any one of SEQ ID NOS: 1-5 and 7-24 (e.g., an amino acid sequence that is 85%, 86%, 87%, 88%, 89%, 90%, 91%, 92%, 93%, 94%, 95%, 96%, 97%, 98%, 99%, or 100% identical to any one of SEQ ID NOS: 1-5 and 7-24). For example, the AAE may have an amino acid sequence that is at least 85% identical to the amino acid sequence of any one of SEQ ID NO: 1-4.

Additionally or alternatively, the host cell may contain one or more heterologous nucleic acids that each, independently, encode a tetraketide synthase (TKS) having an amino acid sequence that is at least 85% identical to the amino acid sequence of any one of SEQ ID NOS: 25-43. In some embodiments, the TKS has an amino acid sequence that is at least 85% identical to the amino acid sequence of any one of SEQ ID NOS: 25 and 27-43 (e.g., an amino acid sequence that is 85%, 86%, 87%, 88%, 89%, 90%, 91%, 92%, 93%, 94%, 95%, 96%, 97%, 98%, 99%, or 100% identical to any one of SEQ ID NOS: 25 and 27-43).

Additionally or alternatively, the host cell may contain one or more heterologous nucleic acids that each, independently, encode a cannabigerolic acid synthase (CBGaS) having an amino acid sequence that is at least 85% identical to the amino acid sequence of any one of SEQ ID NOS: 53-58, 63, and 64. In some embodiments, the CBGaS has an amino acid sequence that is at least 85% identical to the amino acid sequence of any one of SEQ ID NOS: 55-58, 63, and 64 (e.g., an amino acid sequence that is 85%, 86%, 87%, 88%, 89%, 90%, 91%, 92%, 93%, 94%, 95%, 96%, 97%, 98%, 99%, or 100% identical to any one of SEQ ID NOS: 55-58, 63, and 64).

Additionally or alternatively, the host cell may contain one or more heterologous nucleic acids that each, independently, encode an olivetolic acid cyclase (OAC) having an amino acid sequence that is at least 85% identical to the amino acid sequence of any one of SEQ ID NOS: 44-52. In some embodiments, the OAC has an amino acid sequence that is at least 85% identical to the amino acid sequence of any one of SEQ ID NOS: 45-52 (e.g., an amino acid sequence that is 85%, 86%, 87%, 88%, 89%, 90%, 91%, 92%, 93%, 94%, 95%, 96%, 97%, 98%, 99%, or 100% identical to any one of SEQ ID NOS: 45-52).

In some embodiments, the host cell contains a heterologous nucleic acid that encodes an AAE having an amino acid sequence that is at least 90% identical to the amino acid sequence of any one of SEQ ID NOS: 1-5 and 7-24 (e.g., an amino acid sequence that is 90%, 91%, 92%, 93%, 94%, 95%, 96%, 97%, 98%, 99%, or 100% identical to any one of SEQ ID NOS: 1-5 and 7-24). For example, the AAE may have an amino acid sequence that is at least 90% identical to the amino acid sequence of any one of SEQ ID NO: 1-4. In some embodiments, the AAE has an amino acid sequence that is at least 95% identical to the amino acid sequence of any one of SEQ ID NO: 1-4 (e.g., an amino acid sequence that is 95%, 96%, 97%, 98%, 99%, or 100% identical to any one of SEQ ID NO: 1-4). In some embodiments, the AAE has the amino acid sequence of any one of SEQ ID NO: 1-4.

In some embodiments, the host cell contains a heterologous nucleic acid that encodes a TKS having an amino acid sequence that is at least 90% identical to the amino acid sequence of any one of SEQ ID NOS: 25 and 34-39 (e.g., an amino acid sequence that is 90%, 91%, 92%, 93%, 94%, 95%, 96%, 97%, 98%, 99%, or 100% identical to any one of SEQ ID NOS: 25 and 34-39). In some embodiments, the TKS has an amino acid sequence that is at least 95% identical to the amino acid sequence of any one of SEQ ID NOS: 25 and 34-39 (e.g., an amino acid sequence that is 95%, 96%, 97%, 98%, 99%, or 100% identical to any one of SEQ ID NOS: 25 and 34-39). In some embodiments, the TKS has the amino acid sequence of any one of SEQ ID NOS: 25 and 34-39.

In some embodiments, the host cell contains a heterologous nucleic acid that encodes a TKS having an amino acid sequence that is at least 90% identical to the amino acid sequence of any one of SEQ ID NO: 25 or 39 (e.g., an amino acid sequence that is 90%, 91%, 92%, 93%, 94%, 95%, 96%, 97%, 98%, 99%, or 100% identical to any one of SEQ ID NO: 25 or 39). In some embodiments, the TKS has an amino acid sequence that is at least 95% identical to the amino acid sequence of any one of SEQ ID NO: 25 or 39 (e.g., an amino acid sequence that is 95%, 96%, 97%, 98%, 99%, or 100% identical to any one of SEQ ID NO: 25 or 39). In some embodiments, the TKS has the amino acid sequence of any one of SEQ ID NO: 25 or 39.

In some embodiments, the host cell contains a heterologous nucleic acid that encodes a CBGaS having an amino acid sequence that is at least 90% identical to the amino acid sequence of any one of SEQ ID NOS: 55-58, 63, and 64 (e.g., an amino acid sequence that is 90%, 91%, 92%, 93%, 94%, 95%, 96%, 97%, 98%, 99%, or 100% identical to any one of SEQ ID NOS: 55-58, 63, and 64). In some embodiments, the CBGaS has an amino acid sequence that is at least 95% identical to the amino acid sequence of any one of SEQ ID NOS: 55-58, 63, and 64 (e.g., an amino acid sequence that is 95%, 96%, 97%, 98%, 99%, or 100% identical to any one of SEQ ID NOS: 55-58, 63, and 64). In some embodiments, the CBGaS has the amino acid sequence of any one of SEQ ID NOS: 55-58, 63, and 64.

In some embodiments, the host cell contains a heterologous nucleic acid that encodes an OAC having an amino acid sequence that is at least 90% identical to the amino acid sequence of any one of SEQ ID NOS: 45-52 (e.g., an amino acid sequence that is 90%, 91%, 92%, 93%, 94%, 95%, 96%, 97%, 98%, 99%, or 100% identical to any one of SEQ ID NOS: 45-52). In some embodiments, the OAC has an amino acid sequence that is at least 95% identical to the amino acid sequence of any one of SEQ ID NOS: 45-52 (e.g., an amino acid sequence that is 95%, 96%, 97%, 98%, 99%, or 100% identical to any one of SEQ ID NOS: 45-52). In some embodiments, OAC has the amino acid sequence of any one of SEQ ID NOS: 45-52.

In some embodiments, the host cell further contains one or more heterologous nucleic acids that each, independently, encode an enzyme of the mevalonate biosynthetic pathway. The enzyme may be, for example, an acetyl-CoA thiolase, an HMG-CoA synthase, an HMG-CoA reductase, a mevalonate kinase, a phosphomevalonate kinase, a mevalonate pyrophosphate decarboxylase, or an IPP:DMAPP isomerase. In some embodiments, the host cell contains heterologous nucleic acids that independently encode an acetyl-CoA thiolase, an HMG-CoA synthase, an HMG-CoA reductase, a mevalonate kinase, a phosphomevalonate kinase, a mevalonate pyrophosphate decarboxylase, and an IPP:DMAPP isomerase.

In some embodiments, the host cell further contains a heterologous nucleic acid that encodes geranyl pyrophosphate (GPP) synthase. In some embodiments, the GPP synthase has an amino acid sequence that is at least 90% identical to the amino acid sequence of SEQ ID NO: 75 (e.g., an amino acid sequence that is 90%, 91%, 92%, 93%, 94%, 95%, 96%, 97%, 98%, 99%, or 100% identical SEQ ID NO: 75). In some embodiments, the GPP synthase has an amino acid sequence that is at least 95% identical to the amino acid sequence of SEQ ID NO: 75 (e.g., an amino acid sequence that is 95%, 96%, 97%, 98%, 99%, or 100% identical to SEQ ID NO: 75). In some embodiments, the GPP synthase has an amino acid sequence of SEQ ID NO: 75.

In some embodiments, the host cell further contains one or more heterologous nucleic acids that each, independently, encode an acetyl-CoA synthase, and/or an aldehyde dehydrogenase, and/or a pyruvate decarboxylase. In some embodiments, the acetyl-CoA synthase has an amino acid sequence that is at least 90% identical to the amino acid sequence of SEQ ID NO: 66 (e.g., an amino acid sequence that is 90%, 91%, 92%, 93%, 94%, 95%, 96%, 97%, 98%, 99%, or 100% identical to SEQ ID NO: 66). In some embodiments, the acetyl-CoA synthase has an amino acid sequence that is at least 95% identical to the amino acid sequence of SEQ ID NO: 66 (e.g., an amino acid sequence that is 95%, 96%, 97%, 98%, 99%, or 100% identical to SEQ ID NO: 66). In some embodiments, the acetyl-CoA synthase has the amino acid sequence of SEQ ID NO: 66. In some embodiments, the aldehyde dehydrogenase has an amino acid sequence that is at least 90% identical to the amino acid sequence of SEQ ID NO: 67 (e.g., an amino acid sequence that is 90%, 91%, 92%, 93%, 94%, 95%, 96%, 97%, 98%, 99%, or 100% identical to SEQ ID NO: 67). In some embodiments, the aldehyde dehydrogenase has an amino acid sequence that is at least 95% identical to the amino acid sequence of SEQ ID NO: 67 (e.g., an amino acid sequence that is 95%, 96%, 97%, 98%, 99%, or 100% identical to SEQ ID NO: 67). In some embodiments, the aldehyde dehydrogenase synthase has the amino acid sequence of SEQ ID NO: 67. In some embodiments, the pyruvate decarboxylase has an amino acid sequence that is at least 90% identical to the amino acid sequence of SEQ ID NO: 65 (e.g., an amino acid sequence that is 90%, 91%, 92%, 93%, 94%, 95%, 96%, 97%, 98%, 99%, or 100% identical to SEQ ID NO: 65). In some embodiments, the pyruvate decarboxylase has an amino acid sequence that is at least 95% identical to the amino acid sequence of SEQ ID NO: 65 (e.g., an amino acid sequence that is 95%, 96%, 97%, 98%, 99%, or 100% identical to SEQ ID NO: 65). In some embodiments, the pyruvate decarboxylase has the amino acid sequence of SEQ ID NO: 65.

In some embodiments, expression of the one or more heterologous nucleic acids is regulated by an exogenous agent. In some embodiments, the exogenous agent decreases production of the cannabinoid. In some embodiments, the exogenous agent increases production of the cannabinoid. In some embodiments, the exogenous agent is galactose and expression of at least one of the one or more heterologous nucleic acids is under the control of a GAL promoter. In some embodiments, expression of at least one of the one or more heterologous nucleic acids is under the control of a galactose-responsive promoter. In some embodiments, expression of at least one of the one or more heterologous nucleic acids is under the control of a maltose-responsive promoter. In some embodiments, expression of at least one of the one or more heterologous nucleic acids is under the control of a combination of both a galactose-responsive promoter and a maltose-responsive promoter.

In some embodiments, the cannabinoid is cannabidiolic acid (CBDA), cannabidiol (CBD), cannabigerolic acid (CBGA), cannabigerol (CBG), tetrahydrocannabinol (THC), tetrahydrocannabinolic acid (THCa), cannabigerorcinic acid (CBGOA), cannabigerovarinic acid (CBGVA), or 3-geranyl-2,4-dihydroxy-6-phenylethylbenzoic acid (CBGXA).

In some embodiments, the cannabinoid is CBGA, CBG, sesquicannabigerolic acid (SCBGA), CBGOA, sesquicannabigerorcinic acid (SCBGOA), CBGVA, sesquicannabigerovarinic acid (SCBGVA), CBGXA, or 3-farnesyl-2,4-dihydroxy-6-phenylethylbenzoic acid (SCBGXA).

In some embodiments, the host cell is a yeast cell, such as a yeast cell belonging to a yeast strain described herein. In some embodiments, the yeast cell is *S. cerevisiae*.

In another aspect, the disclosure features a mixture containing the host cell of any one of the above aspects or embodiments of the disclosure and a culture medium. In some embodiments, the cell culture medium further contains an exogenous agent, such as maltose. In some embodiments, the exogenous agent is maltose. In some embodiments, the culture medium contains (i) an exogenous agent that increases production of the cannabinoid, and (ii) a precursor required to make the cannabinoid. In some embodiments, the precursor required to make the cannabinoid is hexanoate.

In another aspect, the disclosure features a method for decreasing expression of a cannabinoid in a host cell by culturing the host cell of any of the above aspects or embodiments of the disclosure in a medium comprising an exogenous agent. The exogenous agent may be one, for example, that decreases the expression of the cannabinoid. In some embodiments, the exogenous agent is maltose. In some embodiments, culturing the host cell in the medium comprising the exogenous agent results in production of less than 0.001 mg/L of cannabinoid.

In another aspect, the disclosure features a method for increasing expression of a cannabinoid in a host cell by culturing the host cell of any of the above aspects or embodiments of the disclosure in a medium comprising an exogenous agent. The exogenous agent may be one that, for example, increases the expression of the cannabinoid. In some embodiments, the exogenous agent is galactose. In some embodiments, the method further includes culturing the host cell with a precursor required to make the cannabinoid, such as hexanoate.

In another aspect, the disclosure features a method of genetically modifying a host cell to be capable of producing a cannabinoid. The method may include introducing into the host cell one or more heterologous nucleic acids that each, independently, encode an AAE having an amino acid sequence that is at least 85% identical to the amino acid sequence of any one of SEQ ID NOS: 1-24. In some embodiments, the AAE has an amino acid sequence that is at least 85% identical to the amino acid sequence of any one of SEQ ID NOS: 1-5 and 7-24 (e.g., an amino acid sequence that is 85%, 86%, 87%, 88%, 89%, 90%, 91%, 92%, 93%, 94%, 95%, 96%, 97%, 98%, 99%, or 100% identical to any one of SEQ ID NOS: 1-5 and 7-24). For example, the AAE may have an amino acid sequence that is at least 85% identical to the amino acid sequence of any one of SEQ ID NO: 1-4.

Additionally or alternatively, the method may include introducing into the host cell one or more heterologous nucleic acids that each, independently, encode a TKS having an amino acid sequence that is at least 85% identical to the amino acid sequence of any one of SEQ ID NOS: 25-43. In some embodiments, the TKS has an amino acid sequence that is at least 85% identical to the amino acid sequence of any one of SEQ ID NOS: 25 and 27-43 (e.g., an amino acid sequence that is 85%, 86%, 87%, 88%, 89%, 90%, 91%, 92%, 93%, 94%, 95%, 96%, 97%, 98%, 99%, or 100% identical to any one of SEQ ID NOS: 25 and 27-43).

Additionally or alternatively, the method may include introducing into the host cell one or more heterologous nucleic acids that each, independently, encode a CBGaS having an amino acid sequence that is at least 85% identical to the amino acid sequence of any one of SEQ ID NOS: 53-58, 63, or 64. In some embodiments, the CBGaS has an amino acid sequence that is at least 85% identical to the amino acid sequence of any one of SEQ ID NOS: SEQ ID NOS: 55-58, 63, and 64 (e.g., an amino acid sequence that is 85%, 86%, 87%, 88%, 89%, 90%, 91%, 92%, 93%, 94%, 95%, 96%, 97%, 98%, 99%, or 100% identical to any one of SEQ ID NOS: 55-58, 63, and 64).

Additionally or alternatively, the method may include introducing into the host cell one or more heterologous nucleic acids that each, independently, encode an OAC having an amino acid sequence that is at least 85% identical to the amino acid sequence of any one of SEQ ID NO: 44-52. In some embodiments, the OAC has an amino acid sequence that is at least 85% identical to the amino acid sequence of any one of SEQ ID NOS: 45-52 (e.g., an amino acid sequence that is 85%, 86%, 87%, 88%, 89%, 90%, 91%, 92%, 93%, 94%, 95%, 96%, 97%, 98%, 99%, or 100% identical to any one of SEQ ID NOS: 45-52).

In some embodiments, the method includes introducing into the host cell a heterologous nucleic acid that encodes an AAE having an amino acid sequence that is at least 90% identical to the amino acid sequence of any one of SEQ ID NOS: 1-5 and 7-24 (e.g., an amino acid sequence that is 90%, 91%, 92%, 93%, 94%, 95%, 96%, 97%, 98%, 99%, or 100% identical to any one of SEQ ID NOS: 1-5 and 7-24). For example, the AAE may have an amino acid sequence that is at least 90% identical to the amino acid sequence of any one of SEQ ID NO: 1-4. In some embodiments, the AAE has an amino acid sequence that is at least 95% identical to the amino acid sequence of any one of SEQ ID NO: 1-4 (e.g., an amino acid sequence that is 95%, 96%, 97%, 98%, 99%, or 100% identical to any one of SEQ ID NO: 1-4). In some embodiments, the AAE has the amino acid sequence of any one of SEQ ID NO: 1-4.

In some embodiments, the method includes introducing into the host cell a heterologous nucleic acid that encodes a TKS having an amino acid sequence that is at least 90% identical to the amino acid sequence of any one of SEQ ID NOS: 25 and 27-43 (e.g., an amino acid sequence that is 90%, 91%, 92%, 93%, 94%, 95%, 96%, 97%, 98%, 99%, or 100% identical to any one of SEQ ID NOS: 25 and 27-43). In some embodiments, the TKS has an amino acid sequence that is at least 95% identical to the amino acid sequence of any one of SEQ ID NOS: 25 and 27-43 (e.g., an amino acid sequence that is 95%, 96%, 97%, 98%, 99%, or 100% identical to any one of SEQ ID NOS: 25 and 27-43). In some embodiments, the TKS has the amino acid sequence of any one of SEQ ID NOS: 25 and 27-43.

In some embodiments, the method includes introducing into the host cell a heterologous nucleic acid that encodes a TKS having an amino acid sequence that is at least 90% identical to the amino acid sequence of any one of SEQ ID NOS: 25 or 39 (e.g., an amino acid sequence that is 90%, 91%, 92%, 93%, 94%, 95%, 96%, 97%, 98%, 99%, or 100% identical to any one of SEQ ID NOS: 25 or 39). In some embodiments, the TKS has an amino acid sequence that is at least 95% identical to the amino acid sequence of any one of SEQ ID NOS: 25 or 39 (e.g., an amino acid sequence that is 95%, 96%, 97%, 98%, 99%, or 100% identical to any one of SEQ ID NOS: 25 or 39). In some embodiments, the TKS has the amino acid sequence of any one of SEQ ID NOS: 25 or 39.

In some embodiments, the method includes introducing into the host cell a heterologous nucleic acid that encodes a CBGaS having an amino acid sequence that is at least 90% identical to the amino acid sequence of any one of SEQ ID NOS: 55-58, 63, and 64 (e.g., an amino acid sequence that is 90%, 91%, 92%, 93%, 94%, 95%, 96%, 97%, 98%, 99%, or 100% identical to any one of SEQ ID NOS: 55-58, 63, and 64). In some embodiments, the CBGaS has an amino acid sequence that is at least 95% identical to the amino acid sequence of any one of SEQ ID NOS: 55-58, 63, and 64 (e.g., an amino acid sequence that is 95%, 96%, 97%, 98%, 99%, or 100% identical to any one of SEQ ID NOS: 55-58, 63, and 64). In some embodiments, the CBGaS has the amino acid sequence of any one of SEQ ID NOS: 55-58, 63, and 64.

In some embodiments, the method includes introducing into the host cell a heterologous nucleic acid that encodes an OAC having an amino acid sequence that is at least 90% identical to the amino acid sequence of any one of SEQ ID NOS: 45-52 (e.g., an amino acid sequence that is 90%, 91%, 92%, 93%, 94%, 95%, 96%, 97%, 98%, 99%, or 100% identical to any one of SEQ ID NOS: 45-52). In some embodiments, the OAC has an amino acid sequence that is at least 95% identical to the amino acid sequence of any one of SEQ ID NOS: 45-52 (e.g., an amino acid sequence that is 95%, 96%, 97%, 98%, 99%, or 100% identical to any one of SEQ ID NOS: 45-52). In some embodiments, OAC has the amino acid sequence of any one of SEQ ID NOS: 45-52.

In some embodiments, the host cell further contains one or more heterologous nucleic acids that each, independently, encode an enzyme of the mevalonate biosynthetic pathway, such as an enzyme selected from an acetyl-CoA thiolase, an HMG-CoA synthase, an HMG-CoA reductase, a mevalonate kinase, a phosphomevalonate kinase, a mevalonate pyrophosphate decarboxylase, and an IPP:DMAPP isomerase. In some embodiments, the host cell contains heterologous nucleic acids that independently encode an acetyl-CoA thiolase, an HMG-CoA synthase, an HMG-CoA reductase, a mevalonate kinase, a phosphomevalonate kinase, a mevalonate pyrophosphate decarboxylase, and an IPP:DMAPP isomerase.

In some embodiments, the host cell further contains a heterologous nucleic acid that encodes a GPP synthase. In some embodiments, the GPP synthase has an amino acid sequence that is at least 90% identical to the amino acid sequence of SEQ ID NO: 75 (e.g., an amino acid sequence that is 90%, 91%, 92%, 93%, 94%, 95%, 96%, 97%, 98%, 99%, or 100% identical to SEQ ID NO: 75). In some embodiments, the GPP synthase has an amino acid sequence that is at least 95% identical to the amino acid sequence of SEQ ID NO: 75 (e.g., an amino acid sequence that is 95%, 96%, 97%, 98%, 99%, or 100% identical to SEQ ID NO: 75). In some embodiments, the GPP synthase has an amino acid sequence of SEQ ID NO: 75.

In some embodiments, the host cell further contains one or more heterologous nucleic acids that each, independently, encode an acetyl-CoA synthase, and/or an aldehyde dehydrogenase, and/or a pyruvate decarboxylase. In some embodiments, the acetyl-CoA synthase has an amino acid sequence that is at least 90% identical to the amino acid sequence of SEQ ID NO: 66 (e.g., an amino acid sequence that is 90%, 91%, 92%, 93%, 94%, 95%, 96%, 97%, 98%, 99%, or 100% identical to SEQ ID NO: 66). In some embodiments, the acetyl-CoA synthase has an amino acid sequence that is at least 95% identical to the amino acid sequence of SEQ ID NO: 66 (e.g., an amino acid sequence that is 95%, 96%, 97%, 98%, 99%, or 100% identical to SEQ ID NO: 66). In some embodiments, the acetyl-CoA synthase has the amino acid sequence of SEQ ID NO: 66. In some embodiments, the aldehyde dehydrogenase has an amino acid sequence that is at least 90% identical to the amino acid sequence of SEQ ID NO: 67 (e.g., an amino acid sequence that is 90%, 91%, 92%, 93%, 94%, 95%, 96%, 97%, 98%, 99%, or 100% identical to SEQ ID NO: 67). In some embodiments, the aldehyde dehydrogenase has an amino acid sequence that is at least 95% identical to the amino acid sequence of SEQ ID NO: 67 (e.g., an amino acid sequence that is 95%, 96%, 97%, 98%, 99%, or 100% identical to SEQ ID NO: 67). In some embodiments, the aldehyde dehydrogenase synthase has the amino acid sequence of SEQ ID NO: 67. In some embodiments, the pyruvate decarboxylase has an amino acid sequence that is at least 90% identical to the amino acid sequence of SEQ ID NO: 65 (e.g., an amino acid sequence that is 90%, 91%, 92%, 93%, 94%, 95%, 96%, 97%, 98%, 99%, or 100% identical to SEQ ID NO: 65). In some embodiments, the pyruvate decarboxylase has an amino acid sequence that is at least 95% identical to the amino acid sequence of SEQ ID NO: 65 (e.g., an amino acid sequence that is 95%, 96%, 97%, 98%, 99%, or 100% identical to SEQ ID NO: 65). In some embodiments, the pyruvate decarboxylase has the amino acid sequence of SEQ ID NO: 65.

In some embodiments, expression of the one or more heterologous nucleic acids is regulated by an exogenous agent. In some embodiments, the exogenous agent decreases production of the cannabinoid. In some embodiments, the exogenous agent increases production of the cannabinoid. In some embodiments, the exogenous agent is galactose and expression of at least one of the heterologous nucleic acids is under the control of a GAL promoter. In some embodiments, expression of at least one of the heterologous nucleic acids is under the control of a galactose-responsive promoter. In some embodiments, expression of at least one of the heterologous nucleic acids is under the control of a maltose-responsive promoter. In some embodiments, expression of at least one of the heterologous nucleic acids is under the control of a combination of both a galactose-responsive promoter and a maltose-responsive promoter.

In another aspect, the disclosure features a method of producing a cannabinoid by culturing a population of genetically modified host cells of any of the above aspects or embodiments of the disclosure in a culture medium under conditions suitable for the host cells to produce the cannabinoid. In some embodiments, the culture medium contains less than 3 mM hexanoic acid (e.g., from 1 nM to 2.9 mM hexanoic acid, from 10 nM to 2.9 mM hexanoic acid, from 100 nM to 2.9 mM hexanoic acid, or from 1 μM to 2.9 mM hexanoic acid) hexanoic acid.

In another aspect, the disclosure features a fermentation composition comprising: a population of genetically modified yeast cells comprising the host cell of any of the above aspects or embodiments of the disclosure and a culture medium comprising one or more cannabinoids produced from the yeast cells.

In another aspect, the disclosure features a method of recovering one or more cannabinoids from the fermentation composition, the method comprising separating at least a portion of the population of genetically modified yeast cells from the culture medium; contacting the separated host cells with a wash liquid; and removing the wash liquid from the separated host cells.

In another aspect, the disclosure features a method of producing a cannabinoid including culturing the mixture of any of the above aspects or embodiments of the disclosure under conditions suitable for the host cells to produce the cannabinoid.

In another aspect, the disclosure features a fermentation composition containing a mixture of any of the above aspects or embodiments of the disclosure.

In another aspect, the disclosure features a non-naturally occurring CBGaS enzyme capable of producing CBGA and at least one additional cannabinoid selected from SCBGA, CBGOA, SCBGOA, CBGVA, SCBGVA, CBGXA, and SCBGXA.

In another aspect, the disclosure features a non-naturally occurring CBGaS enzyme capable of accepting, as a substrate, olivetolic acid and at least one additional precursor selected from orsellinic acid, divarinolic acid, and 2,4-dihydroxy-6-phenylethylbenzoic acid.

In another aspect, the disclosure features a non-naturally occurring CBGaS enzyme capable of catalyzing:

(a) conversion of olivetolic acid to cannabigerolic acid (CBGA) in the presence of GPP and/or to sesquicannabigerolic acid (SCBGA) in the presence of FPP; and/or (b) conversion of orsellinic acid to cannabigerorcinic acid (CBGOA) in the presence of GPP and/or to sesquicannabigerorcinic acid (SCBGOA) in the presence of FPP; and/or (c) conversion of divarinolic acid to cannabigerovarinic acid (CBGVA) in the presence of GPP and/or to sesquicannabigerovarinic acid (SCBGVA) in the presence of FPP; and/or (d) conversion of 2,4-dihydroxy-6-phenylethylbenzoic acid to 3-geranyl-2,4-dihydroxy-6-phenylethylbenzoic acid (CBGXA) in the presence of GPP and/or to 3-farnesyl-2,4-dihydroxy-6-phenylethylbenzoic acid (SCBGXA) in the presence of FPP.

In another aspect, the disclosure features a CBGaS enzyme (e.g., a non-naturally occurring CBGaS enzyme) having an amino acid sequence that is at least 90% identical (e.g., at least 91%, at least 92%, at least 93%, at least 94%, at least 95%, at least 96%, at least 97%, at least 98%, or at least 99% identical) to the amino acid sequence of SEQ ID NO: 55, SEQ ID NO:56, SEQ ID NO:57, or SEQ ID NO:58. In some embodiments, the CBGaS comprises one or more amino acid substitutions relative to the amino acid sequence of SEQ ID NO: 55 selected from M88I, V133I, S141Y, Y319L, and L324F.

In some embodiments of any of the foregoing aspects, the CBGaS has the amino acid substitution M88I relative to the amino acid sequence of SEQ ID NO: 55. In some embodiments, the CBGaS has the amino acid substitution V133I relative to the amino acid sequence of SEQ ID NO: 55. In some embodiments, the CBGaS has the amino acid substitution S141Y relative to the amino acid sequence of SEQ ID NO: 55. In some embodiments, the CBGaS has the amino acid substitution Y319L relative to the amino acid sequence of SEQ ID NO: 55. In some embodiments, the CBGaS has the amino acid substitution L324F relative to the amino acid sequence of SEQ ID NO: 55.

In some embodiments, the CBGaS enzyme has an amino acid sequence that is at least 90% identical (e.g., at least 91%, at least 92%, at least 93%, at least 94%, at least 95%, at least 96%, at least 97%, at least 98%, or at least 99% identical) to the amino acid sequence of SEQ ID NO: 56, wherein the CBGaS comprises one or more amino acid substitutions relative to the amino acid sequence of SEQ ID NO: 56 selected from P7K, P7T, T11T, H49C, M83V, A89A, N93V, A131G, V149F, A176V, R196F, T202A, V242L, T248A, C249F, A257Y, A257F, V262L, N264Y, N264F, L276T, L276P, A279C, A279S, A282P, N309F, M311L, S312L, Y319L, I324E, I324K, L325P, and L325A.

In some embodiments of any of the foregoing aspects, the CBGaS has the amino acid substitution P7K or P7T relative to the amino acid sequence of SEQ ID NO: 56. In some embodiments, the CBGaS has the amino acid substitution T11T relative to the amino acid sequence of SEQ ID NO: 56. In some embodiments, the CBGaS has the amino acid substitution H49C relative to the amino acid sequence of SEQ ID NO: 56. In some embodiments, the CBGaS has the amino acid substitution M83V relative to the amino acid sequence of SEQ ID NO: 56. In some embodiments, the CBGaS has the amino acid substitution A89A relative to the amino acid sequence of SEQ ID NO: 56. In some embodiments, the CBGaS has the amino acid substitution N93V relative to the amino acid sequence of SEQ ID NO: 56. In some embodiments, the CBGaS has the amino acid substitution A131G relative to the amino acid sequence of SEQ ID NO: 56. In some embodiments, the CBGaS has the amino acid substitution V149F relative to the amino acid sequence of SEQ ID NO: 56. In some embodiments, the CBGaS has the amino acid substitution A176V relative to the amino acid sequence of SEQ ID NO: 56. In some embodiments, the CBGaS has the amino acid substitution R196F relative to the amino acid sequence of SEQ ID NO: 56. In some embodiments, the CBGaS has the amino acid substitution T202A relative to the amino acid sequence of SEQ ID NO: 56. In some embodiments, the CBGaS has the amino acid substitution V242L relative to the amino acid sequence of SEQ ID NO: 56. In some embodiments, the CBGaS has the amino acid substitution T248A relative to the amino acid sequence of SEQ ID NO: 56. In some embodiments, the CBGaS has the amino acid substitution C249F relative to the amino acid sequence of SEQ ID NO: 56. In some embodiments, the CBGaS has the amino acid substitution A257Y or A257F relative to the amino acid sequence of SEQ ID NO: 56. In some embodiments, the CBGaS has the amino acid substitution V262L relative to the amino acid sequence of SEQ ID NO: 56. In some embodiments, the CBGaS has the amino acid substitution N264Y or N264F relative to the amino acid sequence of SEQ ID NO: 56. In some embodiments, the CBGaS has the amino acid substitution L276T or L276P relative to the amino acid sequence of SEQ ID NO: 56. In some embodiments, the CBGaS has the amino acid substitution A279C or A279S relative to the amino acid sequence of SEQ ID NO: 56. In some embodiments, the CBGaS has the amino acid substitution A282P relative to the amino acid sequence of SEQ ID NO: 56. In some embodiments, the CBGaS has the amino acid substitution N309F relative to the amino acid sequence of SEQ ID NO: 56. In some embodiments, the CBGaS has the amino acid substitution M311L relative to the amino acid sequence of SEQ ID NO: 56. In some embodiments, the CBGaS has the amino acid substitution S312L relative to the amino acid sequence of SEQ ID NO: 56. In some embodiments, the CBGaS has the amino acid substitution Y319L relative to the amino acid sequence of SEQ ID NO: 56. In some embodiments, the CBGaS has the amino acid substitution I324E or I324K relative to the amino acid sequence of SEQ ID NO: 56. In some embodiments, the CBGaS has the amino acid substitution L325P or L325A relative to the amino acid sequence of SEQ ID NO: 56.

In another aspect, the disclosure features a non-naturally occurring CBGaS enzyme having an amino acid sequence that is at least 90% identical (e.g., at least 91%, at least 92%, at least 93%, at least 94%, at least 95%, at least 96%, at least 97%, at least 98%, at least 99%, or 100% identical) to the amino acid sequence of SEQ ID NO: 63.

In another aspect, the disclosure features a CBGaS enzyme (e.g., a non-naturally occurring CBGaS enzyme) having an amino acid sequence that is at least 90% identical (e.g., at least 91%, at least 92%, at least 93%, at least 94%, at least 95%, at least 96%, at least 97%, at least 98%, or at least 99% identical) to the amino acid sequence of SEQ ID NO: 63, wherein the CBGaS has one or more amino acid substitutions relative to the amino acid sequence of SEQ ID NO: 63 selected from I109T, F119L, S245L, S247Y, M270T, C280L, S295D, V314L, A324F, and S361I.

In some embodiments of any of the foregoing aspects, the CBGaS has the amino acid substitution I109T relative to the amino acid sequence of SEQ ID NO: 63. In some embodiments, the CBGaS has the amino acid substitution F119L relative to the amino acid sequence of SEQ ID NO: 63. In some embodiments, the CBGaS has the amino acid substitution S245L relative to the amino acid sequence of SEQ ID NO: 63. In some embodiments, the CBGaS has the amino acid substitution S247Y relative to the amino acid sequence of SEQ ID NO: 63. In some embodiments, the CBGaS has the amino acid substitution M270T relative to the amino acid sequence of SEQ ID NO: 63. In some embodiments, the CBGaS has the amino acid substitution C280L relative to the amino acid sequence of SEQ ID NO: 63. In some embodiments, the CBGaS has the amino acid substitution S295D relative to the amino acid sequence of SEQ ID NO: 63. In some embodiments, the CBGaS has the amino acid substitution V314L relative to the amino acid sequence of SEQ ID NO: 63. In some embodiments, the CBGaS has the amino acid substitution A324F relative to the amino acid sequence of SEQ ID NO: 63. In some embodiments, the CBGaS has the amino acid substitution S361I relative to the amino acid sequence of SEQ ID NO: 63.

In another aspect, the disclosure features a non-naturally occurring CBGaS enzyme having an amino acid sequence that is at least 90% identical (e.g., at least 91%, at least 92%, at least 93%, at least 94%, at least 95%, at least 96%, at least 97%, at least 98%, at least 99%, or 100% identical) to the amino acid sequence of SEQ ID NO: 64.

In another aspect, the disclosure features a CBGaS enzyme (e.g., a non-naturally occurring CBGaS enzyme) having an amino acid sequence that is at least 90% identical (e.g., at least 91%, at least 92%, at least 93%, at least 94%, at least 95%, at least 96%, at least 97%, at least 98%, or at least 99% identical) to the amino acid sequence of SEQ ID NO: 64, wherein the CBGaS has one or more amino acid substitutions relative to the amino acid sequence of SEQ ID NO: 64 selected from M275S, M275T, T276C, T276F, K291H, V292Y, V292H, V292F, G310C, F314N, A331C, A331T, and A347I.

In some embodiments of any of the foregoing aspects, the CBGaS has the amino acid substitution M275S or M275T relative to the amino acid sequence of SEQ ID NO: 64. In some embodiments, the CBGaS has the amino acid substitution T276C or T276F relative to the amino acid sequence of SEQ ID NO: 64. In some embodiments, the CBGaS has the amino acid substitution K291H relative to the amino acid sequence of SEQ ID NO: 64. In some embodiments, the CBGaS has the amino acid substitution V292Y, V292H, or V292F relative to the amino acid sequence of SEQ ID NO: 64. In some embodiments, the CBGaS has the amino acid substitution G310C relative to the amino acid sequence of SEQ ID NO: 64. In some embodiments, the CBGaS has the amino acid substitution F314N relative to the amino acid sequence of SEQ ID NO: 64. In some embodiments, the CBGaS has the amino acid substitution A331C or A331T relative to the amino acid sequence of SEQ ID NO: 64. In some embodiments, the CBGaS has the amino acid substitution A347I relative to the amino acid sequence of SEQ ID NO: 64.

In another aspect, the disclosure features an OAC enzyme having an amino acid sequence that is at least 90% identical (e.g., at least 91%, at least 92%, at least 93%, at least 94%, at least 95%, at least 96%, at least 97%, at least 98%, at least 99%, or 100% identical) to the amino acid sequence of any one of SEQ ID NOs: 45-52.

In another aspect, the disclosure features an OAC enzyme (e.g., a non-naturally occurring OAC enzyme) having an amino acid sequence that is at least 90% identical (e.g., at least 91%, at least 92%, at least 93%, at least 94%, at least 95%, at least 96%, at least 97%, at least 98%, or at least 99% identical) to the amino acid sequence of SEQ ID NO: 44, wherein the OAC has one or more amino acid substitutions relative to the amino acid sequence of SEQ ID NO: 44 selected from A2S, L9I, K12S, E14S, F23L, V28L, T47R, Q48R, K49R, S87H, F88Y, and L92Y.

In some embodiments of any of the foregoing aspects, the OAC has the amino acid substitution A2S relative to the amino acid sequence of SEQ ID NO: 44. In some embodiments, the OAC has the amino acid substitution L9I relative to the amino acid sequence of SEQ ID NO: 44. In some embodiments, the OAC has the amino acid substitution K12S relative to the amino acid sequence of SEQ ID NO: 44. In some embodiments, the OAC has the amino acid substitution E14S relative to the amino acid sequence of SEQ ID NO: 44. In some embodiments, the OAC has the amino acid substitution F23L relative to the amino acid sequence of SEQ ID NO: 44. In some embodiments, the OAC has the amino acid substitution V28L relative to the amino acid sequence of SEQ ID NO: 44. In some embodiments, the OAC has the amino acid substitution T47R relative to the amino acid sequence of SEQ ID NO: 44. In some embodiments, the OAC has the amino acid substitution Q48R relative to the amino acid sequence of SEQ ID NO: 44. In some embodiments, the OAC has the amino acid substitution K49R relative to the amino acid sequence of SEQ ID NO: 44. In some embodiments, the OAC has the amino acid substitution S87H relative to the amino acid sequence of SEQ ID NO: 44. In some embodiments, the OAC has the amino acid substitution F88Y relative to the amino acid sequence of SEQ ID NO: 44. In some embodiments, the OAC has the amino acid substitution L92Y relative to the amino acid sequence of SEQ ID NO: 44.

In another aspect, the disclosure features a nucleic acid encoding the enzyme of any one of the foregoing aspects or embodiments of the disclosure. In another aspect, the disclosure features a host cell comprising the nucleic acid, such as a yeast cell or yeast strain. In some embodiments, the yeast cell is *S. cerevisiae*, among other possible options described herein.

DEFINITIONS

Figure 1:
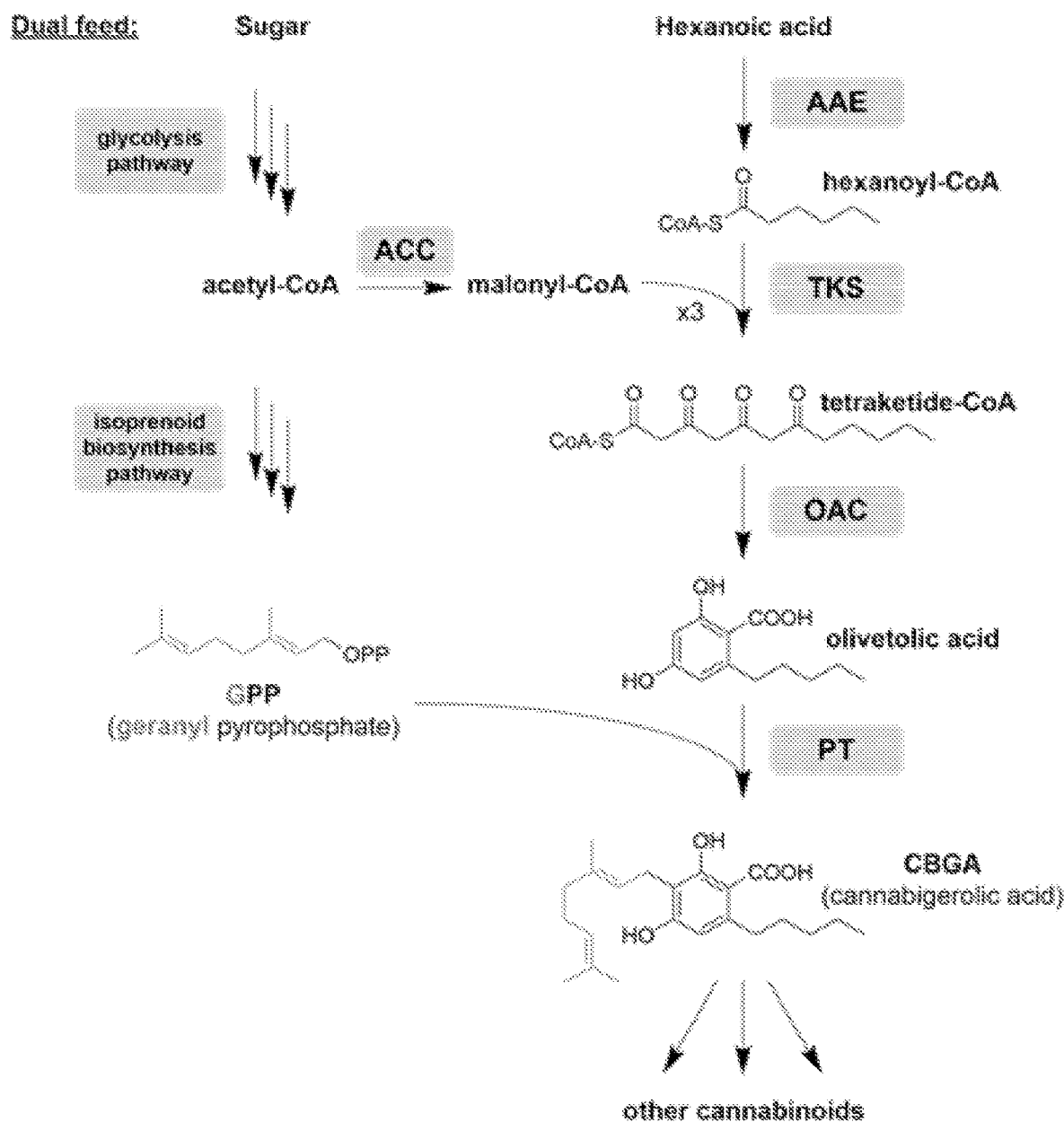
FIG. 1 shows a portion of the cannabinoid biosynthetic pathway referenced herein.

As used herein the singular forms "a," "an," and, "the" include plural reference unless the context clearly dictates otherwise.

The term "about" when modifying a numerical value or range herein includes normal variation encountered in the field, and includes plus or minus 1-10% (e.g., 1%, 2%, 3%, 4%, 5%, 6%, 7%, 8%, 9% or 10%) of the numerical value or end points of the numerical range. Thus, a value of 10 includes all numerical values from 9 to 11. All numerical ranges described herein include the endpoints of the range unless otherwise noted, and all numerical values in-between the end points, to the first significant digit.

As used herein, the terms "acyl activating enzyme," "AAE enzyme," "AAE," and the like are used interchangeably and refer to an enzyme that catalyzes the activation of a carboxylic acid as a part of the cannabinoid biosynthetic pathway. Exemplary AAE enzymes of the disclosure generate hexanoate from hexanoyl-CoA. Exemplary AAE enzymes of the disclosure include those having the amino acid sequence of any one of SEQ ID NOs: 1-24 or an amino acid sequence that is at least 70% identical (e.g., at least 75%, 80%, 85%, 86%, 87%, 88%, 89%, 90%, 91%, 92%, 93%, 94%, 95%, 96%, 97%, 98%, or 99% identical) thereto.

As used herein, the term "cannabinoid" refers to a chemical substance that binds or interacts with a cannabinoid receptor (for example, a human cannabinoid receptor) and includes, without limitation, chemical compounds such endocannabinoids, phytocannabinoids, and synthetic cannabinoids. Synthetic compounds are chemicals made to mimic phytocannabinoids which are naturally found in the *Cannabis* plant (e.g., *Cannabis sativa*), including but not limited to cannabigerols (CBG), cannabichromens (CBC), cannabidiol (CBD), tetrahydrocannabinol (THC), cannabinol (CBN), cannabinodiol (CBDL), cannabicyclol (CBL), cannabielsoin (CBE), and cannabitriol (CBT).

As used herein, the term "capable of producing" refers to a host cell which is genetically modified to include the enzymes necessary for the production of a given compound in accordance with a biochemical pathway that produces the compound. For example, a cell (e.g., a yeast cell) "capable of producing" a cannabinoid is one that contains the enzymes necessary for production of the cannabinoid according to the cannabinoid biosynthetic pathway.

As used herein, the term "conservatively modified variants" refers to a nucleic acid or amino acid sequences that are substantially identical to a reference. With respect to particular nucleic acid sequences, conservatively modified variants refer to those nucleic acids which encode identical or essentially identical amino acid sequences, or where the nucleic acid does not encode an amino acid sequence to essentially identical sequences. Because of the degeneracy of the genetic code, a large number of functionally identical nucleic acids encode any given protein. For instance, the codons GCA, GCC, GCG and GCU all encode the amino acid alanine. Thus, at every position where an alanine is specified by a codon, the codon can be altered to any of the corresponding codons described without altering the encoded polypeptide. Such nucleic acid variations are "silent variations," which are one species of conservatively modified variations. Every nucleic acid sequence herein which encodes a polypeptide also describes every possible silent variation of the nucleic acid. One of skill will recognize that each codon in a nucleic acid (except AUG, which is ordinarily the only codon for methionine) can be modified to yield a functionally identical molecule. Accordingly, each silent variation of a nucleic acid which encodes a polypeptide is implicit in each described sequence.

As to amino acid sequences, one of skill will recognize that individual substitutions, in a nucleic acid, peptide, polypeptide, or protein sequence which alters a single amino acid or a small percentage of amino acids in the encoded sequence is a "conservatively modified variant" where the alteration results in the substitution of an amino acid with a chemically similar amino acid. Conservative substitution tables providing functionally similar amino acids are well known in the art. Examples of amino acid groups defined in this manner can include: a "charged/polar group" including Glu (Glutamic acid or E), Asp (Aspartic acid or D), Asn (Asparagine or N), Gln (Glutamine or Q), Lys (Lysine or K), Arg (Arginine or R) and His (Histidine or H); an "aromatic or cyclic group" including Pro (Proline or P), Phe (Phenylalanine or F), Tyr (Tyrosine or Y) and Trp (Tryptophan or W); and an "aliphatic group" including Gly (Glycine or G), Ala (Alanine or A), Val (Valine or V), Leu (Leucine or L), Ile (Isoleucine or I), Met (Methionine or M), Ser (Serine or S), Thr (Threonine or T) and Cys (Cysteine or C). Within each group, subgroups can also be identified. For example, at pH 7, the group of charged/polar amino acids can be sub-divided into sub-groups including: the "positively-charged sub-group" comprising Lys, Arg and His; the "negatively-charged sub-group" comprising Glu and Asp; and the "polar sub-group" comprising Asn and Gln. In another example, the aromatic or cyclic group can be sub-divided into sub-groups including: the "nitrogen ring sub-group" comprising Pro, His and Trp; and the "phenyl sub-group" comprising Phe and Tyr. In another further example, the aliphatic group can be sub-divided into sub-groups including: the "large aliphatic non-polar sub-group" comprising Val, Leu and Iie; the "aliphatic slightly-polar sub-group" comprising Met, Ser, Thr and Cys; and the "small-residue sub-group" comprising Gly and Ala. Examples of conservative mutations include amino acid substitutions of amino acids within the sub-groups above, such as, but not limited to: Lys for Arg or vice versa, such that a positive charge can be maintained; Glu for Asp or vice versa, such that a negative charge can be maintained; Ser for Thr or vice versa, such that a free —OH can be maintained; and Gln for Asn or vice versa, such that a free —NH$_2$ can be maintained. The following six groups each contain amino acids that further provide illustrative conservative substitutions for one another. 1) Ala, Ser, Thr; 2) Asp, Glu; 3) Asn, Gln; 4) Arg, Lys; 5) Ile, Leu, Met, Val; and 6) Phe, Try, and Trp (see, e.g., Creighton, Proteins (1984)).

As used herein, the terms "cannabigerolic acid synthase," "CBGaS enzyme," "CBGaS," and the like are used interchangeably and refer to a prenyltransferase capable of utilizing, for example, GPP or FPP, to convert a precursor, such as olivetolic acid, orsellinic acid, divarinolic acid, or 2,4-dihydroxy-6-phenylethylbenzoic acid, to a cannabinoid, such as cannabigerolic acid (CBGA), cannabigerol (CBG), sesquicannabigerolic acid (SCBGA), cannabigerorcinic acid (CBGOA), sesquicannabigerorcinic acid (SCBGOA), cannabigerovarinic acid (CBGVA), sesquicannabigerovarinic acid (SCBGVA), 3-geranyl-2,4-dihydroxy-6-phenylethylbenzoic acid (CBGXA), or 3-farnesyl-2,4-dihydroxy-6-phenylethylbenzoic acid (SCBGXA). Exemplary CBGaS enzymes of the disclosure include those having the amino acid sequence of any one of SEQ ID NOs: 55-58, 63, and 64, or an amino acid sequence that is at least 70% identical (e.g., at least 75%, 80%, 85%, 86%, 87%, 88%, 89%, 90%, 91%, 92%, 93%, 94%, 95%, 96%, 97%, 98%, or 99% identical) thereto.

As used herein, the term "endogenous" refers to a substance or process that can occur naturally in a host cell. In contrast, the term "exogenous" refers a substance or compound that originated outside an organism or cell. The exogenous substance or compound can retain its normal function or activity when introduced into an organism or host cell described herein.

The term "expression cassette" or "expression construct" refers to a nucleic acid construct that, when introduced into a host cell, results in transcription and/or translation of an RNA or polypeptide, respectively. In the case of expression of transgenes, one of skill will recognize that the inserted polynucleotide sequence need not be identical but may be only substantially identical to a sequence of the gene from which it was derived. As explained herein, these substantially identical variants are specifically covered by reference to a specific nucleic acid sequence. One example of an expression cassette is a polynucleotide construct that contains a polynucleotide sequence encoding a polypeptide for use in the invention operably linked to a promoter, e.g., its native promoter, where the expression cassette is introduced into a heterologous microorganism. In some embodiments, an expression cassette contains a polynucleotide sequence encoding a polypeptide of the invention where the polynucleotide that is targeted to a position in the genome of a microorganism such that expression of the polynucleotide sequence is driven by a promoter that is present in the microorganism.

As used herein, the term "fermentation composition" refers to a composition which contains genetically modified host cells and products or metabolites produced by the genetically modified host cells. An example of a fermentation composition is a whole cell broth, which may be the entire contents of a vessel, including cells, aqueous phase, and compounds produced from the genetically modified host cells.

As used herein, the term "gene" refers to the segment of DNA involved in producing or encoding a polypeptide chain. It may include regions preceding and following the coding region (leader and trailer) as well as intervening sequences (introns) between individual coding segments (exons). Alternatively, the term "gene" can refer to the segment of DNA involved in producing or encoding a non-translated RNA, such as an rRNA, tRNA, gRNA, or micro RNA.

A "genetic pathway" or "biosynthetic pathway" as used herein refer to a set of at least two different coding sequences, where the coding sequences encode enzymes that catalyze different parts of a synthetic pathway to form a desired product (e.g., a cannabinoid). In a genetic pathway a first encoded enzyme uses a substrate to make a first product which in turn is used as a substrate for a second encoded enzyme to make a second product. In some embodiments, the genetic pathway includes 3 or more members (e.g., 3, 4, 5, 6, 7, 8, 9, etc.), wherein the product of one encoded enzyme is the substrate for the next enzyme in the synthetic pathway. An example of a cannabinoid synthetic pathway is shown in FIG. 1.

As used herein, the term "genetic switch" refers to one or more genetic elements that allow controlled expression of enzymes, e.g., enzymes that catalyze the reactions of cannabinoid biosynthesis pathways. For example, a genetic switch can include one or more promoters operably linked to one or more genes encoding a biosynthetic enzyme, or one or more promoters operably linked to a transcriptional regulator which regulates expression one or more biosynthetic enzymes.

As used herein, the term "genetically modified" denotes a host cell that contains a heterologous nucleotide sequence. The genetically modified host cells described herein typically do not exist in nature.

As used herein, the terms "geranyl pyrophosphate synthase," "GPP synthase," "GPPS enzyme," "GPPS," and the like are used interchangeably and refer to a prenyltransferase enzyme capable of producing an intermediate in the isoprenoid biosynthesis pathway, such as geranyl pyrophosphate (GPP) or farnesyl pyrophosphate (FPP).

As used herein, the term "heterologous" refers to what is not normally found in nature. The term "heterologous compound" refers to the production of a compound by a cell that does not normally produce the compound, or to the production of a compound at a level not normally produced by the cell. For example, a cannabinoid can be a heterologous compound.

The term "heterologous compound" refers to the production of a compound by a cell that does not normally produce the compound, or to the production of a compound at a level at which it is not normally produced by the cell.

As used herein, the phrase "heterologous enzyme" refers to an enzyme that is not normally found in a given cell in nature. The term encompasses an enzyme that is: (a) exogenous to a given cell (i.e., encoded by a nucleotide sequence that is not naturally present in the host cell or not naturally present in a given context in the host cell); and (b) naturally found in the host cell (e.g., the enzyme is encoded by a nucleotide sequence that is endogenous to the cell) but that is produced in an unnatural amount (e.g., greater or lesser than that naturally found) in the host cell.

A "heterologous genetic pathway" or a "heterologous biosynthetic pathway" as used herein refer to a genetic pathway that does not normally or naturally exist in an organism or cell.

The term "host cell" as used in the context of this invention refers to a microorganism, such as yeast, and includes an individual cell or cell culture contains a heterologous vector or heterologous polynucleotide as described herein. Host cells include progeny of a single host cell, and the progeny may not necessarily be completely identical (in morphology or in total DNA complement) to the original parent cell due to natural, accidental, or deliberate mutation and/or change. A host cell includes cells into which a recombinant vector or a heterologous polynucleotide of the invention has been introduced, including by transformation, transfection, and the like.

As used herein, the term "introducing" in the context of introducing a nucleic acid or protein into a host cell refers to any process that results in the presence of a heterologous nucleic acid or polypeptide inside the host cell. For example, the term encompasses introducing a nucleic acid molecule (e.g., a plasmid or a linear nucleic acid) that encodes the nucleic acid of interest (e.g., an RNA molecule) or polypeptide of interest and results in the transcription of the RNA molecules and translation of the polypeptides. The term also encompasses integrating the nucleic acid encoding the RNA molecules or polypeptides into the genome of a progenitor cell. The nucleic acid is then passed through subsequent generations to the host cell, so that, for example, a nucleic acid encoding an RNA-guided endonuclease is "pre-integrated" into the host cell genome. In some cases, introducing refers to translocation of a nucleic acid or polypeptide from outside the host cell to inside the host cell. Various methods of introducing nucleic acids, polypeptides and other biomolecules into host cells are contemplated, including but not limited to, electroporation, contact with nanowires or nanotubes, spheroplasting, PEG 1000-mediated transformation, biolistics, lithium acetate transformation, lithium chloride transformation, and the like.

As used herein, the term "medium" refers to culture medium and/or fermentation medium.

The terms "modified," "recombinant" and "engineered," when used to modify a host cell described herein, refer to host cells or organisms that do not exist in nature, or express compounds, nucleic acids or proteins at levels that are not expressed by naturally occurring cells or organisms.

As used herein, the term "non-naturally occurring" refers to a substance (e.g., a protein, such as an enzyme described herein), that is not produced by an organism (e.g., yeast, such as a yeast strain described herein) without human intervention. Exemplary non-naturally occurring enzymes of the disclosure include the modified CBGaS and OAC enzymes described herein, which contain one or more amino acid substitutions relative to a reference enzyme that is naturally occurring.

As used herein, the terms "olivetolic acid cyclase," "OAC enzyme," "OAC," and the like are used interchangeably and refer to an enzyme that catalyzes the cyclization of tetraketide-CoA, thereby generating olivetolic acid, as part of the cannabinoid biosynthetic pathway. Exemplary OAC enzymes of the disclosure include those having the amino acid sequence of any one of SEQ ID NOs: 45-52 or an amino acid sequence that is at least 70% identical (e.g., at least 75%, 80%, 85%, 86%, 87%, 88%, 89%, 90%, 91%, 92%, 93%, 94%, 95%, 96%, 97%, 98%, or 99% identical) thereto.

As used herein, the phrase "operably linked" refers to a functional linkage between nucleic acid sequences such that the linked promoter and/or regulatory region functionally controls expression of the coding sequence.

"Percent (%) sequence identity" with respect to a reference polynucleotide or polypeptide sequence is defined as the percentage of nucleic acids or amino acids in a candidate sequence that are identical to the nucleic acids or amino acids in the reference polynucleotide or polypeptide sequence, after aligning the sequences and introducing gaps, if necessary, to achieve the maximum percent sequence identity. Alignment for purposes of determining percent nucleic acid or amino acid sequence identity can be achieved in various ways that are within the capabilities of one of skill in the art, for example, using publicly available computer software such as BLAST, BLAST-2, or Megalign software. Those skilled in the art can determine appropriate parameters for aligning sequences, including any algorithms needed to achieve maximal alignment over the full length of the sequences being compared. For example, percent sequence identity values may be generated using the sequence comparison computer program BLAST. As an illustration, the percent sequence identity of a given nucleic acid or amino acid sequence, A, to, with, or against a given nucleic acid or amino acid sequence, B, (which can alternatively be phrased as a given nucleic acid or amino acid sequence, A that has a certain percent sequence identity to, with, or against a given nucleic acid or amino acid sequence, B) is calculated as follows:

$$100 \text{ multiplied by (the fraction } X/Y)$$

where X is the number of nucleotides or amino acids scored as identical matches by a sequence alignment program (e.g., BLAST) in that program's alignment of A and B, and where Y is the total number of nucleic acids in B. It will be appreciated that where the length of nucleic acid or amino acid sequence A is not equal to the length of nucleic acid or amino acid The terms "polynucleotide" and "nucleic acid" are used interchangeably and refer to a single or double-stranded polymer of deoxyribonucleotide or ribonucleotide bases read from the 5' to the 3' end. A nucleic acid as used in the present invention will generally contain phosphodiester bonds, although in some cases, nucleic acid analogs may be used that may have alternate backbones, comprising, e.g., phosphoramidate, phosphorothioate, phosphorodithioate, or O-methylphosphoroamidite linkages (see Eckstein, Oligonucleotides and Analogues: A Practical Approach, Oxford University Press); positive backbones; non-ionic backbones, and non-ribose backbones. Nucleic acids or polynucleotides may also include modified nucleotides that permit correct read-through by a polymerase. "Polynucleotide sequence" or "nucleic acid sequence" includes both the sense and antisense strands of a nucleic acid as either individual single strands or in a duplex. As will be appreciated by those in the art, the depiction of a single strand also defines the sequence of the complementary strand; thus the sequences described herein also provide the complement of the sequence. Unless otherwise indicated, a particular nucleic acid sequence also implicitly encompasses variants thereof (e.g., degenerate codon substitutions) and complementary sequences, as well as the sequence explicitly indicated. The nucleic acid may be DNA, both genomic and cDNA, RNA or a hybrid, where the nucleic acid may contain combinations of deoxyribo- and ribo-nucleotides, and combinations of bases, including uracil, adenine, thymine, cytosine, guanine, inosine, xanthine hypoxanthine, isocytosine, isoguanine, etc. Nucleic acid sequences are presented in the 5' to 3' direction unless otherwise specified.

As used herein, the terms "polypeptide," "peptide," and "protein" are used interchangeably to refer to a polymer of amino acid residues. The terms encompass amino acid chains of any length, including full-length proteins, wherein the amino acid residues are linked by covalent peptide bonds.

As used herein, the term "production" generally refers to an amount of compound produced by a genetically modified host cell provided herein. In some embodiments, production is expressed as a yield of the compound by the host cell. In other embodiments, production is expressed as a productivity of the host cell in producing the compound.

As used herein, the term "productivity" refers to production of a compound by a host cell, expressed as the amount of non-catabolic compound produced (by weight) per amount of fermentation broth in which the host cell is cultured (by volume) over time (per hour).

As used herein, the term "promoter" refers to a synthetic or naturally-derived nucleic acid that is capable of activating, increasing or enhancing expression of a DNA coding sequence, or inactivating, decreasing, or inhibiting expression of a DNA coding sequence. A promoter may contain one or more specific transcriptional regulatory sequences to further enhance or repress expression and/or to alter the spatial expression and/or temporal expression of the coding sequence. A promoter may be positioned 5' (upstream) of the coding sequence under its control. A promoter may also initiate transcription in the downstream (3') direction, the upstream (5') direction, or be designed to initiate transcription in both the downstream (3') and upstream (5') directions. The distance between the promoter and a coding sequence to be expressed may be approximately the same as the distance between that promoter and the native nucleic acid sequence it controls. As is known in the art, variation in this distance may be accommodated without loss of promoter function. The term also includes a regulated promoter, which generally allows transcription of the nucleic acid sequence while in a permissive environment (e.g., microaerobic fermentation conditions, or the presence of maltose), but ceases transcription of the nucleic acid sequence while in a non-permissive environment (e.g., aerobic fermentation conditions, or in the absence of maltose). Promoters used herein can be constitutive, inducible, or repressible.

As used herein, the terms "tetraketide synthase," "TKS enzyme," "TKS," and the like are used interchangeably and refer to an enzyme that is capable of producing tetraketide-CoA from a hexanoyl-CoA precursor in the presence of malonyl-CoA. Exemplary TKS enzymes of the disclosure include those having the amino acid sequence of any one of SEQ ID NOs: 25-43 or an amino acid sequence that is at least 70% identical (e.g., at least 75%, 80%, 85%, 86%, 87%, 88%, 89%, 90%, 91%, 92%, 93%, 94%, 95%, 96%, 97%, 98%, or 99% identical) thereto.

The term "yield" refers to production of a compound by a host cell, expressed as the amount of compound produced per amount of carbon source consumed by the host cell, by weight.

DETAILED DESCRIPTION OF THE INVENTION

The present disclosure features host cells capable of producing a cannabinoid and methods for genetically modifying a host cell to be capable of producing a cannabinoid. The genetically modified host cells include heterologous nucleic acids that independently encode an acyl activating enzyme (AAE), and/or a tetraketide synthase (TKS), and/or a cannabigerolic acid synthase (CBGaS), and/or an olivetolic acid cyclase (OAC). Provided herein are enzymes that have been identified to have AAE, TKS, CBGaS, or OAC activity, wherein in some embodiments the enzyme identified was found to have greater activity in comparison to the Cannabis sativa wild-type AAE, TKS, CBGaS, or OAC. The AAE, TKS, CBGaS, and OAC are all enzymes part of a heterologous biosynthetic pathway for cannabinoid synthesis. The heterologous biosynthetic pathway can be differentially regulated by one or more exogenous agents.

Cannabinoid Pathway

In an aspect, the host cell includes a heterologous genetic pathway that produces a cannabinoid or a precursor of a cannabinoid. The cannabinoid biosynthetic pathway may begin with hexanoic acid as the substrate for an acyl activating enzyme (AAE) to produce hexanoyl-CoA, which is used as the substrate of a tetraketide synthase to produce tetraketide-CoA, which is used by an olivetolic acid cyclase (OAC) to produce olivetolic acid, which is then used to produce a cannabigerolic acid by a geranyl pyrophosphate (GPP) synthase and a cannabigerolic acid synthase (CBGaS) as shown in FIG. 1. In some embodiments, the cannabinoid precursor that is produced is a substrate in the cannabinoid pathway (e.g., hexanoate or olivetolic acid). In some embodiments, the precursor is a substrate for an AAE, a TKS, an OAC, a CBGaS, or a GPP synthase. In some embodiments, the precursor, substrate, or intermediate in the cannabinoid pathway is hexanoate, olivetol, or olivetolic acid. In some embodiments, the precursor is hexanoate. In some embodiments, the host cell does not contain the precursor, substrate or intermediate in an amount sufficient to produce the cannabinoid or a precursor of the cannabinoid. In some embodiments, the host cell does not contain hexanoate at a level or in an amount sufficient to produce the cannabinoid in an amount over 10 mg/L. In some embodiments, the heterologous genetic pathway encodes at least one enzyme selected from the group consisting of an AAE, a TKS, an OAC, a CBGaS, or a GPP synthase. In some embodiments, the genetically modified host cell includes an AAE, TKS, OAC, CBGaS, and a GPP synthase. The cannabinoid pathway is described in Keasling et al. (WO 2018/200888).

Acyl Activating Enzymes

Some embodiments concern a host cell that includes a heterologous AAE such that the host cell is capable of producing a cannabinoid. The AAE may be from Cannabis sativa or may be an enzyme from another plant or fungal source which has been shown to have AAE activity in the cannabinoid biosynthetic pathway, resulting in the production of the cannabinoid precursor olivetolic acid. In some embodiments, the heterologous AAE may have greater activity compared to the AAE from Cannabis sativa (SEQ ID NO: 6).

In some embodiments, the host cell contains a heterologous nucleic acid that encodes an AAE having an amino acid sequence that is at least 90% identical to the amino acid sequence of any one of SEQ ID NOS: 1-24 (e.g., an amino acid sequence that is 90%, 91%, 92%, 93%, 94%, 95%, 96%, 97%, 98%, 99%, or 100% identical to any one of SEQ ID NOS: 1-24). For example, the AAE may have an amino acid sequence that is at least 90% identical to the amino acid sequence of any one of SEQ ID NO: 1-5 and 7-24. In some embodiments, the AAE has an amino acid sequence that is at least 95% identical to the amino acid sequence of any one of SEQ ID NO: 1-5 and 7-24 (e.g., an amino acid sequence that is 95%, 96%, 97%, 98%, 99%, or 100% identical to any one of SEQ ID NO: 1-5 and 7-24). In some embodiments, the AAE has the amino acid sequence of any one of SEQ ID NO: 1-5 and 7-24. In some embodiments, the host cell contains a heterologous nucleic acid that encodes an AAE having an amino acid sequence that is at least 90% identical to the amino acid sequence of any one of SEQ ID NO: 1-4 (e.g., an amino acid sequence that is 90%, 91%, 92%, 93%, 94%, 95%, 96%, 97%, 98%, 99%, or 100% identical to any one of SEQ ID NO: 1-4). In some embodiments, the AAE has an amino acid sequence that is at least 95% identical to the amino acid sequence of any one of SEQ ID NO: 1-4 (e.g., an amino acid sequence that is 95%, 96%, 97%, 98%, 99%, or 100% identical to any one of SEQ ID NO: 1-4). In some embodiments, the AAE has the amino acid sequence of any one of SEQ ID NO: 1-4.

Tetraketide Synthase Enzymes

Some embodiments concern a host cell that includes a heterologous TKS such that the host cell is capable of producing a cannabinoid. A TKS uses the hexanoyl-CoA precursor to generate tetraketide-CoA. The TKS may be from *Cannabis sativa* or may be an enzyme from another plant or fungal source which has been shown to have TKS activity in the cannabinoid biosynthetic pathway, resulting in the production of the cannabinoid precursor olivetolic acid. In some embodiments, the heterologous TKS may have greater activity compared to the TKS from *Cannabis sativa* (SEQ ID NO: 26).

In some embodiments, the host cell contains a heterologous nucleic acid that encodes a TKS having an amino acid sequence that is at least 90% identical to the amino acid sequence of any one of SEQ ID NOS: 25 and 27-43 (e.g., an amino acid sequence that is 90%, 91%, 92%, 93%, 94%, 95%, 96%, 97%, 98%, 99%, or 100% identical to any one of SEQ ID NOS: 25 and 27-43). In some embodiments, the TKS has an amino acid sequence that is at least 95% identical to the amino acid sequence of any one of SEQ ID NOS: 25 and 27-43 (e.g., an amino acid sequence that is 95%, 96%, 97%, 98%, 99%, or 100% identical to any one of SEQ ID NOS: 25 and 27-43). In some embodiments, the TKS has the amino acid sequence of any one of SEQ ID NOS: 25 and 27-43. In some embodiments, the host cell contains a heterologous nucleic acid that encodes a TKS having an amino acid sequence that is at least 90% identical to the amino acid sequence of any one of SEQ ID NOS: 25 and 27-39 (e.g., an amino acid sequence that is 90%, 91%, 92%, 93%, 94%, 95%, 96%, 97%, 98%, 99%, or 100% identical to any one of SEQ ID NOS: 25 and 27-39). In some embodiments, the TKS has an amino acid sequence that is at least 95% identical to the amino acid sequence of any one of SEQ ID NOS: 25 and 27-39 (e.g., an amino acid sequence that is 95%, 96%, 97%, 98%, 99%, or 100% identical to any one of SEQ ID NOS: 25 and 27-39). In some embodiments, the TKS has the amino acid sequence of any one of SEQ ID NOS: 25 and 27-39. In some embodiments, the host cell contains a heterologous nucleic acid that encodes a TKS having an amino acid sequence that is at least 90% identical to the amino acid sequence of SEQ ID NO: 25 or 39 (e.g., an amino acid sequence that is 90%, 91%, 92%, 93%, 94%, 95%, 96%, 97%, 98%, 99%, or 100% identical to SEQ ID NO: 25 or 39). In some embodiments, the TKS has an amino acid sequence that is at least 95% identical to the amino acid sequence of SEQ ID NO: 25 or 39 (e.g., an amino acid sequence that is 95%, 96%, 97%, 98%, 99%, or 100% identical to SEQ ID NO: 25 or 39). In some embodiments, the TKS has the amino acid sequence of SEQ ID NO: 25 or 39.

Cannabigerolic Acid Synthases

Some embodiments concern novel CBGaS enzymes, and/or a host cell that includes a heterologous CBGaS such that the host cell is capable of producing a cannabinoid. In some embodiments, a CBGaS of the disclosure uses an olivetolic acid precursor and GPP or FPP to generate cannabigerolic acid (CBGA) or sesquicannabigerolic acid (SCBGA). In some embodiments, a CBGaS of the disclosure uses an orsellinic acid precursor and GPP or FPP to generate cannabigerorcinic acid (CBGOA) or sesquicannabigerorcinic acid (SCBGOA). In some embodiments, a CBGaS of the disclosure uses a divarinolic acid precursor and GPP or FPP to generate cannabigerovarinic acid (CBGVA) or sesquicannabigerovarinic acid (SCBGVA). In some embodiments, a CBGaS of the disclosure uses 2,4-dihydroxy-6-phenylethylbenzoic acid and GPP or FPP to generate 3-geranyl-2,4-dihydroxy-6-phenylethylbenzoic acid (CBGXA) or 3-farnesyl-2,4-dihydroxy-6-phenylethylbenzoic acid (SCBGXA). The CBGaS may be from *Cannabis sativa* or may be an enzyme from another plant or fungal source which has been shown to have CBGaS activity in the cannabinoid biosynthetic pathway, resulting in the production of the cannabinoid cannabigerolic acid. In some embodiments, the heterologous CBGaS may have greater activity compared to the TKS from *Cannabis sativa* (SEQ ID NO: 53).

In some embodiments, the host cell contains a heterologous nucleic acid that encodes a CBGaS having an amino acid sequence that is at least 90% identical to the amino acid sequence of any one of SEQ ID NOS: 55-58, 63, and 64 (e.g., an amino acid sequence that is 90%, 91%, 92%, 93%, 94%, 95%, 96%, 97%, 98%, 99%, or 100% identical to any one of SEQ ID NOS: 55-58, 63, and 64). In some embodiments, the CBGaS has an amino acid sequence that is at least 95% identical to the amino acid sequence of any one of SEQ ID NOS: 55-58, 63, and 64 (e.g., an amino acid sequence that is 95%, 96%, 97%, 98%, 99%, or 100% identical to any one of SEQ ID NOS: 55-58, 63, and 64). In some embodiments, the CBGaS has the amino acid sequence of any one of SEQ ID NOS: 55-58, 63, and 64.

Olivetolic Acid Cyclase Enzymes

Some embodiments concern a host cell that includes a heterologous OAC such that the host cell is capable of producing a cannabinoid. OAC uses the olivetolic acid precursor and GPP precursor to generate cannabigerolic acid. The OAC may be from *Cannabis sativa* or may be an enzyme from another plant or fungal source which has been shown to have OAC activity in the cannabinoid biosynthetic pathway, resulting in the production of the cannabinoid cannabigerolic acid. In some embodiments, the heterologous OAC may have greater activity compared to the OAC from *Cannabis sativa* (SEQ ID NO: 44).

In some embodiments, the host cell contains a heterologous nucleic acid that encodes an OAC having an amino acid sequence that is at least 90% identical to the amino acid sequence of any one of SEQ ID NOS: 45-52 (e.g., an amino acid sequence that is 90%, 91%, 92%, 93%, 94%, 95%, 96%, 97%, 98%, 99%, or 100% identical to any one of SEQ ID NOS: 45-52). In some embodiments, the OAC has an amino acid sequence that is at least 95% identical to the amino acid sequence of any one of SEQ ID NOS: 45-52 (e.g., an amino acid sequence that is 95%, 96%, 97%, 98%, 99%, or 100% identical to any one of SEQ ID NOS: 45-52). In some embodiments, OAC has the amino acid sequence of any one of SEQ ID NOS: 45-52.

Geranyl Pyrophosphate Synthase

Some embodiments concern a host cell that includes a heterologous GPP synthase such that the host cell is capable of producing a cannabinoid. A GPP synthase uses the product of the isoprenoid biosynthesis pathway precursor to generate cannabigerolic acid together with a prenyltransferase enzyme. The GPP synthase may be from *Cannabis sativa* or may be an enzyme from another plant or bacterial source which has been shown to have GPP synthase activity in the cannabinoid biosynthetic pathway, resulting in the production of the cannabinoid cannabigerolic acid.

In some embodiments, the host cell contains a heterologous nucleic acid that encodes a GPP synthase having an amino acid sequence that is at least 90% identical to the amino acid sequence of SEQ ID NO: 75 (e.g., an amino acid sequence that is 90%, 91%, 92%, 93%, 94%, 95%, 96%, 97%, 98%, 99%, or 100% identical to SEQ ID NO: 65-75). In some embodiments, the GPP synthase has an amino acid sequence that is at least 95% identical to the amino acid sequence of SEQ ID NO: 75 (e.g., an amino acid sequence that is 95%, 96%, 97%, 98%, 99%, or 100% identical to SEQ ID NO: 65-75). In some embodiments, GPP synthase has the amino acid sequence of SEQ ID NO: 75.

Chimeric Enzymes

Some embodiments concern a host cell that includes a heterologous protein produced by chimeragenesis such that the host cell is capable of producing a cannabinoid as described in Examples 14 and 15. The techniques of protein chimeragenesis is part of a family of protein engineering techniques referred to as DNA shuffling, recombination, molecular breeding, simply "chimeragenesis," or other names (Engqvist M K M & Rabe K S, *Plant Physiol.* 179:3, 2019, 907-917). In chimeragenesis, new protein sequences are constructed by concatenating different parts of two or more homologous proteins, and the resulting proteins may possess properties not found in any of the parents (Otey C R et al., *PLoS Biol.* 4:5, 2006, e112). While many proteins generated via chimeragenesis may be non-functional due to protein mis-folding, a careful choice of crossover sites between homologous proteins can result in chimeric proteins that are more likely to be folded and functional (Voigt C A et al., *Nat. Struct. Biol.,* 9:7, 2002, 553-558).

In some embodiments, the host cell contains a heterologous nucleic acid that encodes a chimeric CBGaS enzyme. In some embodiments, the parent protein for chimeragenesis includes an amino acid sequence having at least 90% sequence identity to any one of SEQ ID NO: 59-62 (e.g., an amino acid sequence that is 90%, 91%, 92%, 93%, 94%, 95%, 96%, 97%, 98%, 99%, or 100% identical to SEQ ID NO: 59-62). In some embodiments, the parent protein for chimeragenesis includes an amino acid sequence having at least 95% sequence identity to any one of SEQ ID NO: 59-62 (e.g., an amino acid sequence that is 95%, 96%, 97%, 98%, 99%, or 100% identical to SEQ ID NO: 59-62). In some embodiments, the parent protein for chimeragenesis includes an amino acid sequence of SEQ ID NO: 59-62. In some embodiments, the host cell contains a heterologous nucleic acid that encodes a CBGaS enzyme having at least 90% sequence identity to SEQ ID NO: 63 or 64 (e.g., an amino acid sequence that is 90%, 91%, 92%, 93%, 94%, 95%, 96%, 97%, 98%, 99%, or 100% identical to SEQ ID NO: 63 or 64). In some embodiments, the host cell contains a heterologous nucleic acid that encodes a chimeric CBGaS enzyme having at least 95% sequence identity to SEQ ID NO: 63 or 64 (e.g., an amino acid sequence that is 95%, 96%, 97%, 98%, 99%, or 100% identical to SEQ ID NO: 63 or 64). In some embodiments, the host cell contains a heterologous nucleic acid that encodes a CBGaS enzyme having the amino acid sequence of SEQ ID NO: 63 or 64.

In some embodiments, the host cell contains a heterologous nucleic acid that encodes a CBGaS that includes a M88I, V133I, S141Y, Y319L, L324F, V149F, M83V, T202A, N264Y, N264F, A282P, S312L, T11T, L276T, L276P, I324E, H49C, S312L, L325P, I324K, L325A, P7K, R196F, A176V, N309F, P7T, A279C, A279S, A89A, V262L, N93V, A257Y, A131G, A257F, V242L, C249F, M311L, T248A, M83V, I109T, F119L, S245L, S247Y, M270T, S295D, C280L, V314L, A324F, or S361I substitution relative to SEQ ID NO: 54. In some embodiments, the CBGaS enzyme produced by chimeragenesis has increased substrate specificity relative to the wild-type enzyme. In some embodiments, the CBGaS enzyme produced by chimeragenesis has an increased production of cannabigerolic acid relative to the wild-type CBGaS. In some embodiments, the CBGaS enzyme produced by chimeragenesis has a decreased production of sesquicannabigerolic acid relative to the wild-type CBGaS.

Additional Enzymes

The host cell may further express other heterologous enzymes in addition to the AAE, TKS, CBGaS, OAC, and/or GPP synthase. For example, the host cell may include enzymes that make up the mevalonate biosynthetic pathway. These enzymes may include but are not limited to an acetyl-CoA thiolase, a HMG-CoA synthase, a HMG-CoA reductase, a mevalonate kinase, a phosphomevalonate kinase, a mevalonate pyrophosphate decarboxylase, and an IPP:DMAPP isomerase. In some embodiments, the host cell includes a heterologous nucleic acid that encodes the acetyl-CoA thiolase, the HMG-CoA synthase, the HMG-CoA reductase, the mevalonate kinase, the phosphomevalonate kinase, the mevalonate pyrophosphate decarboxylase, and the IPP:DMAPP isomerase of the mevalonate biosynthesis pathway. In some embodiments, host cell contains a heterologous nucleic acid encoding an acetoacetyl-CoA synthase (AACS) instead of a heterologous nucleic acid encoding an acetyl-CoA thiolase. In some embodiments, the host cell contains a heterologous nucleic acid encoding an acetyl-CoA carboxylase (ACC) instead of a heterologous nucleic acid encoding an acetyl-CoA thiolase.

In some embodiments, the host cell may express heterologous enzymes of the central carbon metabolism. Enzymes of the central carbon metabolism may include an acetyl-CoA synthase, an aldehyde dehydrogenase, and a pyruvate decarboxylase. In some embodiments, the host cell includes heterologous nucleic acids that independently encode an acetyl-CoA synthase, and/or an aldehyde dehydrogenase, and/or a pyruvate decarboxylase. In some embodiments, the acetyl-CoA synthase and the aldehyde dehydrogenase from *Saccharomyces cerevisiae*, and the pyruvate decarboxylase from *Zymomonas mobilis*. In some embodiments, the acetyl-CoA synthase has an amino acid sequence that is at least 90% (e.g., at least 91%, 92%, 93%, 94%, 95%, 96%, 97%, 98%, and 99%) identical to the amino acid sequence of SEQ ID NO: 66. In some embodiments, the acetyl-CoA synthase has an amino acid sequence of SEQ ID NO: 66. In some embodiments, the aldehyde dehydrogenase has an amino acid sequence that is at least 90% (e.g., at least 91%, 92%, 93%, 94%, 95%, 96%, 97%, 98%, and 99%) identical to the amino acid sequence of SEQ ID NO: 67. In some embodiments, the aldehyde dehydrogenase has an amino acid sequence of SEQ ID NO: 67. In some embodiments, the pyruvate dehydrogenase has an amino acid sequence that is at least 90% (e.g., at least 91%, 92%, 93%, 94%, 95%, 96%, 97%, 98%, and 99%) identical to the amino acid sequence of SEQ ID NO: 65. In some embodiments, the pyruvate decarboxylase has an amino acid sequence of SEQ ID NO: 65.

Due to the inherent degeneracy of the genetic code, other polynucleotides which encode substantially the same or functionally equivalent polypeptides can also be used to clone and express the polynucleotides encoding the protein components of the heterologous genetic pathway described herein.

As will be understood by those of skill in the art, it can be advantageous to modify a coding sequence to enhance its expression in a particular host. The genetic code is redundant with 64 possible codons, but most organisms typically use a subset of these codons. The codons that are utilized most often in a species are called optimal codons, and those not utilized very often are classified as rare or low-usage codons. Codons can be substituted to reflect the preferred codon usage of the host, in a process sometimes called "codon optimization" or "controlling for species codon bias."

Optimized coding sequences containing codons preferred by a particular prokaryotic or eukaryotic host (Murray et al., 1989, *Nucl Acids Res.* 17: 477-508) can be prepared, for example, to increase the rate of translation or to produce recombinant RNA transcripts having desirable properties, such as a longer half-life, as compared with transcripts produced from a non-optimized sequence. Translation stop codons can also be modified to reflect host preference. For example, typical stop codons for *S. cerevisiae* and mammals are UAA and UGA, respectively. The typical stop codon for monocotyledonous plants is UGA, whereas insects and *E. coli* commonly use UAA as the stop codon (Dalphin et al., 1996, Nucl Acids Res. 24: 216-8).

Those of skill in the art will recognize that, due to the degenerate nature of the genetic code, a variety of DNA molecules differing in their nucleotide sequences can be used to encode a given enzyme of the disclosure. Any one of the polypeptide sequences disclosed herein may be encoded by DNA molecules of any sequence that encode the amino acid sequences of the polypeptides and proteins of the enzymes utilized in the methods of the disclosure. In a similar fashion, a polypeptide can typically tolerate one or more amino acid substitutions, deletions, and insertions in its amino acid sequence without loss or significant loss of a desired activity. The disclosure includes such polypeptides with different amino acid sequences than the specific proteins described herein so long as the modified or variant polypeptides have the enzymatic anabolic or catabolic activity of the reference polypeptide. Furthermore, the amino acid sequences encoded by the DNA sequences shown herein merely illustrate embodiments of the disclosure.

In addition, homologs of enzymes useful for the compositions and methods provided herein are encompassed by the disclosure. In some embodiments, two proteins (or a region of the proteins) are substantially homologous when the amino acid sequences have at least about 30%, 40%, 50% 60%, 65%, 70%, 75%, 80%, 85%, 90%, 91%, 92%, 93%, 94%, 95%, 96%, 97%, 98%, or 99% identity. To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). In one embodiment, the length of a reference sequence aligned for comparison purposes is at least 30%, typically at least 40%, more typically at least 50%, even more typically at least 60%, and even more typically at least 70%, 80%, 90%, 100% of the length of the reference sequence. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position (as used herein amino acid or nucleic acid "identity" is equivalent to amino acid or nucleic acid "homology"). The percent identity between the two sequences is a function of the number of identical positions shared by the sequences, taking into account the number of gaps, and the length of each gap, which need to be introduced for optimal alignment of the two sequences.

When "homologous" is used in reference to proteins or peptides, it is recognized that residue positions that are not identical often differ by conservative amino acid substitutions. A "conservative amino acid substitution" is one in which an amino acid residue is substituted by another amino acid residue having a side chain (R group) with similar chemical properties (e.g., charge or hydrophobicity). In general, a conservative amino acid substitution will not substantially change the functional properties of a protein. In cases where two or more amino acid sequences differ from each other by conservative substitutions, the percent sequence identity or degree of homology may be adjusted upwards to correct for the conservative nature of the substitution. Means for making this adjustment are well known to those of skill in the art (e.g., Pearson W. R., 1994, Methods in Mol Biol 25: 365-89).

The following six groups each contain amino acids that are conservative substitutions for one another: 1) Serine (S), Threonine (T); 2) Aspartic Acid (D), Glutamic Acid (E); 3) Asparagine (N), Glutamine (Q); 4) Arginine (R), Lysine (K); 5) Isoleucine (I), Leucine (L), Alanine (A), Valine (V), and 6) Phenylalanine (F), Tyrosine (Y), Tryptophan (W).

Sequence homology for polypeptides, which is also referred to as percent sequence identity, is typically measured using sequence analysis software. A typical algorithm used comparing a molecule sequence to a database containing a large number of sequences from different organisms is the computer program BLAST. When searching a database containing sequences from a large number of different organisms, it is typical to compare amino acid sequences.

Furthermore, any of the genes encoding the foregoing enzymes (or any others mentioned herein (or any of the regulatory elements that control or modulate expression thereof)) may be optimized by genetic/protein engineering techniques, such as directed evolution or rational mutagenesis, which are known to those of ordinary skill in the art. Such action allows those of ordinary skill in the art to optimize the enzymes for expression and activity in a host cell, for example, a yeast.

In addition, genes encoding these enzymes can be identified from other fungal and bacterial species and can be expressed in the host cell. A variety of organisms could serve as sources for these enzymes, including, but not limited to, *Saccharomyces* spp., including *S. cerevisiae* and *S. uvarum*, *Kluyveromyces* spp., including *K. thermotolerans*, *K. lactis*, and *K. marxianus*, *Pichia* spp., *Hansenula* spp., including *H. polymorphs*, *Candida* spp., *Trichosporon* spp., *Yamadazyma* spp., including *Y.* spp. *stipitis*, *Torulaspora pretoriensis*, *Issatchenkia orientalis*, *Schizosaccharomyces* spp., including *S. pombe*, *Cryptococcus* spp., *Aspergillus* spp., *Neurospora* spp., or *Ustilago* spp. Sources of genes from anaerobic fungi include, but are not limited to, *Piromyces* spp., *Orpinomyces* spp., or *Neocallimastix* spp. Sources of prokaryotic enzymes that are useful include, but are not limited to, *Escherichia coli*, *Zymomonas mobilis*, *Staphylococcus aureus*, *Bacillus* spp., *Clostridium* spp., *Corynebacterium* spp., *Pseudomonas* spp., *Lactococcus* spp., *Enterobacter* spp., and *Salmonella* spp.

Techniques known to those skilled in the art may be suitable to identify additional homologous genes and homologous enzymes. Generally, analogous genes and/or analogous enzymes can be identified by functional analysis and will have functional similarities. Techniques known to those skilled in the art may be suitable to identify analogous genes and analogous enzymes. For example, to identify homologous or analogous ADA genes, proteins, or enzymes, techniques may include, but are not limited to, cloning a gene by PCR using primers based on a published sequence of an ADA gene/enzyme or by degenerate PCR using degenerate primers designed to amplify a conserved region among ADA genes. Further, one skilled in the art can use techniques to identify homologous or analogous genes, proteins, or enzymes with functional homology or similarity. Techniques include examining a cell or cell culture for the catalytic activity of an enzyme through in vitro enzyme assays for said activity (e.g. as described herein or in Kiritani, K., Branched-Chain Amino Acids Methods Enzymology, 1970), then isolating the enzyme with said activity through purification, determining the protein sequence of the enzyme through techniques such as Edman degradation, design of PCR primers to the likely nucleic acid sequence, amplification of said DNA sequence through PCR, and cloning of said nucleic acid sequence. To identify homologous or similar genes and/or homologous or similar enzymes, analogous genes and/or analogous enzymes or proteins, techniques also include comparison of data concerning a candidate gene or enzyme with databases such as BRENDA, KEGG, JGI Phyzome v12.1, BLAST, NCBI RefSeq, UniProt KB, or MetaCYC Protein annotations in the UniProt Knowledgebase may also be used to identify enzymes which have a similar function in addition to the National Center for Biotechnology Information RefSeq database. The candidate gene or enzyme may be identified within the above-mentioned databases in accordance with the teachings herein.

Modified Host Cells

In one aspect, provided herein are host cells comprising at least one enzyme of the cannabinoid biosynthetic pathway (e.g., AAE, TKS, CBGaS, and OAC). In some embodiments, the cannabinoid biosynthetic pathway contains a genetic regulatory element, such as a nucleic acid sequence, that is regulated by an exogenous agent. In some embodiments, the exogenous agent acts to regulate expression of the heterologous genetic pathway. Thus, in some embodiments, the exogenous agent can be a regulator of gene expression.

In some embodiments, the exogenous agent can be used as a carbon source by the host cell. For example, the same exogenous agent can both regulate production of a cannabinoid and provide a carbon source for growth of the host cell. In some embodiments, the exogenous agent is galactose. In some embodiments, the exogenous agent is maltose.

In some embodiments, the genetic regulatory element is a nucleic acid sequence, such as a promoter.

In some embodiments, the genetic regulatory element is a galactose-responsive promoter. In some embodiments, galactose positively regulates expression of the cannabinoid biosynthetic pathway, thereby increasing production of the cannabinoid. In some embodiments, the galactose-responsive promoter is a GAL1 promoter. In some embodiments, the galactose-responsive promoter is a GAL10 promoter. In some embodiments, the galactose-responsive promoter is a GAL2, GAL3, or GAL7 promoter. In some embodiments, heterologous genetic pathway contains the galactose-responsive regulatory elements described in Westfall et al. (*PNAS* (2012) vol. 109: E111-118). In some embodiments, the host cell lacks the gall gene and is unable to metabolize galactose, but galactose can still induce galactose-regulated genes.

In some embodiments, the galactose regulation system used to control expression of AAE, and/or, TKS, and/or CBGaS, and/or OAC is re-configured such that it is no longer induced by the presence of galactose. Instead, the genes (e.g., AAE, TKS, CBGaS, or OAC) will be expressed unless repressors, which may be maltose in some strains, are present in the medium.

In some embodiments, the genetic regulatory element is a maltose-responsive promoter. In some embodiments, maltose negatively regulates expression of the cannabinoid biosynthetic pathway, thereby decreasing production of the cannabinoid. In some embodiments, the maltose-responsive promoter is selected from the group consisting of pMAL1, pMAL2, pMAL11, pMAL12, pMAL31 and pMAL32. The maltose genetic regulatory element can be designed to both activate expression of some genes and repress expression of others, depending on whether maltose is present or absent in the medium. Maltose regulation of gene expression and maltose-responsive promoters are described in U.S. Patent Publication 2016/0177341, which is hereby incorporated by reference. Genetic regulation of maltose metabolism is described in Novak et al., "Maltose Transport and Metabolism in *S. cerevisiae*," *Food Technol. Biotechnol.* 42 (3) 213-218 (2004).

In some embodiments, the heterologous genetic pathway is regulated by a combination of the maltose and galactose regulons.

In some embodiments, the recombinant host cell does not contain, or expresses a very low level of (for example, an undetectable amount), a precursor (e.g., hexanoic acid) required to make the cannabinoid. In some embodiments, the precursor (e.g., hexanoic acid) is a substrate of an enzyme in the cannabinoid biosynthetic pathway.

Yeast Strains

In some embodiments, yeasts useful in the present methods include yeasts that have been deposited with microorganism depositories (e.g. IFO, ATCC, etc.) and belong to the genera *Aciculoconidium, Ambrosiozyma, Arthroascus, Arxiozyma, Ashbya, Babjevia, Bensingtonia, Botryoascus, Botryozyma, Brettanomyces, Bullera, Bulleromyces, Candida, Citeromyces, Clavispora, Cryptococcus, Cystofilobasidium, Debaryomyces, Dekkara, Dipodascopsis, Dipodascus, Eeniella, Endomycopsella, Eremascus, Eremothecium, Erythrobasidium, Fellomyces, Filobasidium, Galactomyces, Geotrichum, Guilliermondella, Hanseniaspora, Hansenula, Hasegawaea, Holtermannia, Hormoascus, Hyphopichia, Issatchenkia, Kloeckera, Kloeckeraspora, Kluyveromyces, Kondoa, Kuraishia, Kurtzmanomyces, Leucosporidium, Lipomyces, Lodderomyces, Malassezia, Metschnikowia, Mrakia, Myxozyma, Nadsonia, Nakazawaea, Nematospora, Ogataea, Oosporidium, Pachysolen, Phachytichospora, Phaffia, Pichia, Rhodosporidium, Rhodotorula, Saccharomyces, Saccharomycodes, Saccharomycopsis, Saitoella, Sakaguchia, Saturnospora, Schizoblastosporion, chizosaccharomyces, Schwanniomyces, Sporidiobolus, Sporobolomyces, Sporopachydermia, Stephanoascus, Sterigmatomyces, Sterigmatosporidium, Symbiotaphrina, Sympodiomyces, Sympodiomycopsis, Torulaspora, Trichosporiella, Trichosporon, Trigonopsis, Tsuchiyaea, Udeniomyces, Waltomyces, Wickerhamia, Wickerhamiella, Williopsis, Yamadazyma, Yarrowia, Zygoascus, Zygosaccharomyces, Zygowilliopsis*, and *Zygozyma*, among others.

In some embodiments, the strain is *Saccharomyces cerevisiae, Pichia pastoris, Schizosaccharomyces pombe, Dekkera bruxellensis, Kluyveromyces lactis* (previously called *Saccharomyces lactis*), *Kluyveromyces marxianus, Arxula adeninivorans*, or *Hansenula polymorphs* (now known as *Pichia angusta*). In some embodiments, the host microbe is a strain of the genus *Candida*, such as *Candida lipolytica, Candida guilliermondii, Candida krusei, Candida pseudotropicalis*, or *Candida utilis*.

In a particular embodiment, the strain is *Saccharomyces cerevisiae*. In some embodiments, the host is a strain of *Saccharomyces cerevisiae* selected from the group consisting of Baker's yeast, CEN.PK, CEN.PK2, CBS 7959, CBS 7960, CBS 7961, CBS 7962, CBS 7963, CBS 7964, IZ-1904, TA, BG-1, CR-1, SA-1, M-26, Y-904, PE-2, PE-5, VR-1, BR-1, BR-2, ME-2, VR-2, MA-3, MA-4, CAT-1, CB-1, NR-1, BT-1, and AL-1. In some embodiments, the strain of *Saccharomyces cerevisiae* is CEN.PK.

In some embodiments, the strain is a microbe that is suitable for industrial fermentation. In particular embodiments, the microbe is conditioned to subsist under high solvent concentration, high temperature, expanded substrate utilization, nutrient limitation, osmotic stress due to sugar and salts, acidity, sulfite and bacterial contamination, or combinations thereof, which are recognized stress conditions of the industrial fermentation environment.

Mixtures

In another aspect, provided are mixtures of the host cells described herein and a culture medium described herein. In some embodiments, the culture medium contains an exogenous agent described herein. In some embodiments, the culture medium contains an exogenous agent that decreases production of a cannabinoid. In some embodiments, the exogenous agent that decreases production of the heterologous product is maltose. In a particular embodiment, the exogenous agent that decreases production of a cannabinoid is maltose.

In some embodiments, the culture medium contains an exogenous agent that increases production of the cannabinoid. In some embodiments, the exogenous agent that increases production of the cannabinoid is galactose. In some embodiments, the culture medium contains a precursor or substrate required to make the cannabinoid. In some embodiments, the precursor required to make the cannabinoid is hexanoate. In some embodiments, the precursor required to make the cannabinoid is hexanoic acid. In some embodiments, the precursor required to make the cannabinoid is olivetolic acid.

In some embodiments, the culture medium contains an exogenous agent that increases production of the cannabinoid and a precursor or substrate required to make the cannabinoid. In some embodiments, the exogenous agent that increases production of the cannabinoid is galactose, and the precursor or substrate required to make the cannabinoid is hexanoate.

Methods of Making the Host Cells

In another aspect, provided are methods of making the modified host cells described herein. In some embodiments, the methods include transforming a host cell with the heterologous nucleic acid constructs described herein which encode the proteins expressed by a heterologous genetic pathway described herein. Methods for transforming host cells are described in "Laboratory Methods in Enzymology: DNA", Edited by Jon Lorsch, Volume 529, (2013); and U.S. Pat. No. 9,200,270 to Hsieh, Chung-Ming, et al., and references cited therein.

Methods for Producing a Cannabinoid

In another aspect, methods are provided for producing a cannabinoid are described herein. In some embodiments, the method decreases expression of the cannabinoid. In some embodiments, the method includes culturing a host cell comprising at least one enzyme of the cannabinoid biosynthetic pathway described herein in a medium comprising an exogenous agent, wherein the exogenous agent decreases the expression of the cannabinoid. In some embodiments, the exogenous agent is maltose. In some embodiments, the exogenous agent is maltose. In some embodiments, the method results in less than 0.001 mg/L of cannabinoid or a precursor thereof.

In some embodiments, the method is for decreasing expression of a cannabinoid or precursor thereof. In some embodiments, the method includes culturing a host cell comprising an AAE, and/or a TKS, and/or a CBGaS, and/or an OAC described herein in a medium comprising an exogenous agent, wherein the exogenous agent decreases the expression of the cannabinoid. In some embodiments, the exogenous agent is maltose. In some embodiments, the exogenous agent is maltose. In some embodiments, the method results in the production of less than 0.001 mg/L of a cannabinoid or a precursor thereof.

In some embodiments, the method increases the expression of a cannabinoid. In some embodiments, the method includes culturing a host cell comprising an AAE, and/or a TKS, and/or a CBGaS, and/or an OAC described herein in a medium comprising the exogenous agent, wherein the exogenous agent increases expression of the cannabinoid. In some embodiments, the exogenous agent is galactose. In some embodiments, the method further includes culturing the host cell with the precursor or substrate required to make the cannabinoid.

In some embodiments, the method increases the expression of a cannabinoid product or precursor thereof. In some embodiments, the method includes culturing a host cell comprising a heterologous cannabinoid pathway described herein in a medium comprising an exogenous agent, wherein the exogenous agent increases the expression of the cannabinoid or a precursor thereof. In some embodiments, the exogenous agent is galactose. In some embodiments, the method further includes culturing the host cell with a precursor or substrate required to make the cannabinoid or precursor thereof. In some embodiments, the precursor required to make the cannabinoid or precursor thereof is hexanoate. In some embodiments, the combination of the exogenous agent and the precursor or substrate required to make the cannabinoid or precursor thereof produces a higher yield of cannabinoid than the exogenous agent alone.

In some embodiments, the cannabinoid or a precursor thereof is cannabidiolic acid (CBDA), cannabidiol (CBD), cannabigerolic acid (CBGA), or cannabigerol (CBG).

Culture and Fermentation Methods

Materials and methods for the maintenance and growth of microbial cultures are well known to those skilled in the art of microbiology or fermentation science (see, for example, Bailey et al., Biochemical Engineering Fundamentals, second edition, McGraw Hill, New York, 1986). Consideration must be given to appropriate culture medium, pH, temperature, and requirements for aerobic, microaerobic, or anaerobic conditions, depending on the specific requirements of the host cell, the fermentation, and the process.

The methods of producing cannabinoids provided herein may be performed in a suitable culture medium in a suitable container, including but not limited to a cell culture plate, a flask, or a fermentor. Further, the methods can be performed at any scale of fermentation known in the art to support industrial production of microbial products. Any suitable fermentor may be used including a stirred tank fermentor, an airlift fermentor, a bubble fermentor, or any combination thereof. In particular embodiments utilizing *Saccharomyces cerevisiae* as the host cell, strains can be grown in a fermentor as described in detail by Kosaric, et al, in Ullmann's Encyclopedia of Industrial Chemistry, Sixth Edition, Volume 12, pages 398-473, Wiley-VCH Verlag GmbH & Co. KDaA, Weinheim, Germany.

In some embodiments, the culture medium is any culture medium in which a genetically modified microorganism capable of producing a heterologous product can subsist, i.e., maintain growth and viability. In some embodiments, the culture medium is an aqueous medium comprising assimilable carbon, nitrogen and phosphate sources. Such a medium can also include appropriate salts, minerals, metals, and other nutrients. In some embodiments, the carbon source and each of the essential cell nutrients are added incrementally or continuously to the fermentation medium, and each required nutrient is maintained at essentially the minimum level needed for efficient assimilation by growing cells, for example, in accordance with a predetermined cell growth curve based on the metabolic or respiratory function of the cells which convert the carbon source to a biomass.

Suitable conditions and suitable medium for culturing microorganisms are well known in the art. In some embodiments, the suitable medium is supplemented with one or more additional agents, such as, for example, an inducer (e.g., when one or more nucleotide sequences encoding a gene product are under the control of an inducible promoter), a repressor (e.g., when one or more nucleotide sequences encoding a gene product are under the control of a repressible promoter), or a selection agent (e.g., an antibiotic to select for microorganisms comprising the genetic modifications).

In some embodiments, the carbon source is a monosaccharide (simple sugar), a disaccharide, a polysaccharide, a non-fermentable carbon source, or one or more combinations thereof. Non-limiting examples of suitable monosaccharides include glucose, galactose, mannose, fructose, ribose, and combinations thereof. Non-limiting examples of suitable disaccharides include sucrose, lactose, maltose, trehalose, cellobiose, and combinations thereof. Non-limiting examples of suitable polysaccharides include starch, glycogen, cellulose, chitin, and combinations thereof. Non-limiting examples of suitable non-fermentable carbon sources include acetate and glycerol.

The concentration of a carbon source, such as glucose or sucrose, in the culture medium should promote cell growth, but not be so high as to repress growth of the microorganism used. Typically, cultures are run with a carbon source, such as glucose or sucrose, being added at levels to achieve the desired level of growth and biomass. Production of cannabinoids may also occur in these culture conditions, but at undetectable levels (with detection limits being about <0.1 g/l). In other embodiments, the concentration of a carbon source, such as glucose or sucrose, in the culture medium is greater than about 1 g/L, preferably greater than about 2 g/L, and more preferably greater than about 5 g/L. In addition, the concentration of a carbon source, such as glucose or sucrose, in the culture medium is typically less than about 100 g/L, preferably less than about 50 g/L, and more preferably less than about 20 g/L. It should be noted that references to culture component concentrations can refer to both initial and/or ongoing component concentrations. In some cases, it may be desirable to allow the culture medium to become depleted of a carbon source during culture.

Sources of assimilable nitrogen that can be used in a suitable culture medium include, but are not limited to, simple nitrogen sources, organic nitrogen sources and complex nitrogen sources. Such nitrogen sources include anhydrous ammonia, ammonium salts and substances of animal, vegetable and/or microbial origin. Suitable nitrogen sources include, but are not limited to, protein hydrolysates, microbial biomass hydrolysates, peptone, yeast extract, ammonium sulfate, urea, and amino acids. Typically, the concentration of the nitrogen sources, in the culture medium is greater than about 0.1 g/L, preferably greater than about 0.25 g/L, and more preferably greater than about 1.0 g/L. Beyond certain concentrations, however, the addition of a nitrogen source to the culture medium is not advantageous for the growth of the microorganisms. As a result, the concentration of the nitrogen sources, in the culture medium is less than about 20 g/L, preferably less than about 10 g/L and more preferably less than about 5 g/L. Further, in some instances it may be desirable to allow the culture medium to become depleted of the nitrogen sources during culture.

The effective culture medium can contain other compounds such as inorganic salts, vitamins, trace metals, or growth promoters. Such other compounds can also be present in carbon, nitrogen, or mineral sources in the effective medium or can be added specifically to the medium.

The culture medium can also contain a suitable phosphate source. Such phosphate sources include both inorganic and organic phosphate sources. Preferred phosphate sources include, but are not limited to, phosphate salts such as mono or dibasic sodium and potassium phosphates, ammonium phosphate, and mixtures thereof. Typically, the concentration of phosphate in the culture medium is greater than about 1.0 g/L, preferably greater than about 2.0 g/L, and more preferably greater than about 5.0 g/L. Beyond certain concentrations, however, the addition of phosphate to the culture medium is not advantageous for the growth of the microorganisms. Accordingly, the concentration of phosphate in the culture medium is typically less than about 20 g/L, preferably less than about 15 g/L, and more preferably less than about 10 g/L.

A suitable culture medium can also include a source of magnesium, preferably in the form of a physiologically acceptable salt, such as magnesium sulfate heptahydrate, although other magnesium sources in concentrations that contribute similar amounts of magnesium can be used. Typically, the concentration of magnesium in the culture medium is greater than about 0.5 g/L, preferably greater than about 1.0 g/L, and more preferably greater than about 2.0 g/L. Beyond certain concentrations, however, the addition of magnesium to the culture medium is not advantageous for the growth of the microorganisms. Accordingly, the concentration of magnesium in the culture medium is typically less than about 10 g/L, preferably less than about 5 g/L, and more preferably less than about 3 g/L. Further, in some instances, it may be desirable to allow the culture medium to become depleted of a magnesium source during culture.

In some embodiments, the culture medium can also include a biologically acceptable chelating agent, such as the dihydrate of trisodium citrate. In such instance, the concentration of a chelating agent in the culture medium is greater than about 0.2 g/L, preferably greater than about 0.5 g/L, and more preferably greater than about 1 g/L. Beyond certain concentrations, however, the addition of a chelating agent to the culture medium is not advantageous for the growth of the microorganisms. Accordingly, the concentration of a chelating agent in the culture medium is typically less than about 10 g/L, preferably less than about 5 g/L, and more preferably less than about 2 g/L.

The culture medium can also initially include a biologically acceptable acid or base to maintain the desired pH of the culture medium. Biologically acceptable acids include, but are not limited to, hydrochloric acid, sulfuric acid, nitric acid, phosphoric acid, and mixtures thereof. Biologically acceptable bases include, but are not limited to, ammonium hydroxide, sodium hydroxide, potassium hydroxide, and mixtures thereof. In some embodiments, the base used is ammonium hydroxide.

The culture medium can also include a biologically acceptable calcium source, including, but not limited to, calcium chloride. Typically, the concentration of the calcium source, such as calcium chloride, dihydrate, in the culture medium is within the range of from about 5 mg/L to about 2000 mg/L, preferably within the range of from about 20 mg/L to about 1000 mg/L, and more preferably in the range of from about 50 mg/L to about 500 mg/L.

The culture medium can also include sodium chloride. Typically, the concentration of sodium chloride in the culture medium is within the range of from about 0.1 g/L to about 5 g/L, preferably within the range of from about 1 g/L to about 4 g/L, and more preferably in the range of from about 2 g/L to about 4 g/L.

In some embodiments, the culture medium can also include trace metals. Such trace metals can be added to the culture medium as a stock solution that, for convenience, can be prepared separately from the rest of the culture medium. Typically, the amount of such a trace metals solution added to the culture medium is greater than about 1 mL/L, preferably greater than about 5 mL/L, and more preferably greater than about 10 mL/L. Beyond certain concentrations, however, the addition of a trace metals to the culture medium is not advantageous for the growth of the microorganisms. Accordingly, the amount of such a trace metals solution added to the culture medium is typically less than about 100 mL/L, preferably less than about 50 mL/L, and more preferably less than about 30 mL/L. It should be noted that, in addition to adding trace metals in a stock solution, the individual components can be added separately, each within ranges corresponding independently to the amounts of the components dictated by the above ranges of the trace metals solution.

The culture medium can include other vitamins, such as pantothenate, biotin, calcium, pantothenate, inositol, pyridoxine-HCl, and thiamine-HCl. Such vitamins can be added to the culture medium as a stock solution that, for convenience, can be prepared separately from the rest of the culture medium. Beyond certain concentrations, however, the addition of vitamins to the culture medium is not advantageous for the growth of the microorganisms.

The culture medium may be supplemented with hexanoic acid or hexanoate as a precursor for the cannabinoid biosynthetic pathway. The hexanoic acid may have a concentration of less than 3 mM hexanoic acid (e.g., from 1 nM to 2.9 mM hexanoic acid, from 10 nM to 2.9 mM hexanoic acid, from 100 nM to 2.9 mM hexanoic acid, or from 1 µM to 2.9 mM hexanoic acid) hexanoic acid.

The fermentation methods described herein can be performed in conventional culture modes, which include, but are not limited to, batch, fed-batch, cell recycle, continuous and semi-continuous. In some embodiments, the fermentation is carried out in fed-batch mode. In such a case, some of the components of the medium are depleted during culture, including pantothenate during the production stage of the fermentation. In some embodiments, the culture may be supplemented with relatively high concentrations of such components at the outset, for example, of the production stage, so that growth and/or production is supported for a period of time before additions are required. The preferred ranges of these components are maintained throughout the culture by making additions as levels are depleted by culture. Levels of components in the culture medium can be monitored by, for example, sampling the culture medium periodically and assaying for concentrations. Alternatively, once a standard culture procedure is developed, additions can be made at timed intervals corresponding to known levels at particular times throughout the culture. As will be recognized by those in the art, the rate of consumption of nutrient increases during culture as the cell density of the medium increases. Moreover, to avoid introduction of foreign microorganisms into the culture medium, addition is performed using aseptic addition methods, as are known in the art. In addition, a small amount of anti-foaming agent may be added during the culture.

The temperature of the culture medium can be any temperature suitable for growth of the genetically modified cells and/or production of compounds of interest. For example, prior to inoculation of the culture medium with an inoculum, the culture medium can be brought to and maintained at a temperature in the range of from about 20° C. to about 45° C., preferably to a temperature in the range of from about 25° C. to about 40° C. and more preferably in the range of from about 28° C. to about 32° C.

The pH of the culture medium can be controlled by the addition of acid or base to the culture medium. In such cases when ammonia is used to control pH, it also conveniently serves as a nitrogen source in the culture medium. Preferably, the pH is maintained from about 3.0 to about 8.0, more preferably from about 3.5 to about 7.0, and most preferably from about 4.0 to about 6.5.

In some embodiments, the carbon source concentration, such as the glucose concentration, of the culture medium is monitored during culture. Glucose or sucrose concentration of the culture medium can be monitored using known techniques, such as, for example, use of the glucose oxidase enzyme test or high pressure liquid chromatography, which can be used to monitor glucose concentration in the supernatant, e.g., a cell-free component of the culture medium. As stated previously, the carbon source concentration should be kept below the level at which cell growth inhibition occurs. Although such concentration may vary from organism to organism, for glucose as a carbon source, cell growth inhibition occurs at glucose concentrations greater than at about 60 g/L and can be determined readily by trial. Accordingly, when glucose is used as a carbon source the glucose is preferably fed to the fermentor and maintained below detection limits. Alternatively, the glucose concentration in the culture medium is maintained in the range of from about 1 g/L to about 100 g/L, more preferably in the range of from about 2 g/L to about 50 g/L, and yet more preferably in the range of from about 5 g/L to about 20 g/L. Although the carbon source concentration can be maintained within desired levels by addition of, for example, a substantially pure glucose solution, it is acceptable, and may be preferred, to maintain the carbon source concentration of the culture medium by addition of aliquots of the original culture medium. The use of aliquots of the original culture medium may be desirable because the concentrations of other nutrients in the medium (e.g. the nitrogen and phosphate sources) can be maintained simultaneously. Likewise, the trace metals concentrations can be maintained in the culture medium by addition of aliquots of the trace metals solution.

EXAMPLES

The following examples are put forth to provide those of ordinary skill in the art with a description of how the compositions and methods described herein may be used, made, and evaluated, and are intended to be purely exemplary of the invention and are not intended to limit the scope of what the inventors regard as their invention.

Example 1: Transformation of Heterologous Nucleic Acids into Yeast Cells

Each DNA construct was integrated into *Saccharomyces cerevisiae* (CEN.PK113-7D) using standard molecular biology techniques in an optimized lithium acetate transformation. Briefly, cells were grown overnight in yeast extract peptone dextrose (YPD) medium at 30° C. with shaking (200 rpm), diluted to an $OD_{600}$ of 0.1 in 100 mL YPD, and grown to an $OD_{600}$ of 0.6-0.8. For each transformation, 5 mL of culture were harvested by centrifugation, washed in 5 mL of sterile water, spun down again, resuspended in 1 mL of 100 mM lithium acetate, and transferred to a microcentrifuge tube. Cells were spun down (13,000×g) for 30 s, the supernatant was removed, and the cells were resuspended in a transformation mix consisting of 240 µL 50% PEG, 36 µL 1 M lithium acetate, 10 µL boiled salmon sperm DNA, and 74 µL of donor DNA. For transformations that require expression of the endonuclease F-Cph1, the donor DNA included a plasmid carrying the F-Cph1 gene expressed under the yeast TDH3 promoter. F-Cph1 endonuclease expressed in such a manner cuts a specific recognition site engineered in a host strain to facilitate integration of the target gene of interest. Following a heat shock at 42° C. for 40 min, cells were recovered overnight in YPD medium before plating on selective medium. DNA integration was confirmed by colony PCR with primers specific to the integrations.

Example 2: Culturing of Yeast

For routine strain characterization in a 96-well-plate format, yeast colonies were picked into a 1.1-mL-per-well capacity 96-well 'Pre-Culture plate' filled with 360 µL per well of pre-culture medium. Pre-culture medium consists of Bird Seed Media (BSM, originally described by van Hoek et al., Biotech. and Bioengin., 68, 2000, 517-23) at pH 5.05 with 14 g/L sucrose, 7 g/L maltose, 3.75 g/L ammonium sulfate, and 1 g/L lysine. Cells were cultured at 28° C. in a high capacity microtiter plate incubator shaking at 1000 rpm and 80% humidity for 3 days until the cultures reached carbon exhaustion.

The growth-saturated cultures were sub-cultured by taking 14.4 µL from the saturated cultures and diluting into a 2.2 mL per well capacity 96-well 'production plate' filled with 360 µL per well of production medium. Production medium consists of BSM at pH 5.05 with 40 g/L sucrose, 3.75 g/L ammonium sulfate, and 2 mM hexanoic acid. Cells in the production medium were cultured at 30° C. in a high capacity microtiter plate shaker at 1000 rpm and 80% humidity for an additional 3 days prior to extraction and analysis.

Example 3: Analytical Methods for Product Extraction and Titer Determination At the conclusion of the incubation of the production plate, methanol was added to each well such that the final concentration is 67% (v/v) methanol. An impermeable seal was added, and the plate was shaken at 1000 rpm for 5 minutes to lyse the cells and extract cannabinoids. The plate was centrifuged for 5 minutes at 2000×g to pellet cell debris. Subsequently, 300 µL of the clarified sample was transferred to an empty 1.1-mL-capacity 96-well plate and sealed with a foil seal. The sample plate was stored at −20° C. until analysis.

Samples for olivetolic acid and CBGA measurements were initially analyzed in high-throughput by mass spectrometer (Agilent 6470-QQQ) with a RapidFire 365 system autosampler with C4 cartridge.

TABLE 1

| RapidFire 365 system configuration | |
|---|---|
| Pump 1: 0.1% acetic acid in water | 0.8 mL/min |
| Pump 2: 0.1% formic acid in acetonitrile | 1.5 mL/min |
| Pump 3: 0.1% formic acid in 40% acetone in water | 0.8 mL/min |
| State 1: Aspirate | 600 ms |
| State 2: Load/Wash | 2000 ms |
| State 3: Extra wash | 500 ms |
| State 4: Elute | 6000 ms |
| State 5: Reequilibrate | 1000 ms |

TABLE 2

| Agilent 6470-QQQ MS method configurations | |
|---|---|
| Ion Source | AJS ESI |
| Time Filtering peak width | 0.02 min |
| Stop Time | No limit/as pump |
| Scan Type | MRM |
| Diverter Valve | To MS |
| Delta EMV | (+)0/(−)0 |
| Ion Mode (polarity) | Negative |
| Gas Temp | 300° C. |
| Gas Flow | 13 L/min |
| Nebulizer | 30 psi |
| Sheath Gas Temp | 30° C. |
| Sheath Gas Flow | 12 L/min |
| Negative Capillary V | 3500 V |

The peak areas from a chromatogram from a mass spectrometer were used to generate the calibration curve using authentic standards. The amounts, in moles, of each compound were generated through external calibration using an authentic standard.

Hit samples from the initial screen were then analyzed for HTAL, PDAL, olivetol, olivetolic acid, CBGA, and SCBGA on a weight per volume basis, by the two methods below. All measurements were performed by reverse phase ultra-high pressure liquid chromatography and ultraviolet detection (UPL-UV) using Thermo Vanquish Flex Binary UHPLC System with a Vanquish Diode Array Detector HL.

TABLE 3

| Mobile Phases and Column Information | |
|---|---|
| Mobile Phase A: | 99.9% water + 0.1% Formic Acid, 5 mM ammonium formate |
| Mobile Phase B: | 99.9% acetonitrile + 0.1% Formic acid |
| Column for method #1 | Thermo Scientific Accucore Polar Premium C18 100 mm × 2.1 mm × 2.6 um, Thermo P/N 28026-103030 |
| Guard Column for method #1 | Thermo Scientific Guard Cartridge, 4 PK, P/N 28103014001 |
| Column for method #2 | Restek Raptor ARC-18 100 mm × 3.0 mm × 1.8 um, Restek P/N 931421E |
| Guard Column for method #2 | Restek UltraShield UHPLC PreColumn Filter 0.2 um frit, P/N 25809 |

TABLE 4

| Mobile Phase Gradient for Method #1 | | | | |
|---|---|---|---|---|
| Time [min] | Flow [mL/min] | % A | % B | Pump Curve |
| 0.00 | 1.2 | 70 | 30 | 5 |
| 1.00 | 1.2 | 20 | 80 | 5 |
| 1.75 | 1.2 | 12.5 | 87.5 | 5 |
| 1.80 | 1.2 | 70 | 30 | 5 |
| 2.1 | 1.2 | 70 | 30 | 5 |

TABLE 5

Isocratic Mobile Phase for Method #2

| Time [min] | Flow [mL/min] | % A | % B | Pump Curve |
|---|---|---|---|---|
| 0.00 | 1.0 | 25 | 75 | 5 |
| 4.00 | 1.0 | 25 | 75 | 5 |

TABLE 6

Column compartment settings

| Parameter: | Method #1 | Method #2 |
|---|---|---|
| Temperature control | On | On |
| Temperature | 50.0 C. | 30.0 C. |
| Ready temp delta | 0.50 C. | 0.50 C. |
| Equilibration time | 1.0 min | 1.0 min |
| Thermostatting mode | Still air | Still air |
| Fan Speed | 5 | 5 |

TABLE 7

Detector Settings

| Parameter: | Method #1 | Method #2 |
|---|---|---|
| UV-Vis Channel 1 Wavelength | 270 nm | 228 nm |
| Data collection rate | 50.0 Hz | 5.0 Hz |
| Response time | 0.10 s | 1.00 s |
| Peak width | 0.010 min | 0.100 min |

Analytes were identified by retention time compared to an authentic standard. The peak areas were used to generate the linear calibration curve for each analyte.

Example 4: Generation of the Base Strain for AAE Screening

Figure 2:
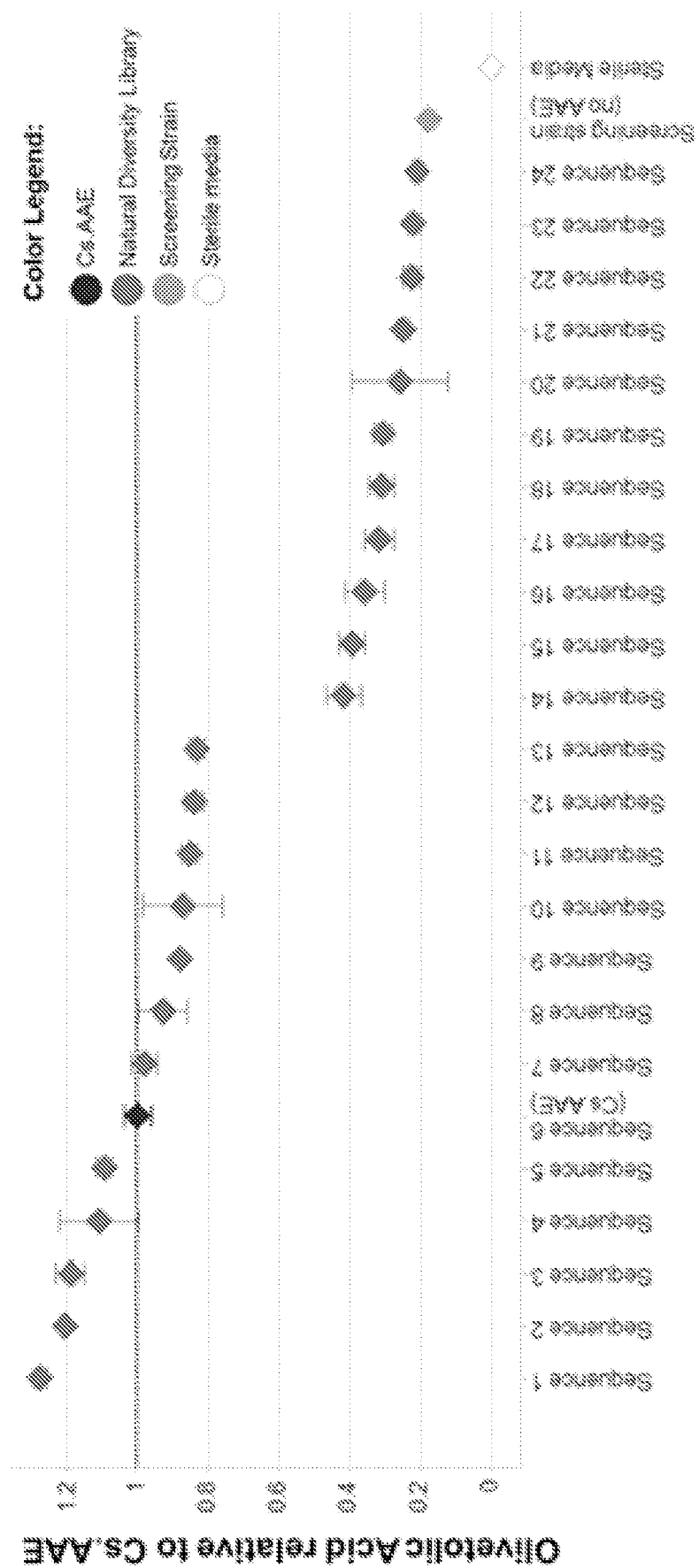
FIG. 2 shows the amount of olivetolic acid produced by 23 proteins from a diversity library, as is described in further detail in the working examples, below. The candidates produced olivetolic acid at 0.21- to 1.27-fold the amount of Cs.AAE.

A set of genes for screening for AAE activity was engineered into *Saccharomyces cerevisiae* in two steps (Table 8). First, constructs were integrated into chromosomal loci to express three genes: a heterologous *Zymomonas mobilis* PDC gene and two endogenous *S. cerevisiae* ACS1 and ALD6 genes, all using GAL-regulon promoters. Second, constructs were integrated into chromosomal loci to express TKS and OAC genes from *Cannabis sativa* (2 and 3 copies, respectively). The resulting strain was capable of producing olivetolic acid in the presence of an AAE enzyme when fed a mixture of sucrose and hexanoic acid, as described in Example 2: Culturing of Yeast. Endogenous yeast metabolism produced a negligible amount of hexanoyl-CoA, which resulted in this strain producing a trace amount of olivetolic acid even in the absence of an exogenous AAE enzyme. This endogenous activity did not interfere with an accurate assessment of proteins with potential AAE activity, as the addition of an exogenous AAE gene to this strain could result in over five times higher amounts of olivetolic acid production (FIG. 2).

TABLE 8

Representation of the cannabinoid pathway in the engineered *S. cerevisiae* strain designed for AAE screening.

| Enzyme | SEQ ID NOs | Copy number and Promoter |
|---|---|---|
| Zm.PDC | Sequence 65 | 1 × pGAL7 |
| Sc.ACS1 | Sequence 66 | 1 × pGAL10 |
| Sc.ALD6 | Sequence 67 | 1 × pGAL1 |
| Cs.TKS | Sequence 26 | 2 × pGAL10 |
| Cs.OAC | Sequence 44 | 3 × pGAL1 |

Figure 11:
FIG. 11. shows a schematic depiction of the DNA landing pad used to facilitate homologous recombination into the yeast screening strains containing an upstream locus, a promoter, a F-Cph1 cut site, a terminator, and a downstream locus.

To measure the activity of proteins with potential AAE activity in vivo in *S. cerevisiae*, a landing pad was introduced into this screening strain, which allows for the rapid insertion of AAE variants (FIG. 11). The landing pad consists of 500 bp of locus-targeting DNA sequences on either end of the construct to the genomic region upstream and downstream of the yeast locus of choice (Upstream locus and Downstream locus), thereby deleting the locus when the landing pad is integrated into the yeast chromosome. Internally, the landing pad contains a promoter which can be GAL1, GAL3 or any other promoter of yeast GAL regulon, and a yeast terminator of choice flanking an endonuclease recognition site (F-Cphl). DNA variants of the AAE library were used to transform the strain along with a plasmid expressing endonuclease F-Cphl, which cuts the recognition sequence, creating a double strand break at the landing pad, and facilitating homologous recombination of the DNA variants at the site. At least six colonies from each transformation were used to screen for AAE activity, using methods described in Example 2: Culturing of Yeast and Example 3: Analytical Methods for Product Extraction and Titer Determination Example 3: Analytical Methods for Product Extraction and Titer Determination.

Example 5: Generation of the Base Strain for TKS Screening

A set of genes for screening for TKS activity was engineered into *Saccharomyces cerevisiae* in two steps (Table 9). First, constructs were integrated into chromosomal loci to express three genes: a heterologous *Zymomonas mobilis* PDC gene and two endogenous *S. cerevisiae* ACS1 and ALD6 genes, all using GAL-regulon promoters. Second, constructs were integrated into chromosomal loci to express AAE and OAC genes from *Cannabis sativa* (2 and 4 copies, respectively). The resulting strain was capable of producing olivetolic acid in the presence of a TKS enzyme when fed a mixture of sucrose and hexanoic acid, as described in Example 2: Culturing of Yeast. Olivetolic acid was utilized as the reporter for TKS activity, as the tetraketide-CoA intermediate is difficult to measure analytically.

TABLE 9

Representation of the cannabinoid pathway in the engineered *S. cerevisiae* strain designed for TKS screening.

| Enzyme | SEQ ID NOs | Copy number and Promoter |
|---|---|---|
| Zm.PDC | Sequence 65 | 1 × pGAL7 |
| Sc.ACS1 | Sequence 66 | 1 × pGAL10 |
| Sc.ALD6 | Sequence 67 | 1 × pGAL1 |
| Cs.AAE | Sequence 6 | 2 × pGAL10 |
| Cs.OAC | Sequence 44 | 2 × pGAL1, 2 × pGAL10 |

To measure the activity of proteins with potential TKS activity in vivo in *S. cerevisiae*, a landing pad was introduced into a screening strain, which allows for the rapid insertion of TKS variants. The landing pad consists of 500 bp of locus-targeting DNA sequences on either end of the construct to the genomic region upstream and downstream of the yeast locus of choice (Upstream locus and Downstream locus), thereby deleting the locus when the landing pad is integrated into the yeast chromosome as shown in FIG. 11. Internally, the landing pad contains a promoter which can be GAL1, GAL3 or any other promoter of yeast GAL regulon, and a yeast terminator of choice flanking an endonuclease recognition site (F-Cph1). The DNA sequences from the TKS library were used to transform the strain along with a plasmid expressing endonuclease F-Cph1, which cuts the recognition sequence, creating a double strand break at the landing pad, and facilitating homologous recombination of the DNA variants at the site. At least six colonies from each transformation were used to screen for TKS activity, using methods described in Example 2: Culturing of Yeast and Example 3: Analytical Methods for Product Extraction and Titer Determination.

Example 6: Generation of the Base Strain for OAC Screening

A set of genes for screening for OAC activity was engineered into *Saccharomyces cerevisiae* in two steps (Table 10). First, constructs were integrated into chromosomal loci to express three genes: a heterologous *Zymomonas mobilis* PDC gene and two endogenous *S. cerevisiae* ACS1 and ALD6 genes, all using GAL-regulon promoters. Second, constructs were integrated into chromosomal loci to express AAE and TKS genes from *Cannabis sativa* (2 copies of each). The resulting strain was capable of producing olivetolic acid in the presence of an OAC enzyme when fed a mixture of sucrose and hexanoic acid, as described in Example 2: Culturing of Yeast.

TABLE 10

Representation of the cannabinoid pathway in the engineered *S. cerevisiae* strain designed for OAC screening.

| Enzyme | SEQ ID NOs | Copy number and Promoter |
| --- | --- | --- |
| Zm.PDC | Sequence 65 | 1 × pGAL7 |
| Sc.ACS1 | Sequence 66 | 1 × pGAL10 |
| Sc.ALD6 | Sequence 67 | 1 × pGAL1 |
| Cs.AAE | Sequence 6 | 2 × pGAL10 |
| Cs.TKS | Sequence 26 | 2 × pGAL1 |

To measure the activity of proteins with potential OAC activity in vivo in *S. cerevisiae*, a landing pad was introduced into a screening strain, which allows for the rapid insertion of OAC variants. The landing pad consists of 500 bp of locus-targeting DNA sequences on either end of the construct to the genomic region upstream and downstream of the yeast locus of choice (Upstream locus and Downstream locus), thereby deleting the locus when the landing pad is integrated into the yeast chromosome as shown in FIG. 11. Internally, the landing pad contains a promoter which can be GAL1, GAL3 or any other promoter of yeast GAL regulon, and a yeast terminator of choice flanking an endonuclease recognition site (F-Cph1). The DNA sequences from the OAC library were used to transform the strain along with a plasmid expressing endonuclease F-Cph1, which cuts the recognition sequence, creating a double strand break at the landing pad, and facilitating homologous recombination of the DNA variants at the site. At least six colonies from each transformation were used to screen for OAC activity, using methods described in Example 2: Culturing of Yeast and Example 3: Analytical Methods for Product Extraction and Titer Determination.

Example 7: Identification of Novel Proteins with AAE Activity from a Natural Diversity Library A library of enzymes was generated to identify enzymes capable of catalyzing the formation of hexanoyl-CoA with improved properties over the previously identified AAE enzyme Cs.AAE (SEQ ID NO: 6) from the plant *Cannabis sativa*. The ligation of a fatty acid to Coenzyme A (CoA) is a ubiquitous reaction in biological systems, where it is catalyzed by adenylate-forming enzymes (Schmelz et al., *Curr. Opin. Struc. Biol.*, 19:6, 2009, 666-71). This bioorganic chemistry has convergently evolved in proteins with vastly different domain architectures, so a homology-based search of sequence databases is insufficient to retrieve the full suite of enzymes with this desired catalytic activity. Instead, we chose to leverage protein annotations in the UniProt Knowledgebase (UniProtKB) to generate a list of candidate sequences for functional characterization.

We began by searching UniProtKB for proteins annotated with the Enzyme Commission (EC) numbers 6.2.1.2, for medium-chain acyl-CoA ligase, or 6.2.1.3, for long-chain acyl-CoA ligase. The database was accessed on Nov. 6, 2019, and a total of 18,245 protein sequences were obtained. Next, these sequences were then algorithmically clustered at a 30% identity cutoff using CD-HIT (http://weizhong-lab.ucsd.edu/cdhit-web-server/cgi-bin/index.cgi?cmd=cd-hit). To exclude aberrant proteins, only clusters containing at least 5 sequences or containing a protein with "Reviewed" status in UniProtKB were considered for functional characterization. To select a subset with minimal redundancy, one representative sequence was selected from each cluster. Ultimately, 128 proteins were codon-optimized for *S. cerevisiae* and ordered from a DNA-synthesis vendor.

This library of genes was then screened in an engineered *S. cerevisiae* strain described in Example 4: Generation of the Base Strain for AAE Screening. The immediate product of the AAE is hexanoyl-CoA, but olivetolic acid was used a primary readout for AAE activity, as a functional AAE increases olivetolic acid production; downstream enzymes, TKS, and OAC, were not limiting in this screening strain.

Out of 128 proteins in the Natural Diversity Library screened, 23 of them produced olivetolic acid at 0.21- to 1.27-fold the amount of Cs.AAE (FIG. 2). These 23 proteins (SEQ ID NOS: 1, 2, 3, 4, 5, and 7 through 24) that produced olivetolic acid at least one standard deviation higher than the screening strain were classified as hits. Each of these proteins shares less than 30% sequence similarity with the AAE from *Cannabis sativa* (SEQ ID NO: 6).

The four proteins displaying the highest AAE activity each share less than 20% sequence similarity with Cs.AAE and achieve higher amounts of olivetolic acid in engineered *S. cerevisiae* strains. These four proteins come from the bacterial source organisms *Pseudonocardia* sp. N23 (SEQ ID NO: 1), *Pseudomonas* sp. (SEQ ID NO: 2), *Streptomyces* sp.ADI96-02 (SEQ ID NO: 3), and *Erythrobacter citreus* LAMA 915 (SEQ ID NO: 4). There are several potential reasons for why certain heterologous AAE proteins may achieve better microbial production of cannabinoids, compared to the AAE from *Cannabis sativa*, such as improved folding, stability, $K_M$, $k_{cat}$, pH preference, cofactor requirement (e.g. $Mg^{2+}$), and substrate specificity. A strength of the in vivo screening platform utilized here is to identify optimal enzymes in a context that resembles microbial production of cannabinoids at manufacturing scale.

Example 8: Identification of Novel Proteins with TKS Activity from a Natural Diversity Library A library of candidate protein sequences was assembled using two different approaches to identify enzymes having tetraketide synthase (TKS) activity. The first approach relied on homology searching using a TKS (SEQ ID NO: 26) known to participate in olivetolic acid biosynthesis from Cannabis sativa as a query sequence. The query sequence was used to perform three iterations of position specific iterative basic local alignment search tool (PSI-BLAST, Altschul et al, Nuc. Acid Research, 25:17, 1997, 3389-3402) against a pre-clustered protein database (UniRef90, Baris et al, Bioinformatics, 31:6, 2015, 926-32). The resultant position specific scoring matrix (PSSM) was used to query all known protein sequences stored by the National Center for Biotechnology Information (NCBI-nr/RefSeq non-redundant) resulting in several thousand amino acid sequences. Sequences were clustered based on pairwise amino acid similarity using CD-HIT, and candidate sequences were chosen manually from the resultant clusters to add to the library.

The second approach used SciFinder (CAS, Limin et al., Bioinformatics, 28: 23, 2012, 3150-52) to locate hundreds of literature references related to the biosynthesis of alkylated resorcylic acid derivatives. References related to short chain derivatives resembling olivetolic acid (a pentyl-derivative) were closely read for specific mention of biosynthetic genes. Candidate TKS genes were added to the library from the organisms located from the references. Combined, these two approaches yielded 90 candidate protein sequences. The protein sequences were codon-optimized for S. cerevisiae and ordered from a DNA-synthesis vendor.

This library of genes was then screened in an engineered S. cerevisiae strain described in Example 5: Generation of the Base Strain for TKS Screening. The immediate product of the TKS is tetraketide-CoA, but olivetolic acid was used a primary readout for TKS activity, as a functional TKS is strictly necessary for olivetolic acid production; upstream and downstream enzymes (AAE and OAC, respectively) were not limiting in this screening strain.

Figure 3:
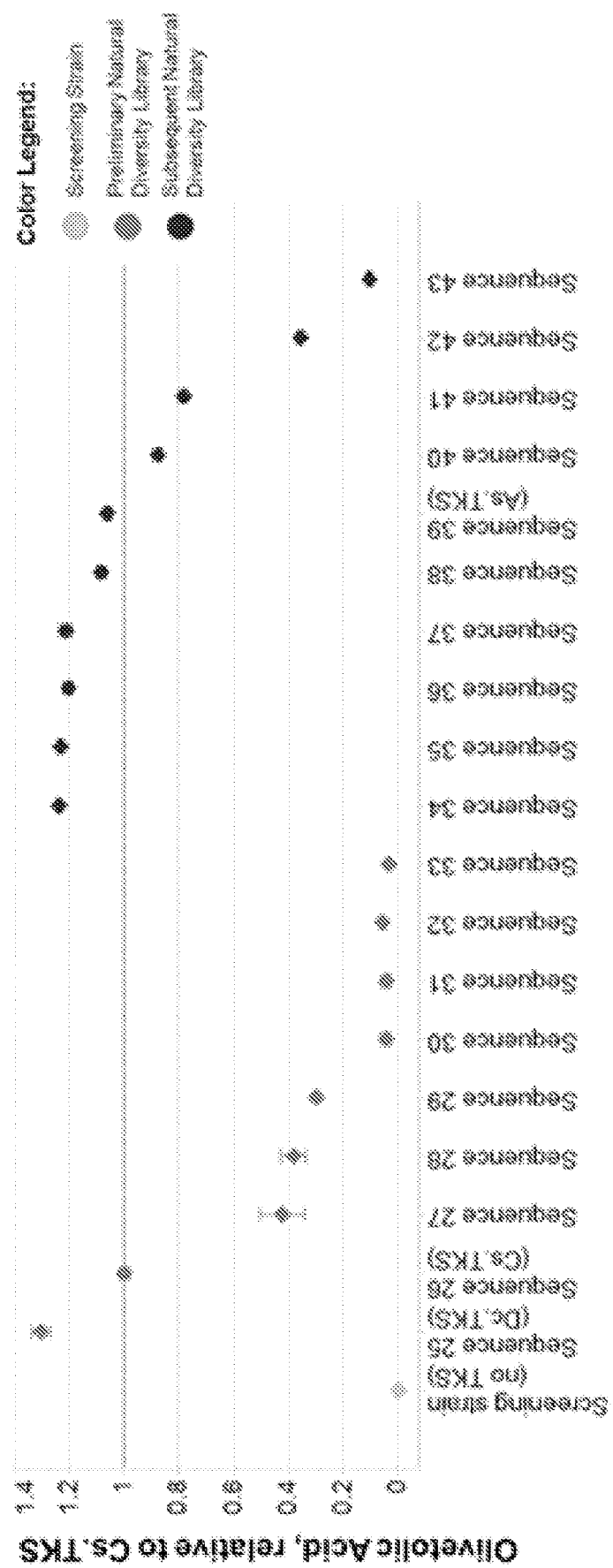
FIG. 3 shows the amount of olivetolic acid produced by 10 proteins identified from the subsequent natural diversity, which possessed TKS activity that surpassed the activity of the TKS from *Cannabis sativa*.
Figure 4:
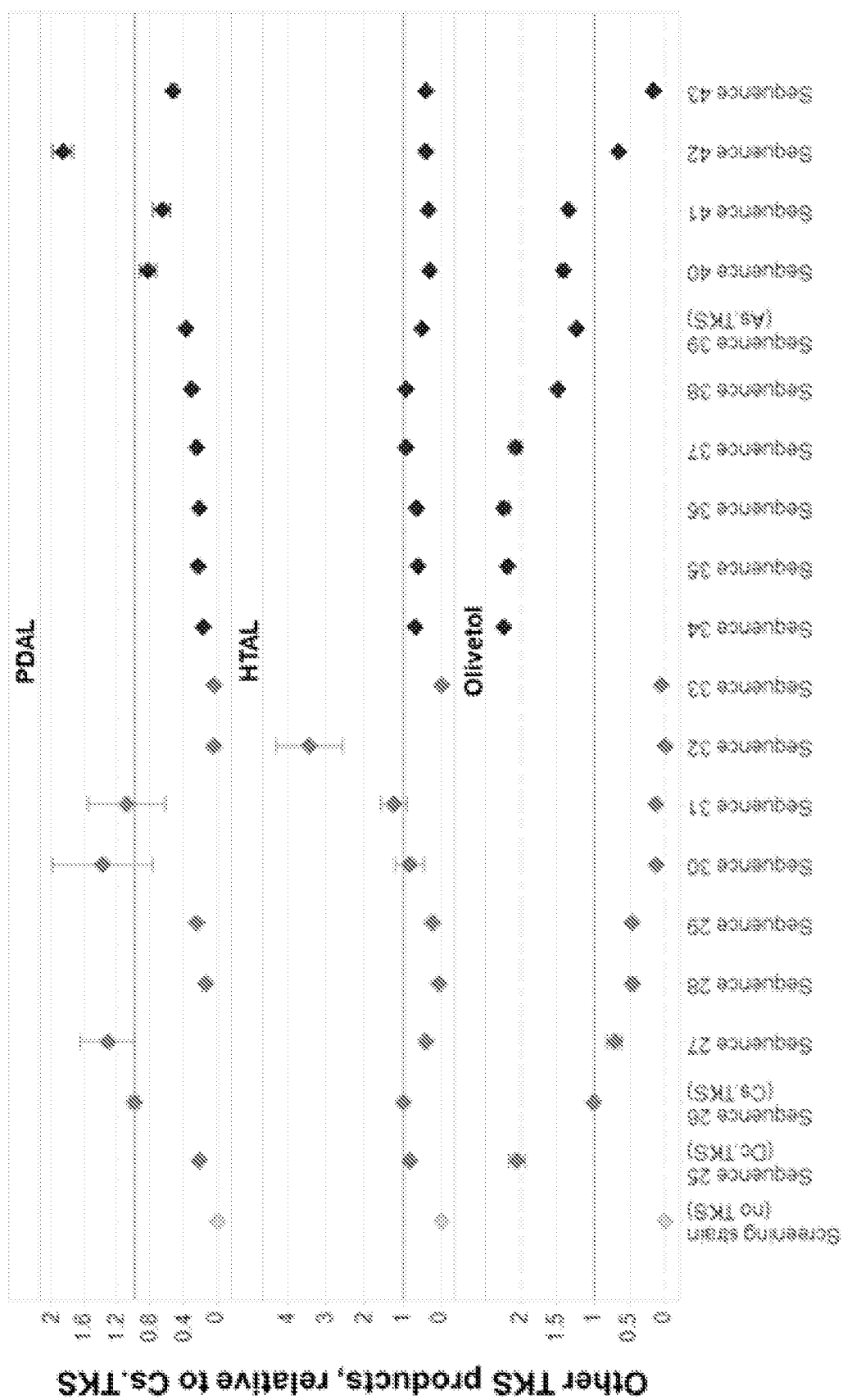
FIG. 4 shows the amount of PDAL, HTAL, and olivetol produced from 17 enzymes that were identified during screening to produce olivetolic acid.
Figure 5:
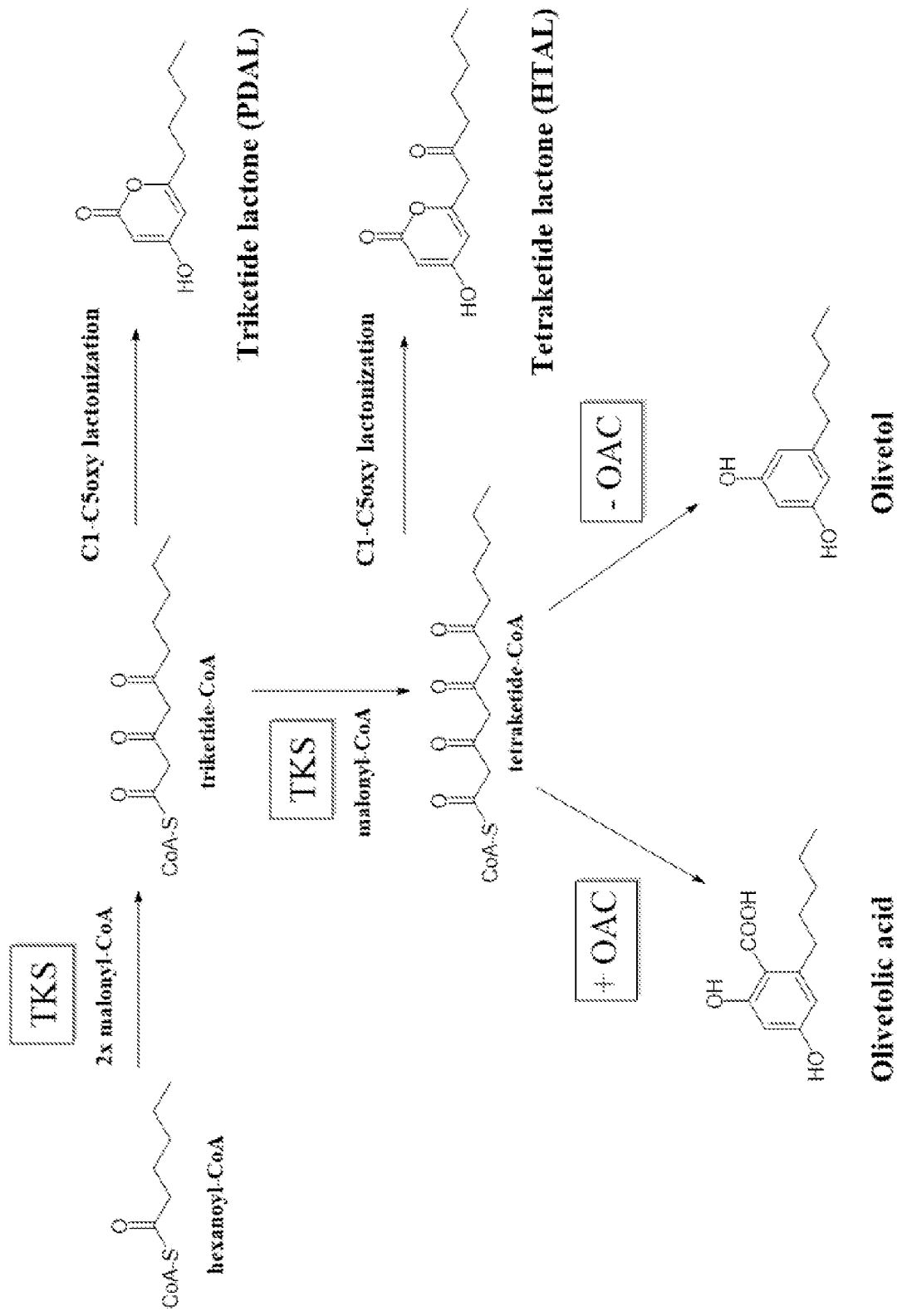
FIG. 5 shows the mechanism of the TKS enzyme. A TKS enzyme can directly catalyze formation of PDAL and HTAL, in addition to the tetraketide-CoA intermediate. Within the screening strain, the tetraketide-CoA can either be converted to olivetolic acid by the OAC enzyme or converted to olivetol spontaneously. All four intermediates directly result from TKS enzymatic activity.

After screening, several hits were observed that produce olivetolic acid (FIG. 3). Notably, many of the hits also produced HTAL, PDAL, and olivetol in addition to olivetolic acid (FIG. 4). These molecules can be formed as part of TKS catalysis, and when present, are also indicative of an active TKS enzyme as shown in the TKS reaction mechanism in FIG. 5. Overall, of the 90 genes screened, the preliminary library resulted in 8 novel TKS proteins (SEQ ID NOS: 25, 27, 28, 29, 30, 31, 32, 33) that produced between 0.07-fold and 1.30-fold the amount of olivetolic acid compared to the TKS from Cannabis sativa (Cs.TKS, SEQ ID NO: 26). Each of these novel TKS proteins shares less than 70% similarity with Cs.TKS.

One protein (SEQ ID NO: 25) from this initial TKS Natural Diversity Library achieved particularly high olivetolic acid production compared to Cs.TKS in engineered S. cerevisiae strains. This most active TKS protein comes from source organism Dendrobium catenatum, a species of lithophytic orchid. Motivated by the surprisingly high TKS activity of this enzyme (Dc.TKS, SEQ ID NO: 25), we performed an additional homology search to identify more protein sequences from this clade of natural diversity. The BLASTp algorithm (https://blast.ncbi.nlm.nih.gov/Blast.cgi) was used to gather all proteins from NCBI-nr database with >70% amino acid identity to Dc.TKS. The resulting 38 sequences were clustered based on sequence identity using CD-HIT with a 93% identity threshold, giving a final list of 14 proteins. The protein sequences were codon-optimized for S. cerevisiae and ordered from a DNA-synthesis vendor.

Screening the subsequent natural diversity library yielded an additional 10 proteins (SEQ ID NOS: 34 through 43) possessing TKS activity, including an additional 6 proteins (SEQ ID NOS: 34, 35, 36, 37, 38, 39) that surpass the activity of the TKS from Cannabis sativa (FIG. 3). The source organisms of these novel TKS proteins are a variety of orchid species. Several of these novel TKS proteins also produce higher amounts of olivetol and lower amounts of PDAL, compared to Cs.TKS (FIG. 4). In particular, a TKS from Apostasia shenzhenica (As.TKS, SEQ ID NO: 39) produces higher olivetolic acid while not producing much higher olivetol. The favorable product profile of As.TKS and the high activity of Dc.TKS (SEQ ID NO: 25), as demonstrated in this in vivo characterization, are thus advantageous for the microbial production of cannabinoids.

Example 9: Identification of Proteins with Improved OAC Activity from Site Saturation Mutagenesis Followed by Combinatorial Mutagenesis The OAC enzyme catalyzes the cyclization of tetraketide-CoA into olivetolic acid (Gagne S L et al. PNAS 109:31, 2012, 12811-12816). In this example, site-saturation mutagenesis was used to improve the activity of OAC from Cannabis sativa (SEQ ID NO: 44). Each amino acid residue was mutated using the degenerate codon NNT, where "N" indicates any of the four nucleotides. The degenerate codon NNT can encode 15 different amino acids (A, C, D, F, G, H, I, L, N, P, R, S, T, V, and Y). Each library for a given amino acid residue was generated by PCR and transformed into the screening strain described in Example 6: Generation of the Base Strain for OAC Screening.

In primary screening (termed Tier 1), 26 colonies per library were tested using the conditions described in Example 2: Culturing of Yeast and the high-throughput assay described in Example 3: Analytical Methods for Product Extraction and Titer Determination. In a secondary screen (termed Tier 2), transformed strains harboring OAC enzyme mutants of interest were re-tested in higher replication (n 6) to determine if the improved activity was significant. A mutation was considered to improve OAC activity if the median amount of olivetolic acid produced by the mutant was at least one standard deviation above the median amount of olivetolic acid produced by the original Cs.OAC protein.

Nine unique point mutations that improved OAC activity were identified: K49R, T47R, V28L, E14S, K12S, L9I, L92Y, A2S, and F23L. The OAC activity of each of these mutants is provided in Table 11. These individual mutants resulted in up to 1.34-fold the production olivetolic acid, compared to the original Cs.OAC (SEQ ID NO: 44). An additional three point mutations that have a neutral effect on OAC activity are also provided in Table 11: Q48R, S87H, and F88Y. These combined twelve point mutations were then used to generate a full factorial combinatorial library, with the intent to obtain mutant proteins with further improvements in OAC activity.

The full factorial combinatorial library was generated by PCR and transformed into the strain described in Example 6:

Generation of the Base Strain for OAC Screening. A total of 3579 colonies from this pooled library transformation were tested in Tier-1 screening. Subsequently, 360 of the colonies were tested in higher replication in Tier-2 screening, as described above, and also sequenced to determine the DNA coding sequence of the protein combinatorial mutant.

In total, 167 unique protein sequences, each containing at least six amino acid point mutations, were found to possess improved OAC activity. These combinatorial mutants resulted in between 1.55-fold and 2.31-fold the production of olivetolic acid, compared to Cs.OAC. Each of these improved OAC proteins shares less than 95% similarity to Cs.OAC (SEQ ID NO: 44). The sequences and OAC activity of these proteins are summarized in Table 11.

Figure 6:
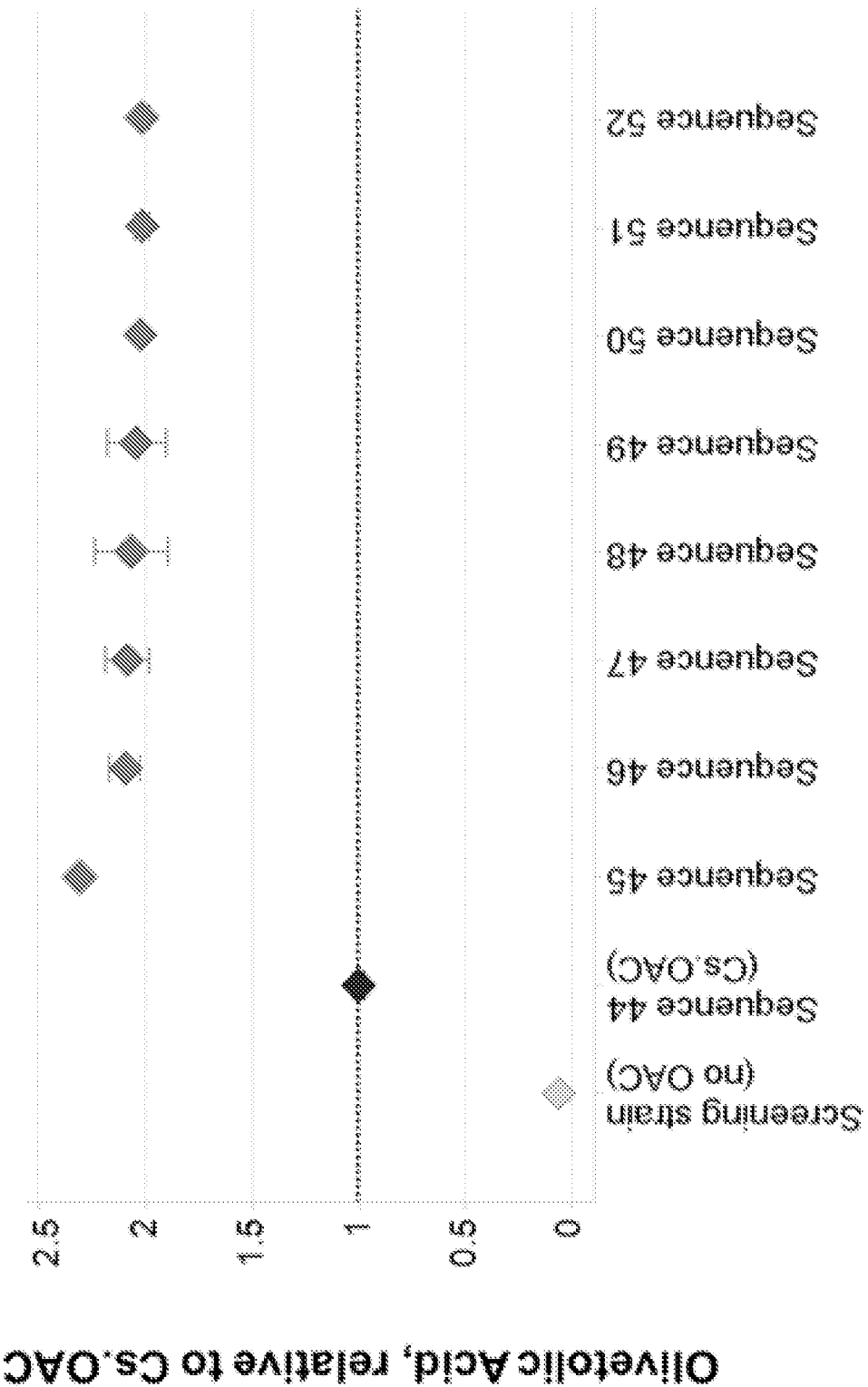
FIG. 6 shows the amount of olivetolic acid produced by 8 unique proteins, each containing at least eight amino acid point mutations, that were found to possess more than double the OAC activity of Cs.OAC.

In particular, 8 unique protein sequences, each containing at least eight amino acid point mutations, were found to possess more than double the OAC activity of Cs.OAC (FIG. 6). These combinatorial mutants (SEQ ID NOs: 45, 46, 47, 48, 49, 50, 51, 52) achieve up to 2.31-fold the production of olivetolic acid, compared to Cs.OAC. The top 8 improved OAC proteins each share less than 93% similarity to Cs.OAC (SEQ ID NO: 44). The identification of these improved enzymes will aid in the production of cannabinoids at high purity and lower cost.

TABLE 11

Cs.OAC sequence and activity data

| Seq ID | Relative Olivetolic Acid titer | Mutations | #AA diff |
|---|---|---|---|
| SEQ ID NO 44 | 1.00 | Parent Enzyme Cs.OAC | 0 |
| single v1 | 0.92 | Q48R | 1 |
| single v2 | 0.94 | S87H | 1 |
| single v3 | 1.01 | F88Y | 1 |
| single v4 | 1.06 | K49R | 1 |
| single v5 | 1.06 | T47R | 1 |
| single v6 | 1.07 | V28L | 1 |
| single v7 | 1.16 | E14S | 1 |
| single v8 | 1.20 | K12S | 1 |
| single v9 | 1.21 | L9I | 1 |
| single v10 | 1.21 | L92Y | 1 |
| single v11 | 1.23 | A2S | 1 |
| single v12 | 1.34 | F23L | 1 |
| combi v1 = SEQ ID NO 45 | 2.31 | L9I, K12S, E14S, V28L, Q48R, K49R, S87H, F88Y | 8 |
| combi v2 = SEQ ID NO 46 | 2.10 | A2S, L9I, K12S, F23L, T47R, K49R, S87H, F88Y | 8 |
| combi v3 = SEQ ID NO 47 | 2.09 | A2S, L9I, K12S, F23L, Q48R, K49R, S87H, F88Y | 8 |
| combi v4 = SEQ ID NO 48 | 2.07 | A2S, L9I, E14S, F23L, Q48R, K49R, S87H, F88Y | 8 |
| combi v5 = SEQ ID NO 49 | 2.06 | A2S, L9I, E14S, F23L, V28L, Q48R, K49R, F88Y | 8 |
| combi v6 = SEQ ID NO 50 | 2.02 | L9I, K12S, E14S, F23L, Q48R, K49R, S87H, F88Y | 8 |
| combi v7 = SEQ ID NO 51 | 2.02 | A2S, L9I, K12S, E14S, Q48R, K49R, S87H, F88Y | 8 |
| combi v8 = SEQ ID NO 52 | 2.02 | A2S, L9I, E14S, F23L, T47R, Q48R, K49R, F88Y | 8 |
| combi v9 | 1.76 | A2S, L9I, K12S, E14S, F23L, V28L, Q48R, K49R, S87H, F88Y | 10 |
| combi v10 | 1.94 | A2S, L9I, K12S, E14S, V28L, Q48R, K49R, S87H, F88Y | 9 |
| combi v11 | 1.93 | A2S, L9I, E14S, F23L, V28L, Q48R, K49R, S87H, F88Y | 9 |
| combi v12 | 1.88 | A2S, L9I, K12S, V28L, T47R, Q48R, K49R, S87H, F88Y | 9 |
| combi v13 | 1.88 | A2S, L9I, E14S, F23L, T47R, Q48R, K49R, S87H, F88Y | 9 |
| combi v14 | 1.88 | A2S, L9I, K12S, E14S, F23L, V28L, Q48R, K49R, F88Y | 9 |
| combi v15 | 1.86 | A2S, L9I, K12S, F23L, V28L, Q48R, K49R, S87H, F88Y | 9 |
| combi v16 | 1.83 | A2S, L9I, E14S, V28L, T47R, Q48R, K49R, S87H, F88Y | 9 |
| combi v17 | 1.75 | A2S, L9I, K12S, F23L, T47R, Q48R, K49R, S87H, F88Y | 9 |
| combi v18 | 1.65 | A2S, L9I, E14S, F23L, V28L, T47R, K49R, S87H, F88Y | 9 |
| combi v19 | 1.95 | A2S, L9I, E14S, V28L, T47R, Q48R, K49R, F88Y | 8 |
| combi v20 | 1.94 | A2S, L9I, E14S, F23L, T47R, K49R, S87H, F88Y | 8 |
| combi v21 | 1.94 | A2S, L9I, F23L, V28L, Q48R, K49R, S87H, F88Y | 8 |
| combi v22 | 1.92 | A2S, L9I, K12S, E14S, T47R, K49R, S87H, F88Y | 8 |
| combi v23 | 1.92 | A2S, L9I, E14S, F23L, V28L, K49R, S87H, F88Y | 8 |
| combi v24 | 1.91 | A2S, L9I, E14S, V28L, Q48R, K49R, S87H | 8 |
| combi v25 | 1.91 | A2S, L9I, K12S, E14S, V28L, K49R, S87H, F88Y | 8 |
| combi v26 | 1.90 | L9I, E14S, F23L, T47R, Q48R, K49R, S87H, F88Y | 8 |
| combi v27 | 1.90 | A2S, L9I, F23L, T47R, Q48R, K49R, S87H, F88Y | 8 |
| combi v28 | 1.90 | A2S, L9I, K12S, E14S, F23L, V28L, K49R, F88Y | 8 |
| combi v29 | 1.90 | A2S, L9I, E14S, V28L, T47R, K49R, S87H, F88Y | 8 |
| combi v30 | 1.88 | A2S, L9I, K12S, F23L, V28L, Q48R, K49R, F88Y | 8 |
| combi v31 | 1.84 | A2S, L9I, E14S, F23L, V28L, T47R, K49R, F88Y | 8 |
| combi v32 | 1.84 | A2S, L9I, V28L, T47R, Q48R, K49R, S87H, F88Y | 8 |
| combi v33 | 1.83 | A2S, L9I, E14S, F23L, T47R, Q48R, K49R, S87H | 8 |
| combi v34 | 1.82 | L9I, K12S, F23L, V28L, Q48R, K49R, S87H, F88Y | 8 |
| combi v35 | 1.82 | A2S, L9I, K12S, F23L, V28L, K49R, S87H, F88Y | 8 |
| combi v36 | 1.81 | A2S, L9I, K12S, V28L, T47R, Q48R, S87H, F88Y | 8 |

TABLE 11-continued

Cs.OAC sequence and activity data

| Seq ID | Relative Olivetolic Acid titer | Mutations | #AA diff |
|---|---|---|---|
| combi v37 | 1.81 | L9I, K12S, E14S, F23L, V28L, Q48R, K49R, F88Y | 8 |
| combi v38 | 1.79 | A2S, L9I, K12S, E14S, F23L, T47R, K49R, F88Y | 8 |
| combi v39 | 1.78 | A2S, L9I, K12S, F23L, V28L, Q48R, K49R, S87H | 8 |
| combi v40 | 1.75 | A2S, L9I, F23L, V28L, T47R, Q48R, K49R, F88Y | 8 |
| combi v41 | 1.75 | L9I, K12S, F23L, T47R, Q48R, K49R, S87H, F88Y | 8 |
| combi v42 | 1.73 | A2S, L9I, K12S, F23L, V28L, Q48R, S87H, F88Y | 8 |
| combi v43 | 1.69 | A2S, L9I, F23L, V28L, T47R, Q48R, S87H, F88Y | 8 |
| combi v44 | 1.67 | L9I, E14S, F23L, V28L, T47R, Q48R, K49R, F88Y | 8 |
| combi v45 | 2.16 | A2S, L9I, E14S, F23L, Q48R, K49R, F88Y | 7 |
| combi v46 | 2.11 | A2S, L9I, K12S, E14S, V28L, K49R, F88Y | 7 |
| combi v47 | 2.05 | A2S, L9I, K12S, T47R, K49R, S87H, F88Y | 7 |
| combi v48 | 2.05 | A2S, L9I, F23L, V28L, Q48R, K49R, F88Y | 7 |
| combi v49 | 2.05 | A2S, L9I, E14S, F23L, Q48R, K49R, S87H | 7 |
| combi v50 | 2.05 | A2S, L9I, E14S, V28L, Q48R, K49R, F88Y | 7 |
| combi v51 | 2.05 | A2S, L9I, K12S, F23L, K49R, S87H, F88Y | 7 |
| combi v52 | 2.04 | L9I, K12S, F23L, Q48R, K49R, S87H, F88Y | 7 |
| combi v53 | 2.02 | A2S, L9I, F23L, T47R, Q48R, K49R, F88Y | 7 |
| combi v54 | 2.02 | A2S, L9I, E14S, F23L, V28L, K49R, F88Y | 7 |
| combi v55 | 2.02 | A2S, L9I, F23L, T47R, Q48R, K49R | 7 |
| combi v56 | 2.02 | A2S, L9I, E14S, F23L, V28L, Q48R, K49R | 7 |
| combi v57 | 2.01 | L9I, K12S, E14S, F23L, K49R, S87H, F88Y | 7 |
| combi v58 | 2.00 | L9I, K12S, E14S, Q48R, K49R, S87H, F88Y | 7 |
| combi v59 | 2.00 | L9I, K12S, T47R, Q48R, K49R, S87H, F88Y | 7 |
| combi v60 | 1.98 | A2S, L9I, K12S, F23L, Q48R, K49R, S87H | 7 |
| combi v61 | 1.98 | L9I, E14S, F23L, V28L, Q48R, K49R, F88Y | 7 |
| combi v62 | 1.97 | L9I, K12S, V28L, Q48R, K49R, S87H, F88Y | 7 |
| combi v63 | 1.97 | A2S, L9I, E14S, T47R, Q48R, K49R, F88Y | 7 |
| combi v64 | 1.96 | A2S, L9I, F23L, T47R, Q48R, S87H, F88Y | 7 |
| combi v65 | 1.95 | A2S, L9I, K12S, E14S, T47R, K49R, F88Y | 7 |
| combi v66 | 1.94 | A2S, L9I, E14S, F23L, V28L, K49R, S87H | 7 |
| combi v67 | 1.94 | A2S, L9I, E14S, V28L, Q48R, K49R, S87H | 7 |
| combi v68 | 1.94 | A2S, L9I, K12S, F23L, Q48R, S87H, F88Y | 7 |
| combi v69 | 1.93 | A2S, L9I, E14S, F23L, V28L, T47R, F88Y | 7 |
| combi v70 | 1.93 | A2S, L9I, E14S, F23L, T47R, S87H, F88Y | 7 |
| combi v71 | 1.92 | A2S, L9I, F23L, V28L, Q48R, K49R, S87H | 7 |
| combi v72 | 1.92 | A2S, L9I, F23L, T47R, K49R, S87H, F88Y | 7 |
| combi v73 | 1.92 | A2S, L9I, V28L, T47R, K49R, S87H, F88Y | 7 |
| combi v74 | 1.92 | A2S, L9I, E14S, F23L, Q48R, S87H, F88Y | 7 |
| combi v75 | 1.91 | L9I, K12S, F23L, V28L, Q48R, K49R, F88Y | 7 |
| combi v76 | 1.91 | L9I, K12S, E14S, F23L, Q48R, K49R, S87H | 7 |
| combi v77 | 1.91 | A2S, L9I, K12S, E14S, T47R, Q48R, F88Y | 7 |
| combi v78 | 1.90 | A2S, K12S, V28L, Q48R, K49R, S87H, F88Y | 7 |
| combi v79 | 1.89 | A2S, L9I, K12S, V28L, T47R, S87H, F88Y | 7 |
| combi v80 | 1.89 | A2S, L9I, K12S, F23L, V28L, K49R, F88Y | 7 |
| combi v81 | 1.89 | A2S, L9I, F23L, T47R, Q48R, K49R, S87H | 7 |
| combi v82 | 1.87 | L9I, E14S, F23L, T47R, K49R, S87H, F88Y | 7 |
| combi v83 | 1.87 | A2S, L9I, E14S, T47R, Q48R, K49R, S87H | 7 |
| combi v84 | 1.87 | L9I, E14S, V28L, Q48R, K49R, S87H, F88Y | 7 |
| combi v85 | 1.86 | A2S, L9I, F23L, V28L, T47R, K49R, F88Y | 7 |
| combi v86 | 1.86 | L9I, E14S, F23L, V28L, Q48R, K49R, S87H | 7 |
| combi v87 | 1.84 | L9I, K12S, E14S, F23L, V28L, K49R, F88Y | 7 |
| combi v88 | 1.84 | A2S, L9I, E14S, F23L, T47R, Q48R, S87H | 7 |
| combi v89 | 1.83 | L9I, F23L, V28L, Q48R, K49R, S87H, F88Y | 7 |
| combi v90 | 1.83 | A2S, L9I, F23L, T47R, Q48R, K49R, F88Y | 7 |
| combi v91 | 1.82 | L9I, K12S, F23L, V28L, K49R, S87H, F88Y | 7 |
| combi v92 | 1.81 | L9I, K12S, E14S, V28L, Q48R, K49R, F88Y | 7 |
| combi v93 | 1.80 | L9I, E14S, V28L, T47R, Q48R, S87H, F88Y | 7 |
| combi v94 | 1.79 | A2S, L9I, V28L, T47R, Q48R, S87H, F88Y | 7 |
| combi v95 | 1.78 | A2S, L9I, E14S, V28L, T47R, Q48R, S87H | 7 |
| combi v96 | 1.76 | A2S, L9I, K12S, E14S, F23L, V28L, K49R | 7 |
| combi v97 | 1.74 | L9I, E14S, F23L, V28L, T47R, Q48R, F88Y | 7 |
| combi v98 | 1.60 | A2S, L9I, F23L, K49R, S87H, F88Y, L92Y | 7 |
| combi v99 | 2.11 | A2S, L9I, F23L, Q48R, K49R, S87H | 6 |
| combi v100 | 2.11 | A2S, L9I, K12S, F23L, K49R, S87H | 6 |
| combi v101 | 2.09 | A2S, L9I, F23L, K49R, S87H, F88Y | 6 |
| combi v102 | 2.08 | L9I, E14S, F23L, T47R, Q48R, F88Y | 6 |
| combi v103 | 2.05 | L9I, K12S, E14S, V28L, K49R, F88Y | 6 |
| combi v104 | 2.05 | A2S, L9I, K12S, F23L, Q48R, K49R | 6 |
| combi v105 | 2.05 | A2S, L9I, K12S, F23L, Q48R, F88Y | 6 |
| combi v106 | 2.04 | L9I, K12S, F23L, K49R, S87H, F88Y | 6 |
| combi v107 | 2.04 | A2S, L9I, E14S, F23L, K49R, S87H | 6 |
| combi v108 | 2.03 | A2S, L9I, K12S, V28L, K49R, F88Y | 6 |
| combi v109 | 2.03 | A2S, L9I, E14S, T47R, K49R, F88Y | 6 |
| combi v110 | 2.03 | A2S, L9I, F23L, V28L, K49R, F88Y | 6 |

TABLE 11-continued

Cs.OAC sequence and activity data

| Seq ID | Relative Olivetolic Acid titer | Mutations | #AA diff |
|---|---|---|---|
| combi v111 | 2.03 | A2S, L9I, E14S, F23L, T47R, F88Y | 6 |
| combi v112 | 2.01 | L9I, K12S, V28L, K49R, S87H, F88Y | 6 |
| combi v113 | 2.01 | A2S, L9I, F23L, V28L, Q48R, K49R | 6 |
| combi v114 | 2.01 | A2S, L9I, E14S, V28L, K49R, F88Y | 6 |
| combi v115 | 2.01 | A2S, L9I, K12S, Q48R, K49R, F88Y | 6 |
| combi v116 | 2.00 | A2S, L9I, K12S, E14S, T47R, K49R | 6 |
| combi v117 | 2.00 | A2S, L9I, E14S, F23L, Q48R, F88Y | 6 |
| combi v118 | 2.00 | A2S, L9I, K12S, E14S, K49R, S87H | 6 |
| combi v119 | 1.99 | L9I, K12S, E14S, T47R, K49R, F88Y | 6 |
| combi v120 | 1.99 | A2S, L9I, V28L, Q48R, K49R, F88Y | 6 |
| combi v121 | 1.99 | A2S, L9I, E14S, Q48R, K49R, F88Y | 6 |
| combi v122 | 1.98 | A2S, L9I, K12S, Q48R, K49R, S87H | 6 |
| combi v123 | 1.98 | A2S, L9I, K12S, E14S, T47R, F88Y | 6 |
| combi v124 | 1.98 | A2S, L9I, F23L, Q48R, S87H, F88Y | 6 |
| combi v125 | 1.96 | A2S, L9I, K12S, T47R, K49R, S87H | 6 |
| combi v126 | 1.96 | L9I, K12S, E14S, F23L, Q48R, K49R | 6 |
| combi v127 | 1.95 | A2S, L9I, E14S, F23L, T47R, K49R | 6 |
| combi v128 | 1.95 | A2S, L9I, F23L, T47R, Q48R, K49R | 6 |
| combi v129 | 1.94 | L9I, K12S, F23L, V28L, K49R, F88Y | 6 |
| combi v130 | 1.93 | A2S, L9I, E14S, F23L, T47R, Q48R | 6 |
| combi v131 | 1.93 | A2S, L9I, K12S, Q48R, S87H, F88Y | 6 |
| combi v132 | 1.92 | L9I, F23L, V28L, Q48R, K49R, F88Y | 6 |
| combi v133 | 1.91 | L9I, F23L, T47R, Q48R, K49R, F88Y | 6 |
| combi v134 | 1.91 | L9I, F23L, V28L, K49R, S87H, F88Y | 6 |
| combi v135 | 1.91 | A2S, L9I, E14S, F23L, V28L, Q48R | 6 |
| combi v136 | 1.91 | A2S, L9I, V28L, T47R, Q48R, F88Y | 6 |
| combi v137 | 1.90 | A2S, L9I, F23L, V28L, K49R, S87H | 6 |
| combi v138 | 1.90 | A2S, L9I, V28L, T47R, K49R, S87H | 6 |
| combi v139 | 1.89 | L9I, E14S, F23L, V28L, Q48R, S87H | 6 |
| combi v140 | 1.88 | A2S, L9I, Q48R, K49R, S87H, F88Y | 6 |
| combi v141 | 1.88 | L9I, E14S, F23L, T47R, K49R, S87H | 6 |
| combi v142 | 1.88 | A2S, L9I, K12S, E14S, V28L, F88Y | 6 |
| combi v143 | 1.88 | A2S, L9I, E14S, F23L, Q48R, S87H | 6 |
| combi v144 | 1.87 | A2S, E14S, V28L, T47R, K49R, F88Y | 6 |
| combi v145 | 1.87 | L9I, K12S, F23L, Q48R, S87H, F88Y | 6 |
| combi v146 | 1.86 | L9I, E14S, V28L, T47R, Q48R, F88Y | 6 |
| combi v147 | 1.86 | A2S, L9I, K12S, F23L, Q48R, S87H | 6 |
| combi v148 | 1.83 | A2S, L9I, E14S, T47R, K49R, S87H | 6 |
| combi v149 | 1.83 | A2S, L9I, E14S, Q48R, K49R, S87H | 6 |
| combi v150 | 1.82 | A2S, L9I, F23L, V28L, T47R, F88Y | 6 |
| combi v151 | 1.82 | A2S, L9I, V28L, T47R, Q48R, S87H | 6 |
| combi v152 | 1.82 | A2S, L9I, K12S, F23L, T47R, F88Y | 6 |
| combi v153 | 1.81 | A2S, L9I, K12S, F23L, V28L, F88Y | 6 |
| combi v154 | 1.80 | L9I, E14S, F23L, V28L, K49R, S87H | 6 |
| combi v155 | 1.80 | A2S, K12S, E14S, V28L, K49R, F88Y | 6 |
| combi v156 | 1.79 | A2S, E14S, F23L, Q48R, K49R, S87H | 6 |
| combi v157 | 1.79 | A2S, E14S, F23L, V28L, K49R, F88Y | 6 |
| combi v158 | 1.78 | L9I, F23L, V28L, Q48R, K49R, S87H | 6 |
| combi v159 | 1.78 | A2S, L9I, F23L, V28L, Q48R, S87H | 6 |
| combi v160 | 1.77 | A2S, L9I, F23L, V28L, S87H, F88Y | 6 |
| combi v161 | 1.71 | A2S, E14S, F23L, V28L, K49R, S87H | 6 |
| combi v162 | 1.71 | A2S, L9I, E14S, V28L, S87H, F88Y | 6 |
| combi v163 | 1.68 | L9I, K12S, F23L, V28L, S87H, F88Y | 6 |
| combi v164 | 1.67 | L9I, E14S, F23L, K49R, F88Y, L92Y | 6 |
| combi v165 | 1.59 | L9I, F23L, V28L, T47R, K49R, F88Y | 6 |
| combi v166 | 1.56 | A2S, L9I, T47R, Q48R, F88Y, L92Y | 6 |
| combi v167 | 1.55 | A2S, F23L, Q48R, K49R, F88Y, L92Y | 6 |

Example 10: Generation of the Base Strain for CBGaS Screening

A set of genes for screening for CBGaS activity was engineered into *Saccharomyces cerevisiae* (Table 12). This strain contains the following chromosomally integrated mevalonate pathway genes from 5 *S. cerevisiae*: acetyl-CoA thiolase (ERG10), HMG-CoA synthase (ERG13), HMG-CoA reductase truncated to alleviate feedback inhibition (HMGR-t), mevalonate kinase (ERG12), phosphomevalonate kinase (ERG8), mevalonate pyrophosphate decarboxylase (MVD1), and IPP:DMAPP isomerase (ID11). In addition, the strain contained copies of four heterologous enzymes involved in the cannabinoid biosynthetic pathway (FIG. 1): the acyl-activating enzyme (AAE), tetraketide synthase (TKS), and olivetolic acid cyclase (OAC) from *Cannabis sativa*, as well as geranyl pyrophosphate (GPP) synthase from *Streptomyces aculeolatus*, all under the control of GAL regulated promoters. To increase flux to cytosolic acetyl-CoA, PDC from *Zymomonas mobilis*, and overexpression of *S. cerevisiae* ALD6 and ACS1 were included in the engineering. FIG. 1 shows a depiction of the biosynthetic pathway to cannabigerolic acid (CBGA) utilized in the screening strain, with enzyme screening occurring at the PT node.

TABLE 12

Representation of the cannabinoid pathway in the engineered S. cerevisiae strain designed for CBGaS screening.

| Enzyme | SEQ ID NOs | Copy number and Promoter |
|---|---|---|
| Zm.PDC | Sequence 65 | 1 × pGAL7 |
| Sc.ACS1 | Sequence 66 | 1 × pGAL10 |
| Sc.ALD6 | Sequence 67 | 1 × pGAL1 |
| Cs.AAE | Sequence 6 | 2 × pGAL10 |
| Cs.TKS | Sequence 26 | 2 × pGAL10 |
| Cs.OAC | Sequence 44 | 4 × pGAL1 |
| Sc.ERG10 | Sequence 68 | 1 × pGAL2 |
| Sc.ERG13 | Sequence 69 | 1 × pGAL1 |
| Sc.HMGR-t | Sequence 70 | 1 × pGAL10 |
| Sc.ERG12 | Sequence 71 | 1 × pGAL2 |
| Sc.ERG8 | Sequence 72 | 1 × pGAL1 |
| Sc.MVD1 | Sequence 73 | 1 × pGAL10 |
| Sc.IDI1 | Sequence 74 | 1 × pGAL7 |
| Sa.GPPS | Sequence 75 | 1 × pGAL10 |

In order to screen the library of candidate genes for CBGaS activity, a landing pad approach was utilized (FIG. 11). An intergenic region in the screening strain was altered to contain an F-CphI endonuclease recognition site, which was flanked by a GAL-regulon promoter and a terminator, both from yeast as described in U.S. Pat. No. 7,919,605B1, which is incorporated herein by reference. This site allowed the candidate genes to be integrated into the genome by co-transformation of the endonuclease F-CphI alongside donor DNA containing the desired DNA sequence to be screened, flanked by 40 base pair homology regions to the promoter and terminator. At least six colonies from each transformation were used to screen for CBGaS activity, using methods described in Example 2: Culturing of Yeast and Example 3: Analytical Methods for Product Extraction and Titer Determination.

Example 11: Identification of Novel Proteins with CBGaS Activity from a Natural Diversity Library A previously identified CBGA synthase (CBGaS) enzyme Cs.PT4 (SEQ ID NO: 53) from the plant *Cannabis sativa* belongs to the UbiA protein family. Members of the UbiA family occur in all three domains of life and are known to catalyze diverse prenylation reactions of aromatic substrates (Li, W., *Trends Bioche. Sci.*, 41:4, 2016, 356-70). However, proteins of the UbiA family that catalyze the formation of CBGA are extremely rare. Here, we pursued two alternate hypotheses novel proteins with improved CBGaS activity: (1) Plant UbiA proteins related to Cs.PT4 also possess CBGaS catalytic activity, and (2) UbiA proteins possessing CBGaS activity exist in organisms that produce chemicals structurally similar to CBGA.

To pursue the first hypothesis, Cs.PT4 was used to search for homologous proteins in the three following sequence databases: NCBI RefSeq non-redundant proteins UniProt Knowledgebase (UniProtKB), and JGI Phytozome v12.1 Proteomes (https://phytozome.jgi.doe.gov/pz/portal.html). These databases were accessed on Feb. 20, 2019. An E-value threshold of 1e-20 for the BLASTp algorithm was used to gather sequences that range from about 23% to about 48% identity to Cs.PT4. The combined results from the three databases consisted of 1059 protein sequences. These sequences were then algorithmically clustered at a 70% identity cutoff using CD-HIT (http://weizhong-lab.ucsd.edu/cdhit-web-server/cgi-bin/index.cgi?cmd=cd-hit). To minimize redundancy in the sequences to be functionally characterized, one representative was selected from each cluster. Ultimately, 172 proteins were codon-optimized for *S. cerevisiae* and ordered from an appropriate gene-synthesis vendor. This set of sequences is termed the homology library.

The plant UbiA sequences typically contain an N-terminal chloroplast transit peptide (cTP), which is known to impair the expression of such proteins in microbial hosts such as *S. cerevisiae*. For example, removal of the cTP from the *Cannabis sativa* protein Cs.PT4 (SEQ ID NO: 53) to generate the truncated protein Cs.PT4-T (SEQ ID NO: 54) significantly improves the CBGaS activity in engineered *S. cerevisiae* strains. Accordingly, for each of the plant UbiA proteins in the natural diversity library, a set of primers was designed to truncate the computationally predicted cTP (http://www.cbs.dtu.dk/services/ChloroP/). This in effect added an additional 172 proteins to the homology library.

To pursue the second hypothesis, SciFinder (https://scifinder-n.cas.org/) was used to search the academic literature for reports of chemicals containing a prenylated resorcylic acid substructure, resembling that of CBGA. Papers related to natural products bearing this chemical substructure were closely read for mention of the producing organism. Suspected UbiA-type prenyltransferase proteins were then identified from these target species in UniProtKB. Ultimately, 15 proteins were codon-optimized for *S. cerevisiae* and ordered from an appropriate gene-synthesis vendor. This set of sequences is termed the target species library.

Each member of the homology and target-species libraries was transformed individually into the strain described in Example 10: Generation of the Base Strain for CBGaS Screening. The resulting yeast strains were screened for the ability to produce CBGA using methods described in Example 2: Culturing of Yeast and Example 3: Analytical Methods for Product Extraction and Titer Determination.

Figure 7:
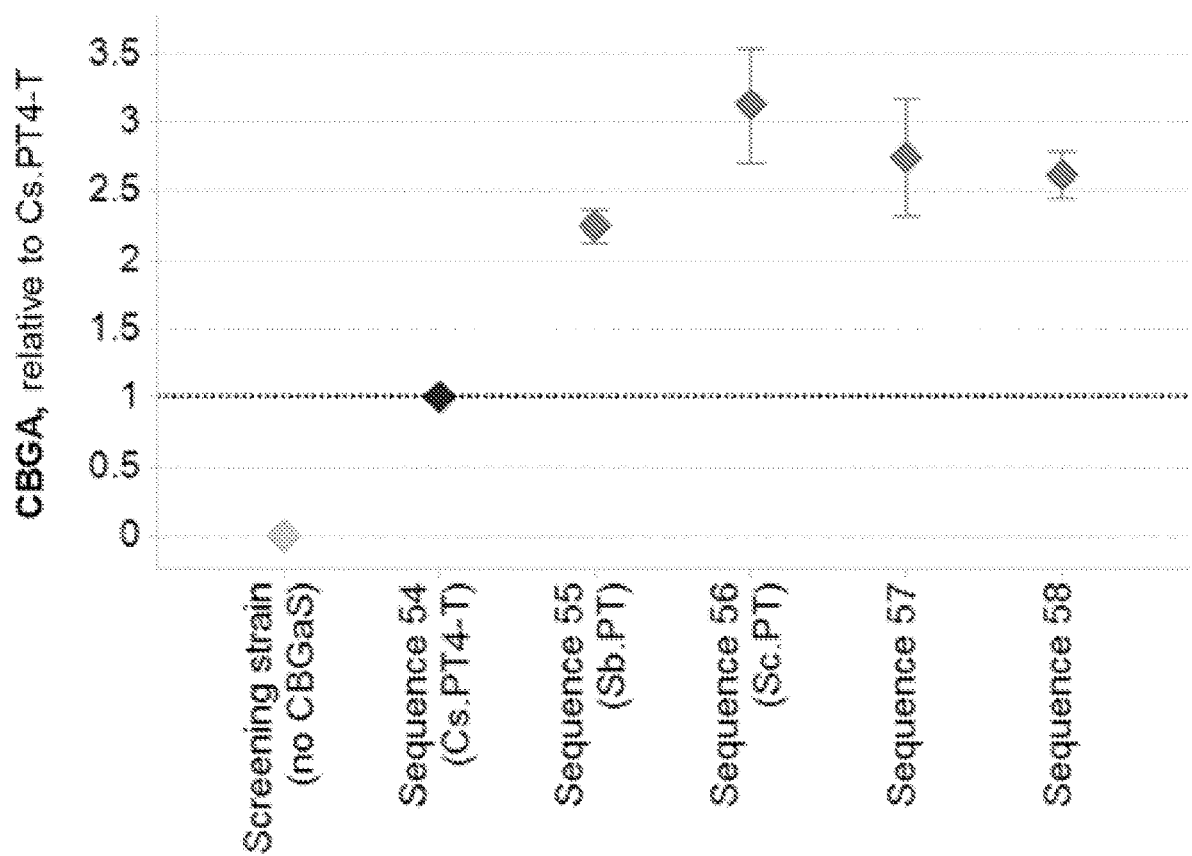
FIG. 7 shows the amount of cannabigerolic acid produced relative to the production of cannabigerolic acid produced by Cs.PT4 by 3 proteins identified in the subsequent natural diversity library.

The majority of the proteins in these natural diversity libraries were devoid of any CBGaS activity. However, one protein from the target species library resulted in CBGA production that was 2.24-fold the level of Cs.PT4-T (SEQ ID NO: 54) (FIG. 7). This novel CBGaS enzyme is from the fungal source organism *Stachybotrys bisbyi* and is hereafter referred to as Sb.PT (SEQ ID NO: 55). The novel CBGaS protein Sb.PT shares less than 20% sequence similarity to Cs.PT4-T.

Motivated by the surprisingly high CBGaS activity of Sb.PT, we performed an additional homology search to identify more protein sequences from this clade of natural diversity. The BLASTp algorithm (https://blast.ncbi.nlm.nih.gov/Blast.cgi) was used to gather all proteins from NCBI-nr and UniProtKB databases with >50% amino acid identity to Sb.PT. The resulting 11 proteins were codon-optimized for *S. cerevisiae*, ordered from a DNA-synthesis vendor, and then screened for CBGaS activity.

Screening the subsequent natural diversity library yielded an additional 3 proteins possessing CBGaS activity (FIG. 7). Two of the novel CBGaS enzymes are from the fungal source organism *Stachybotrys chartarum* (SEQ ID NO: 56 and 57), and the other novel CBGaS enzyme is from the fungal source organism *Stachybotrys chlorohalanata* (SEQ ID NO: 58). These proteins result in CBGA production that is between 2.24-fold and 3.12-fold the level of Cs.PT4-T. The protein demonstrating the highest CBGaS activity is from *Stachybotrys chartarum* and is hereafter referred to as Sc.PT (SEQ ID NO: 56). Each of these fungal proteins shares less than 20% sequence similarity to Cs.PT4-T, and the fungal proteins Sb.PT and Sc.PT share 73% pairwise identity.

Figure 8:
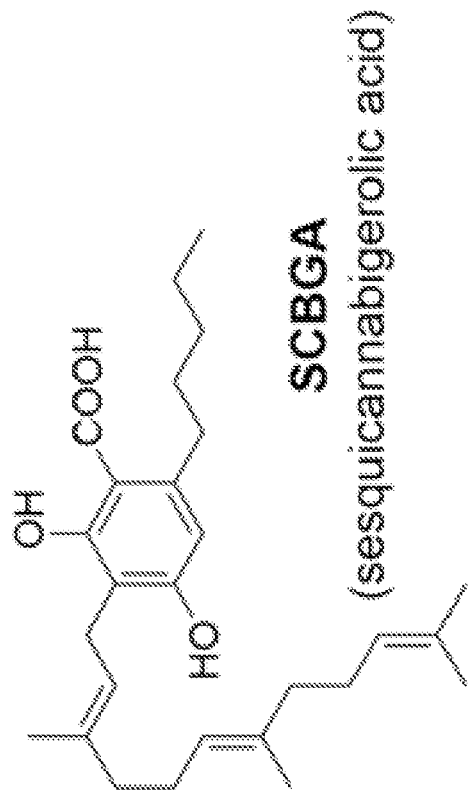
FIG. 8 shows the structures of cannabigerolic acid (CBGA) and sesquicannabigerolic acid (SCBGA).
Figure 8:
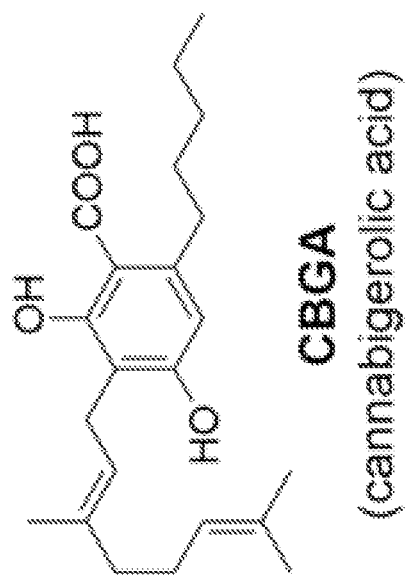

Example 12: Identification of SesquiCannaBiGerolic Acid (SCBGA) as a Product Resulting from Substrate Promiscuity of the CBGaS In the course of screening engineered *S. cerevisiae* strains in Example 11: Identification of Novel Proteins with CBGaS Activity from a Natural Diversity Library, the chromatography assay used to measure CBGA (see Example 3: Analytical Methods for Product Extraction and Titer Determination) indicated that an additional compound with a similar UV-absorbance spectrum was accumulating in the samples. This additional peak eluted from the C18 column at 3.10 min, which is later than the elution time of CBGA (1.28 min) in this assay. Analysis of samples containing this additional peak using high-resolution mass spectroscopy indicated that the compound forms a negative ion with a mass-to-charge ratio of 427.287 m/z, which matches the ion mass of sesquicannabigerolic acid (SCBGA, 427.285 m/z, see FIG. 8). Further fragmentation pattern analysis using tandem high-resolution mass spectrometry provided further support for the assignment of this peak as SCBGA. Finally, upon heating samples containing this additional peak prior to high-resolution mass spectrometry analysis, the peak suspected to be SCBGA disappears and a new peak resembling sesquicannabigerol (SCBG) appears, analogous to the heat-induced decarboxylation of CBGA into CBG. This additional peak occurring in *S. cerevisiae* strains engineered to produce CBGA is thus reasoned to be SCBGA (FIG. 8).

The chemical structure of SCBGA differs from CBGA by the addition of a $C_5H_8$ isoprenyl moiety, in the same way that farnesyl pyrophosphate (FPP) differs from geranyl pyrophosphate (GPP). And FPP is an endogenous metabolite of *S. cerevisiae*, as it is an intermediate in the biosynthesis of ergosterol. The origin of SCBGA in these samples is likely to be from substrate promiscuity of the CBGaS enzyme, whereby it accepts FPP in place of GPP as the prenyl group donor for prenylation of olivetolic acid. In support of this hypothesis, strains differing in the CBGaS enzyme were found to accumulate different ratios of SCBGA and CBGa. The following metric is used in these comparisons:

$$SCBGA \text{ fraction} = \frac{\text{Area of } SCBGA \text{ peak in chromatogram}}{\text{Sum of the areas of } SCBGA \text{ and } CBGA \text{ peaks in chromatogram}} \times 100\%$$

The SCBGA fraction of a strain expressing Cs.PT4-T (SEQ ID NO: 54) was found to be 13.9%. The SCBGA fraction of strains expressing Sb.PT or Sc.PT was found to be 48.3% and 44.3%, respectively (SEQ ID NOS: 55 and 56). These strains are all derived from the same parental strain described in Example 10: Generation of the Base Strain for CBGaS Screening, and hence differ only in the prenyltransferase enzyme. This implies that the novel CBGaS enzymes from fungi are more promiscuous in accepting FPP in place of GPP in the prenylation of olivetolic acid and are thus advantageous for the microbial production of multiple cannabinoids.

Example 13: Identification of Proteins with Improved CBGaS Substrate Specificity and Activity from Site Saturation Mutagenesis of Sb.PT and Sc.PT In this example, site-saturation mutagenesis was used to improve the substrate specificity and activity of the novel CBGaS enzymes Sb.PT and Sc.PT (SEQ ID NOS: 55 and 56). Approximately 85% of the amino acid residues in each protein were targeted for mutagenesis, whereby highly conserved residues were deemed essential and avoided during mutagenesis. Each amino acid residue was mutated using the degenerate codon NNT, where "N" indicates any of the four nucleotides. The degenerate codon NNT can encode 15 different amino acids (A, C, D, F, G, H, I, L, N, P, R, S, T, V, and Y). Each library for a given amino acid residue was generated by PCR and transformed into the strain described in Example 10: Generation of the Base Strain for CBGaS Screening.

In primary screening (termed Tier 1), 13 colonies per library were tested using the high-throughput assay described in Example 2: Culturing of Yeast and Example 3: Analytical Methods for Product Extraction and Titer Determination. In a secondary screen (termed Tier 2), transformed strains harboring CBGaS enzyme mutants of interest were re-tested in higher replication (n 6) to determine if the improved activity was significant. A mutation was considered to improve substrate specificity if the SCBGA fraction produced by the mutant was at least one standard deviation below the median SCBGA fraction of the original CBGaS protein. A mutation was considered to improve activity if the median amount of CBGA produced by the mutant was at least one standard deviation above the median amount of CBGA produced by the original CBGaS protein.

Figure 10:
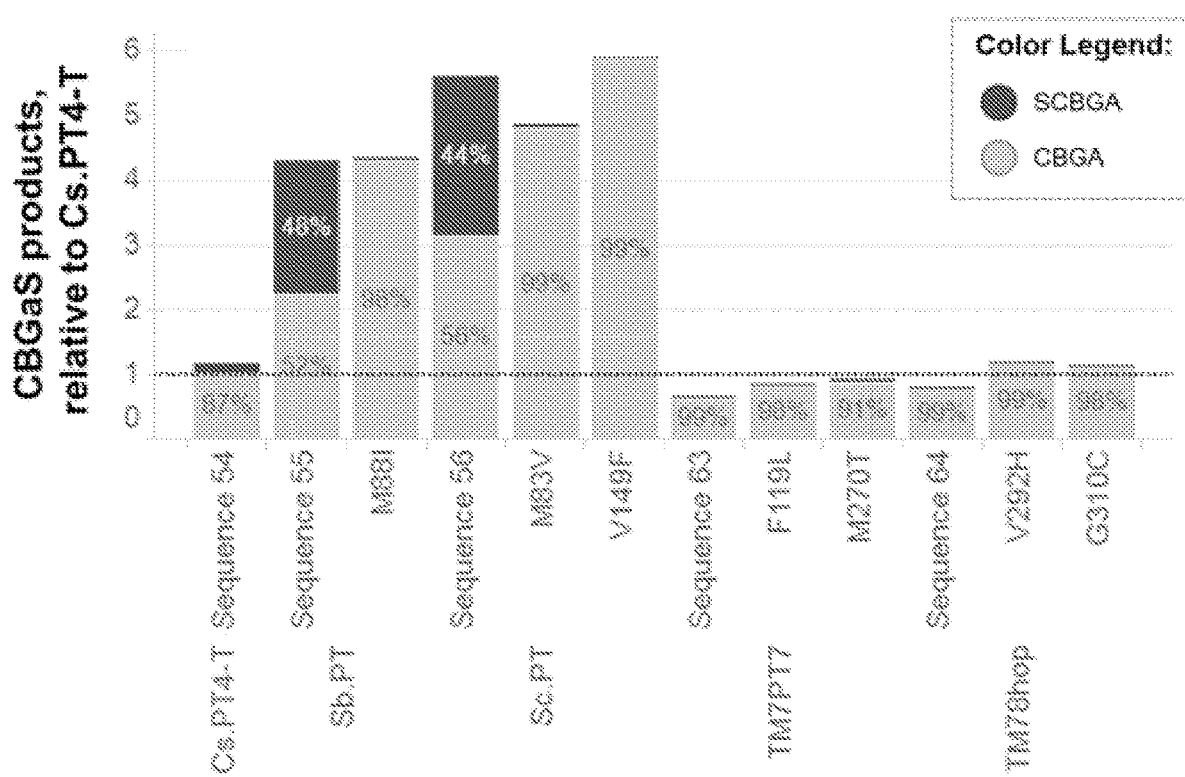
FIG. 10 shows the amount of CBGA and SCBGA produced by the chimeras relative to the production of CBGA and SCBGA produced by Cs.PT4.

One point mutation in Sb.PT was found to improve both substrate specificity and activity: M88I (Table 13). Remarkably, this single amino acid change reduced the SCBGA fraction from 48.3% to 1.7% (FIG. 10). The CBGaS activity of this mutant was 1.92-fold the level of the original Sb.PT protein. Four other point mutations resulted in improved CBGaS activity (between 1.39-fold and 1.48-fold the level of Sb.PT): V133I, S141Y, Y319L, and L324F. The SCBGA fraction was not measured for the four additional mutants.

TABLE 13

CBGaS Sb.PT sequence and activity data

| Seq ID | Relative CBGA titer | Mutation | SCBGA Fraction |
|---|---|---|---|
| SEQ ID NO 54 | 0.45 | Reference Enzyme Cs.PT4-T | 13.9% |
| SEQ ID NO 55 | 1.00 | Parent Enzyme Sb.PT | 48.3% |
| v1 | 1.92 | M88I | 1.7% |
| v2 | 1.48 | V133I | no data |
| v3 | 1.51 | S141Y | no data |
| v4 | 1.44 | Y319L | no data |
| v5 | 1.39 | L324F | no data |

Two unique point mutations in Sc.PT were found to improve both substrate specificity and activity: M83V and V149F (Table 14). Remarkably, each of these single amino acid changes reduced the SCBGA fraction from 44.3% to 1.4% or 0.8%, respectively (FIG. 10). The CBGaS activity of these mutants compared to the original Sc.PT protein was 1.92-fold and 2.33-fold, respectively.

Seeking to further improve the CBGaS activity, a subsequent campaign of site-saturation mutagenesis was performed, using the top single-point mutant Sc.PT_V149F as the template protein. Approximately 85% of the amino acid residues in the protein were targeted for mutagenesis. Each amino acid residue was mutated using the degenerate codon NNK, where "N" indicates any of the four nucleotides, and "K" indicates either Guanine or Thymine. The degenerate codon NNK can encode all 20 different amino acids (A, C, D, E, F, G, H, I, K, L, M, N, P, Q, R, S, T, V, W, and Y). Each library for a given amino acid residue was generated, transformed, and screening as described above for the original campaign on Sc.PT.

Thirty unique proteins were found to improve CBGaS activity from 3.89-fold to 5.68-fold the level of the original Sc.PT protein. These performance of each of these protein mutants is summarized in Table 14. Notably, the multiple mutations in Sc.PT generally preserved the high substrate specificity afforded by the initial V149F mutation; only the mutant multi_v23 (Table 14) displayed a moderate increase in SCBGA fraction. An enzyme with high activity and specificity for CBGA formation from GPP and olivetolic acid is crucial for the efficient production of CBGA from microbial fermentation. The enzymes identified from fungal species are here demonstrated to possess high activity when expressed in S. cerevisiae, and the point mutations here engineered achieve highest specificity for CBGA formation.

TABLE 14

CBGaS Sc.PT sequence and activity data

| Seq ID | Relative CBGA titer | Mutant | SCBGA Fraction |
|---|---|---|---|
| SEQ ID NO 54 | 0.32 | Reference Enzyme Cs.PT4-T | 13.9% |
| SEQ ID NO 56 | 1.00 | Parent Enzyme Sc.PT | 44.3% |
| single v1 | 1.87 | V149F | 0.8% |
| single v2 | 1.53 | M83V | 1.4% |
| multi v1 | 4.55 | V149F, T202A | <1% |
| multi v2 | 4.27 | V149F, N264Y | <1% |
| multi v3 | 4.21 | V149F, N264F, A282P | <1% |
| multi v4 | 4.13 | V149F, S312L, T11T | <1% |
| multi v5 | 4.06 | V149F, L276T | <1% |
| multi v6 | 3.99 | V149F, L276P | <1% |
| multi v7 | 3.96 | V149F, I324E | <1% |
| multi v8 | 3.91 | V149F, H49C | <1% |
| multi v9 | 3.89 | V149F, H49C | <1% |
| multi v10 | 3.86 | V149F, S312L | <1% |
| multi v11 | 3.86 | V149F, L325P | <1% |
| multi v12 | 3.77 | V149F, I324K | <1% |
| multi v13 | 3.73 | V149F, L325A | <1% |
| multi v14 | 3.68 | V149F, P7K | <1% |
| multi v15 | 3.60 | V149F, R196F | <1% |
| multi v16 | 3.51 | V149F, A176V | <1% |
| multi v17 | 3.49 | V149F, A176V | <1% |
| multi v18 | 3.47 | V149F, N309F | <1% |
| multi v19 | 3.47 | V149F, P7T | <1% |
| multi v20 | 3.43 | V149F, A279C | <1% |
| multi v21 | 3.42 | V149F, A279S | <1% |
| multi v22 | 3.39 | V149F, A89A | <1% |
| multi v23 | 3.31 | V149F, V262L | 1.4% |
| multi v24 | 3.30 | V149F, N93V | <1% |
| multi v25 | 3.25 | V149F, A257Y | <1% |
| multi v26 | 3.21 | V149F, A131G | <1% |
| multi v27 | 3.20 | V149F, A257F, V242L | <1% |
| multi v28 | 3.19 | V149F, C249F | <1% |
| multi v29 | 3.18 | V149F, M311L | <1% |
| multi v30 | 3.11 | V149F, T248A | <1% |
| multi v31 | 1.60 | V149F, M83V | <1% |

Example 14: Identification of Proteins with Improved CBGaS Substrate Specificity from Chimeragenesis of Cs.PT4-T its and Close Homolog In this example, protein chimeragenesis is used to improve the substrate specificity of Cs.PT4-T (SEQ ID NO: 54). Protein chimeragenesis part of a family of protein engineering techniques referred to as DNA shuffling, recombination, molecular breeding, simply "chimeragenesis," or other names (Engqvist M K M & Rabe K S, Plant Physiol. 179:3, 2019, 907-917). In chimeragenesis, new protein sequences are constructed by concatenating different parts of two or more homologous proteins, and the resulting proteins may possess properties not found in any of the parents (Otey C R et al., PLoS Biol. 4:5, 2006, e112). While many proteins generated via chimeragenesis may be non-functional due to protein mis-folding, a careful choice of crossover sites between homologous proteins can result in chimeric proteins that are more likely to be folded and functional (Voigt C A et al., Nat. Struct. Biol., 9:7, 2002, 553-558).

For chimeragenesis of Cs.PT4-T (SEQ ID NO: 54), the four proteins from the previously described homology library (see Example 11: Identification of Novel Proteins with CBGaS Activity from a Natural Diversity Library) that shared the highest pairwise identity with Cs.PT4-T were selected. Two of these homologous proteins are from the source organism Cannabis sativa (SEQ ID NO: 59 and 60), and the other two are from Humulus lupulus (SEQ ID NO: 61 and 62). In previous screening, these four homologs displayed no CBGaS activity, either as full-length proteins or after truncation of the chloroplast transit peptide (cTP). All subsequent work was performed using the cTP-truncated sequences. The four homologs share between 44% and 60% pairwise identity with Cs.PT4-T. Computational prediction of transmembrane (TM) regions of each protein using TMHMM (http://www.cbs.dtu.dk/services/TMHMM/) indicated that all five proteins share a similar domain architecture consisting of nine TM regions.

Figure 9:
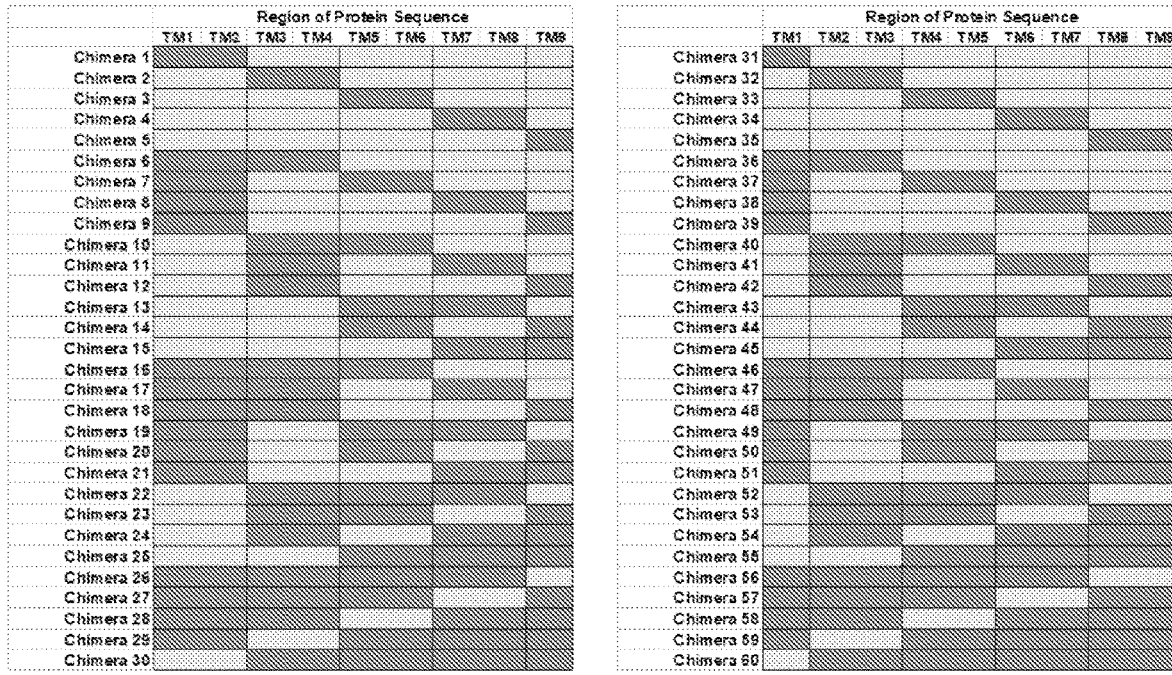
FIG. 9 shows a representation of the library of chimeras constructed from Cs.PT4-T and one homolog.
Figure 9:
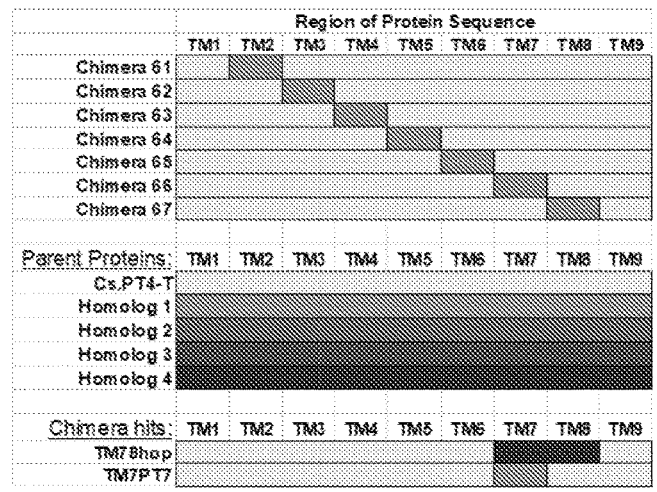

The library of chimeragenesis variants (or simply "chimeras") was designed as follows. Each chimera consisted of amino acid sequences from exactly two parent proteins, one of which was Cs.PT4-T. The protein sequences were aligned, and crossover sites were selected at the end of each TM region. To facilitate high-efficiency DNA assembly into the landing pad (FIG. 11), the library was constrained to include only chimeras that could be built by five or fewer overlapping DNA pieces. The library of chimeras constructed from Cs.PT4-T and one homolog are illustrated in FIG. 9. The chimeras numbered 1 to 30 consisted of a full-factorial recombination using crossover sites after TM2, TM4, TM6, and TM8. Similarly, the chimeras numbered 31 to 60 consisted of a full-factorial recombination using crossover sites after TM1, TM3, TM5, and TM7. Finally, the chimeras numbered 61 to 67 consisted of more conservative changes to Cs.PT4-T, whereby a single interior TM region was replaced with the corresponding amino acid sequence from a homolog (FIG. 9). The resulting library thus consisted of 67 chimeras using sequence from Cs.PT4-T and a single homolog. Iterating across the four homologs brought the total library size to 4×67=268 chimeras.

Oligonucleotide primers were ordered to construct each chimera in the library. The oligonucleotides added 30-nucleotide overlaps between each piece, as well as 40-nucleotide overlaps to the Landing Pad (FIG. 11), to enable direct transformation into the strain described in Example 10: Generation of the Base Strain for CBGaS Screening. Each chimera was transformed individually, and colony-PCR and Sanger DNA sequencing were used to confirm that the intended chimeras were assembled using in vivo DNA recombination. The resulting strains were screened for the ability to produce CBGA using methods described in Example 2: Culturing of Yeast and Example 3: Analytical Methods for Product Extraction and Titer Determination.

The majority of the 268 chimeras screened in this library resulted in no CBGA production. However, two chimeras were found to produce either 0.59-fold or 0.81-fold the level of CBGA as the reference protein Cs.PT4-T (SEQ ID NO: 54). Notably, both chimeras demonstrated a SCBGA fraction of below 1%, compared to a 13% SCBGA fraction for Cs.PT4-T (Table 15 and FIG. 10). These two hits from chimeragenesis are thus greatly improved in their substrate specificity for GPP over FPP in the prenylation of olivetolic acid. The first chimera, hereafter referred to as TM7PT7 (SEQ ID NO: 63), arises from swapping the TM7 region of Cs.PT4-T with the homologous amino acid sequence from the protein PT7 from *Cannabis sativa* (SEQ ID NO: 60), and this chimera shares 93% pairwise identity with Cs.PT4-T. The second chimera, hereafter referred to as TM78hop (SEQ ID NO: 64), arises from swapping the TM7 and TM8 regions of Cs.PT4-T with the homologous amino acid sequence from a protein from *Humulus lupulus* (SEQ ID NO: 62), and this chimera shares 89% pairwise identity with Cs.PT4-T.

TABLE 15

Chimeragenesis sequence and activity data

| Seq ID | Relative CBGa titer | SCBGa Fraction | CBGaS Protein |
|---|---|---|---|
| SEQ ID NO 54 | 1.00 | 12.9% | Reference Enzyme Cs.PT4-T |
| SEQ ID NO 63 | 0.59 | <1.2% | Chimera CBGaS TM7PT7 |
| SEQ ID NO 64 | 0.81 | <1.2% | Chimera CBGaS TM78hop |

Example 15: Identification of Proteins with Improved CBGaS Activity from Site Saturation Mutagenesis of Two Chimeric Proteins Named TM7PT7 and TM78hop The gain of substrate specificity in the two chimeras TM7PT7 (SEQ ID NO: 63) and TM78hop (SEQ ID NO: 64) were accompanied with a reduction in CBGA production, compared to Cs.PT4-T (SEQ ID NO: 54), as summarized in Table 15. In this example, site-saturation mutagenesis was used to improve the CBGaS activity of these two chimeras. Specifically, 91 residues within each protein were mutated. The selected amino acid residues reside within or are spatially adjacent to the transmembrane (TM) regions that differ between these chimeras and Cs.PT4-T. Each amino acid residue was mutated using the degenerate codon NNT, where "N" indicates any of the four nucleotides. The degenerate codon NNT can encode 15 different amino acids (A, C, D, F, G, H, I, L, N, P, R, S, T, V, and Y). Each library for a given amino acid residue was generated by PCR and transformed into the strain described in Example 10: Generation of the Base Strain for CBGaS Screening.

In primary screening (termed Tier 1), 26 colonies per library were tested using the conditions described in Example 2: Culturing of Yeast and the high-throughput assay described in Example 3: Analytical Methods for Product Extraction and Titer Determination. In a secondary screen (termed Tier 2), transformed strains harboring CBGaS enzyme mutants of interest were re-tested in higher replication (n≥6) to determine if the improved activity was significant. A mutation was considered to improve CBGaS activity if the median amount of CBGA produced by the mutant was at least one standard deviation above the median amount of CBGA produced by the starting protein (either TM7PT7 or TM78hop). The SCBGA Fraction of the enzymes was assessed using the approach described in Example 12: Identification of SesquiCannaBiGerolic Acid (SCBGA) as a Product Resulting from Substrate Promiscuity of the CBGaS.

For mutagenesis of TM7PT7, in total ten unique point mutations that improve CBGaS activity were identified (Table 16). These individual mutants resulted in up to 1.31-fold the production of CBGA, compared to the original protein TM7PT7. The SCBGA fraction of these mutants either remained very low (between 1.1% and 2.2%) or increased to levels higher than TM7PT7 but still lower than the reference enzyme Cs.PT4-T (Table 16 and FIG. 10).

TABLE 16

TM7PT7 sequence and activity data

| Seq ID | Relative CBGA titer | SCBGA Fraction | CBGaS Protein/Mutant |
|---|---|---|---|
| SEQ ID NO 54 | 1.00 | 13.5% | Reference Enzyme Cs.PT4-T |
| SEQ ID NO 63 | 0.64 | 1.0% | Parent Enzyme TM7PT7 |
| v1 | 0.80 | 2.1% | I109T |
| v2 | 0.83 | 1.8% | F119L |
| v3 | 0.81 | 4.8% | S245L |
| v4 | 0.73 | 1.1% | S247Y |
| v5 | 0.84 | 9.4% | M270T |
| v6 | 0.72 | 1.9% | S295D |
| v7 | 0.72 | 2.2% | C280L |
| v8 | 0.81 | 7.4% | V314L |
| v9 | 0.72 | 1.5% | A324F |
| v10 | 0.73 | 1.7% | S361I |

For mutagenesis of TM78hop, in total thirteen unique point mutations that improve CBGaS activity were identified (Table 17). These individual mutants resulted in up to 1.51-fold the production of CBGA, compared to the original protein TM78hop. The SCBGA fraction of all these mutants remained low (between 0.8% and 4.3%) (FIG. 10). Notably, seven of these mutations displayed CBGaS activity higher than the reference enzyme Cs.PT4-T and displayed lower SCBGA fraction. For example, the point mutation V292H produced a 1.2% SCBGA fraction, produced 1.15-fold the CBGA compared to Cs.PT4-T, and shares 89% pairwise identity with Cs.PT4-T.

TABLE 17

TM78hop sequence and activity data

| Seq ID | Relative CBGA titer | SCBGA Fraction | CBGaS Protein/Mutant |
|---|---|---|---|
| SEQ ID NO 54 | 1 | 13.5% | Reference Enzyme Cs.PT4-T |
| SEQ ID NO 64 | 0.78 | 1.1% | Parent Enzyme TM78hop |
| v1 | 1.18 | 3.2% | V292Y |
| v2 | 1.15 | 1.2% | V292H |
| v3 | 1.14 | 3.3% | V292F |
| v4 | 1.13 | 3.2% | M275S |
| v5 | 1.10 | 2.2% | G310C |
| v6 | 1.09 | 2.4% | F314N |
| v7 | 1.02 | 1.4% | A347I |
| v8 | 1.00 | 1.3% | M275T |
| v9 | 0.97 | 1.5% | T276C |
| v10 | 0.92 | 0.8% | A331C |
| v11 | 0.90 | 1.8% | T276F |
| v12 | 0.87 | 1.8% | A331T |
| v13 | 0.84 | 4.3% | K291H |

Example 16: Production of CBGOA, CBGVA, CBGXA, SCBGOA, SCBGVA, and SCBGXA

Cannabigerorcinic acid (CBGOA), cannabigerovarinic acid (CBGVA), 3-geranyl-2,4-dihydroxy-6-phenylethylbenzoic acid (CBGXA), and CBGA differ structurally only in their alkyl side chain. CBGOA has a methyl side chain, CBGVA a propyl side chain, CBGA a pentyl side chain, and CBGXA a phenylethyl side chain. Due to this structural similarity, it was hypothesized that the CBGA-producing enzymes identified in Example 11: Identification of Novel Proteins with CBGaS Activity from a Natural Diversity Library, would also have activity toward production of CBGOA, CBGVA, and/or CBGXA, as well as sesquicannabigerorcinic acid (SCBGOA), sesquicannabigerovarinic acid (SCBGVA), and/or 3-farnesyl-2,4-dihydroxy-6-phenylethylbenzoic acid (SCBGXA).

*Saccharomyces cerevisiae* strains are transformed with the mevalonate pathway genes (ERG10, ERG13, HMGR-t, ERG12, ERG8, MVD1, and ID11) and the PDH bypass genes (Zm.PDC, ALD6, and ACS1) and the GPP synthase described in Example 10: Generation of the Base Strain for CBGaS Screening. Each of the prenyltransferases identified in Example 11: Identification of Novel Proteins with CBGaS Activity from a Natural Diversity Library are then expressed in this strain and screened for their ability to produce CBGOA and/or SCBGOA, CBGVA and/or SCBGVA, or CBGXA and/or SCBGXA, as the strains are fed orsellinic acid, divarinolic acid, and 2,4-dihydroxy-6-phenylethylbenzoic acid, respectively. Cells are cultured according to the methods described in Example 2: Culturing Yeast, and using the analytical methods described in Example 3: Analytical Methods for Product Extraction and Titer Determination, CBGOA, SCBGOA, CBGVA, SCBGVA, CBGXA, and SCBGXA are detected and quantified, confirming the ability of the enzymes to act on multiple substrates.

Other Embodiments

While the invention has been described in connection with specific embodiments thereof, it will be understood that it is capable of further modifications and this application is intended to cover any variations, uses, or adaptations of the invention following, in general, the principles of the invention and including such departures from the invention that come within known or customary practice within the art to which the invention pertains and may be applied to the essential features hereinbefore set forth, and follows in the scope of the claims. Other embodiments are within the claims.

Exemplary embodiments of the invention are those enumerated below:

1. A host cell capable of producing a cannabinoid, wherein the host cell comprises one or more heterologous nucleic acids that each, independently, encode
   (a) an acyl activating enzyme (AAE) having an amino acid sequence that is at least 90% identical to the amino acid sequence of any one of SEQ ID NOS: 1-5 and 7-24, and/or
   (b) a tetraketide synthase (TKS) having an amino acid sequence that is at least 90% identical to the amino acid sequence of any one of SEQ ID NOS: 25 and 27-43, and/or
   (c) a cannabigerolic acid synthase (CBGaS) having an amino acid sequence that is at least 90% identical to the amino acid sequence of any one of SEQ ID NOS: 55-58, 63, and 64, and/or
   (d) an olivetolic acid cyclase (OAC) having an amino acid sequence that is at least 90% identical to the amino acid sequence of any one of SEQ ID NOS: 45-52.
2. The host cell of embodiment 1, wherein the host cell comprises a heterologous nucleic acid that encodes an AAE having an amino acid sequence that is at least 90% identical to the amino acid sequence of any one of SEQ ID NOS: 1-5 and 7-24.
3. The host cell of embodiment 2, wherein the AAE has an amino acid sequence that is at least 95% identical to the amino acid sequence of any one of SEQ ID NOS: 1-5 and 7-24.
4. The host cell of embodiment 3, wherein the AAE has the amino acid sequence of any one of SEQ ID NOS: 1-5 and 7-24.
5. The host cell of embodiment 1, wherein the host cell comprises a heterologous nucleic acid that encodes an AAE having an amino acid sequence that is at least 90% identical to the amino acid sequence of any one of SEQ ID NOS: 1-4.
6. The host cell of embodiment 5, wherein the AAE has an amino acid sequence that is at least 95% identical to the amino acid sequence of any one of SEQ ID NOS: 1-4.
7. The host cell of embodiment 6, wherein the AAE has the amino acid sequence of any one of SEQ ID NOS: 1-4.
8. The host cell of any one of embodiments 1-7, wherein the host cell comprises a heterologous nucleic acid that encodes a TKS having an amino acid sequence that is at least 90% identical to the amino acid sequence of any one of SEQ ID NOS: 25 and 27-43.
9. The host cell of embodiment 8, wherein the TKS has an amino acid sequence that is at least 95% identical to the amino acid sequence of any one of SEQ ID NOS: 25 and 27-43.
10. The host cell of embodiment 9, wherein the TKS has the amino acid sequence of any one of SEQ ID NOS: 25 and 27-43.
11. The host cell of any one of embodiments 1-7, wherein the host cell comprises a heterologous nucleic acid that encodes a TKS having an amino acid sequence that is at least 90% identical to the amino acid sequence of any one of SEQ ID NOS: 25 and 34-39.
12. The host cell of embodiment 11, wherein the TKS has an amino acid sequence that is at least 95% identical to the amino acid sequence of any one of SEQ ID NOS: 25 and 34-39.
13. The host cell of embodiment 12, wherein the TKS has the amino acid sequence of any one of SEQ ID NOS: 25 and 34-39.
14. The host cell of any one of embodiments 1-7, wherein the host cell comprises a heterologous nucleic acid that encodes a TKS having an amino acid sequence that is at least 90% identical to the amino acid sequence of SEQ ID NO: 25 or 39.
15. The host cell of embodiment 14, wherein the TKS has an amino acid sequence that is at least 95% identical to the amino acid sequence of SEQ ID NO: 25 or 39.
16. The host cell of embodiment 15, wherein the TKS has the amino acid sequence of SEQ ID NO: 25 or 39.
17. The host cell of any one of embodiments 1-16, wherein the host cell comprises a heterologous nucleic acid that encodes a CBGaS having an amino acid sequence that is at least 90% identical to the amino acid sequence of any one of SEQ ID NOS: 55-58, 63, and 64.

18. The host cell of embodiment 17, wherein the CBGaS has an amino acid sequence that is at least 95% identical to the amino acid sequence of any one of SEQ ID NOS: 55-58, 63, and 64.

19. The host cell of embodiment 18, wherein the CBGaS has the amino acid sequence of any one of SEQ ID NOS: 55-58, 63, and 64.

20. The host cell of any one of embodiments 17-19, wherein the CBGaS has one or more amino acid substitutions relative to the amino acid sequence of SEQ ID NO: 55, wherein the one or more amino acid substitutions are selected from M88I, V133I, S141Y, Y319L, and L324F.

21. The host cell of embodiment 20, wherein the CBGaS has the amino acid substitution M88I relative to the amino acid sequence of SEQ ID NO: 55.

22. The host cell of embodiment 20 or 21, wherein the CBGaS has the amino acid substitution V133I relative to the amino acid sequence of SEQ ID NO: 55.

23. The host cell of any one of embodiments 20-22, wherein the CBGaS has the amino acid substitution S141Y relative to the amino acid sequence of SEQ ID NO: 55.

24. The host cell of any one of embodiments 20-23, wherein the CBGaS has the amino acid substitution Y319L relative to the amino acid sequence of SEQ ID NO: 55.

25. The host cell of any one of embodiments 20-24, wherein the CBGaS has the amino acid substitution L324F relative to the amino acid sequence of SEQ ID NO: 55.

26. The host cell of any one of embodiments 17-25, wherein the CBGaS has one or more amino acid substitutions relative to the amino acid sequence of SEQ ID NO: 56, wherein the one or more amino acid substitutions are selected from P7K, P7T, T11T, H49C, M83V, A89A, N93V, A131G, V149F, A176V, R196F, T202A, V242L, T248A, C249F, A257Y, A257F, V262L, N264Y, N264F, L276T, L276P, A279C, A279S, A282P, N309F, M311L, S312L, Y319L, I324E, I324K, L325P, and L325A.

27. The host cell of embodiment 26, wherein the CBGaS has the amino acid substitution P7K or P7T relative to the amino acid sequence of SEQ ID NO: 56.

28. The host cell of embodiment 26 or 27, wherein the CBGaS has the amino acid substitution T11T relative to the amino acid sequence of SEQ ID NO: 56.

29. The host cell of any one of embodiments 26-28, wherein the CBGaS has the amino acid substitution H49C relative to the amino acid sequence of SEQ ID NO: 56.

30. The host cell of any one of embodiments 26-29, wherein the CBGaS has the amino acid substitution M83V relative to the amino acid sequence of SEQ ID NO: 56.

31. The host cell of any one of embodiments 26-30, wherein the CBGaS has the amino acid substitution A89A relative to the amino acid sequence of SEQ ID NO: 56.

32. The host cell of any one of embodiments 26-31, wherein the CBGaS has the amino acid substitution N93V relative to the amino acid sequence of SEQ ID NO: 56.

33. The host cell of any one of embodiments 26-32, wherein the CBGaS has the amino acid substitution A131G relative to the amino acid sequence of SEQ ID NO: 56.

34. The host cell of any one of embodiments 26-33, wherein the CBGaS has the amino acid substitution V149F relative to the amino acid sequence of SEQ ID NO: 56.

35. The host cell of any one of embodiments 26-34, wherein the CBGaS has the amino acid substitution A176V relative to the amino acid sequence of SEQ ID NO: 56.

36. The host cell of any one of embodiments 26-35, wherein the CBGaS has the amino acid substitution R196F relative to the amino acid sequence of SEQ ID NO: 56.

37. The host cell of any one of embodiments 26-36, wherein the CBGaS has the amino acid substitution T202A relative to the amino acid sequence of SEQ ID NO: 56.

38. The host cell of any one of embodiments 26-37, wherein the CBGaS has the amino acid substitution V242L relative to the amino acid sequence of SEQ ID NO: 56.

39. The host cell of any one of embodiments 26-38, wherein the CBGaS has the amino acid substitution T248A relative to the amino acid sequence of SEQ ID NO: 56.

40. The host cell of any one of embodiments 26-39, wherein the CBGaS has the amino acid substitution C249F relative to the amino acid sequence of SEQ ID NO: 56.

41. The host cell of any one of embodiments 26-40, wherein the CBGaS has the amino acid substitution A257Y or A257F relative to the amino acid sequence of SEQ ID NO: 56.

42. The host cell of any one of embodiments 26-41, wherein the CBGaS has the amino acid substitution V262L relative to the amino acid sequence of SEQ ID NO: 56.

43. The host cell of any one of embodiments 26-42, wherein the CBGaS has the amino acid substitution N264Y or N264F relative to the amino acid sequence of SEQ ID NO: 56.

44. The host cell of any one of embodiments 26-43, wherein the CBGaS has the amino acid substitution L276T or L276P relative to the amino acid sequence of SEQ ID NO: 56.

45. The host cell of any one of embodiments 26-44, wherein the CBGaS has the amino acid substitution A279C or A279S relative to the amino acid sequence of SEQ ID NO: 56.

46. The host cell of any one of embodiments 26-45, wherein the CBGaS has the amino acid substitution A282P relative to the amino acid sequence of SEQ ID NO: 56.

47. The host cell of any one of embodiments 26-46, wherein the CBGaS has the amino acid substitution N309F relative to the amino acid sequence of SEQ ID NO: 56.

48. The host cell of any one of embodiments 26-47, wherein the CBGaS has the amino acid substitution M311L relative to the amino acid sequence of SEQ ID NO: 56.

49. The host cell of any one of embodiments 26-48, wherein the CBGaS has the amino acid substitution S312L relative to the amino acid sequence of SEQ ID NO: 56.

50. The host cell of any one of embodiments 26-49, wherein the CBGaS has the amino acid substitution Y319L relative to the amino acid sequence of SEQ ID NO: 56.

51. The host cell of any one of embodiments 26-50, wherein the CBGaS has the amino acid substitution I324E or I324K relative to the amino acid sequence of SEQ ID NO: 56.

52. The host cell of any one of embodiments 26-51, wherein the CBGaS has the amino acid substitution L325P or L325A relative to the amino acid sequence of SEQ ID NO: 56.

53. The host cell of any one of embodiments 17-52, wherein the CBGaS has one or more amino acid substitutions relative to the amino acid sequence of SEQ ID NO: 63, wherein the one or more amino acid substitutions are selected from I109T, F119L, S245L, S247Y, M270T, C280L, S295D, V314L, A324F, and S361I.

54. The host cell of embodiment 53, wherein the CBGaS has the amino acid substitution I109T relative to the amino acid sequence of SEQ ID NO: 63.

55. The host cell of embodiment 53 or 54, wherein the CBGaS has the amino acid substitution F119L relative to the amino acid sequence of SEQ ID NO: 63.

56. The host cell of any one of embodiments 53-55, wherein the CBGaS has the amino acid substitution S245L relative to the amino acid sequence of SEQ ID NO: 63.

57. The host cell of any one of embodiments 53-56, wherein the CBGaS has the amino acid substitution S247Y relative to the amino acid sequence of SEQ ID NO: 63.

58. The host cell of any one of embodiments 53-57, wherein the CBGaS has the amino acid substitution M270T relative to the amino acid sequence of SEQ ID NO: 63.

59. The host cell of any one of embodiments 53-58, wherein the CBGaS has the amino acid substitution C280L relative to the amino acid sequence of SEQ ID NO: 63.

60. The host cell of any one of embodiments 53-59, wherein the CBGaS has the amino acid substitution S295D relative to the amino acid sequence of SEQ ID NO: 63.

61. The host cell of any one of embodiments 53-60, wherein the CBGaS has the amino acid substitution V314L relative to the amino acid sequence of SEQ ID NO: 63.

62. The host cell of any one of embodiments 53-61, wherein the CBGaS has the amino acid substitution A324F relative to the amino acid sequence of SEQ ID NO: 63.

63. The host cell of any one of embodiments 53-62, wherein the CBGaS has the amino acid substitution S361I relative to the amino acid sequence of SEQ ID NO: 63.

64. The host cell of any one of embodiments 17-63, wherein the CBGaS has one or more amino acid substitutions relative to the amino acid sequence of SEQ ID NO: 64, wherein the one or more amino acid substitutions are selected from M275S, M275T, T276C, T276F, K291H, V292Y, V292H, V292F, G310C, F314N, A331C, A331T, and A347I.

65. The host cell of embodiment 64, wherein the CBGaS has the amino acid substitution M275S or M275T relative to the amino acid sequence of SEQ ID NO: 64.

66. The host cell of embodiment 64 or 65, wherein the CBGaS has the amino acid substitution T276C or T276F relative to the amino acid sequence of SEQ ID NO: 64.

67. The host cell of any one of embodiments 64-66, wherein the CBGaS has the amino acid substitution K291H relative to the amino acid sequence of SEQ ID NO: 64.

68. The host cell of any one of embodiments 64-67, wherein the CBGaS has the amino acid substitution V292Y, V292H, or V292F relative to the amino acid sequence of SEQ ID NO: 64.

69. The host cell of any one of embodiments 64-68, wherein the CBGaS has the amino acid substitution G310C relative to the amino acid sequence of SEQ ID NO: 64.

70. The host cell of any one of embodiments 64-69, wherein the CBGaS has the amino acid substitution F314N relative to the amino acid sequence of SEQ ID NO: 64.

71. The host cell of any one of embodiments 64-70, wherein the CBGaS has the amino acid substitution A331C or A331T relative to the amino acid sequence of SEQ ID NO: 64.

72. The host cell of any one of embodiments 64-71, wherein the CBGaS has the amino acid substitution A347I relative to the amino acid sequence of SEQ ID NO: 64.

73. The host cell of any one of embodiments 1-72, wherein the host cell comprises a heterologous nucleic acid that encodes an OAC having an amino acid sequence that is at least 90% identical to the amino acid sequence of any one of SEQ ID NOS: 45-52.

74. The host cell of embodiment 73, wherein the OAC has an amino acid sequence that is at least 95% identical to the amino acid sequence of any one of SEQ ID NOS: 45-52.

75. The host cell of embodiment 74, wherein OAC has the amino acid sequence of any one of SEQ ID NOS: 45-52.

76. The host cell of any one of embodiments 73-75, wherein the OAC has one or more amino acid substitutions relative to the amino acid sequence of SEQ ID NO: 44, wherein the one or more amino acid substitutions are selected from A2S, L9I, K12S, E14S, F23L, V28L, T47R, Q48R, K49R, S87H, F88Y, and L92Y.

77. The host cell of embodiment 76, wherein the OAC has the amino acid substitution A2S relative to the amino acid sequence of SEQ ID NO: 44.

78. The host cell of embodiment 76 or 77, wherein the OAC has the amino acid substitution L9I relative to the amino acid sequence of SEQ ID NO: 44.

79. The host cell of any one of embodiments 76-78, wherein the OAC has the amino acid substitution K12S relative to the amino acid sequence of SEQ ID NO: 44.

80. The host cell of any one of embodiments 76-79, wherein the OAC has the amino acid substitution E14S relative to the amino acid sequence of SEQ ID NO: 44.

81. The host cell of any one of embodiments 76-80, wherein the OAC has the amino acid substitution F23L relative to the amino acid sequence of SEQ ID NO: 44.

82. The host cell of any one of embodiments 76-81, wherein the OAC has the amino acid substitution V28L relative to the amino acid sequence of SEQ ID NO: 44.
83. The host cell of any one of embodiments 76-82, wherein the OAC has the amino acid substitution T47R relative to the amino acid sequence of SEQ ID NO: 44.
84. The host cell of any one of embodiments 76-83, wherein the OAC has the amino acid substitution Q48R relative to the amino acid sequence of SEQ ID NO: 44.
85. The host cell of any one of embodiments 76-84, wherein the OAC has the amino acid substitution K49R relative to the amino acid sequence of SEQ ID NO: 44.
86. The host cell of any one of embodiments 76-85, wherein the OAC has the amino acid substitution S87H relative to the amino acid sequence of SEQ ID NO: 44.
87. The host cell of any one of embodiments 76-86, wherein the OAC has the amino acid substitution F88Y relative to the amino acid sequence of SEQ ID NO: 44.
88. The host cell of any one of embodiments 76-87, wherein the OAC has the amino acid substitution L92Y relative to the amino acid sequence of SEQ ID NO: 44.
89. The host cell of any one of embodiments 1-88, wherein the host cell further comprises one or more heterologous nucleic acids that each, independently, encode an enzyme of the mevalonate biosynthetic pathway.
90. The host cell of embodiment 89, wherein the enzyme of the mevalonate biosynthetic pathway is selected from an acetyl-CoA thiolase, an HMG-CoA synthase, an HMG-CoA reductase, a mevalonate kinase, a phosphomevalonate kinase, a mevalonate pyrophosphate decarboxylase, and an IPP:DMAPP isomerase.
91. The host cell of embodiment 89 or 90, wherein the host cell comprises one or more heterologous nucleic acids that, together, encode an acetyl-CoA thiolase, an HMG-CoA synthase, an HMG-CoA reductase, a mevalonate kinase, a phosphomevalonate kinase, a mevalonate pyrophosphate decarboxylase, and an IPP:DMAPP isomerase.
92. The host cell of embodiment 90 or 91, wherein the acetyl-CoA thiolase has an amino acid sequence that is at least 90% identical to the amino acid sequence of SEQ ID NO: 68.
93. The host cell of embodiment 92, wherein the acetyl-CoA thiolase has an amino acid sequence that is at least 95% identical to the amino acid sequence of SEQ ID NO: 68.
94. The host cell of embodiment 93, wherein the acetyl-CoA thiolase has the amino acid sequence of SEQ ID NO: 68.
95. The host cell of any one of embodiments 90-94, wherein the HMG-CoA synthase has an amino acid sequence that is at least 90% identical to the amino acid sequence of SEQ ID NO: 69.
96. The host cell of embodiment 95, wherein the HMG-CoA synthase has an amino acid sequence that is at least 95% identical to the amino acid sequence of SEQ ID NO: 69.
97. The host cell of embodiment 96, wherein the HMG-CoA synthase has the amino acid sequence of SEQ ID NO: 69.
98. The host cell of any one of embodiments 90-97, wherein the HMG-CoA reductase has an amino acid sequence that is at least 90% identical to the amino acid sequence of SEQ ID NO: 70.
99. The host cell of embodiment 98, wherein the HMG-CoA reductase has an amino acid sequence that is at least 95% identical to the amino acid sequence of SEQ ID NO: 70.
100. The host cell of embodiment 99, wherein the HMG-CoA reductase has the amino acid sequence of SEQ ID NO: 70.
101. The host cell of any one of embodiments 90-100, wherein the mevalonate kinase has an amino acid sequence that is at least 90% identical to the amino acid sequence of SEQ ID NO: 71.
102. The host cell of embodiment 101, wherein the mevalonate kinase has an amino acid sequence that is at least 95% identical to the amino acid sequence of SEQ ID NO: 71.
103. The host cell of embodiment 102, wherein the mevalonate kinase has the amino acid sequence of SEQ ID NO: 71.
104. The host cell of any one of embodiments 90-103, wherein the phosphomevalonate kinase has an amino acid sequence that is at least 90% identical to the amino acid sequence of SEQ ID NO: 72.
105. The host cell of embodiment 104, wherein the phosphomevalonate kinase has an amino acid sequence that is at least 95% identical to the amino acid sequence of SEQ ID NO: 72.
106. The host cell of embodiment 105, wherein the phosphomevalonate kinase has the amino acid sequence of SEQ ID NO: 72.
107. The host cell of any one of embodiments 90-106, wherein the mevalonate pyrophosphate decarboxylase has an amino acid sequence that is at least 90% identical to the amino acid sequence of SEQ ID NO: 73.
108. The host cell of embodiment 107, wherein the mevalonate pyrophosphate decarboxylase has an amino acid sequence that is at least 95% identical to the amino acid sequence of SEQ ID NO: 73.
109. The host cell of embodiment 108, wherein the mevalonate pyrophosphate decarboxylase has the amino acid sequence of SEQ ID NO: 73.
110. The host cell of any one of embodiments 90-109, wherein the IPP:DMAPP isomerase has an amino acid sequence that is at least 90% identical to the amino acid sequence of SEQ ID NO: 74.
111. The host cell of embodiment 110, wherein the IPP:DMAPP isomerase has an amino acid sequence that is at least 95% identical to the amino acid sequence of SEQ ID NO: 74.
112. The host cell of embodiment 111, wherein the IPP:DMAPP isomerase has the amino acid sequence of SEQ ID NO: 74.
113. The host cell of any one of embodiments 1-112, wherein the host cell further comprises a heterologous nucleic acid that encodes a geranyl pyrophosphate (GPP) synthase.
114. The host ell of embodiment 113, wherein the GPP synthase has an amino acid sequence that is at least 90% identical to the amino acid sequence of SEQ ID NO: 75.
115. The host ell of embodiment 114, wherein the GPP synthase has an amino acid sequence that is at least 95% identical to the amino acid sequence of SEQ ID NO: 75.
116. The host ell of embodiment 115, wherein the GPP synthase has the amino acid sequence of SEQ ID NO: 75.

117. The host cell of any one of embodiments 1-116, wherein the host cell further comprises one or more heterologous nucleic acids that each, independently, encode an acetyl-CoA synthase, an aldehyde dehydrogenase, and/or a pyruvate decarboxylase.

118. The host cell of embodiment 117, wherein the host cell comprises one or more heterologous nucleic acids that, together, encode an acetyl-CoA synthase, an aldehyde dehydrogenase, and a pyruvate decarboxylase.

119. The host cell of embodiment 117 or 118, wherein the acetyl-CoA synthase has an amino acid sequence that is at least 90% identical to the amino acid sequence of SEQ ID NO: 66.

120. The host cell of embodiment 119, wherein the acetyl-CoA synthase has an amino acid sequence that is at least 95% identical to the amino acid sequence of SEQ ID NO: 66.

121. The host cell of embodiment 120, wherein the acetyl-CoA synthase has the amino acid sequence of SEQ ID NO: 66.

122. The host cell of any one of embodiments 117-121, wherein the aldehyde dehydrogenase has an amino acid sequence that is at least 90% identical to the amino acid sequence of SEQ ID NO: 67.

123. The host cell of embodiment 122, wherein the aldehyde dehydrogenase has an amino acid sequence that is at least 95% identical to the amino acid sequence of SEQ ID NO: 67.

124. The host cell of embodiment 123, wherein the aldehyde dehydrogenase has the amino acid sequence of SEQ ID NO: 67.

125. The host cell of any one of embodiments 117-124, wherein the pyruvate decarboxylase has an amino acid sequence that is at least 90% identical to the amino acid sequence of SEQ ID NO: 65.

126. The host cell of embodiment 125, wherein the pyruvate decarboxylase has an amino acid sequence that is at least 95% identical to the amino acid sequence of SEQ ID NO: 65.

127. The host cell of embodiment 126, wherein the pyruvate decarboxylase has the amino acid sequence of SEQ ID NO: 65.

128. The host cell of any one of embodiments 1-127, wherein the host cell comprises heterologous nucleic acids that independently encode
 (a) an AAE having the amino acid sequence of any one of SEQ ID NOS: 1-5 and 7-24,
 (b) a TKS having the amino acid sequence of any one of SEQ ID NOS: 25 and 27-43,
 (c) a CBGaS having the amino acid sequences of any one of SEQ ID NOS: 55-58, 63, and 64, and
 (d) an OAC having the amino acid sequence of any one of SEQ ID NO: 45-52.

129. The host cell of any one of embodiments 1-128, wherein expression of one or more of the heterologous nucleic acids is regulated by an exogenous agent.

130. The host cell of embodiment 129, wherein the exogenous agent decreases production of the cannabinoid.

131. The host cell of embodiment 129, wherein the exogenous agent increases production of the cannabinoid.

132. The host cell of embodiment 131, wherein the exogenous agent is galactose and expression of one or more of the heterologous nucleic acids is under the control of a GAL promoter.

133. The host cell of embodiment 129, wherein expression of one or more of the heterologous nucleic acids is under the control of a galactose-responsive promoter, a maltose-responsive promoter, or a combination of both.

134. The host cell of any one of embodiments 1-133, wherein the cannabinoid is cannabigerolic acid (CBGA), cannabigerol (CBG), sesquicannabigerolic acid (SCBGA), cannabigerorcinic acid (CBGOA), sesquicannabigerorcinic acid (SCBGOA), cannabigerovarinic acid (CBGVA), sesquicannabigerovarinic acid (SCBGVA), 3-geranyl-2,4-dihydroxy-6-phenylethylbenzoic acid (CBGXA), or 3-farnesyl-2,4-dihydroxy-6-phenylethylbenzoic acid (SCBGXA).

135. The host cell of any one of embodiments 1-134, wherein the host cell is a yeast cell or yeast strain.

136. The host cell of embodiment 135, wherein the yeast cell is *S. cerevisiae*.

137. A mixture comprising the host cell of any one of embodiments 1-136 and a culture medium.

138. The mixture of embodiment 137, wherein the culture medium comprises an exogenous agent that decreases production of the cannabinoid.

139. The mixture of embodiment 138, wherein the exogenous agent is maltose.

140. The mixture of embodiment 137, wherein the culture medium comprises (i) an exogenous agent that increases production of the cannabinoid, and (ii) a precursor required to make the cannabinoid.

141. The mixture of embodiment 140, wherein the exogenous agent is galactose.

142. The mixture of embodiment 140 or 141, wherein the precursor required to make the cannabinoid is hexanoate.

143. A method for decreasing the expression of a cannabinoid, the method comprising culturing the host cell of any one of embodiments 1-136 in a medium comprising an exogenous agent, wherein the exogenous agent decreases the expression of the cannabinoid.

144. The method of embodiment 143, wherein the exogenous agent is maltose.

145. The method of embodiment 143 or 144, wherein culturing the host cell in the medium comprising the exogenous agent results in less than 0.001 mg/L of cannabinoid.

146. A method for increasing the expression of cannabinoid, the method comprising culturing the host cell of any one of embodiments 1-136 in a medium comprising an exogenous agent, wherein the exogenous agent increases expression of the cannabinoid.

147. The method of embodiment 146, wherein the exogenous agent is galactose.

148. The method of embodiment 146 or 147, further comprising culturing the host cell with a precursor required to make the cannabinoid.

149. The method of embodiment 148, wherein the precursor required to make the cannabinoid is hexanoate.

150. A method of genetically modifying a host cell to be capable of producing a cannabinoid, the method comprising introducing into the host cell one or more heterologous nucleic acids that each, independently, encode
 (a) an AAE having an amino acid sequence that is at least 90% identical to the amino acid sequence of any one of SEQ ID NOS: 1-5 and 7-24, and/or
 (b) a TKS having an amino acid sequence that is at least 90% identical to the amino acid sequence of any one of SEQ ID NOS: 25 and 27-43, and/or (c) a CBGaS having an amino acid sequence that is at least 90% identical to the amino acid sequence of any one of SEQ ID NOS: 55-58, 63, and 64, and/or (d) an OAC having an amino acid sequence that is at least 90% identical to the amino acid sequence of any one of SEQ ID NO: 45-52.

151. The method of embodiment 150, wherein the method comprises introducing into the host cell a heterologous nucleic acid that encodes an AAE having an amino acid sequence that is at least 90% identical to the amino acid sequence of any one of SEQ ID NOS: 1-5 and 7-24.

152. The method of embodiment 151, wherein the AAE has an amino acid sequence that is at least 95% identical to the amino acid sequence of any one of SEQ ID NOS: 1-5 and 7-24.

153. The method of embodiment 152, wherein the AAE has the amino acid sequence of any one of SEQ ID NOS: 1-5 and 7-24.

154. The method of any one of embodiments 150-153, wherein the method comprises introducing into the host cell a heterologous nucleic acid that encodes a TKS having an amino acid sequence that is at least 90% identical to the amino acid sequence of any one of SEQ ID NOS: 25 and 27-43.

155. The method of embodiment 154, wherein the TKS has an amino acid sequence that is at least 95% identical to the amino acid sequence of any one of SEQ ID NOS: 25 and 27-43.

156. The method of embodiment 155, wherein the TKS has the amino acid sequence of any one of SEQ ID NOS: 25 and 27-43.

157. The method of any one of embodiments 150-156, wherein the method comprises introducing into the host cell a heterologous nucleic acid that encodes a CBGaS having an amino acid sequence that is at least 90% identical to the amino acid sequence of any one of SEQ ID NOS: 55-58, 63, and 64.

158. The method of embodiment 157, wherein the CBGaS has an amino acid sequence that is at least 95% identical to the amino acid sequence of any one of SEQ ID NOS: 55-58, 63, and 64.

159. The method of embodiment 158, wherein the CBGaS has the amino acid sequence of any one of SEQ ID NOS: 55-58, 63, and 64.

160. The method of any one of embodiments 150-159, wherein the method comprises introducing into the host cell a heterologous nucleic acid that encodes a OAC having an amino acid sequence that is at least 90% identical to the amino acid sequence of any one of SEQ ID NOS: 45-52.

161. The method of embodiment 160, wherein the OAC has an amino acid sequence that is at least 95% identical to the amino acid sequence of any one of SEQ ID NOS: 45-52.

162. The method of embodiment 161, wherein OAC has the amino acid sequence of any one of SEQ ID NOS: 45-52.

163. The method of any one of embodiments 150-162, wherein the host cell comprises one or more heterologous nucleic acids that each, independently, encode an enzyme of the mevalonate biosynthetic pathway, wherein the enzyme is selected from an acetyl-CoA thiolase, an HMG-CoA synthase, an HMG-CoA reductase, a mevalonate kinase, a phosphomevalonate kinase, a mevalonate pyrophosphate decarboxylase, and an IPP:DMAPP isomerase.

164. The method of embodiment 163, wherein the host cell comprises one or more heterologous nucleic acids that, together, encode an acetyl-CoA thiolase, an HMG-CoA synthase, an HMG-CoA reductase, a mevalonate kinase, a phosphomevalonate kinase, a mevalonate pyrophosphate decarboxylase, and an IPP:DMAPP isomerase.

165. The method of embodiment 163 or 164, wherein the acetyl-CoA thiolase has an amino acid sequence that is at least 90% identical to the amino acid sequence of SEQ ID NO: 68, optionally wherein the acetyl-CoA thiolase has an amino acid sequence that is at least 95% identical to the amino acid sequence of SEQ ID NO: 68, optionally wherein the acetyl-CoA thiolase has the amino acid sequence of SEQ ID NO: 68.

166. The method of any one of embodiments 163-165, wherein the HMG-CoA synthase has an amino acid sequence that is at least 90% identical to the amino acid sequence of SEQ ID NO: 69 optionally wherein the HMG-CoA synthase has an amino acid sequence that is at least 95% identical to the amino acid sequence of SEQ ID NO: 69, optionally wherein the HMG-CoA synthase has the amino acid sequence of SEQ ID NO: 69.

167. The method of any one of embodiments 163-166, wherein the HMG-CoA reductase has an amino acid sequence that is at least 90% identical to the amino acid sequence of SEQ ID NO: 70, optionally wherein the HMG-CoA reductase has an amino acid sequence that is at least 95% identical to the amino acid sequence of SEQ ID NO: 70, optionally wherein the HMG-CoA reductase has the amino acid sequence of SEQ ID NO: 70.

168. The method of any one of embodiments 163-167, wherein the mevalonate kinase has an amino acid sequence that is at least 90% identical to the amino acid sequence of SEQ ID NO: 71, optionally wherein the mevalonate kinase has an amino acid sequence that is at least 95% identical to the amino acid sequence of SEQ ID NO: 71, optionally wherein the mevalonate kinase has the amino acid sequence of SEQ ID NO: 71.

169. The method of any one of embodiments 163-168, wherein the phosphomevalonate kinase has an amino acid sequence that is at least 90% identical to the amino acid sequence of SEQ ID NO: 72, optionally wherein the phosphomevalonate kinase has an amino acid sequence that is at least 95% identical to the amino acid sequence of SEQ ID NO: 72, optionally wherein the phosphomevalonate kinase has the amino acid sequence of SEQ ID NO: 72.

170. The method of any one of embodiments 163-169, wherein the mevalonate pyrophosphate decarboxylase has an amino acid sequence that is at least 90% identical to the amino acid sequence of SEQ ID NO: 73, optionally wherein the mevalonate pyrophosphate decarboxylase has an amino acid sequence that is at least 95% identical to the amino acid sequence of SEQ ID NO: 73, optionally wherein the mevalonate pyrophosphate decarboxylase has the amino acid sequence of SEQ ID NO: 73.

171. The method of any one of embodiments 163-170, wherein the IPP:DMAPP isomerase has an amino acid sequence that is at least 90% identical to the amino acid sequence of SEQ ID NO: 74, optionally wherein the IPP:DMAPP isomerase has an amino acid sequence that is at least 95% identical to the amino acid sequence of SEQ ID NO: 74, optionally wherein the IPP:D-MAPP isomerase has the amino acid sequence of SEQ ID NO: 74.

172. The method of any one of embodiments 150-171, wherein the host cell comprises a heterologous nucleic acid that encodes a GPP synthase.

173. The method of embodiment 172, wherein the GPP synthase has an amino acid sequence that is at least 90% identical to the amino acid sequence of SEQ ID NO: 75, optionally wherein the GPP synthase has an amino acid sequence that is at least 95% identical to the amino acid sequence of SEQ ID NO: 75, optionally wherein the GPP synthase has the amino acid sequence of SEQ ID NO: 75.

174. The method of any one of embodiments 150-173, wherein the host cell comprises one or more heterologous nucleic acids that each, independently, encode an acetyl-CoA synthase, an aldehyde dehydrogenase, and/or a pyruvate decarboxylase.

175. The method of embodiment 174, wherein the host cell comprises one or more heterologous nucleic acids that, together, encode an acetyl-CoA synthase, an aldehyde dehydrogenase, and a pyruvate decarboxylase.

176. The method of embodiment 174 or 175, wherein the acetyl-CoA synthase has an amino acid sequence that is at least 90% identical to the amino acid sequence of SEQ ID NO: 66, optionally wherein the acetyl-CoA synthase has an amino acid sequence that is at least 95% identical to the amino acid sequence of SEQ ID NO: 66, optionally wherein the acetyl-CoA synthase has the amino acid sequence of SEQ ID NO: 66.

177. The method of any one of embodiments 174-176, wherein the aldehyde dehydrogenase has an amino acid sequence that is at least 90% identical to the amino acid sequence of SEQ ID NO: 67, optionally wherein the aldehyde dehydrogenase has an amino acid sequence that is at least 95% identical to the amino acid sequence of SEQ ID NO: 67, optionally wherein the aldehyde dehydrogenase has the amino acid sequence of SEQ ID NO: 67.

178. The method of any one of embodiments 174-177, wherein the pyruvate decarboxylase has an amino acid sequence that is at least 90% identical to the amino acid sequence of SEQ ID NO: 65, optionally wherein the pyruvate decarboxylase has an amino acid sequence that is at least 95% identical to the amino acid sequence of SEQ ID NO: 65, optionally wherein the pyruvate decarboxylase has the amino acid sequence of SEQ ID NO: 65.

179. The method of any one of embodiments 150-178, wherein one or more of the heterologous nucleic acids are regulated by an exogenous agent.

180. The method of any one of embodiments 150-179, wherein expression of one or more of the heterologous nucleic acids is regulated by an exogenous agent.

181. The method of embodiment 180, wherein the exogenous agent decreases production of the cannabinoid.

182. The method of embodiment 180, wherein the exogenous agent increases production of the cannabinoid.

183. The method of embodiment 182, wherein the exogenous agent is galactose and expression of one or more of the heterologous nucleic acids is under the control of a GAL promoter.

184. The method of embodiment 180, wherein expression of one or more of the heterologous nucleic acids is under the control of a galactose-responsive promoter, a maltose-responsive promoter, or a combination of both.

185. The method of any one of embodiments 150-184, wherein the cannabinoid is CBGA, CBG, SCBGA, CBGOA, SCBGOA, CBGVA, SCBGVA, CBGXA, or SCBGXA.

186. The method of any one of embodiments 150-185, wherein the host cell is a yeast cell or yeast strain.

187. The method of embodiment 186, wherein the yeast cell is S. cerevisiae.

188. A method of producing a cannabinoid, the method comprising culturing a population of genetically modified host cells of any one of embodiments 1-136 in a culture medium under conditions suitable for the host cells to produce the cannabinoid.

189. The method of embodiment 188, wherein the culture medium comprises less than 3 mM hexanoic acid.

190. A fermentation composition comprising (i) a population of genetically modified yeast cells comprising the host cell of any one of embodiments 1-136 and (ii) a culture medium comprising one or more cannabinoids produced from the yeast cells.

191. A method of recovering one or more cannabinoids from the fermentation composition of embodiment 190, the method comprising:
(i) separating at least a portion of the population of genetically modified yeast cells from the culture medium; and
(ii) contacting the separated host cells with a wash liquid; and
(iii) removing the wash liquid from the separated host cells.

192. A method of producing a cannabinoid, the method comprising culturing the mixture of any one of embodiments 137-142 under conditions suitable for the host cells to produce the cannabinoid.

193. A fermentation composition comprising a mixture of any one of embodiments 137-142.

194. A non-naturally occurring CBGaS enzyme capable of producing CBGA and at least one additional cannabinoid selected from SCBGA, CBGOA, SCBGOA, CBGVA, SCBGVA, CBGXA, and SCBGXA.

195. A non-naturally occurring CBGaS enzyme capable of accepting, as a substrate, olivetolic acid and at least one additional precursor selected from orsellinic acid, divarinolic acid, and 2,4-dihydroxy-6-phenylethylbenzoic acid.

196. A non-naturally occurring CBGaS enzyme capable of catalyzing:
(a) conversion of olivetolic acid to cannabigerolic acid (CBGA) in the presence of GPP and/or to sesquicannabigerolic acid (SCBGA) in the presence of FPP; and/or
(b) conversion of orsellinic acid to cannabigerorcinic acid (CBGOA) in the presence of GPP and/or to sesquicannabigerorcinic acid (SCBGOA) in the presence of FPP; and/or
(c) conversion of divarinolic acid to cannabigerovarinic acid (CBGVA) in the presence of GPP and/or to sesquicannabigerovarinic acid (SCBGVA) in the presence of FPP; and/or
(d) conversion of 2,4-dihydroxy-6-phenylethylbenzoic acid to 3-geranyl-2,4-dihydroxy-6-phenylethylbenzoic acid (CBGXA) in the presence of GPP and/or to 3-farnesyl-2,4-dihydroxy-6-phenylethylbenzoic acid (SCBGXA) in the presence of FPP.

197. A non-naturally occurring CBGaS enzyme having an amino acid sequence that is at least 90% identical (e.g., at least 91%, at least 92%, at least 93%, at least 94%, at least 95%, at least 96%, at least 97%, at least 98%, or at least 99% identical) to the amino acid sequence of SEQ ID NO: 55, SEQ ID NO:56, SEQ ID NO:57, or SEQ ID NO:58.

198. The CBGaS enzyme of any one of embodiments 194-197, wherein the CBGaS comprises one or more amino acid substitutions relative to the amino acid sequence of SEQ ID NO: 55 selected from M88I, V133I, S141Y, Y319L, and L324F.

199. The CBGaS enzyme of any one of embodiments 194-198, wherein the CBGaS has the amino acid substitution M88I relative to the amino acid sequence of SEQ ID NO: 55.

200. The CBGaS enzyme of any one of embodiments 194-199, wherein the CBGaS has the amino acid substitution V133I relative to the amino acid sequence of SEQ ID NO: 55.

201. The CBGaS enzyme of any one of embodiments 194-200, wherein the CBGaS has the amino acid substitution S141Y relative to the amino acid sequence of SEQ ID NO: 55.

202. The CBGaS enzyme of any one of embodiments 194-201, wherein the CBGaS has the amino acid substitution Y319L relative to the amino acid sequence of SEQ ID NO: 55.

203. The CBGaS enzyme of any one of embodiments 194-202, wherein the CBGaS has the amino acid substitution L324F relative to the amino acid sequence of SEQ ID NO: 55.

204. The CBGaS enzyme of any one of embodiments 194-197, wherein the CBGaS comprises one or more amino acid substitutions relative to the amino acid sequence of SEQ ID NO: 56 selected from P7K, P7T, T11T, H49C, M83V, A89A, N93V, A131G, V149F, A176V, R196F, T202A, V242L, T248A, C249F, A257Y, A257F, V262L, N264Y, N264F, L276T, L276P, A279C, A279S, A282P, N309F, M311L, S312L, Y319L, I324E, I324K, L325P, and L325A.

205. The CBGaS enzyme of any one of embodiments 194-197 and 204, wherein the CBGaS has the amino acid substitution P7K or P7T relative to the amino acid sequence of SEQ ID NO: 56.

206. The CBGaS enzyme of any one of embodiments 194-197, 204, and 205, wherein the CBGaS has the amino acid substitution T11T relative to the amino acid sequence of SEQ ID NO: 56.

207. The CBGaS enzyme of any one of embodiments 194-197 and 204-206, wherein the CBGaS has the amino acid substitution H49C relative to the amino acid sequence of SEQ ID NO: 56.

208. The CBGaS enzyme of any one of embodiments 194-197 and 204-207, wherein the CBGaS has the amino acid substitution M83V relative to the amino acid sequence of SEQ ID NO: 56.

209. The CBGaS enzyme of any one of embodiments 194-197 and 204-208, wherein the CBGaS has the amino acid substitution A89A relative to the amino acid sequence of SEQ ID NO: 56.

210. The CBGaS enzyme of any one of embodiments 194-197 and 204-209, wherein the CBGaS has the amino acid substitution N93V relative to the amino acid sequence of SEQ ID NO: 56.

211. The CBGaS enzyme of any one of embodiments 194-197 and 204-210, wherein the CBGaS has the amino acid substitution A131G relative to the amino acid sequence of SEQ ID NO: 56.

212. The CBGaS enzyme of any one of embodiments 194-197 and 204-211, wherein the CBGaS has the amino acid substitution V149F relative to the amino acid sequence of SEQ ID NO: 56.

213. The CBGaS enzyme of any one of embodiments 194-197 and 204-212, wherein the CBGaS has the amino acid substitution A176V relative to the amino acid sequence of SEQ ID NO: 56.

214. The CBGaS enzyme of any one of embodiments 194-197 and 204-213, wherein the CBGaS has the amino acid substitution R196F relative to the amino acid sequence of SEQ ID NO: 56.

215. The CBGaS enzyme of any one of embodiments 194-197 and 204-214, wherein the CBGaS has the amino acid substitution T202A relative to the amino acid sequence of SEQ ID NO: 56.

216. The CBGaS enzyme of any one of embodiments 194-197 and 204-215, wherein the CBGaS has the amino acid substitution V242L relative to the amino acid sequence of SEQ ID NO: 56.

217. The CBGaS enzyme of any one of embodiments 194-197 and 204-216, wherein the CBGaS has the amino acid substitution T248A relative to the amino acid sequence of SEQ ID NO: 56.

218. The CBGaS enzyme of any one of embodiments 194-197 and 204-217, wherein the CBGaS has the amino acid substitution C249F relative to the amino acid sequence of SEQ ID NO: 56.

219. The CBGaS enzyme of any one of embodiments 194-197 and 204-218, wherein the CBGaS has the amino acid substitution A257Y or A257F relative to the amino acid sequence of SEQ ID NO: 56.

220. The CBGaS enzyme of any one of embodiments 194-197 and 204-219, wherein the CBGaS has the amino acid substitution V262L relative to the amino acid sequence of SEQ ID NO: 56.

221. The CBGaS enzyme of any one of embodiments 194-197 and 204-220, wherein the CBGaS has the amino acid substitution N264Y or N264F relative to the amino acid sequence of SEQ ID NO: 56.

222. The CBGaS enzyme of any one of embodiments 194-197 and 204-221, wherein the CBGaS has the amino acid substitution L276T or L276P relative to the amino acid sequence of SEQ ID NO: 56.

223. The CBGaS enzyme of any one of embodiments 194-197 and 204-222, wherein the CBGaS has the amino acid substitution A279C or A279S relative to the amino acid sequence of SEQ ID NO: 56.

224. The CBGaS enzyme of any one of embodiments 194-197 and 204-223, wherein the CBGaS has the amino acid substitution A282P relative to the amino acid sequence of SEQ ID NO: 56.

225. The CBGaS enzyme of any one of embodiments 194-197 and 204-224, wherein the CBGaS has the amino acid substitution N309F relative to the amino acid sequence of SEQ ID NO: 56.

226. The CBGaS enzyme of any one of embodiments 194-197 and 204-225, wherein the CBGaS has the amino acid substitution M311L relative to the amino acid sequence of SEQ ID NO: 56.

227. The CBGaS enzyme of any one of embodiments 194-197 and 204-226, wherein the CBGaS has the amino acid substitution S312L relative to the amino acid sequence of SEQ ID NO: 56.

228. The CBGaS enzyme of any one of embodiments 194-197 and 204-227, wherein the CBGaS has the amino acid substitution Y319L relative to the amino acid sequence of SEQ ID NO: 56.

229. The CBGaS enzyme of any one of embodiments 194-197 and 204-228, wherein the CBGaS has the amino acid substitution I324E or I324K relative to the amino acid sequence of SEQ ID NO: 56.

230. The CBGaS enzyme of any one of embodiments 194-197 and 204-229, wherein the CBGaS has the amino acid substitution L325P or L325A relative to the amino acid sequence of SEQ ID NO: 56.

231. A non-naturally occurring CBGaS enzyme having an amino acid sequence that is at least 90% identical (e.g., at least 91%, at least 92%, at least 93%, at least 94%, at least 95%, at least 96%, at least 97%, at least 98%, at least 99%, or 100% identical) to the amino acid sequence of SEQ ID NO: 63.

232. A non-naturally occurring CBGaS enzyme having an amino acid sequence that is at least 90% identical (e.g., at least 91%, at least 92%, at least 93%, at least 94%, at least 95%, at least 96%, at least 97%, at least 98%, or at least 99% identical) to the amino acid sequence of SEQ ID NO: 63, wherein the CBGaS has one or more amino acid substitutions relative to the amino acid sequence of SEQ ID NO: 63 selected from I109T, F119L, S245L, S247Y, M270T, C280L, S295D, V314L, A324F, and S361I.

233. The CBGaS enzyme of any one of embodiments 194-196, 231, and 232, wherein the CBGaS has the amino acid substitution I109T relative to the amino acid sequence of SEQ ID NO: 63.

234. The CBGaS enzyme of any one of embodiments 194-196 and 231-233, wherein the CBGaS has the amino acid substitution F119L relative to the amino acid sequence of SEQ ID NO: 63.

235. The CBGaS enzyme of any one of embodiments 194-196 and 231-234, wherein the CBGaS has the amino acid substitution S245L relative to the amino acid sequence of SEQ ID NO: 63.

236. The CBGaS enzyme of any one of embodiments 194-196 and 231-235, wherein the CBGaS has the amino acid substitution S247Y relative to the amino acid sequence of SEQ ID NO: 63.

237. The CBGaS enzyme of any one of embodiments 194-196 and 231-236, wherein the CBGaS has the amino acid substitution M270T relative to the amino acid sequence of SEQ ID NO: 63.

238. The CBGaS enzyme of any one of embodiments 194-196 and 231-237, wherein the CBGaS has the amino acid substitution C280L relative to the amino acid sequence of SEQ ID NO: 63.

239. The CBGaS enzyme of any one of embodiments 194-196 and 231-238, wherein the CBGaS has the amino acid substitution S295D relative to the amino acid sequence of SEQ ID NO: 63.

240. The CBGaS enzyme of any one of embodiments 194-196 and 231-239, wherein the CBGaS has the amino acid substitution V314L relative to the amino acid sequence of SEQ ID NO: 63.

241. The CBGaS enzyme of any one of embodiments 194-196 and 231-240, wherein the CBGaS has the amino acid substitution A324F relative to the amino acid sequence of SEQ ID NO: 63.

242. The CBGaS enzyme of any one of embodiments 194-196 and 231-241, wherein the CBGaS has the amino acid substitution S361I relative to the amino acid sequence of SEQ ID NO: 63.

243. A CBGaS enzyme having an amino acid sequence that is at least 90% identical (e.g., at least 91%, at least 92%, at least 93%, at least 94%, at least 95%, at least 96%, at least 97%, at least 98%, at least 99%, or 100% identical) to the amino acid sequence of SEQ ID NO: 64.

244. A non-naturally occurring CBGaS enzyme having an amino acid sequence that is at least 90% identical (e.g., at least 91%, at least 92%, at least 93%, at least 94%, at least 95%, at least 96%, at least 97%, at least 98%, or at least 99% identical) to the amino acid sequence of SEQ ID NO: 64, wherein the CBGaS has one or more amino acid substitutions relative to the amino acid sequence of SEQ ID NO: 64 selected from M275S, M275T, T276C, T276F, K291H, V292Y, V292H, V292F, G310C, F314N, A331C, A331T, and A347I.

245. The CBGaS enzyme of any one of embodiments 194-196, 243, and 244, wherein the CBGaS has the amino acid substitution M275S or M275T relative to the amino acid sequence of SEQ ID NO: 64.

246. The CBGaS enzyme of any one of embodiments 194-196 and 243-245, wherein the CBGaS has the amino acid substitution T276C or T276F relative to the amino acid sequence of SEQ ID NO: 64.

247. The CBGaS enzyme of any one of embodiments 194-196 and 243-246, wherein the CBGaS has the amino acid substitution K291H relative to the amino acid sequence of SEQ ID NO: 64.

248. The CBGaS enzyme of any one of embodiments 194-196 and 243-247, wherein the CBGaS has the amino acid substitution V292Y, V292H, or V292F relative to the amino acid sequence of SEQ ID NO: 64.

249. The CBGaS enzyme of any one of embodiments 194-196 and 243-248, wherein the CBGaS has the amino acid substitution G310C relative to the amino acid sequence of SEQ ID NO: 64.

250. The CBGaS enzyme of any one of embodiments 194-196 and 243-249, wherein the CBGaS has the amino acid substitution F314N relative to the amino acid sequence of SEQ ID NO: 64.

251. The CBGaS enzyme of any one of embodiments 194-196 and 243-250, wherein the CBGaS has the amino acid substitution A331C or A331T relative to the amino acid sequence of SEQ ID NO: 64.

252. The CBGaS enzyme of any one of embodiments 194-196 and 243-251, wherein the CBGaS has the amino acid substitution A347I relative to the amino acid sequence of SEQ ID NO: 64.

253. An OAC enzyme having an amino acid sequence that is at least 90% identical (e.g., at least 91%, at least 92%, at least 93%, at least 94%, at least 95%, at least 96%, at least 97%, at least 98%, at least 99%, or 100% identical) to the amino acid sequence of any one of SEQ ID NOs: 45-52.

254. A non-naturally occurring OAC enzyme having an amino acid sequence that is at least 90% identical (e.g., at least 91%, at least 92%, at least 93%, at least 94%, at least 95%, at least 96%, at least 97%, at least 98%, or at least 99% identical) to the amino acid sequence of SEQ ID NO: 44, wherein the OAC has one or more amino acid substitutions relative to the amino acid sequence of SEQ ID NO: 44 selected from A2S, L9I, K12S, E14S, F23L, V28L, T47R, Q48R, K49R, S87H, F88Y, and L92Y.

255. The OAC of embodiment 253 or 254, wherein the OAC has the amino acid substitution A2S relative to the amino acid sequence of SEQ ID NO: 44.

256. The OAC of any one of embodiments 253-255, wherein the OAC has the amino acid substitution L9I relative to the amino acid sequence of SEQ ID NO: 44.
257. The OAC of any one of embodiments 253-256, wherein the OAC has the amino acid substitution K12S relative to the amino acid sequence of SEQ ID NO: 44.
258. The OAC of any one of embodiments 253-257, wherein the OAC has the amino acid substitution E14S relative to the amino acid sequence of SEQ ID NO: 44.
259. The OAC of any one of embodiments 253-258, wherein the OAC has the amino acid substitution F23L relative to the amino acid sequence of SEQ ID NO: 44.
260. The OAC of any one of embodiments 253-259, wherein the OAC has the amino acid substitution V28L relative to the amino acid sequence of SEQ ID NO: 44.
261. The OAC of any one of embodiments 253-260, wherein the OAC has the amino acid substitution T47R relative to the amino acid sequence of SEQ ID NO: 44.
262. The OAC of any one of embodiments 253-261, wherein the OAC has the amino acid substitution Q48R relative to the amino acid sequence of SEQ ID NO: 44.
263. The OAC of any one of embodiments 253-262, wherein the OAC has the amino acid substitution K49R relative to the amino acid sequence of SEQ ID NO: 44.
264. The OAC of any one of embodiments 253-263, wherein the OAC has the amino acid substitution S87H relative to the amino acid sequence of SEQ ID NO: 44.
265. The OAC of any one of embodiments 253-264, wherein the OAC has the amino acid substitution F88Y relative to the amino acid sequence of SEQ ID NO: 44.
266. The OAC of any one of embodiments 253-265, wherein the OAC has the amino acid substitution L92Y relative to the amino acid sequence of SEQ ID NO: 44.
267. A nucleic acid encoding the enzyme of any one of embodiments 194-266.
268. A host cell comprising the nucleic acid of embodiment 267.
269. The host cell of embodiment 268, wherein the host cell is a yeast cell or yeast strain.
270. The host cell of embodiment 269, wherein the yeast cell is *S. cerevisiae*.

```
SEQUENCE APPENDIX
AAE from Pseudonocardia sp. N23
                                                              SEQ ID NO: 1
MTAAQAPDPAGVPLVERTVPRMLARSAALDPDRPFVVTRERTWSHTDAHRIVATLAAAFTDRGIGQGSR

VAVMMPTSPRHVWLLLALAHLRAVPVALNPDASGEVLRYFVADSECVLGVVDQERAAAFATAAGPDGPP

AIVLPPGADDLGELGSAGPGPLDPGAASFSDTFVVLYTSGSTGMPKATAVTHAQVITCGAVFTDRLGLGP

ADRLYTCLPLFHINATAYSLSGALVSGASLALGPHFSATTFWDDVADLGATEVNAMGSMVRILQSRPPRP

AERAHRVRTMFVAPLPPDAVELSERFGLDFATCYAQTEWLPSSMTRPGEGYGRPGATGPVLPWTEVRI

VGDDDRPLPAGQTGEIILRPRDPYTTFQGYLGKPQETVDAWRNLWFHTGDLGDIGPDGWLHYRGRRKD

VIRRRGENIPATVVEDLLAGHPDIAEVAAVSVPAHISEEEIFAFVVPGAGAALTTADVEAHAHAVLPRYMVP

SYLALVPDLPRTATNKIAKVELTERARAAVEGTGDPADAPTRTSAADRVVVPAAE

AAE from Pseudomonas putida
                                                              SEQ ID NO: 2
MMVPTLEHELAPNEANHVPLSPLSFLKRAAQVYPQRDAVIYGARRYSYRQLHERSRALASALERVGVQP

GERVAILAPNIPEMLEAHYGVPGAGAVLVCINIRLEGRSIAFILRHCAAKVLICDREFGAVANQALAMLDAP

PLLVGIDDDQAERADLAHDLDYEAFLAQGDPARPLSAPQNEWQSIAINYTSGTTGDPKGVVLHHRGAYLN

ACAGALIFQLGPRSVYLWTLPMFHCNGWSHTWAVTLSGGTHVCLRKVQPDAINAAIAEHAVTHLSAAPV

VMSMLIHAEHASAPPVPVSVITGGAAPPSAVIAAMEARGFNITHAYGMTESYGPSTLCLWQPGVDELPLE

ARAQFMSRQGVAHPLLEEATVLDTDTGRPVPADGLTLGELVVRGNTVMKGYLHNPEATRAALANGWLH

TGDLAVLHLDGYVEIKDRAKDIIISGGENISSLEIEEVLYQHPEVVEAAVVARPDSRWGETPHAFVTLRADA

LASGDDLVRWCRERLAHFKAPRHVSLVDLPKTATGKIQKFVLREWARQQEAQIADAEH

AAE from Streptomyces sp.ADI96-02
                                                              SEQ ID NO: 3
MLSTMQDVPLTVTRILQHGMTIHGKSQVTTWTGEPEPHRRTFAEIGARATRLAHALRDELGIDGDQRVAT

LMWNNAEHVEAYLAVPSMGAVLHTLNLRLPAEQLIWIVNHADDKVVIVNGSLLPLLVPLLPHLPTVEHVVV

SGPGDRSALAGVAPRVHEYEELIADRPTTYDWPELDERQAAAMCYTSGTTGDPKGVVYSHRSVYLHSM

QVNMTESMGLTDKDTTLVVVPQFHVNAWGLPHATFMAGVNMLMPDRFLQPAPLADMIERERPTHAAAV

PTIWQGLLAEVTAHPRDLTSMASVTIGGAACPPSLMEAYDKLGVRLCHAWGMTETSPLGTMANPPAGLS

AEEEWPYRVTQGRFPAGVEARLVGPAGDHLPWDGRSAGELEVRGAWIAGAYYGGADGEHLRPEDKFS

ADGWLKTGDVGVISADGFLTLTDRAKDVIKSGGEWISSVELENALMAHPDVAEAAVVAVPDEKWGERPL

ATVVLKEGAEVGYEALKVFLADSGIAKWQLPERWTVIPAVPKTSVGKFDKKVIRKQYADGELDITQL
```

AAE from *Erythrobacter citreus* LAMA 915

SEQ ID NO: 4

MSRAECRDRLTAPGERFEIETIDIRGVPTRVWKHAPTNMRQVAMAARTHGDRLFAIYEDERVTYEAWFR
AVARMAAELRERGVAKGDRVALAMRNLPEWPVAFFAATTIGAICVPLNAWWTGPELAFGLANSGAKLLV
CDAERWERIAPHRGELPDLEHALVSRSDAPLEGAEQLEDLLGTPKDYAALPSAALPQVDIDPEDEATIFYT
SGTTGQPKGALGTHRNLCTNIMSSAYNGAIAFLRRGEEPPAPVQKVGLTVIPLFHVTACSAGLMGYVVAG
HTMVFMHKWDPVKAFQLIEREKVNLTGGVPTIAWQLLEHPERANYDLSSLEAVAYGGAPAAPELVRKIHE
EFGALPANGWGMTETMATVTGHSSEDYLNRPDSCGPPVAVADLKIVGDDGVTELPVGEVGELWARGP
MVVKGYWNRPEATAETFVDGWVRTGDLARLDEEGWCYIVDRAKDMIIRGGENIYSSEVENVLYDHPAVT
DAALVAIAHPTLGEEPAAVVHLAPGMSATEDELREWVAARLAKFKVPVRIAFVQDTLPRNANGKILKKDLG
AFFA

AAE from *Saccharomyces cerevisiae*

SEQ ID NO: 5

MVAQYTVPVGKAANEHETAPRRNYQCREKPLVRPPNTKCSTVYEFVLECFQKNKNSNAMGWRDVKEIH
EESKSVMKKVDGKETSVEKKWMYYELSHYHYNSFDQLTDIMHEIGRGLVKIGLKPNDDDKLHLYAATSHK
WMKMFLGAQSQGIPVVTAYDTLGEKGLIHSLVQTGSKAIFTDNSLLPSLIKPVQAAQDVKYIIHFDSISSED
RRQSGKIYQSAHDAINRIKEVRPDIKTFSFDDILKLGKESCNEIDVHPPGKDDLCCIMYTSGSTGEPKGVVL
KHSNVVAGVGGASLNVLKFVGNTDRVICFLPLAHIFELVFELLSFYWGACIGYATVKTLTSSSVRNCQGDL
QEFKPTIMVGVAAVWETVRKGILNQIDNLPFLTKKIFWTAYNTKLNMQRLHIPGGGALGNLVFKKIRTATG
GQLRYLLNGGSPISRDAQEFITNLICPMLIGYGLTETCASTTILDPANFELGVAGDLTGCVTVKLVDVEELG
YFAKNNQGEVWITGANVTPEYYKNEEETSQALTSDGWFKTGDIGEWEANGHLKIIDRKKNLVKTMNGEYI
ALEKLESVYRSNEYVANICVYADQSKTKPVGIIVPNHAPLTKLAKKLGIMEQKDSSINIENYLEDAKLIKAVY
SDLLKTGKDQGLVGIELLAGIVFFDGEWTPQNGFVTSAQKLKRKDILNAVKDKVDAVYSSS

AAE from *Cannabis sativa*

SEQ ID NO: 6

MGKNYKSLDSVVASDFIALGITSEVAETLHGRLAEIVCNYGAATPQTWINIANHILSPDLPFSLHQMLFYGC
YKDFGPAPPAWIPDPEKVKSTNLGALLEKRGKEFLGVKYKDPISSFSHFQEFSVRNPEVYWRTVLMDEM
KISFSKDPECILRRDDINNPGGSEWLPGGYLNSAKNCLNVSNKKLNDTMIVWRDEGNDDLPLNKLTLDQ
LRKRVWLVGYALEEMGLEKGCAIAIDMPMHVDAVVIYLAIVLAGYVVVSIADSFSAPEISTRLRLSKAKAIFT
QDHIIRGKKRIPLYSRVVEAKSPMAIVIPCSGSNIGAELRDGDISWDYFLERAKEFKNCEFTAREQPVDAYT
NILFSSGTTGEPKAIPWTQATPLKAAADGWSHLDIRKGDVIVWPTNLGWMMGPWLVYASLLNGASIALYN
GSPLVSGFAKFVQDAKVTMLGVVPSIVRSWKSTNCVSGYDWSTIRCFSSSGEASNVDEYLWLMGRANY
KPVIEMCGGTEIGGAFSAGSFLQAQSLSSFSSQCMGCTLYILDKNGYPMPKNKPGIGELALGPVMFGASK
TLLNGNHHDVYFKGMPTLNGEVLRRHGDIFELTSNGYYHAHGRADDTMNIGGIKISSIEIERVCNEVDDRV
FETTAIGVPPLGGGPEQLVIFFVLKDSNDTTIDLNQLRLSFNLGLQKKLNPLFKVTRVVPLSSLPRTATNKIM
RRVLRQQFSHFE

AAE from *Citreicella* sp. SE45

SEQ ID NO: 7

MSLAADNVLLVEEGRPATAEHPSAGPVYRCKYAKDGLLDLPTDIDSPWQFFSEAVKKYPNEQMLGQRVT
TDSKVGPYTWITYKEAHDAAIRIGSAIRSRGVDPGHCCGIYGANCPEWIIAMEACMSQGITYVPLYDSLGV
NAVEFIINHAEVSLVFVQEKTVSSILSCQKGCSSNLKTIVSFGEVSSTQKEEAKNQCVSLFSWNEFSLMGN
LDEANLPRKRKTDICTIMYTSGTTGEPKGVILNNAAISVQVLSIDKMLEVTDRSCDTSDVFFSYLPLAHCYD
QVMEIYFLSRGSSVGYWRGDIRYLMDDVQALKPTVFCGVPRVYDKLYAGIMQKISASGLIRKKLFDFAYN
YKLGNMRKGFSQEEASPRLDRLMFDKIKEALGGRAHMLLSGAAPLPRHVEEFLRIIPASNLSQGYGLTES

-continued

CGGSFTTLAGVFSMVGTVGVPMPTVEARLVSVPEMGYDAFSADVPRGEICLRGNSMFSGYHKRQDLTD

QVLIDGWFHTGDIGEWQEDGSMKIIDRKKNIFKLSQGEYVAVENLENTYSRCPLIAQIWVYGNSFESFLVG

VVVPDRKAIEDWAKLNYQSPNDFESLCQNLKAQKYFLDELNSTAKQYQLKGFEMLKAIHLEPNPFDIERD

LITPTFKLKRPQLLQHYKGIVDQLYSEAKRSMA

AAE from *Bacillus subtilis* (strain 168)
SEQ ID NO: 8

MDNLVLCEANNVPLTPITFLKRASECYPNRTSIIYGQTRFTWPQTYDRCCRLAASLLSLNITRNDVVSILAP

NVPAMYEMHFSVPMTGAVLNPINTRLDAKTIAIILRHAEPKILFVDYEFAPLIQEVLRLIPTYQSQPHPRIILIN

EIDSTTKPFSKELDYEGLIRKGEPTPSSSASMFRVHNEHDPISLNYTSGTTADPKGVVISHQGAYLSALSSII

GWEMGIFPVYLWTLPMFHCNGWTHTWSVAARGGTNVCIRHVTAPEIYKNIELHGVTHMSCVPTVFRFLL

EGSRTDQSPKSSPVQVLTGGSSPPAVLIKKVEQLGFHVMHGYGLTEATGPVLFCEWQDEWNKLPEHQQ

IELQQRQGVRNLTLADVDVKNTKTLESVPRDGKTMGEIVIKGSSLMKGYLKNPKATSEAFKHGWLNTGDI

GVIHPDGYVEIKDRSKDIIISGGENISSIEVEKVLYMYQEVLEAAVVAMPHPLWGETPCAFVVLKKGEEGLV

TSEGDLIKYCRENMPHFMCPKKVVFFQELPKNSNGKILKSKLRDIAKALVVREDDAGSKKVHQRSIEHVSS

RL

AAE from *Bhargavaea cecembensis* DSE10
SEQ ID NO: 9

MYTDHGWIMKRADITPDGTALIDVHTGQRWTYRELAGRTAAYMEQFRSAGLRKGERVAVLSHNRIDLFA

VLFACAGRGLIYVPMNWRLSESELRYIVSDSGPSLLLHDHEHAGRAAGLGIPAALLDSVPATSVNLRTEQA

AGRLDDPWMMIYTGGTTGRPKGVVLTFESVNWNAINTIISWNLSARDCTLNYMPLFHTGGLNALSLPILM

AGGTVVIGRKFDPEEAIRALNDYRTTISLFVPTMHQAMLDTDLFWESDFPTVDVFLSGGAPCPQTVYDAY

RKKGVRFREGYGMTEAGPNNFIIDPDTAMRKRGAVGKSMQFNEVRILDAKGRPCRAGEVGELHLRGRH

LFSHYWNNEEATQEALKEGWFSTGDLASRDEDGDYFIVGRKKEMIISGGENIYPQEVEQCLIGHDGVREI

AVIGIADRKWGERVVAFIVAQPGNIPKTEELLKHCAQTLGSYKVPKDFFFVQELPITDIGKIDKKQLAIMAEE

LKKEEMQHPGQSG

AAE from *Saccharomyces cerevisiae*
SEQ ID NO: 10

MTEQYSVAVGEAANEHETAPRRNIRVKDQPLIRPINSSASTLYEFALECFTKGGKRDGMAWRDIIDIHETK

KTIVKRVDGKDKPIEKTWLYYELTPYITMTYEEMICVMHDIGRGLIKIGVKPNGENKFHIFASTSHKWMKTF

LGCMSQGIPVVTAYDTLGESGLIHSMVETDSVAIFTDNQLLSKLAVPLKTAKNVKFVIHNEPIDPSDKRQN

GKLYKAAKDAVDKIKEVRPDIKIYSFDEIIEIGKKAKDEVELHFPKPEDPACIMYTSGSTGTPKGVVLTHYNI

VAGIGGVGHNVIGWIGPTDRIIAFLPLAHIFELTFEFEAFYWNGILGYANVKTLTPTSTRNCQGDLMEFKPT

VMVGVAAVWETVRKGILAKINELPGWSQTLFWTVYALKERNIPCSGLLSGLIFKRIREATGGNLRFILNGG

SAISIDAQKFLSNLLCPMLIGYGLTEGVANACVLEPEHFDYGIAGDLVGTITAKLVDVEDLGYFAKNNQGEL

LFKGAPICSEYYKNPEETAAAFTDDGWFRTGDIAEWTPKGQVKIIDRKKNLVKTLNGEYIALEKLESIYRSN

PYVQNICVYADENKVKPVGIVVPNLGHLSKLAIELGIMVPGEDVESYIHEKKLQDAVCKDMLSTAKSQGLN

GIELLCGIVFFEEEWTPENGLVTSAQKLKRRDILAAVKPDVERVYKENT

AAE from *Deltaproteobacteria bacterium* ADurb.Bin022
SEQ ID NO: 11

MHKFTLDKPDNLVDWWGESVTRFADRPLFGTKNKEGVYKWATYKEIGNRIDNLRAGLTQLGIGKDDVVG

IIANNRPEWAVIGFATWGCLARYVPMYEAELVQVWKYIINDSGAKVLFVSNPAIYEKIKDFPKDIPTLKHIFII

ESDGDNSMASLEKKGAAKPVAPKSPKAEDVAELIYTSGTTGNPKGVLLMHMNFTSNSHAGLKMYPELYE

NEVVSLTILPWAHVFGQTAELFAIIRLGGRMGLIESTKTIINDIVQIKPTFIIAVPTVFNRIYDGLWNKMNKDG

GLARALFVMGVEAAKKKRILAEKGQSDLMTNFKVAVADKIVFKKIRERMGGRMLGSMTGSAAMNVEISKF

FFDIGIPIYDCYGLTETSPGITMNGSQAYRIGSVGRPIDKVKVVIDSSVVEEGATDGEIIAYGPNVMKGYHN

```
RPEDTKAALTPDGGFRTGDRGRLDKDGYLFITGRIKEQYKLENGKFCFPVSLEENICLASFVQQAVVYGL

NRPYNVCIVVPDFDVLLDYAKEKGLPTDIKTLVEREDIIHMISEAVTGQLKGKFGGYEIPKKFIILPEAFSLDN

GMLTQTMKLKRKVILDKLNDRIEALYKEDK
```

AAE from *Alcaligenes xylosoxydans* (*Achromobacter xylosoxidans*)

SEQ ID NO: 12

```
MYSRIHEPHACTLTDALREWAASRPAAPWLEDSQGIAFTVGQAFTSSQRFASFLHHQLGVQPEERVGVF

MSNSCAMVATTFGIGYLRATAVMLNTELRSSFLRHQLNDCQLATIVVDSALVEHVASLADELPHLRTLVVV

GDAPAAVPERWRQVAWMDSSACAPWEGPAPRPEDIFCIMYTSGTTGPSKGVLMPHCHCALLGLGAIRS

LEITEADKYYICLPLFHANGLFMQLGATVLAGIPAFLKQRFSASTWLADIRRSGATLTNHLGTTAMFVINQP

PTEQDRDHRLRASLSAPNPAQHEAVFRERFGVKDVLSGFGMTEVGIPIWGRIGHAAPNAAGWAHEDRF

EICIADPETDVPVLAGQVGEILVRPKVPFGFMAGYLNVPAKTVEAWRNLWFHTGDAGTRDEQGLITFVDRI

KDCIRRRGENISATEVEVVVGQLPGVHEVAAYAVPAQGAGGEDEVMLALVPSEGAALDMADIVRQASAQ

LPRFAKPRYLRQMDSLPKTATGKIQRAVLRQQGSAGAYDAEAAPAR
```

AAE from *Novosphingobium* sp. MD-1

SEQ ID NO: 13

```
MQFTQGLERAVQHHPDVTATICRARSQTFAELYERVTGLAGCLASRSLAKGARIAVLALNSDHYLEVYLA

TAWAGGVIVPVNFRWSPAEIAYSLNDAGCVALMVDQHHAALVPTLREQCPGLQHIFLMGGTEESDDLPG

LDALIAAAEPLQNAGAGGDDLLGIFYTGGTTGRPKGVMLSHANLCSSGLSMLAEGVFNEGAVGLHVAPM

FHLADMLLTTCLVLRGCTHVMLPAFSPDAVLDHVARFGVTDTLVVPAMLQAIVDHPAIGNFDTSSLCNILY

GASPASETLLRRTMAAFPDVRLTQGYGMTESAAFICALPWHQHVVDNDGPNRLRAAGRSTFDVHLQIVD

PDDRELPRGEIGEIIVKGPNVMQGYYNMPEATAETLRGGWLHTGDMAWMDEEGYVFIVDRAKDMIISGG

ENIYSAEVENAVASHPAVAANAVIGIPHEQMGEAVHVALVLRPGSELSLEALQAHCRALIAGYKVPRSMEV

RPSLPLSGAGKILKTELREPFWKGRDRAVG
```

AAE from *Thermus thermophilus* (strain HB8/ATCC 27634/DSM 579)

SEQ ID NO: 14

```
MEGERMNAFPSTMMDEELNLWDFLERAAALFGRKEVVSRLHTGEVHRTTYAEVYQRARRLMGGLRALG

VGVGDRVATLGFNHFRHLEAYFAVPGMGAVLHTANPRLSPKEIAYILNHAEDKVLLFDPNLLPLVEAIRGE

LKTVQHFVVMDEKAPEGYLAYEEALGEEADPVRVPERAACGMAYTTGTTGLPKGVVYSHRALVLHSLAA

SLVDGTALSEKDVVLPVVPMFHVNAWCLPYAATLVGAKQVLPGPRLDPASLVELFDGEGVTFTAGVPTV

WLALADYLESTGHRLKTLRRLVVGGSAAPRSLIARFERMGVEVRQGYGLTETSPVVVQNFVKSHLESLSE

EEKLTLKAKTGLPIPLVRLRVADEEGRPVPKDGKALGEVQLKGPWITGGYYGNEEATRSALTPDGFFRTG

DIAVWDEEGYVEIKDRLKDLIKSGGEWISSVDLENALMGHPKVKEAAVVAIPHPKWQERPLAVVVPRGEK

PTPEELNEHLLKAGFAKWQLPDAYVFAEEIPRTSAGKFLKRALREQYKNYYGA
```

AAE from *Bradyrhizobium* sp. CI-41S

SEQ ID NO: 15

```
MDWSQHAIPPMRLEPRFGDRVVPAFVDRPASLWAMIADAVAQNGGGEALVCGDIRISWHEVARRAAKV

AAGFAKLGLNSGDRVAILLGNRIEFVLTMFAAAHAGLVTVLLSTRQQKPEIAYVLNDCGARALVHEATLAE

RIPDAADIPGLAHRIAVSDDAASQFAVLLDHPPAPAPAAVSEEDTAMILYTSGTTGRPKGAMLAHCNIIHSS

MVFASTLRLTQADRSIAAVPLAHVTGAVANITTMVRCAGTLIIMPEFKAAEYLKVAARERVSYTVMVPAMY

NLCLLQPDFDSYDLSSWRIGGFGGAPMPVATIERLDAKIPGLKLANCYGATETTSPSTLMPGELTAAHIDS

VGLPCPGAEIIVMGPDGRELPRGEIGELWIRSASVIKGYWNNPKATAESFTDGFWHSGDLGSVDAENFV

RVFDRQKDMINRGGLKIYSAEVESVLAGHPAVIESAIIAKPCPVLGERVHAVIVTRTEVDAESLRAWCAERL

SDYKVPETMTLTTTPLPRNANGKVVKRQLRETLAAGQAPA
```

-continued

AAE from *Bradyrhizobium* sp. CI-41S
SEQ ID NO: 16
MAGPAVLTVADTIARSFLLAVQTRGDRPAIREKKFGIWQPTSWREWLQISKDIAHGLHASGFRPGDVASII

ANAVPEWVYADMGILCAGGVSSGIYPTDSTAQVEYLVNDSRTKIVFVEDEEQLDKVLACRARCPTLEKIVV

FDMEGLSGFSDPMVLSFAEFAALGRNHAHGNAALWDEMTGSRTASDLAILVYTSGTTGPPKGAMHSNR

SVTHQMRHANDLFPSTDSEERLVFLPLCHVAERVGGYYISIALGSVMNFAESPETVPDNLREVQPTAFLA

VPRVWEKFYSGITIALKDATPFQNWMYGRALAIGNRMTECRLEGETPPLSLRLANRAAYWLVFRNIRRML

GLDRCRIALTGAAPISPDLIRWYLALGLDMREVYGQTENCGVATIMPTERIKLGSVGKAAPWGEVMICPK

GEILIKGDFLFMGYLNQPERTAETIDAKGWLHTGDVGTIDNEGYVRITDRMKDIIITSGGKNVTPSEIENQLK

FSPYVSDAVVIGDKRPYLTCLIMIDQENVEKFAQDHDIPFTNYASLCRAREIQDLIQREVEAVNTKFARVETI

KKFYLIERQLTPEDEELTPTMKLKRSFVNKRYAAEIDAMYGARAVA

AAE from *Bacillus subtilis* (strain 168)
SEQ ID NO: 17
MNLVSKLEETASEKPDSIACRFKDHMMTYQELNEYIQRFADGLQEAGMEKGDHLALLLGNSPDFIIAFFGA

LKAGIVVVPINPLYTPTEIGYMLTNGDVKAIVGVSQLLPLYESMHESLPKVELVILCQTGEAEPEAADPEVR

MKMTTFAKILRPTSAAKQNQEPVPDDTAVILYTSGTTGKPKGAMLTHQNLYSNANDVAGYLGMDERDNV

VCALPMFHVFCLTVCMNAPLMSGATVLIEPQFSPASVFKLVKQQQATIFAGVPTMYNYLFQHENGKKDDF

SSIRLCISGGASMPVALLTAFEEKFGVTILEGYGLSEASPVTCFNPFDRGRKPGSIGTSILHVENKVVDPLG

RELPAHQVGELIVKGPNVMKGYYKMPMETEHALKDGWLYTGDLARRDEDGYFYIVDRKKDMIIVGGYNV

YPREVEEVLYSHPDVKEAVVIGVPDPQSGEAVKGYVVPKRSGVTEEDIMQHCEKHLAKYKRPAAITFLDDI

PKNATGKMLRRALRDILPQ

AAE from *Azoarcus olearius*
SEQ ID NO: 18
METVIRDVGRMFAKPVVNVETRGDGSRILRSGIPLPDTYARCVGEWVEKWGKETPDQLFLAERDAVSGE

WRKITWGETRRRVIGIATWLLGQKLSAERPVVILSDNSIEHALLMLAAMHVGVPVSSISPGNSLMSRDHAK

LKGNIELLRPGVIFADPVEKFAPALAAIRELHDGVVIAGRNSQPTAGTVPFAEIEVAPDEAAVMAAFNAITP

DTIAKFLFTSGSVGVPKAVINTQRMMCSNQLAKELVWPFLKENRPVLVEWLPWSHTFGSNHNLNMILRW

GGTIWIDDGKPTPAGLDKTVKNLKEISPTVYFNVPRAYDMLVPLLREDKQLRETFFARLNLIFYAGAALPH

HLWEGLEDLSEQTTGHKVTMVSSWGSTETAPMCTDCHFEAERPGVIGVPVPGTALKLVPSADKLEVRVK

GPNIFPGYWKQPDITAKSFDEEGYYMIGDAVEFLDERFPEKGLLFDGRVGEDFKLLTGTWVHVGSLRVA

GIDAMKPVAQDIVVTGHDRDEIGFLVFPNIPECRTLCPDLPPDADIIDLLLNPAVRQRVRQGMALMKQIGG

GSSTYPSRALLMAEPPSVEAGEITDKGYINQRMVLNRRADLVEYLYQDVVDKTVITVHSAI

AAE from *Microbacterium oxydans*
SEQ ID NO: 19
MVRSTYPDVEIPEVSIHDFLFGDLSEAELDTVALVDGMSGATTTYRQLVGQIDLFAGALAARGVGVGTTV

GVLCPNVPAFATVFHGILRAGATATTINSLYTADEIANQLTDAGATWLVTVSPLLPGAQAAAEKLGFDADH

VIVLDGAEGHPSLPALLGEGRQAPDVSFDPSTHLAVLPYSSGTTGRPKGVMLTHRNLVANVSQCQPVLG

VDASDRVLAVLPFFHIYGMTVLLNFALRQRAGLATMPRFDLPEFLRIIAEHRTSWVFVAPPIAVALAKHPIV

DQYDLSAVKVIFSGAAPLDGTLASAVANRLGCIVTQGYGMTETSPAVNLISEARTEIDRSTIGPLVPNTEAR

LVDPDSGEDVVVPAEGASEPGELWVRGPQVMVGYLNRPDATAEMLDADGWLHTGDVATVTHDGIYRIV

DRLKELIKYKGYQVAPAVLEAVLLEHPAIADAAVIGAFDDDGQEVPKAFVVRQPDADLDADAVMAHVTSH

VAPHEKVRQVEFIDVIPKSSSGKILRKDLRAR

AAE from *Aspergillus niger* (strain CBS 513.88/FGSC A1513)
SEQ ID NO: 20
MLFSQQPLHLTRADELRQSPPKGTPYSVALPGTEKPGRSKVYRAWNATEGVLKSLDPQILTAHDIFESTA

NRLPKNHCLGWRPYNPTTKTYGVYQWLDYQTVQKRRAAFGAGLVELHHKHECSRPGQYGIGLWCQNR

```
PEWQITDLACMSQSLYSVSIYDVLAPDATEYIINHAELACVVTSLPHIPTLLRLKPQLPNLKIIVSLDPLDGGE

EAGHSKRALLESMAAGQDVSIYTMSQVEELGASVDRPCKPPAPSDTITINYTSGTTGPPKGVVLAHENAV

ASASGALINSIQKAGDTIISYLPLAHIYARMSEHAAFWAGARIGYFHGNILELVDDLKLLKPTGFISVPRLYTR

FGNAIRASTVEAPGFRGALSRHIVATKTANLKNPDPSQATGKHALYDRIWAKKVAAAIGLERSRMLASGS

APLDPSLHQFLRIALGVDVVQGYGLTETYAMACVQSLADLTAGHCGGLIPSTEACLMSLPDMEYSVDDKP

YPRGELMLRGANVFREYFKDPEETAKAVTEDGWFRTGDVCKIDEMGRIVIIDRRKNVLKLAQGEYISPERL

EGVYMSEMGYLAQGYVHGDSVQTFLVAIFGVQPDTFAVFASKVLGRTIEATDIEGIRSVLNDPKIRKAVLK

DLNRIAKKHKLAGYERIKNCALMIDPFTIENNLLTPTLKLKRPPTTKKYRQVLDELYAEALAEESAPKAKL
```

AAE from *Brevibacterium yomogidense*
SEQ ID NO: 21

```
MSWFDERPWLRTLGLTETEAVPLEPSTPLRDLADTVAAHPTTAAWTHYGQSATYAEFDRQTTAFAAYLA

ESGIRPGDAVAVYAQNSPHFPIATYGIWKAGAVVVPLNPMYRDELTHAFADADVKAIVVQKALYLMRVKE

YAADLPLVVLAGDLDWAQDGPDAVFGAYADLPDVPLPDLRTVVDERLDTDFEPLTVRPEDPALIGYTSGT

SGKAKGALHPHSSISSNSRMAARNAGLPQGAGVVSLAPLFHITGFICQMIASTANGSTLVLNHRFDPASFL

DLLRQEKPAFMAGPATVYTAMMASPSFGADAFDSFHSIMSGGAPLPEGLVKRFEEKTGHYIGQGYGLTE

TAAQAVTVPHSLRAPVDPESGNLSTGLPQRDAMVRILDDDGNPVGPREVGEVAISGPMVATEYLGNPQA

TADSLPGGELRTGDVGFMDPDGWVFIVDRKKDMINASGFKVWPREVEDILYMHPAVREGAVVGVPDEY

RGETVVAFVSLQPDSQATAEDIIAHCKEHLASYKAPVEVTIVDELPKTSSGKILRRTVRDEATQARQAQPD

AH
```

AAE from *Brevibacterium linens*
SEQ ID NO: 22

```
MINNWLAVGLLVVSGILAFNWKRKHPYGQTVEIGEKPENGGRIRRNSACADHLISFLEDDEIYTLYDSLVK

SCKKYGERKCFGERKKDSNGNLGKFEWISYNTYLERCEYIQQGLCELGLKPKSKVGIFSKNRLEWLIVHS

ASFIQSYCVVSFYETLGVESLSYVTEHAEIGLAFCSAETLQKTLDIAKGVKVLKTIICFDSIDKEHYNIAKELG

VTLYTYDEIMKKGKEANGKHKHTPPTPDTLSTIMYTSGTTGPPKGVMITHKNLTSVVCAVSDFIKVYDTDV

HYSYLPYAHVLERVVILAAFHFGAAIGIFSGDISNILVEVKLLSPTLFIGVPRVFERIKTNVFKEISKKPALLRT

LFNGAYNLKYLSIQHGFKLPIIEKVLDLVFFSKIKQALGGKVRVILSGSAPLSFDTEVFLRVVMCCCVLQGY

GASEGCGGDACKRLDDESVGTIGPPFASNEIKLVDVPELGYDSNGEVQTGEVCLRGPSISSGYYKDEEK

TREEFKDGWFHTGDIGRWNRDGSLSIVDRKKNIFKLSQGEYVAVEKIETIVVKSEYVEQVCIYGDSQKSCV

IAIIHPHPESCSEWAGSKKTDKDIKEICKNQDFIKVVLDDIIKNCKKSGLHGFEIPKAIHLTPEAFSDQNNLLT

PSFKLKRHEIKKYFEDEIKKLYSKLD
```

AAE from *Nocardioides simplex* (*Arthrobacter simplex*)
SEQ ID NO: 23

```
MSFRYYRDLHPTFADRTEWALPTVLRHHAAERPDAVWLDCPEEGRTWTFAETLTAAERVGRSLLAAGA

EPGDRVVLVAQNSSAFVRTWLGTAVAGLVEVPVNTAYEHDFLAHQVSTVEATLAVVDDVYAARFVAIAEA

AKSIRKFWVIDTGSRDQALATLRDAGWEAAPFEELDEAATAPEVVDATLALPDVRPQDLASVLFTSGTTG

PSKGVAMPHAQMYFFADECVSLVRLTPDDAWMSVTPLFHGNAQFMAAYPTLVAGARFVTRSRFSASRW

VDQLRESRVTVTNFIGVMMDFIWKQDRRDDDADNPLRVVFAAPTAATLVGPMSERYGIEAFVEVFGLTET

SAPIISPYGVDRPAGAAGLAADEWFDVRLVDPETDEEVGVGEIGELVVRPKVPFICSMGYFNMPDKTVEA

WRNLWFHTGDALRREDEDGWFYFVDRFKDALRRRGENISSYEIETSILAHPAVVECAVIAVPASSEAGEDE

VMAYVITGGDAPVPTPAELWAHCDGRIPSFAVPRYLRFVDEMPKTPSQRVQKAKLRALGVTPDTHDREA
```

-continued

AAE from *Pseudomonas putida* (*Arthrobacter siderocapsulatus*)
SEQ ID NO: 24
MNLGKIITRSARYWPDHTAVADSQTRLTYAQLERRSNRLASGLGALGVATGEHVAILAANRVELVEAEVA

LYKAAMVKVPINARLSLDEVVRVLEDSCSVALITDATFAQALAERRAALPMLRQVIALEGEGGDLGYAALL

ERGSEAPCSLDPADDALAVLHYTSGSSGVLKAAMLSFGNRKALVRKSIASPTRRSGPDDVMAHVGPITH

ASGMQIMPLLAVGACNLLLDRYDDRLLLEAIERERVTRLFLVPAMINRLVNYPDVERFDLSSLKLVMYGAA

PMAPALVKKAIELFGPILVQGYGAGETCSLVTVLTEQDHLIEDGNYQRLASCGRCYFETDLRVVNEAFEDV

APGEIGEIVVKGPDIMQGYWRAPALTAEVMRDGYYLTGDLATVDAQGYVFIVDRKKEMIISGGFNVYPSE

VEQVIYGFPEVFEAAVVGVPDEQWGEAVRAVVVLKPGAQLDAAELIERCGRALAGFKKPRGVDFVTELP

KNPNGKVVRRLVREAYWQHSDRRI

TKS from *Dendrobium catenatum*
SEQ ID NO: 25
MPSLESIRKAPRANGFASILAIGRANPENFIEQSTYPDFFFRITNSEHLVDLKKKFQRICDKTAIRKRHFVW

NEEFITTNPCLHTFMDKSLDVRQEVAIREIPKLGAKAAAKAIQEWGQPKSRITHLIFCTTSGMDLPGADYQL

TQILGLNPNVERVMLYQQGCFAGGTTLRLAKCLAESRKGARVLVVCAETTTVLFRGPSEEHQEDLVTQAL

FADGASALIVGADPDEAAHERASFVIVSTSQVLLPDSAGAIGGHVSEGGLLATLHRDVPKIVSKNVEKCLE

EAFTPFGITDWNSIFWVPHPGGRAILDLVEERVGLKPEKLLVSRHVLAEYGNMSSVCVHFALDEMRKRSA

IEGKATTGEGLEWGVVFGFGPGLTVETVVLRSVPL

TKS from *Cannabis sativa*
SEQ ID NO: 26
MNHLRAEGPASVLAIGTANPENILLQDEFPDYYFRVTKSEHMTQLKEKFRKICDKSMIRKRNCFLNEEHLK

QNPRLVEHEMQTLDARQDMLVVEVPKLGKDACAKAIKEWGQPKSKITHLIFTSASTTDMPGADYHCAKLL

GLSPSVKRVMMYQLGCYGGGTVLRIAKDIAENNKGARVLAVCCDIMACLFRGPSESDLELLVGQAIFGDG

AAAVIVGAEPDESVGERPIFELVSTGQTILPNSEGTIGGHIREAGLIFDLHKDVPMLISNNIEKCLIEAFTPIGI

SDWNSIFWITHPGGKAILDKVEEKLHLKSDKFVDSRHVLSEHGNMSSSTVLFVMDELRKRSLEEGKSTTG

DGFEWGVLFGFGPGLTVERVVVRSVPIKY

TKS from *Arachis hypogaea*
SEQ ID NO: 27
MVSVSGIRKVQRAEGPATVLAIGTANPPNCIDQSTYADYYFRVTNSEHMTDLKKKFQRICERTQIKNRHM

YLTEEILKENPNMCAYKAPSLDAREDMMIREVPRVGKEAATKAIKEWGQPMSKITHLIFCTTSGVALPGVD

YELIVLLGLDPCVKRYMMYHQGCFAGGTVLRLAKDLAENNKDARVLIVCSENTAVTFRGPSETDMDSLVG

QALFADGAAAIIIGSDPVPEVEKPIFELVSTDQKLVPGSHGAIGGLLREVGLTFYLNKSVPDIISQNINDALNK

AFDPLGISDYNSIFWIAHPGGRAILDQVEQKVNLKPEKMKATRDVLSNYGNMSSACVFFIMDLMRKRSLE

EGLKTTGEGLDWGVLFGFGPGLTIETVVLRSVAI

TKS from *Dictyostelium discoideum* AX4
SEQ ID NO: 28
MNNSNVKSSPSIVKEEIVTLDKDQQPLLLKEHQHIIISPDIRINKPKRESLIRTPILNKFNQITESIITPSTPSLS

QSDVLKTPPIKSLNNTKNSSLINTPPIQSVQQHQKQQQKVQVIQQQQQPLSRLSYKSNNNSFVLGIGISVP

GEPISQQSLKDSISNDFSDKAETNEKVKRIFEQSQIKTRHLVRDYTKPENSIKFRHLETITDVNNQFKKVVP

DLAQQACLRALKDWGGDKGDITHIVSVTSTGIIIPDVNFKLIDLLGLNKDVERVSLNLMGCLAGLSSLRTAA

SLAKASPRNRILVVCTEVCSLHFSNTDGGDQMVASSIFADGSAAYIIGCNPRIEETPLYEVMCSINRSFPNT

ENAMVWDLEKEGWNLGLDASIPIVIGSGIEAFVDTLLDKAKLQTSTAISAKDCEFLIHTGGKSILMNIENSLG

IDPKQTKNTWDVYHAYGNMSSASVIFVMDHARKSKSLPTYSISLAFGPGLAFEGCFLKNVV

TKS from *Spinacia oleracea*
SEQ ID NO: 29
MASVDISEIHNVERAKGQANVLAIGTANPPNVMYQADYPDFYFRLTNSEHMTDLKAKFKRICEKTTIKKRY

MHISEDILKEKPDLCDYNASSLDIRQVILAKEVPKVGKDAAMKAIEEWGQAMSKITHLIFCTTSGVDIPGAD

```
YQLTMLLGLNPSVKRYMLCQQGCHAGGTVLRLAKDLAENNYGSRVLVVCSENTTVCFRGPTETHPDSM

VAQALFADGAGAVIVGAYPDESLNERPIFQIVSTAQTILPNSQGAIEGHLRQIGLAIQLLPNVPDLISNNIDKC

LVEAFNPIGINDWNSIFWIAHPGGPAILGQVESKLGLQESKLTTTWHVLREFGNMSSACVFFIMDETRKRS

LKEGKTTTGDGFDWGVLFGFGPGLTVETVVLRSFPLNQ
```

TKS from *Chenopodium quinoa*
SEQ ID NO: 30
```
MASVQEIRNAQRADGPATILAIGTANPPNEMYQAEYPDFYFRVTESEHMTDLKKKFKRMCERSMIKKRY

MHVTEELLKENPHMCDYNASSLNTRQDILATEVPKLGKEAAIKAIKEWGQPRSKITHVIFCTTSGVDMPGA

DYQLTKLLGLRPSVKRFMLYQQGCYAGGTVLRLAKDIAENNRGARVLVVCAEITVICFRGPTETHLDSMIG

QALFGDGAGAVIVGADVDESIERPIFQLVWAAQTILPDSEGAIDGHLREVGLAFHLLKDVPGLISKNIEKAL

VEAFKPIGIDDWNSIFWVAHPGGPAILDQVESKLELKQDKLRDTRHVLSEFGNMSSACVLFILDEMRNRSL

KEGKTTTGEGLDWGVLFGFGPGLTVETVMLHSVPITN
```

TKS from *Cannabis sativa*
SEQ ID NO: 31
```
MASISVDQIRKAQRANGPATVLAIGTANPPTSFYQADYPDFYFRVTKNQHMTELKDKFKRICEKTTIKKRH

LYLTEDRLNQHPNLLEYMAPSLNTRQDMLVVEIPKLGKEAAMKAIKEWGQPKSRITHLIFCSTNGVDMPG

ADYECAKLLGLSSSVKRVMLYQQGCHAGGSVLRIAKDLAENNKGARILTINSEITIGIFHSPDETYFDGMV

GQALFGDGASATIVGADPDKEIGERPVFEMVSAAQEFIPNSDGAVDGHLTEAGLVYHIHKDVPGLISKNIE

KSLVEALNPIGISDWNSLFWIVHPGGPAILNAVEAKLHLKKEKMADTRHVLSEYGNMSSVSIFFIMDKLRKR

SLEEGKSTTGDGFEWGVLFGFGPGLTVETIVLHSLAN
```

TKS from *Plumbago indica*
SEQ ID NO: 32
```
MAPAVQSQSHGGAYRSNGERSKGPATVLAIATAVPPNVYYQDEYADFFFRVTNSEHKTAIKEKFNRVCG

TSMIKKRHMYFTEKMLNQNKNMCTWDDKSLNARQDMVIPAVPELGKEAALKAIEEWGKPLSNITHLIFCT

TAGNDAPGADFRLTQLLGLNPSVNRYMIYQQGCFAGATALRIAKDLAENNKGARVLIVCCEIFAFAFRGPH

EDHMDSLICQLLFGDGAAAVIVGGDPDETENALFELEWANSTIIPQSEEAITLRMREEGLMIGLSKEIPRLL

GEQIEDILVEAFTPLGITDWSSLFWIAHPGGKAILEALEKKIGVEGKLWASWHVLKEYGNLTSACVLFAMD

EMRKRSIKEGKATTGDGHEYGVLFGVGPGLTVETVVLKSVPLN
```

TKS from *Ziziphus jujuba*
SEQ ID NO: 33
```
MVTVDEIREAQRAKGPATIMAIGTATPPNAIDQSTFTDYYFRITNSDHKTDLKKKFKTICDKSMIKKRYLYLT

EEHLKQNPNMSEYMAPSLDVRQEIVIAEVPKLGKEAANKAIKEWGQPKSITHLVFSTISGVDAPGADYQL

TKLLGLNPSVKRIMVYQQGCFAGGTSLRLAKDLAENNKGARVLVVCTEISAINFRGPSETYFDSNVGQILF

GDGASAVVVGSDPLVGVEKPLFELVSASQTIIPDSEGNIEGHICEVGLTIRLSKKVPSLISNNIEKSLVEAFN

PLGISDWNSIFWIAHPGGPAILDQIELKLGLKPEKLRASRHVLSEYGNMSSATVLFILDEMRKKSIEDGLKT

PGEGLEWGVLFGFGPGLTVETVVLHSVTA
```

TKS from *Anoectochilus roxburghii*
SEQ ID NO: 34
```
MPSLESIRKAPRADGLASILAIGRANPDNFMEQSSFPDFFFRITGSDHLVDLKKKFQRICDRTAIRKRHFV

WNEEFIKANPCFSTFMDNSLNVRQEVAIREIPKLGAEAATKAIKEWGQPKSRITHLIFCTTSGMDLPGADY

QLTRILGLNPNVERVMLYQQGCFAGGTTLRLAKCLAESRKGARVLVVCAETTTVLFRAPSEEHQEDLVTQ

ALFADGASAVIVGADPDEEAHEKASFVIFSTSQVLLPDSEGAIGGHVSEGGLLATLHRDVPQLVSKNVGK

CLEEAFTPLGISDWNSIFWVPHPGGRAILDQIEERVGLKPEKLTTSRHVLAEYGNMSSVCVHFVLDEMRK

KSSKEGKATTGEGLEWGVLFGFGPGLTVETVVLRSVPL
```

TKS from *Cymbidium* hybrid cultivar

SEQ ID NO: 35

MPSLESVKKSNRADGFASILAIGRANPENFIEQSTYPDFFFRVTNSEHLVNLKKKFQRICDKTAIRKRHFV

WNEELLNANPCLGTFMDNSLNVRQEFAIREIPKLGAEAATKAIQEWGQPKSRITHLIFCTTSGMDLPGADY

QLTQILGLNPNIERVMLYQQGCFAGGTTLRLAKCLAESRKGARVLVVCAETTAVLFRAPSEEHQDDLVTQ

ALFADGASALIVGADPDETAHERASFVIVSTSQVLLPDSAGAIGGHVSEGGLIATLHRDVPQIVSKNVGKCL

EEAFTPLGISDWNSIFWVPHPGGRAILDQVEERVGLKPEKLIVSRHVLAEYGNMSSVCVHFALDEMRKRS

KKEGKATTGEGLDWGVLFGFGPGLTVETVVLHSVPI

TKS from *Phalaenopsis equestris*

SEQ ID NO: 36

MPSLDSIKKAPRADGFASILAIGRANPDNIIEQSAYPDFYFRVTNSEHLVDLKKKFQRICEKTAIRKRHFVW

NEEFLTSNPCFSTFMDKSLNVRQEVAIREIPKLGAKAATKAIEDWGQPKSRITHLIFCTTSGMDLPGADYQ

LTQILGLNPNVERVMLYQQGCFAGGTTLRLAKCLAESRKGARVLVVCAETTTVLFRAPSEEHQDDLVTQA

LFADGASAVIVGADPDEAADERASFVIVSTSQVLLPDSAGAIGGHVSEGGLLATLHRDVPQIVSKNVGKCL

EEAFTPFGISDWNSIFWVPHPGGRAILDQVEERVGLKPEKLSVSRHVLAEYGNMSSVCVHFALDEMRKR

SANEGKATTGEGLEWGVLFGFGPGLTVETVVLRSVPL

TKS from *Dendrobium catenatum*

SEQ ID NO: 37

MPSLESIRKAPRANGFASILAIGRANPENFIEQSTYPDFFFRITNSEHLVDLKKKFQRICDKTAIRKRHFVW

NEEFITTNPCLHTFMDKSLDVRQEVAIREIPKLGAKAAAKAIQEWGQPKSRITHLIFCTTSGMDLPGADYQL

TQILGLNPNVERVMLYQQGCFAGGTTLRLAKCLAESRKGARVLVVCAETTTVLFRGPSEEHQDDLVTQAL

FADGASALIVGADPDEAAHERASFVIVSTSQVLLPDSAGAIGGHVSEGGLLATLHRDVPKIVSKNVEKCLE

EAFTPFGITDWNTIFWVPHPGGRAILDQVEERMGLKPEKLLVSRHVLAEYGNMSSVCVHFALDEMRKRS

AIEGKATTGEGLEWGVLFGFGPGLTVETVVLRSVHL

TKS from *Oncidium* hybrid cultivar

SEQ ID NO: 38

MPSLESTKKAPRSHGFASILAIGRANPENFVEQNAYPDLFFRATNSKHLVNLKKKFQRICDKTAIRKRHFA

WNEEFITANPCLQTFMDNSLNVRQEFAITYIPKLGAEAATKAIQEWGQPKSRITHLIFCTTSGMDLPGADY

QLTQILGLNPNVERVMLYQQGCFAGGTTLRLAKCLAESRKGARVLVVCAETTAVLFRAPSEEHQDDLVT

QALFADGASALIVGADPDEAANERASFIIVSTSQVLLPDSAGAIGGHVSEGGLLATLHRDVPQIVSKNVGK

CLEEAFTPLGISDWNSIFWVPHPGGRAILDLVEERVGLKPEKLLVSRHVLAEYGNMSSVCVHFALDEMRR

RSAKEGKATTGEGLDWGVLFGFGPGLTVETVVLHSVPI

TKS from Apostasia shenzhenica

SEQ ID NO: 39

MPGVEAVAQNISPARSDGLAAILAIGRANPPNIVEQSSFADLYFRLHNSEHLVDLKKKLQRICDRTAIRKRH

FVWDEELLMANPCLRTVTEPSLNARQKVAITEIPKLGAAAATNAIAEWGRPKSDITHLIFCTTSGMDLPGA

DYQLIRLLGLNDNIQRIMLYQQGCFAGGTVLRLAKVLAESRRSARVLIVCAETTTVLVRSPSVENQDDLVT

QALFADGASALIVGADPNAGEKPVFSVFSTSQVLLPDSDGAIGGHVGENGLTATLHRDVPAVISKNVGKC

LEEAFTPLGISDWNSIFWAAHPGGRAILDQVEERVGLKPEKMWASRHVLAEYGNMSSVSVHFALDEIRR

RSAKEGKATTGDGFEWGVLFGFGPGLTVETVVLRSAPISA

TKS from Paphiopedilum hangianum

SEQ ID NO: 40

MPGLENRKKVEALIRAEGLATIMAIGRANPPNAMEQSTFPDFYFRVTNSEHLVGLKKKFQRICEKTAIRRR

HFVWNEEILNANPCLRTHMEPSLNVRQKIAVAEIPKLGAEAASRAIEEWGQPKSRITHLIFCTTSGMDLPG

ADYKLTRILGLNPNVQRVMLYQQGCFAGGTVLRLAKCFAESRKGARVLVVCSETTTVLVRAPSEDYQDD

-continued

LVTQALFADGASALIVGADPDEEAKERPIFTIVSTTQVILPDSDGAIGGHLGEGGLTATLHRDVPLIISKNVS

KCLEEAFAPLGISDWNSIFWAPHPGGRAILDQVEERVGLKPEKLWASRHVLAEYGNMSSVCVHFVLDEIR

KRSAKESKATTGEGFDWGVLFGFGPGLTVETVILRSVPLN

TKS from *Apostasia shenzhenica*
SEQ ID NO: 41

MPGLQIISKASSRAADGLAAILAIGRANPPNSMDQSSYPEFYFRVMDSDHLVDLKKKFQRICERTAIRKRH

FVWNEELLRDNPCLRTFMDSSLNVRQKVAVAEIPKLGAAAAERAIEEWGQPRSGITHLIFCTTSGMDLPG

ADYQLTKILGLNADVQRVMLYQQGCFAGGTVLRLAKVLAESRKGARVLVVCAETTTVLIRAPSVEHQDDL

VTQALFADGASALIVGADPVEEVNERPLFSIISASQVILPDSDGAIGGHLGEGGLTATLHRDVPLIISKNVSK

CLEDAFSPLGISDWNSIFWAPHPGGRAILDQVEERVGLKPEKMWASRHVLAEYGNMSSVCVHFVLDEM

RKRSAKEGKPTTGEGLEWGVLFGFGPGLTVETVVLRSHPIN

TKS from *Phalaenopsis equestris*
SEQ ID NO: 42

MPNMESIKKEDGLATIMAIGRALPPNSIDQNSFPDFYFRVHNSEHLMDLKNKFRRICERTAIRKRHFVWNE

EVLKQNPCLRTFMEPSLNTRQEIVCSEIPKLGAEAARNAIREWGQPERSITHLIFCTTSGMNLPGADFEAA

QILGLNHSVERVMLYQQGCFAGGTVLRLAKCLAESRRGARVLVICAESTTSLVRSPSREHQYDLIAQALF

ADGASALIIGTEPNAEAGERPIFSIFSTAQVTLPDSGDAIRGYLKEGGLIATLAKDVPLIISENIERCLQEAFG

PLGISDWNSIFWAPHPGGRAILDGIEDKLGLKPEKLWAARHVLAEYGNMSSVCVHYILDEMRRRDVKNGK

APTGDGPEWGVLFGFGPGLTVETVVLRRLFL

TKS from *Bromheadia finlaysoniana*
SEQ ID NO: 43

MASQVSPPSINMAPKADGFASILAIGRANPKNFIEQSTFPDFFFRVTNTEHMVDLKKKFQRICDKTSIRKRH

FIWNEELLTANPSLCTFMGNSLNLRHEVAVREIPKLGAEAATKAIQEWGQPKSFITHLVFCTTSGMDLPGA

DYQLTQILGLNLDIERVMLHQQGCFLGGTTLRLAKYLAESRKGARVLVVCAETTTEFFRAPSEEHQEDLVT

QSLFGDGASALIVGADPHEGARERASFILVSSSQVLLANSAHAITGHVSEGGIKATLHRDVPQIISNNLGKC

LEEAFTPLGISDWNSIFWVLHPGGRAILDQVEEKMGLEPEKLLISRHVLLEYGNMSSVCVHFALDEMRKR

SSNEGKATTGEGLEWGVLFGFGPGLTIETVVLRSVSIS

OAC from *Cannabis sativa*
SEQ ID NO: 44
MAVKHLIVLKFKDEITEAQKEEFFKTYVNLVNIIPAMKDVYWGKDVTQKNKEEGYTHIVEVTFESVETIQDYI

IHPAHVGFGDVYRSFWEKLLIFDYTPRK

OAC (synthetic)
SEQ ID NO: 45
MAVKHLIVIKFSDSITEAQKEEFFKTYLNLVNIIPAMKDVYWGKDVTRRNKEEGYTHIVEVTFESVETIQDYII

HPAHVGFGDVYRHYWEKLLIFDYTPRK

OAC (synthetic)
SEQ ID NO: 46
MSVKHLIVIKFSDEITEAQKEELFKTYVNLVNIIPAMKDVYWGKDVRQRNKEEGYTHIVEVTFESVETIQDYI

IHPAHVGFGDVYRHYWEKLLIFDYTPRK

OAC (synthetic)
SEQ ID NO: 47
MSVKHLIVIKFSDEITEAQKEELFKTYVNLVNIIPAMKDVYWGKDVTRRNKEEGYTHIVEVTFESVETIQDYII

HPAHVGFGDVYRHYWEKLLIFDYTPRK

OAC (synthetic)
SEQ ID NO: 48
MSVKHLIVIKFKDSITEAQKEELFKTYVNLVNIIPAMKDVYWGKDVTRRNKEEGYTHIVEVTFESVETIQDYII

HPAHVGFGDVYRHYWEKLLIFDYTPRK

OAC (synthetic)

SEQ ID NO: 49

MSVKHLIVIKFKDSITEAQKEELFKTYLNLVNIIPAMKDVYWGKDVTRRNKEEGYTHIVEVTFESVETIQDYII

HPAHVGFGDVYRSYWEKLLIFDYTPRK

OAC (synthetic)

SEQ ID NO: 50

MAVKHLIVIKFSDSITEAQKEELFKTYVNLVNIIPAMKDVYWGKDVTRRNKEEGYTHIVEVTFESVETIQDYII

HPAHVGFGDVYRHYWEKLLIFDYTPRK

OAC (synthetic)

SEQ ID NO: 51

MSVKHLIVIKFSDSITEAQKEEFFKTYVNLVNIIPAMKDVYWGKDVTRRNKEEGYTHIVEVTFESVETIQDYII

HPAHVGFGDVYRHYWEKLLIFDYTPRK

OAC (synthetic)

SEQ ID NO: 52

MSVKHLIVIKFKDSITEAQKEELFKTYVNLVNIIPAMKDVYWGKDVRRRNKEEGYTHIVEVTFESVETIQDYII

HPAHVGFGDVYRSYWEKLLIFDYTPRK

CBGaS from Cannabis sativa

SEQ ID NO: 53

MSIIIFMGLSLVCTFSFQTNYHTLLNPHNKNPKNSLLSYQHPKTPIIKSSYDNFPSKYCLTKNFHLLGLNSHN

RISSQSRSIRAGSDQIEGSPHHESDNSIATKILNFGHTCWKLQRPYVVKGMISIACGLFGRELFNNRHLFS

WGLMWKAFFALVPILSFNFFAAIMNQIYDVDIDRINKPDLPLVSGEMSIETAWILSIIVALTGLIVTIKLKSAPL

FVFIYIFGIFAGFAYSVPPIRWKQYPFTNFLITISSHVGLAFTSYSATTSALGLPFVWRPAFSFIIAFMTVMGM

TIAFAKDISDIEGDAKYGVSTVATKLGARNMTFVVSGVLLLNYLVSISIGIIWPQVFKSNIMILSHAILAFCLIF

QTRELALANYASAPSRQFFEFIWLLYYAEYFVYVFI

CBGaS from Cannabis sativa

SEQ ID NO: 54

MAGSDQIEGSPHHESDNSIATKILNFGHTCWKLQRPYVVKGMISIACGLFGRELFNNRHLFSWGLMWKA

FFALVPILSFNFFAAIMNQIYDVDIDRINKPDLPLVSGEMSIETAWILSIIVALTGLIVTIKLKSAPLFVFIYIFGIF

AGFAYSVPPIRWKQYPFTNFLITISSHVGLAFTSYSATTSALGLPFVWRPAFSFIIAFMTVMGMTIAFAKDIS

DIEGDAKYGVSTVATKLGARNMTFVVSGVLLLNYLVSISIGIIWPQVFKSNIMILSHAILAFCLIFQTRELALA

NYASAPSRQFFEFIWLLYYAEYFVYVFI

CBGaS from Stachybotrys bisbyi

SEQ ID NO: 55

MPATRTPIHPEAAAYKNPRYQSGPLSVIPKSFVPYCELMRLELPHGNFLGYFPHLVGLLYGSSASPARLP

ANEVAFQAVLYIGWTFFMRGAGCAWNDVVDQDFDRKTTRCRVRPVARGAVSTTSANIFGFAMVALAFA

CISPLPAECQRLGLMTTVLSIIYPFCKRVTNFAQVILGMTLAINFILAAYGAGLPAIEAPYTVPTICVTTAITLL

VVFYDVVYARQDTADDLKSGVKGMAVLFRNYVEILLTSITLVIAGLIATTGVLVDNGPYFFVFSVAGLLAALL

AMIGGIRYRIFHTWNSYSGWFYALAIFNLLGGYLIEYLDQVPMLNKA

CBGaS from Stachybotrys chartarum IBT 40288

SEQ ID NO: 56

MSAKVSPMAYTNPRYETGPLSLIPKPIVPYFELMRFELPHGYYLGYFPHLVGIMYGASAGPERLPARDLVF

QALLYVGWTFAMRGAGCAWNDNIDQDFDRKTERCRTRPIARGAVSTTAGHVFAVAGVALAFLCLSPLPT

ECHQLGVLVTVLSVIYPFCKRFTNFAQVILGMTLAANFILAAYGAGLPALEQPYTRPTMSATLAITLLVVFYD

VVYARQDTADDLKSGVKGMAVLFRNHIEVLLAVLTCTIGGLLAATGVSVGNGPYYFLFSVAGLTVALLAMI

GGIRYRIFHTWNGYSGWFYVLAIINLMSGYFIEYLDNAPILARGS

CBGaS from Stachybotrys chlorohalonata (strain IBT 40285)

SEQ ID NO: 57

MSPKVSSMPYTNPRYESGPLSLIPKSIVPYFELMRFELPHGYYLGYFPHLVGIMYGASAGPERLPARDLVF

QALLYVGWTFAMRGAGCAWNDNIDQDFDRKTERCRTRPIARGAVSTTAGHIFAVAGVALAFLCLSPLPTE

CHQLGVLVTVLSVIYPFCKRFTNFAQVILGMTLAANFILAAYGAGLPALEQPYTRPTMFATLAITLLVVFYDV

VYARQDTADDLKSGVKGMAVLFRNHIEVLLAVLTCTIGGLLAATGVSVGNGPYYFLFSVAGLTVALLAMIG

GIRYRIFHTWNGYSGWFYVLAIINLMSGYFIEYLDNAPILARGS

CBGaS from *Stachybotrys chartarum* (strain CBS 109288/IBT 7711)

SEQ ID NO: 58

MSAKVSPMAYTNPRYERGPLSLIPKPIVPYFELMRFELPHGYYLGYFPHLVGIMYGASAGPERLPARDLV

FQALLYVGWTFAMRGAGCAWNDNIDQDFDRKTERCRTRPIARGAVSTTAGHVFAVAGVALAFLCLSPLP

TECHQLGVLVTVLSVIYPFCKRFTNFAQVILGMTLAANFILAAYGAGLPALEQPYTRPTMSATLAITLLVVFY

DVVYARQDTADDLKSGVKGMAVLFRNHIEVLLAVLTCTIGGLLAATGVSVGNGPYYFLFSVAGLTVALLAM

IGGIRYRIFHTWNGYSGWFYVLAIINLMSGYFIEYLDNAPILARGS

Parent for Chimeragenesis from *Cannabis sativa*

SEQ ID NO: 59

MAATTNQTEPPESDNHSVATKILNFGKACWKLQRPYTIIAFTSCACGLFGKELLHNTNLISWSLMFKAFFF

LVAILCIASFTTTINQIYDLHIDRINKPDLPLASGEISVNTAWIMSIIVALFGLIITIKMKGGPLYIFGYCFGIFGGI

VYSVPPFRWKQNPSTAFLLNFLAHIITNFTFYYASRAALGLPFELRPSFTFLLAFMKSMGSALALIKDASDV

EGDTKFGISTLASKYGSRNLTLFCSGIVLLSYVAAILAGIIWPQAFNSNVMLLSHAILAFWLILQTRDFALTNY

DPEAGRRFYEFMWKLYYAEYLVYVFI

Parent for Chimeragenesis from *Cannabis sativa*

SEQ ID NO: 60

MTDTANQTEPPESNTKYSVVTKILSFGHTCWKLQRPYTFIGVISCACGLFGRELFHNTNLLSWSLMLKAFS

SLMVILSVNLCTNIINQITDLDIDRINKPDLPLASGEMSIETAWIMSIIVALTGLILTIKLNCGPLFISLYCVSILV

GALYSVPPFRWKQNPNTAFSSYFMGLVIVNFTCYYASRAAFGLPFEMSPPFTFILAFVKSMGSALFLCKD

VSDIEGDSKHGISTLATRYGAKNITFLCSGIVLLTYVSAILAAIIWPQAFKSNVMLLSHATLAFWLIFQTREFA

LTNYNPEAGRKFYEFMWKLHYAEYLVYVFI

Parent for Chimeragenesis from *Humulus lupulus*

SEQ ID NO: 61

MDQRGNSIRASAQIEDRPPESGNLSALTNVKDFVSVCWEYVRPYTAKGVIICSSCLFGRELLENPNLFSW

PLIFRALLGMLAILGSCFYTAGINQIFDMDIDRINKPDLPLVSGRISVESAWLLTLSPAIIGFILILKLNSGPLLT

SLYCLAILSGTIYSVPPFRWKKNPITAFLCILMIHAGLNFSVYYASRAALGLAFVWSPSFSFITAFITFMTLTL

ASSKDLSDINGDRKFGVETFATKLGAKNITLLGTGLLLLNYVAAISTAIIWPKAFKSNIMLLSHAILAFSLFFQ

ARELDRTNYTPEACKSFYEFIWILFSAEYVVYLFI

Parent for Chimeragenesis from *Humulus lupulus*

SEQ ID NO: 62

MPNSLTAWSHQSEFPSTIVTKGSNFGHASWKFVRPIPFVAVSIICTSLFGAELLKNPNLFSWQLMFDAFQ

GLVVILLYHIYINGLNQIYDLESDRINKPDLPLAAEEMSVKSAWFLTIFSAVASLLLMIKLKCGLFLTCMYCCY

LVIGAMYSVPPFRWKMNTFTSTLWNFSEIGIGINFLINYASRATLGLPFQWRPPFTFIIGFVSTLSIILSILKDV

PDVEGDKKVGMSTLPVIFGARTIVLVGSGFFLLNYVAAIGVAIMWPQAFKGYIMIPAHAIFASALIFKTWLLD

KANYAKEASDSYYHFLWFLMIAEYILYPFIST

CBGaS (synthetic)

SEQ ID NO: 63

MAGSDQIEGSPHHESDNSIATKILNFGHTCWKLQRPYVVKGMISIACGLFGRELFNNRHLFSWGLMWKA

FFALVPILSFNFFAAIMNQIYDVDIDRINKPDLPLVSGEMSIETAWILSIIVALTGLIVTIKLKSAPLFVFIYIFGIF

AGFAYSVPPIRWKQYPFTNFLITISSHVGLAFTSYSATTSALGLPFVWRPAFSFIIAFMTVMGMTIAFCKDV

SDIEGDSKHGISTLATRYGAKNITFLCSGIVLLTYVSAILAAIIWPQVFKSNIMILSHAILAFCLIFQTRELALAN

YASAPSRQFFEFIWLLYYAEYFVYVFI

CBGaS (synthetic)

SEQ ID NO: 64

MAGSDQIEGSPHHESDNSIATKILNFGHTCWKLQRPYVVKGMISIACGLFGRELFNNRHLFSWGLMWKA

FFALVPILSFNFFAAIMNQIYDVDIDRINKPDLPLVSGEMSIETAWILSIIVALTGLIVTIKLKSAPLFVFIYIFGIF

AGFAYSVPPIRWKQYPFTNFLITISSHVGLAFTSYSATTSALGLPFVWRPAFSFIIAFMTVMGMTIAFLKDVP

DVEGDKKVGMSTLPVIFGARTIVLVGSGFFLLNYVAAIGVAIMWPQAFKGYIMIPAHAIFASALIFKTRELAL

ANYASAPSRQFFEFIWLLYYAEYFVYVFI

PDC from *Zymomonas mobilis*

SEQ ID NO: 65

MSYTVGTYLAERLVQIGLKHHFAVAGDYNLVLLDNLLLNKNMEQVYCCNELNCGFSAEGYARAKGAAAA

VVTYSVGALSAFDAIGGAYAENLPVILISGAPNNNDHAAGHVLHHALGKTDYHYQLEMAKNITAAAEAIYTP

EEAPAKIDHVIKTALREKKPVYLEIACNIASMPCAAPGPASALFNDEASDEASLNAAVEETLKFIANRDKVA

VLVGSKLRAAGAEEAAVKFADALGGAVATMAAAKSFFPEENPHYIGTSWGEVSYPGVEKTMKEADAVIAL

APVFNDYSTTGWTDIPDPKKLVLAEPRSVVVNGIRFPSVHLKDYLTRLAQKVSKKTGALDFFKSLNAGELK

KAAPADPSAPLVNAEIARQVEALLTPNTTVIAETGDSWFNAQRMKLPNGARVEYEMQWGHIGWSVPAAF

GYAVGAPERRNILMVGDGSFQLTAQEVAQMVRLKLPVIIFLINNYGYTIEVMIHDGPYNNIKNWDYAGLME

VFNGNGGYDSGAGKGLKAKTGGELAEAIKVALANTDGPTLIECFIGREDCTEELVKWGKRVAAANSRKPV

NKLL

ACS1 from *Saccharomyces cerevisiae*

SEQ ID NO: 66

MSPSAVQSSKLEEQSSEIDKLKAKMSQSASTAQQKKEHEYEHLTSVKIVPQRPISDRLQPAIATHYSPHLD

GLQDYQRLHKESIEDPAKFFGSKATQFLNWSKPFDKVFIPDSKTGRPSFQNNAWFLNGQLNACYNCVDR

HALKTPNKKAIIFEGDEPGQGYSITYKELLEEVCQVAQVLTYSMGVRKGDTVAVYMPMVPEAIITLLAISRI

GAIHSVVFAGFSSNSLRDRINDGDSKVVITTDESNRGGKVIETKRIVDDALRETPGVRHVLVYRKTNNPSV

AFHAPRDLDWATEKKKYKTYYPCTPVDSEDPLFLLYTSGSTGAPKGVQHSTAGYLLGALLTMRYTFDTH

QEDVFFTAGDIGWITGHTYVVYGPLLYGCATLVFEGTPAYPNYSRYWDIIDEHKVTQFYVAPTALRLLKRA

GDSYIENHSLKSLRCLGSVGEPIAAEVWEWYSEKIGKNEIPIVDTYWQTESGSHLVTPLAGGVTPMKPGS

ASFPFFGIDAVVLDPNTGEELNTSHAEGVLAVKAAWPSFARTIWKNHDRYLDTYLNPYPGYYFTGDGAAK

DKDGYIWILGRVDDVVNVSGHRLSTAEIEAAIIEDPIVAECAVVGFNDDLTGQAVAAFVVLKNKSNWSTAT

DDELQDIKKHLVFTVRKDIGPFAAPKLIILVDDLPKTRSGKIMRRILRKILAGESDQLGDVSTLSNPGIVRHLI

DSVKL

ALD6 from *Saccharomyces cerevisiae*

SEQ ID NO: 67

MTKLHFDTAEPVKITLPNGLTYEQPTGLFINNKFMKAQDGKTYPVEDPSTENTVCEVSSATTEDVEYAIEC

ADRAFHDTEWATQDPRERGRLLSKLADELESQIDLVSSIEALDNGKTLALARGDVTIAINCLRDAAAYADK

VNGRTINTGDGYMNFTTLEPIGVCGQIIPWNFPIMMLAWKIAPALAMGNVCILKPAAVTPLNALYFASLCKK

VGIPAGVVNIVPGPGRTVGAALTNDPRIRKLAFTGSTEVGKSVAVDSSESNLKKITLELGGKSAHLVFDDA

NIKKTLPNLVNGIFKNAGQICSSGSRIYVQEGIYDELLAAFKAYLETEIKVGNPFDKANFQGAITNRQQFDTI

MNYIDIGKKEGAKILTGGEKVGDKGYFIRPTVFYDVNEDMRIVKEEIFGPVVTVAKFKTLEEGVEMANSSE

FGLGSGIETESLSTGLKVAKMLKAGTVWINTYNDFDSRVPFGGVKQSGYGREMGEEVYHAYTEVKAVRI

KL

ERG10 from *Saccharomyces cerevisiae*

SEQ ID NO: 68

MSQNVYIVSTARTPIGSFQGSLSSKTAVELGAVALKGALAKVPELDASKDFDEIIFGNVLSANLGQAPARQ

VALAAGLSNHIVASTVNKVCASAMKAIILGAQSIKCGNADVVVAGGCESMTNAPYYMPAARAGAKFGQTV

LVDGVERDGLNDAYDGLAMGVHAEKCARDWDITREQQDNFAIESYQKSQKSQKEGKFDNEIVPVTIKGF

```
RGKPDTQVTKDEEPARLHVEKLRSARTVFQKENGTVTAANASPINDGAAAVILVSEKVLKEKNLKPLAIIKG

WGEAAHQPADFTWAPSLAVPKALKHAGIEDINSVDYFEFNEAFSVVGLVNTKILKLDPSKVNVYGGAVAL

GHPLGCSGARVVVTLLSILQQEGGKIGVAAICNGGGGASSIVIEKI
```

ERG13 from *Saccharomyces cerevisiae*

SEQ ID NO: 69

```
MKLSTKLCWCGIKGRLRPQKQQQLHNTNLQMTELKKQKTAEQKTRPQNVGIKGIQIYIPTQCVNQSELEK

FDGVSQGKYTIGLGQTNMSFVNDREDIYSMSLTVLSKLIKSYNIDTNKIGRLEVGTETLIDKSKSVKSVLMQ

LFGENTDVEGIDTLNACYGGTNALFNSLNWIESNAWDGRDAIVVCGDIAIYDKGAARPTGGAGTVAMWIG

PDAPIVFDSVRASYMEHAYDFYKPDFTSEYPYVDGHFSLTCYVKALDQVYKSYSKKAISKGLVSDPAGSD

ALNVLKYFDYNVFHVPTCKLVTKSYGRLLYNDFRANPQLFPEVDAELATRDYDESLTDKNIEKTFVNVAKP

FHKERVAQSLIVPTNTGNMYTASVYAAFASLLNYVGSDDLQGKRVGLFSYGSGLAASLYSCKIVGDVQHII

KELDITNKLAKRITETPKDYEAAIELRENAHLKKNFKPQGSIEHLQSGVYYLTNIDDKFRRSYDVKK
```

HMGR-t from *Saccharomyces cerevisiae*

SEQ ID NO: 70

```
MAADQLVKTEVTKKSFTAPVQKASTPVLTNKTVISGSKVKSLSSAQSSSSGPSSSSEEDDSRDIESLDKKI

RPLEELEALLSSGNTKQLKNKEVAALVIHGKLPLYALEKKLGDTTRAVAVRRKALSILAEAPVLASDRLPYK

NYDYDRVFGACCENVIGYMPLPVGVIGPLVIDGTSYHIPMATTEGCLVASAMRGCKAINAGGGATTVLTK

DGMTRGPVVRFPTLKRSGACKIWLDSEEGQNAIKKAFNSTSRFARLQHIQTCLAGDLLFMRFRTTTGDA

MGMNMISKGVEYSLKQMVEEYGWEDMEVVSVSGNYCTDKKPAAINWIEGRGKSVVAEATIPGDVVRKV

LKSDVSALVELNIAKNLVGSAMAGSVGGFNAHAANLVTAVFLALGQDPAQNVESSNCITLMKEVDGDLRI

SVSMPSIEVGTIGGGTVLEPQGAMLDLLGVRGPHATAPGTNARQLARIVACAVLAGELSLCAALAAGHLV

QSHMTHNRKPAEPTKPNNLDATDINRLKDGSVTCIKS
```

ERG12 from *Saccharomyces cerevisiae*

SEQ ID NO: 71

```
MSLPFLTSAPGKVIIFGEHSAVYNKPAVAASVSALRTYLLISESSAPDTIELDFPDISFNHKWSINDFNAITED

QVNSQKLAKAQQATDGLSQELVSLLDPLLAQLSESFHYHAAFCFLYMFVCLCPHAKNIKFSLKSTLPIGAG

LGSSASISVSLALAMAYLGGLIGSNDLEKLSENDKHIVNQWAFIGEKCIHGTPSGIDNAVATYGNALLFEKD

SHNGTINTNNFKFLDDFPAIPMILTYTRIPRSTKDLVARVRVLVTEKFPEVMKPILDAMGECALQGLEIMTKL

SKCKGTDDEAVETNNELYEQLLELIRINHGLLVSIGVSHPGLELIKNLSDDLRIGSTKLTGAGGGGCSLTLL

RRDITQEQIDSFKKKLQDDFSYETFETDLGGTGCCLLSAKNLNKDLKIKSLVFQLFENKTTTKQQIDDLLLP

GNTNLPWTS
```

ERG8 from *Saccharomyces cerevisiae*

SEQ ID NO: 72

```
MSELRAFSAPGKALLAGGYLVLDPKYEAFVVGLSARMHAVAHPYGSLQESDKFEVRVKSKQFKDGEWL

YHISPKTGFIPVSIGGSKNPFIEKVIANVFSYFKPNMDDYCNRNLFVIDIFSDDAYHSQEDSVTEHRGNRRL

SFHSHRIEEVPKTGLGSSAGLVTVLTTALASFFVSDLENNVDKYREVIHNLSQVAHCQAQGKIGSGFDVAA

AAYGSIRYRRFPPALISNLPDIGSATYGSKLAHLVNEEDWNITIKSNHLPSGLTLWMGDIKNGSETVKLVQK

VKNWYDSHMPESLKIYTELDHANSRFMDGLSKLDRLHETHDDYSDQIFESLERNDCTCQKYPEITEVRDA

VATIRRSFRKITKESGADIEPPVQTSLLDDCQTLKGVLTCLIPGAGGYDAIAVIAKQDVDLRAQTADDKRFS

KVQWLDVTQADWGVRKEKDPETYLDK
```

MVD1 from *Saccharomyces cerevisiae*

SEQ ID NO: 73

```
MTVYTASVTAPVNIATLKYWGKRDTKLNLPTNSSISVTLSQDDLRTLTSAATAPEFERDTLWLNGEPHSID

NERTQNCLRDLRQLRKEMESKDASLPTLSQWKLHIVSENNFPTAAGLASSAAGFAALVSAIAKLYQLPQS

TSEISRIARKGSGSACRSLFGGYVAWEMGKAEDGHDSMAVQIADSSDWPQMKACVLVVSDIKKDVSSTQ
```

-continued

GMQLTVATSELFKERIEHVVPKRFEVMRKAIVEKDFATFAKETMMDSNSFHATCLDSFPPIFYMNDTSKRII

SWCHTINQFYGETIVAYTFDAGPNAVLYYLAENESKLFAFIYKLFGSVPGWDKKFTTEQLEAFNHQFESSN

FTARELDLELQKDVARVILTQVGSGPQETNESLIDAKTGLPKE

IDI1 from Saccharomyces cerevisiae  SEQ ID NO: 74

MTADNNSMPHGAVSSYAKLVQNQTPEDILEEFPEIIPLQQRPNTRSSETSNDESGETCFSGHDEEQIKLM

NENCIVLDWDDNAIGAGTKKVCHLMENIEKGLLHRAFSVFIFNEQGELLLQQRATEKITFPDLWTNTCCSH

PLCIDDELGLKGKLDDKIKGAITAAVRKLDHELGIPEDETKTRGKFHFLNRIHYMAPSNEPWGEHEIDYILFY

KINAKENLTVNPNVNEVRDFKWVSPNDLKTMFADPSYKFTPWFKIICENYLFNWWEQLDDLSEVENDRQI

HRML

GPPS from Streptomyces aculeolatus  SEQ ID NO: 75

MTTEVTSFTGAGPHPAASVRRITDDLLQRVEDKLASFLTAERDRYAAMDERALAAVDALTDLVTSGGKRV

RPTFCITGYLAAGGDAGDPGIVAAAAGLEMLHVSALIHDDILDNSAQRRGKPTIHTLYGDLHDSHGWRGE

SRRFGEGIGILIGNLALVYSQELVCQAPPAVLAEWHRLCSEVNIGQCLDVCAAAEFSADPELSRLVALIKS

GRYTIHRPLVMGANAASRPDLAAAYVEYGEAVGEAFQLRDDLLDAFGDSTETGKPTGLDFTQHKMTLLL

GWAMQRDTHIRTLMTEPGHTPEEVRRRLEDTEVPKDVERHIADLVEQGRAAIADAPIDPQWRQELADMA

VRAAYRTN

What is claimed is:

1. A non-naturally occurring olivetolic acid cyclase (OAC) enzyme having an amino acid sequence that is at least 90% identical to the amino acid sequence of SEQ ID NO: 44, wherein the OAC has one or more amino acid substitutions relative to the amino acid sequence of SEQ ID NO: 44 selected from A2S, L9I, K12S, E14S, V28L, T47R, Q48R, K49R, S87H, F88Y, and L92Y.

2. The non-naturally occurring OAC enzyme of claim 1, wherein the OAC has the amino acid substitution A2S relative to the amino acid sequence of SEQ ID NO: 44.

3. The non-naturally occurring OAC enzyme of claim 1, wherein the OAC has the amino acid substitution L9I relative to the amino acid sequence of SEQ ID NO: 44.

4. The non-naturally occurring OAC enzyme of claim 1, wherein the OAC has the amino acid substitution K12S relative to the amino acid sequence of SEQ ID NO: 44.

5. The non-naturally occurring OAC enzyme of claim 1, wherein the OAC has the amino acid substitution E14S relative to the amino acid sequence of SEQ ID NO: 44.

6. The non-naturally occurring OAC enzyme of claim 1, wherein the OAC has the amino acid substitution F23L relative to the amino acid sequence of SEQ ID NO: 44.

7. The non-naturally occurring OAC enzyme of claim 1, wherein the OAC has the amino acid substitution V28L relative to the amino acid sequence of SEQ ID NO: 44.

8. The non-naturally occurring OAC enzyme of claim 1, wherein the OAC has the amino acid substitution T47R relative to the amino acid sequence of SEQ ID NO: 44.

9. The non-naturally occurring OAC enzyme of claim 1, wherein the OAC has the amino acid substitution Q48R relative to the amino acid sequence of SEQ ID NO: 44.

10. The non-naturally occurring OAC enzyme of claim 1, wherein the OAC has the amino acid substitution K49R relative to the amino acid sequence of SEQ ID NO: 44.

11. The non-naturally occurring OAC enzyme of claim 1, wherein the OAC has the amino acid substitution S87H relative to the amino acid sequence of SEQ ID NO: 44.

12. The non-naturally occurring OAC enzyme of claim 1, wherein the OAC has the amino acid substitution F88Y relative to the amino acid sequence of SEQ ID NO: 44.

13. The non-naturally occurring OAC enzyme of claim 1, wherein the OAC has the amino acid substitution L92Y relative to the amino acid sequence of SEQ ID NO: 44.

14. A non-naturally occurring OAC enzyme having an amino acid sequence that is at least 90% identical to the amino acid sequence of any one of SEQ ID NOs: 45-52.

15. The non-naturally occurring OAC enzyme of claim 14, wherein the OAC enzyme has an amino acid sequence that is at least 95% identical to the amino acid sequence of any one of SEQ ID NOS: 45-52.

16. The non-naturally occurring OAC enzyme of claim 14, wherein the OAC enzyme has an amino acid sequence that comprises the amino acid sequence of any one of SEQ ID NOS: 45-52.

17. The non-naturally occurring OAC enzyme of claim 14, wherein the OAC enzyme has an amino acid sequence that comprises the amino acid sequence of SEQ ID NO: 45.

18. The non-naturally occurring OAC enzyme of claim 1, wherein the non-naturally occurring OAC enzyme is in a yeast cell.

* * * * *

```
                            SEQUENCE LISTING

<160> NUMBER OF SEQ ID NOS: 75

<210> SEQ ID NO 1
<211> LENGTH: 541
<212> TYPE: PRT
<213> ORGANISM: Pseudonocardia sp. N23

<400> SEQUENCE: 1

Met Thr Ala Ala Gln Ala Pro Asp Pro Ala Gly Val Pro Leu Val Glu
1               5                   10                  15

Arg Thr Val Pro Arg Met Leu Ala Arg Ser Ala Ala Leu Asp Pro Asp
            20                  25                  30

Arg Pro Phe Val Val Thr Arg Glu Arg Thr Trp Ser His Thr Asp Ala
        35                  40                  45

His Arg Ile Val Ala Thr Leu Ala Ala Ala Phe Thr Asp Arg Gly Ile
    50                  55                  60

Gly Gln Gly Ser Arg Val Ala Val Met Met Pro Thr Ser Pro Arg His
65                  70                  75                  80

Val Trp Leu Leu Leu Ala Leu Ala His Leu Arg Ala Val Pro Val Ala
                85                  90                  95

Leu Asn Pro Asp Ala Ser Gly Glu Val Leu Arg Tyr Phe Val Ala Asp
            100                 105                 110

Ser Glu Cys Val Leu Gly Val Val Asp Gln Glu Arg Ala Ala Ala Phe
        115                 120                 125

Ala Thr Ala Ala Gly Pro Asp Gly Pro Ala Ile Val Leu Pro Pro
    130                 135                 140

Gly Ala Asp Asp Leu Gly Glu Leu Gly Ser Ala Gly Pro Gly Pro Leu
145                 150                 155                 160

Asp Pro Gly Ala Ala Ser Phe Ser Asp Thr Phe Val Val Leu Tyr Thr
                165                 170                 175

Ser Gly Ser Thr Gly Met Pro Lys Ala Thr Ala Val Thr His Ala Gln
```

```
            180                 185                 190
Val Ile Thr Cys Gly Ala Val Phe Thr Asp Arg Leu Gly Leu Gly Pro
            195                 200                 205

Ala Asp Arg Leu Tyr Thr Cys Leu Pro Leu Phe His Ile Asn Ala Thr
            210                 215                 220

Ala Tyr Ser Leu Ser Gly Ala Leu Val Ser Gly Ala Ser Leu Ala Leu
225                 230                 235                 240

Gly Pro His Phe Ser Ala Thr Thr Phe Trp Asp Val Ala Asp Leu
                245                 250                 255

Gly Ala Thr Glu Val Asn Ala Met Gly Ser Met Val Arg Ile Leu Gln
                260                 265                 270

Ser Arg Pro Pro Arg Pro Ala Glu Arg Ala His Arg Val Arg Thr Met
                275                 280                 285

Phe Val Ala Pro Leu Pro Pro Asp Ala Val Glu Leu Ser Glu Arg Phe
                290                 295                 300

Gly Leu Asp Phe Ala Thr Cys Tyr Ala Gln Thr Glu Trp Leu Pro Ser
305                 310                 315                 320

Ser Met Thr Arg Pro Gly Glu Gly Tyr Gly Arg Pro Gly Ala Thr Gly
                325                 330                 335

Pro Val Leu Pro Trp Thr Glu Val Arg Ile Val Gly Asp Asp Arg
                340                 345                 350

Pro Leu Pro Ala Gly Gln Thr Gly Glu Ile Ile Leu Arg Pro Arg Asp
                355                 360                 365

Pro Tyr Thr Thr Phe Gln Gly Tyr Leu Gly Lys Pro Gln Glu Thr Val
            370                 375                 380

Asp Ala Trp Arg Asn Leu Trp Phe His Thr Gly Asp Leu Gly Asp Ile
385                 390                 395                 400

Gly Pro Asp Gly Trp Leu His Tyr Arg Gly Arg Lys Asp Val Ile
                405                 410                 415

Arg Arg Arg Gly Glu Asn Ile Pro Ala Thr Val Val Glu Asp Leu Leu
                420                 425                 430

Ala Gly His Pro Asp Ile Ala Glu Val Ala Ala Val Ser Val Pro Ala
            435                 440                 445

His Ile Ser Glu Glu Glu Ile Phe Ala Phe Val Val Pro Gly Ala Gly
            450                 455                 460

Ala Ala Leu Thr Thr Ala Asp Val Glu Ala His Ala His Ala Val Leu
465                 470                 475                 480

Pro Arg Tyr Met Val Pro Ser Tyr Leu Ala Leu Val Pro Asp Leu Pro
                485                 490                 495

Arg Thr Ala Thr Asn Lys Ile Ala Lys Val Glu Leu Thr Glu Arg Ala
                500                 505                 510

Arg Ala Ala Val Glu Gly Thr Gly Asp Pro Ala Asp Ala Pro Thr Arg
            515                 520                 525

Thr Ser Ala Ala Asp Arg Val Val Val Pro Ala Ala Glu
            530                 535                 540

<210> SEQ ID NO 2
<211> LENGTH: 548
<212> TYPE: PRT
<213> ORGANISM: Pseudomonas putida

<400> SEQUENCE: 2

Met Met Val Pro Thr Leu Glu His Glu Leu Ala Pro Asn Glu Ala Asn
1               5                   10                  15
```

```
His Val Pro Leu Ser Pro Leu Ser Phe Leu Lys Arg Ala Ala Gln Val
                20                  25                  30

Tyr Pro Gln Arg Asp Ala Val Ile Tyr Gly Ala Arg Tyr Ser Tyr
        35                  40                  45

Arg Gln Leu His Glu Arg Ser Arg Ala Leu Ala Ser Ala Leu Glu Arg
    50                  55                  60

Val Gly Val Gln Pro Gly Glu Arg Val Ala Ile Leu Ala Pro Asn Ile
65                  70                  75                  80

Pro Glu Met Leu Glu Ala His Tyr Gly Val Pro Gly Ala Gly Ala Val
                85                  90                  95

Leu Val Cys Ile Asn Ile Arg Leu Glu Gly Arg Ser Ile Ala Phe Ile
                100                 105                 110

Leu Arg His Cys Ala Ala Lys Val Leu Ile Cys Asp Arg Glu Phe Gly
            115                 120                 125

Ala Val Ala Asn Gln Ala Leu Ala Met Leu Asp Ala Pro Pro Leu Leu
        130                 135                 140

Val Gly Ile Asp Asp Gln Ala Glu Arg Ala Asp Leu Ala His Asp
145                 150                 155                 160

Leu Asp Tyr Glu Ala Phe Leu Ala Gln Gly Asp Pro Ala Arg Pro Leu
                165                 170                 175

Ser Ala Pro Gln Asn Glu Trp Gln Ser Ile Ala Ile Asn Tyr Thr Ser
            180                 185                 190

Gly Thr Thr Gly Asp Pro Lys Gly Val Val Leu His His Arg Gly Ala
        195                 200                 205

Tyr Leu Asn Ala Cys Ala Gly Ala Leu Ile Phe Gln Leu Gly Pro Arg
210                 215                 220

Ser Val Tyr Leu Trp Thr Leu Pro Met Phe His Cys Asn Gly Trp Ser
225                 230                 235                 240

His Thr Trp Ala Val Thr Leu Ser Gly Gly Thr His Val Cys Leu Arg
                245                 250                 255

Lys Val Gln Pro Asp Ala Ile Asn Ala Ala Ile Ala Glu His Ala Val
                260                 265                 270

Thr His Leu Ser Ala Ala Pro Val Val Met Ser Met Leu Ile His Ala
        275                 280                 285

Glu His Ala Ser Ala Pro Pro Val Pro Val Ser Val Ile Thr Gly Gly
    290                 295                 300

Ala Ala Pro Pro Ser Ala Val Ile Ala Ala Met Glu Ala Arg Gly Phe
305                 310                 315                 320

Asn Ile Thr His Ala Tyr Gly Met Thr Glu Ser Tyr Gly Pro Ser Thr
                325                 330                 335

Leu Cys Leu Trp Gln Pro Gly Val Asp Glu Leu Pro Leu Glu Ala Arg
            340                 345                 350

Ala Gln Phe Met Ser Arg Gln Gly Val Ala His Pro Leu Leu Glu Glu
        355                 360                 365

Ala Thr Val Leu Asp Thr Asp Thr Gly Arg Pro Val Pro Ala Asp Gly
    370                 375                 380

Leu Thr Leu Gly Glu Leu Val Val Arg Gly Asn Thr Val Met Lys Gly
385                 390                 395                 400

Tyr Leu His Asn Pro Glu Ala Thr Arg Ala Ala Leu Ala Asn Gly Trp
                405                 410                 415

Leu His Thr Gly Asp Leu Ala Val Leu His Leu Asp Gly Tyr Val Glu
            420                 425                 430

Ile Lys Asp Arg Ala Lys Asp Ile Ile Ile Ser Gly Gly Glu Asn Ile
```

```
                435                 440                 445
Ser Ser Leu Glu Ile Glu Glu Val Leu Tyr Gln His Pro Glu Val Val
    450                 455                 460

Glu Ala Ala Val Val Ala Arg Pro Asp Ser Arg Trp Gly Glu Thr Pro
465                 470                 475                 480

His Ala Phe Val Thr Leu Arg Ala Asp Ala Leu Ala Ser Gly Asp Asp
                485                 490                 495

Leu Val Arg Trp Cys Arg Glu Arg Leu Ala His Phe Lys Ala Pro Arg
                500                 505                 510

His Val Ser Leu Val Asp Leu Pro Lys Thr Ala Thr Gly Lys Ile Gln
                515                 520                 525

Lys Phe Val Leu Arg Glu Trp Ala Arg Gln Gln Glu Ala Gln Ile Ala
530                 535                 540

Asp Ala Glu His
545

<210> SEQ ID NO 3
<211> LENGTH: 549
<212> TYPE: PRT
<213> ORGANISM: Streptomyces sp.ADI96-02

<400> SEQUENCE: 3

Met Leu Ser Thr Met Gln Asp Val Pro Leu Thr Val Thr Arg Ile Leu
1               5                   10                  15

Gln His Gly Met Thr Ile His Gly Lys Ser Gln Val Thr Thr Trp Thr
                20                  25                  30

Gly Glu Pro Glu Pro His Arg Arg Thr Phe Ala Glu Ile Gly Ala Arg
            35                  40                  45

Ala Thr Arg Leu Ala His Ala Leu Arg Asp Glu Leu Gly Ile Asp Gly
    50                  55                  60

Asp Gln Arg Val Ala Thr Leu Met Trp Asn Asn Ala Glu His Val Glu
65                  70                  75                  80

Ala Tyr Leu Ala Val Pro Ser Met Gly Ala Val Leu His Thr Leu Asn
                85                  90                  95

Leu Arg Leu Pro Ala Glu Gln Leu Ile Trp Ile Val Asn His Ala Asp
            100                 105                 110

Asp Lys Val Val Ile Val Asn Gly Ser Leu Leu Pro Leu Leu Val Pro
    115                 120                 125

Leu Leu Pro His Leu Pro Thr Val Glu His Val Val Ser Gly Pro
130                 135                 140

Gly Asp Arg Ser Ala Leu Ala Gly Val Ala Pro Arg Val His Glu Tyr
145                 150                 155                 160

Glu Glu Leu Ile Ala Asp Arg Pro Thr Thr Tyr Asp Trp Pro Glu Leu
                165                 170                 175

Asp Glu Arg Gln Ala Ala Ala Met Cys Tyr Thr Ser Gly Thr Thr Gly
            180                 185                 190

Asp Pro Lys Gly Val Val Tyr Ser His Arg Ser Val Tyr Leu His Ser
    195                 200                 205

Met Gln Val Asn Met Thr Glu Ser Met Gly Leu Thr Asp Lys Asp Thr
210                 215                 220

Thr Leu Val Val Pro Gln Phe His Val Asn Ala Trp Gly Leu Pro
225                 230                 235                 240

His Ala Thr Phe Met Ala Gly Val Asn Met Leu Met Pro Asp Arg Phe
                245                 250                 255
```

-continued

```
Leu Gln Pro Ala Pro Leu Ala Asp Met Ile Glu Arg Glu Arg Pro Thr
                260                 265                 270

His Ala Ala Ala Val Pro Thr Ile Trp Gln Gly Leu Leu Ala Glu Val
            275                 280                 285

Thr Ala His Pro Arg Asp Leu Thr Ser Met Ala Ser Val Thr Ile Gly
        290                 295                 300

Gly Ala Ala Cys Pro Pro Ser Leu Met Glu Ala Tyr Asp Lys Leu Gly
305                 310                 315                 320

Val Arg Leu Cys His Ala Trp Gly Met Thr Glu Thr Ser Pro Leu Gly
                325                 330                 335

Thr Met Ala Asn Pro Pro Ala Gly Leu Ser Ala Glu Glu Trp Pro
            340                 345                 350

Tyr Arg Val Thr Gln Gly Arg Phe Pro Ala Gly Val Glu Ala Arg Leu
        355                 360                 365

Val Gly Pro Ala Gly Asp His Leu Pro Trp Asp Gly Arg Ser Ala Gly
370                 375                 380

Glu Leu Glu Val Arg Gly Ala Trp Ile Ala Gly Ala Tyr Tyr Gly Gly
385                 390                 395                 400

Ala Asp Gly Glu His Leu Arg Pro Glu Asp Lys Phe Ser Ala Asp Gly
                405                 410                 415

Trp Leu Lys Thr Gly Asp Val Gly Val Ile Ser Ala Asp Gly Phe Leu
            420                 425                 430

Thr Leu Thr Asp Arg Ala Lys Asp Val Ile Lys Ser Gly Gly Glu Trp
        435                 440                 445

Ile Ser Ser Val Glu Leu Glu Asn Ala Leu Met Ala His Pro Asp Val
450                 455                 460

Ala Glu Ala Ala Val Val Ala Val Pro Asp Glu Lys Trp Gly Glu Arg
465                 470                 475                 480

Pro Leu Ala Thr Val Val Leu Lys Glu Gly Ala Glu Val Gly Tyr Glu
                485                 490                 495

Ala Leu Lys Val Phe Leu Ala Asp Ser Gly Ile Ala Lys Trp Gln Leu
            500                 505                 510

Pro Glu Arg Trp Thr Val Ile Pro Ala Val Pro Lys Thr Ser Val Gly
        515                 520                 525

Lys Phe Asp Lys Lys Val Ile Arg Lys Gln Tyr Ala Asp Gly Glu Leu
530                 535                 540

Asp Ile Thr Gln Leu
545
```

```
<210> SEQ ID NO 4
<211> LENGTH: 560
<212> TYPE: PRT
<213> ORGANISM: Erythrobacter citreus LAMA 915

<400> SEQUENCE: 4

Met Ser Arg Ala Glu Cys Arg Asp Arg Leu Thr Ala Pro Gly Glu Arg
1               5                   10                  15

Phe Glu Ile Glu Thr Ile Asp Ile Arg Gly Val Pro Thr Arg Val Trp
                20                  25                  30

Lys His Ala Pro Thr Asn Met Arg Gln Val Ala Met Ala Ala Arg Thr
            35                  40                  45

His Gly Asp Arg Leu Phe Ala Ile Tyr Glu Asp Glu Arg Val Thr Tyr
        50                  55                  60

Glu Ala Trp Phe Arg Ala Val Ala Arg Met Ala Ala Glu Leu Arg Glu
65                  70                  75                  80
```

```
Arg Gly Val Ala Lys Gly Asp Arg Val Ala Leu Ala Met Arg Asn Leu
                85                  90                  95

Pro Glu Trp Pro Val Ala Phe Phe Ala Ala Thr Thr Ile Gly Ala Ile
            100                 105                 110

Cys Val Pro Leu Asn Ala Trp Trp Thr Gly Pro Glu Leu Ala Phe Gly
        115                 120                 125

Leu Ala Asn Ser Gly Ala Lys Leu Leu Val Cys Asp Ala Glu Arg Trp
130                 135                 140

Glu Arg Ile Ala Pro His Arg Gly Glu Leu Pro Asp Leu Glu His Ala
145                 150                 155                 160

Leu Val Ser Arg Ser Asp Ala Pro Leu Glu Gly Ala Glu Gln Leu Glu
                165                 170                 175

Asp Leu Leu Gly Thr Pro Lys Asp Tyr Ala Ala Leu Pro Ser Ala Ala
            180                 185                 190

Leu Pro Gln Val Asp Ile Asp Pro Glu Asp Glu Ala Thr Ile Phe Tyr
        195                 200                 205

Thr Ser Gly Thr Thr Gly Gln Pro Lys Gly Ala Leu Gly Thr His Arg
    210                 215                 220

Asn Leu Cys Thr Asn Ile Met Ser Ser Ala Tyr Asn Gly Ala Ile Ala
225                 230                 235                 240

Phe Leu Arg Arg Gly Glu Glu Pro Pro Ala Pro Val Gln Lys Val Gly
                245                 250                 255

Leu Thr Val Ile Pro Leu Phe His Val Thr Ala Cys Ser Ala Gly Leu
            260                 265                 270

Met Gly Tyr Val Val Ala Gly His Thr Met Val Phe Met His Lys Trp
        275                 280                 285

Asp Pro Val Lys Ala Phe Gln Leu Ile Glu Arg Glu Lys Val Asn Leu
    290                 295                 300

Thr Gly Gly Val Pro Thr Ile Ala Trp Gln Leu Leu Glu His Pro Glu
305                 310                 315                 320

Arg Ala Asn Tyr Asp Leu Ser Ser Leu Glu Ala Val Ala Tyr Gly Gly
                325                 330                 335

Ala Pro Ala Ala Pro Glu Leu Val Arg Lys Ile His Glu Glu Phe Gly
            340                 345                 350

Ala Leu Pro Ala Asn Gly Trp Gly Met Thr Glu Thr Met Ala Thr Val
        355                 360                 365

Thr Gly His Ser Ser Glu Asp Tyr Leu Asn Arg Pro Asp Ser Cys Gly
    370                 375                 380

Pro Pro Val Ala Val Ala Asp Leu Lys Ile Val Gly Asp Asp Gly Val
385                 390                 395                 400

Thr Glu Leu Pro Val Gly Glu Val Gly Glu Leu Trp Ala Arg Gly Pro
                405                 410                 415

Met Val Val Lys Gly Tyr Trp Asn Arg Pro Glu Ala Thr Ala Glu Thr
            420                 425                 430

Phe Val Asp Gly Trp Val Arg Thr Gly Asp Leu Ala Arg Leu Asp Glu
        435                 440                 445

Glu Gly Trp Cys Tyr Ile Val Asp Arg Ala Lys Asp Met Ile Ile Arg
    450                 455                 460

Gly Gly Glu Asn Ile Tyr Ser Ser Glu Val Glu Asn Val Leu Tyr Asp
465                 470                 475                 480

His Pro Ala Val Thr Asp Ala Ala Leu Val Ala Ile Ala His Pro Thr
                485                 490                 495
```

```
Leu Gly Glu Glu Pro Ala Ala Val Val His Leu Ala Pro Gly Met Ser
                500                 505                 510

Ala Thr Glu Asp Glu Leu Arg Glu Trp Val Ala Ala Arg Leu Ala Lys
                515                 520                 525

Phe Lys Val Pro Val Arg Ile Ala Phe Val Gln Asp Thr Leu Pro Arg
                530                 535                 540

Asn Ala Asn Gly Lys Ile Leu Lys Lys Asp Leu Gly Ala Phe Phe Ala
545                 550                 555                 560

<210> SEQ ID NO 5
<211> LENGTH: 700
<212> TYPE: PRT
<213> ORGANISM: Saccharomyces cerevisiae

<400> SEQUENCE: 5

Met Val Ala Gln Tyr Thr Val Pro Val Gly Lys Ala Ala Asn Glu His
1               5                   10                  15

Glu Thr Ala Pro Arg Arg Asn Tyr Gln Cys Arg Glu Lys Pro Leu Val
                20                  25                  30

Arg Pro Pro Asn Thr Lys Cys Ser Thr Val Tyr Glu Phe Val Leu Glu
            35                  40                  45

Cys Phe Gln Lys Asn Lys Asn Ser Asn Ala Met Gly Trp Arg Asp Val
        50                  55                  60

Lys Glu Ile His Glu Glu Ser Lys Ser Val Met Lys Lys Val Asp Gly
65                  70                  75                  80

Lys Glu Thr Ser Val Glu Lys Lys Trp Met Tyr Tyr Glu Leu Ser His
                85                  90                  95

Tyr His Tyr Asn Ser Phe Asp Gln Leu Thr Asp Ile Met His Glu Ile
                100                 105                 110

Gly Arg Gly Leu Val Lys Ile Gly Leu Lys Pro Asn Asp Asp Asp Lys
            115                 120                 125

Leu His Leu Tyr Ala Ala Thr Ser His Lys Trp Met Lys Met Phe Leu
        130                 135                 140

Gly Ala Gln Ser Gln Gly Ile Pro Val Val Thr Ala Tyr Asp Thr Leu
145                 150                 155                 160

Gly Glu Lys Gly Leu Ile His Ser Leu Val Gln Thr Gly Ser Lys Ala
                165                 170                 175

Ile Phe Thr Asp Asn Ser Leu Leu Pro Ser Leu Ile Lys Pro Val Gln
                180                 185                 190

Ala Ala Gln Asp Val Lys Tyr Ile Ile His Phe Asp Ser Ile Ser Ser
            195                 200                 205

Glu Asp Arg Arg Gln Ser Gly Lys Ile Tyr Gln Ser Ala His Asp Ala
        210                 215                 220

Ile Asn Arg Ile Lys Glu Val Arg Pro Asp Ile Lys Thr Phe Ser Phe
225                 230                 235                 240

Asp Asp Ile Leu Lys Leu Gly Lys Glu Ser Cys Asn Glu Ile Asp Val
                245                 250                 255

His Pro Pro Gly Lys Asp Asp Leu Cys Cys Ile Met Tyr Thr Ser Gly
                260                 265                 270

Ser Thr Gly Glu Pro Lys Gly Val Val Leu Lys His Ser Asn Val Val
            275                 280                 285

Ala Gly Val Gly Gly Ala Ser Leu Asn Val Leu Lys Phe Val Gly Asn
        290                 295                 300

Thr Asp Arg Val Ile Cys Phe Leu Pro Leu Ala His Ile Phe Glu Leu
305                 310                 315                 320
```

```
Val Phe Glu Leu Leu Ser Phe Tyr Trp Gly Ala Cys Ile Gly Tyr Ala
                325                 330                 335

Thr Val Lys Thr Leu Thr Ser Ser Val Arg Asn Cys Gln Gly Asp
        340                 345                 350

Leu Gln Glu Phe Lys Pro Thr Ile Met Val Gly Val Ala Ala Val Trp
            355                 360                 365

Glu Thr Val Arg Lys Gly Ile Leu Asn Gln Ile Asp Asn Leu Pro Phe
370                 375                 380

Leu Thr Lys Lys Ile Phe Trp Thr Ala Tyr Asn Thr Lys Leu Asn Met
385                 390                 395                 400

Gln Arg Leu His Ile Pro Gly Gly Ala Leu Gly Asn Leu Val Phe
                405                 410                 415

Lys Lys Ile Arg Thr Ala Thr Gly Gly Gln Leu Arg Tyr Leu Leu Asn
            420                 425                 430

Gly Gly Ser Pro Ile Ser Arg Asp Ala Gln Glu Phe Ile Thr Asn Leu
                435                 440                 445

Ile Cys Pro Met Leu Ile Gly Tyr Gly Leu Thr Glu Thr Cys Ala Ser
            450                 455                 460

Thr Thr Ile Leu Asp Pro Ala Asn Phe Glu Leu Gly Val Ala Gly Asp
465                 470                 475                 480

Leu Thr Gly Cys Val Thr Val Lys Leu Val Asp Val Glu Glu Leu Gly
                485                 490                 495

Tyr Phe Ala Lys Asn Asn Gln Gly Glu Val Trp Ile Thr Gly Ala Asn
                500                 505                 510

Val Thr Pro Glu Tyr Tyr Lys Asn Glu Glu Thr Ser Gln Ala Leu
            515                 520                 525

Thr Ser Asp Gly Trp Phe Lys Thr Gly Asp Ile Gly Glu Trp Glu Ala
            530                 535                 540

Asn Gly His Leu Lys Ile Ile Asp Arg Lys Lys Asn Leu Val Lys Thr
545                 550                 555                 560

Met Asn Gly Glu Tyr Ile Ala Leu Glu Lys Leu Glu Ser Val Tyr Arg
                565                 570                 575

Ser Asn Glu Tyr Val Ala Asn Ile Cys Val Tyr Ala Asp Gln Ser Lys
                580                 585                 590

Thr Lys Pro Val Gly Ile Ile Val Pro Asn His Ala Pro Leu Thr Lys
            595                 600                 605

Leu Ala Lys Lys Leu Gly Ile Met Glu Gln Lys Asp Ser Ser Ile Asn
610                 615                 620

Ile Glu Asn Tyr Leu Glu Asp Ala Lys Leu Ile Lys Ala Val Tyr Ser
625                 630                 635                 640

Asp Leu Leu Lys Thr Gly Lys Asp Gln Gly Leu Val Gly Ile Glu Leu
                645                 650                 655

Leu Ala Gly Ile Val Phe Phe Asp Gly Glu Trp Thr Pro Gln Asn Gly
                660                 665                 670

Phe Val Thr Ser Ala Gln Lys Leu Lys Arg Lys Asp Ile Leu Asn Ala
            675                 680                 685

Val Lys Asp Lys Val Asp Ala Val Tyr Ser Ser Ser
690                 695                 700

<210> SEQ ID NO 6
<211> LENGTH: 720
<212> TYPE: PRT
<213> ORGANISM: Cannabis sativa
```

```
<400> SEQUENCE: 6

Met Gly Lys Asn Tyr Lys Ser Leu Asp Ser Val Ala Ser Asp Phe
1               5                  10                 15

Ile Ala Leu Gly Ile Thr Ser Glu Val Ala Glu Thr Leu His Gly Arg
                20                 25                 30

Leu Ala Glu Ile Val Cys Asn Tyr Gly Ala Ala Thr Pro Gln Thr Trp
            35                 40                 45

Ile Asn Ile Ala Asn His Ile Leu Ser Pro Asp Leu Pro Phe Ser Leu
        50                 55                 60

His Gln Met Leu Phe Tyr Gly Cys Tyr Lys Asp Phe Gly Pro Ala Pro
65                  70                 75                 80

Pro Ala Trp Ile Pro Asp Pro Glu Lys Val Lys Ser Thr Asn Leu Gly
                85                 90                 95

Ala Leu Leu Glu Lys Arg Gly Lys Glu Phe Leu Gly Val Lys Tyr Lys
            100                105                110

Asp Pro Ile Ser Ser Phe Ser His Phe Gln Glu Phe Ser Val Arg Asn
        115                120                125

Pro Glu Val Tyr Trp Arg Thr Val Leu Met Asp Glu Met Lys Ile Ser
130                 135                140

Phe Ser Lys Asp Pro Glu Cys Ile Leu Arg Arg Asp Asp Ile Asn Asn
145                 150                155                160

Pro Gly Gly Ser Glu Trp Leu Pro Gly Gly Tyr Leu Asn Ser Ala Lys
                165                170                175

Asn Cys Leu Asn Val Asn Ser Asn Lys Lys Leu Asn Asp Thr Met Ile
            180                185                190

Val Trp Arg Asp Glu Gly Asn Asp Asp Leu Pro Leu Asn Lys Leu Thr
        195                200                205

Leu Asp Gln Leu Arg Lys Arg Val Trp Leu Val Gly Tyr Ala Leu Glu
210                 215                220

Glu Met Gly Leu Glu Lys Gly Cys Ala Ile Ala Ile Asp Met Pro Met
225                 230                235                240

His Val Asp Ala Val Val Ile Tyr Leu Ala Ile Val Leu Ala Gly Tyr
                245                250                255

Val Val Val Ser Ile Ala Asp Ser Phe Ser Ala Pro Glu Ile Ser Thr
            260                265                270

Arg Leu Arg Leu Ser Lys Ala Lys Ala Ile Phe Thr Gln Asp His Ile
        275                280                285

Ile Arg Gly Lys Lys Arg Ile Pro Leu Tyr Ser Arg Val Val Glu Ala
290                 295                300

Lys Ser Pro Met Ala Ile Val Ile Pro Cys Ser Gly Ser Asn Ile Gly
305                 310                315                320

Ala Glu Leu Arg Asp Gly Asp Ile Ser Trp Asp Tyr Phe Leu Glu Arg
                325                330                335

Ala Lys Glu Phe Lys Asn Cys Glu Phe Thr Ala Arg Glu Gln Pro Val
            340                345                350

Asp Ala Tyr Thr Asn Ile Leu Phe Ser Ser Gly Thr Thr Gly Glu Pro
        355                360                365

Lys Ala Ile Pro Trp Thr Gln Ala Thr Pro Leu Lys Ala Ala Ala Asp
370                 375                380

Gly Trp Ser His Leu Asp Ile Arg Lys Gly Asp Val Ile Val Trp Pro
385                 390                395                400

Thr Asn Leu Gly Trp Met Met Gly Pro Trp Leu Val Tyr Ala Ser Leu
                405                410                415
```

```
Leu Asn Gly Ala Ser Ile Ala Leu Tyr Asn Gly Ser Pro Leu Val Ser
                420                 425                 430

Gly Phe Ala Lys Phe Val Gln Asp Ala Lys Val Thr Met Leu Gly Val
            435                 440                 445

Val Pro Ser Ile Val Arg Ser Trp Lys Ser Thr Asn Cys Val Ser Gly
        450                 455                 460

Tyr Asp Trp Ser Thr Ile Arg Cys Phe Ser Ser Gly Glu Ala Ser
465             470                 475                 480

Asn Val Asp Glu Tyr Leu Trp Leu Met Gly Arg Ala Asn Tyr Lys Pro
                485                 490                 495

Val Ile Glu Met Cys Gly Gly Thr Glu Ile Gly Gly Ala Phe Ser Ala
            500                 505                 510

Gly Ser Phe Leu Gln Ala Gln Ser Leu Ser Ser Phe Ser Ser Gln Cys
        515                 520                 525

Met Gly Cys Thr Leu Tyr Ile Leu Asp Lys Asn Gly Tyr Pro Met Pro
        530                 535                 540

Lys Asn Lys Pro Gly Ile Gly Glu Leu Ala Leu Gly Pro Val Met Phe
545                 550                 555                 560

Gly Ala Ser Lys Thr Leu Leu Asn Gly Asn His His Asp Val Tyr Phe
                565                 570                 575

Lys Gly Met Pro Thr Leu Asn Gly Glu Val Leu Arg Arg His Gly Asp
            580                 585                 590

Ile Phe Glu Leu Thr Ser Asn Gly Tyr Tyr His Ala His Gly Arg Ala
        595                 600                 605

Asp Asp Thr Met Asn Ile Gly Ile Lys Ile Ser Ser Ile Glu Ile
        610                 615                 620

Glu Arg Val Cys Asn Glu Val Asp Asp Arg Val Phe Glu Thr Thr Ala
625                 630                 635                 640

Ile Gly Val Pro Pro Leu Gly Gly Pro Glu Gln Leu Val Ile Phe
                645                 650                 655

Phe Val Leu Lys Asp Ser Asn Asp Thr Thr Ile Asp Leu Asn Gln Leu
            660                 665                 670

Arg Leu Ser Phe Asn Leu Gly Leu Gln Lys Lys Leu Asn Pro Leu Phe
        675                 680                 685

Lys Val Thr Arg Val Val Pro Leu Ser Ser Leu Pro Arg Thr Ala Thr
        690                 695                 700

Asn Lys Ile Met Arg Arg Val Leu Arg Gln Gln Phe Ser His Phe Glu
705                 710                 715                 720

<210> SEQ ID NO 7
<211> LENGTH: 665
<212> TYPE: PRT
<213> ORGANISM: Citreicella sp. SE45

<400> SEQUENCE: 7

Met Ser Leu Ala Ala Asp Asn Val Leu Leu Val Glu Glu Gly Arg Pro
1               5                   10                  15

Ala Thr Ala Glu His Pro Ser Ala Gly Pro Val Tyr Arg Cys Lys Tyr
                20                  25                  30

Ala Lys Asp Gly Leu Leu Asp Leu Pro Thr Asp Ile Ser Pro Trp
            35                  40                  45

Gln Phe Phe Ser Glu Ala Val Lys Lys Tyr Pro Asn Glu Gln Met Leu
        50                  55                  60

Gly Gln Arg Val Thr Thr Asp Ser Lys Val Gly Pro Tyr Thr Trp Ile
```

```
                65                  70                  75                  80
        Thr Tyr Lys Glu Ala His Asp Ala Ala Ile Arg Ile Gly Ser Ala Ile
                            85                  90                  95

Arg Ser Arg Gly Val Asp Pro Gly His Cys Cys Gly Ile Tyr Gly Ala
                            100                 105                 110

Asn Cys Pro Glu Trp Ile Ile Ala Met Glu Ala Cys Met Ser Gln Gly
                            115                 120                 125

Ile Thr Tyr Val Pro Leu Tyr Asp Ser Leu Gly Val Asn Ala Val Glu
                    130                 135                 140

Phe Ile Ile Asn His Ala Glu Val Ser Leu Val Phe Val Gln Glu Lys
        145                 150                 155                 160

Thr Val Ser Ser Ile Leu Ser Cys Gln Lys Gly Cys Ser Ser Asn Leu
                            165                 170                 175

Lys Thr Ile Val Ser Phe Gly Glu Val Ser Ser Thr Gln Lys Glu Glu
                            180                 185                 190

Ala Lys Asn Gln Cys Val Ser Leu Phe Ser Trp Asn Glu Phe Ser Leu
                            195                 200                 205

Met Gly Asn Leu Asp Glu Ala Asn Leu Pro Arg Lys Arg Lys Thr Asp
                    210                 215                 220

Ile Cys Thr Ile Met Tyr Thr Ser Gly Thr Thr Gly Glu Pro Lys Gly
        225                 230                 235                 240

Val Ile Leu Asn Asn Ala Ala Ile Ser Val Gln Val Leu Ser Ile Asp
                            245                 250                 255

Lys Met Leu Glu Val Thr Asp Arg Ser Cys Asp Thr Ser Asp Val Phe
                            260                 265                 270

Phe Ser Tyr Leu Pro Leu Ala His Cys Tyr Asp Gln Val Met Glu Ile
                    275                 280                 285

Tyr Phe Leu Ser Arg Gly Ser Ser Val Gly Tyr Trp Arg Gly Asp Ile
                    290                 295                 300

Arg Tyr Leu Met Asp Asp Val Gln Ala Leu Lys Pro Thr Val Phe Cys
        305                 310                 315                 320

Gly Val Pro Arg Val Tyr Asp Lys Leu Tyr Ala Gly Ile Met Gln Lys
                            325                 330                 335

Ile Ser Ala Ser Gly Leu Ile Arg Lys Lys Leu Phe Asp Phe Ala Tyr
                            340                 345                 350

Asn Tyr Lys Leu Gly Asn Met Arg Lys Gly Phe Ser Gln Glu Glu Ala
                            355                 360                 365

Ser Pro Arg Leu Asp Arg Leu Met Phe Asp Lys Ile Lys Glu Ala Leu
                    370                 375                 380

Gly Gly Arg Ala His Met Leu Leu Ser Gly Ala Ala Pro Leu Pro Arg
        385                 390                 395                 400

His Val Glu Glu Phe Leu Arg Ile Ile Pro Ala Ser Asn Leu Ser Gln
                            405                 410                 415

Gly Tyr Gly Leu Thr Glu Ser Cys Gly Gly Ser Phe Thr Thr Leu Ala
                    420                 425                 430

Gly Val Phe Ser Met Val Gly Thr Val Gly Val Pro Met Pro Thr Val
                    435                 440                 445

Glu Ala Arg Leu Val Ser Val Pro Glu Met Gly Tyr Asp Ala Phe Ser
        450                 455                 460

Ala Asp Val Pro Arg Gly Glu Ile Cys Leu Arg Gly Asn Ser Met Phe
        465                 470                 475                 480

Ser Gly Tyr His Lys Arg Gln Asp Leu Thr Asp Gln Val Leu Ile Asp
                    485                 490                 495
```

-continued

```
Gly Trp Phe His Thr Gly Asp Ile Gly Glu Trp Gln Glu Asp Gly Ser
                500                 505                 510

Met Lys Ile Ile Asp Arg Lys Asn Ile Phe Lys Leu Ser Gln Gly
    515                 520                 525

Glu Tyr Val Ala Val Glu Asn Leu Glu Asn Thr Tyr Ser Arg Cys Pro
    530                 535                 540

Leu Ile Ala Gln Ile Trp Val Tyr Gly Asn Ser Phe Glu Ser Phe Leu
545                 550                 555                 560

Val Gly Val Val Val Pro Asp Arg Lys Ala Ile Glu Asp Trp Ala Lys
                565                 570                 575

Leu Asn Tyr Gln Ser Pro Asn Asp Phe Glu Ser Leu Cys Gln Asn Leu
                580                 585                 590

Lys Ala Gln Lys Tyr Phe Leu Asp Glu Leu Asn Ser Thr Ala Lys Gln
                595                 600                 605

Tyr Gln Leu Lys Gly Phe Glu Met Leu Lys Ala Ile His Leu Glu Pro
                610                 615                 620

Asn Pro Phe Asp Ile Glu Arg Asp Leu Ile Thr Pro Thr Phe Lys Leu
625                 630                 635                 640

Lys Arg Pro Gln Leu Leu Gln His Tyr Lys Gly Ile Val Asp Gln Leu
                645                 650                 655

Tyr Ser Glu Ala Lys Arg Ser Met Ala
                660                 665

<210> SEQ ID NO 8
<211> LENGTH: 572
<212> TYPE: PRT
<213> ORGANISM: Bacillus subtilis (strain 168)

<400> SEQUENCE: 8

Met Asp Asn Leu Val Leu Cys Glu Ala Asn Asn Val Pro Leu Thr Pro
1               5                   10                  15

Ile Thr Phe Leu Lys Arg Ala Ser Glu Cys Tyr Pro Asn Arg Thr Ser
                20                  25                  30

Ile Ile Tyr Gly Gln Thr Arg Phe Thr Trp Pro Gln Thr Tyr Asp Arg
            35                  40                  45

Cys Cys Arg Leu Ala Ala Ser Leu Leu Ser Leu Asn Ile Thr Arg Asn
    50                  55                  60

Asp Val Val Ser Ile Leu Ala Pro Asn Val Pro Ala Met Tyr Glu Met
65                  70                  75                  80

His Phe Ser Val Pro Met Thr Gly Ala Val Leu Asn Pro Ile Asn Thr
                85                  90                  95

Arg Leu Asp Ala Lys Thr Ile Ala Ile Leu Arg His Ala Glu Pro
                100                 105                 110

Lys Ile Leu Phe Val Asp Tyr Glu Phe Ala Pro Leu Ile Gln Glu Val
            115                 120                 125

Leu Arg Leu Ile Pro Thr Tyr Gln Ser Gln Pro His Pro Arg Ile Ile
    130                 135                 140

Leu Ile Asn Glu Ile Asp Ser Thr Thr Lys Pro Phe Ser Lys Glu Leu
145                 150                 155                 160

Asp Tyr Glu Gly Leu Ile Arg Lys Gly Glu Pro Thr Pro Ser Ser Ser
                165                 170                 175

Ala Ser Met Phe Arg Val His Asn Glu His Asp Pro Ile Ser Leu Asn
                180                 185                 190

Tyr Thr Ser Gly Thr Thr Ala Asp Pro Lys Gly Val Val Ile Ser His
```

```
                195                 200                 205
Gln Gly Ala Tyr Leu Ser Ala Leu Ser Ser Ile Ile Gly Trp Glu Met
210                 215                 220

Gly Ile Phe Pro Val Tyr Leu Trp Thr Leu Pro Met Phe His Cys Asn
225                 230                 235                 240

Gly Trp Thr His Thr Trp Ser Val Ala Ala Arg Gly Gly Thr Asn Val
                    245                 250                 255

Cys Ile Arg His Val Thr Ala Pro Glu Ile Tyr Lys Asn Ile Glu Leu
                260                 265                 270

His Gly Val Thr His Met Ser Cys Val Pro Thr Val Phe Arg Phe Leu
                275                 280                 285

Leu Glu Gly Ser Arg Thr Asp Gln Ser Pro Lys Ser Ser Pro Val Gln
290                 295                 300

Val Leu Thr Gly Gly Ser Ser Pro Ala Val Leu Ile Lys Lys Val
305                 310                 315                 320

Glu Gln Leu Gly Phe His Val Met His Gly Tyr Gly Leu Thr Glu Ala
                325                 330                 335

Thr Gly Pro Val Leu Phe Cys Glu Trp Gln Asp Glu Trp Asn Lys Leu
                340                 345                 350

Pro Glu His Gln Gln Ile Glu Leu Gln Gln Arg Gln Gly Val Arg Asn
                355                 360                 365

Leu Thr Leu Ala Asp Val Asp Val Lys Asn Thr Lys Thr Leu Glu Ser
370                 375                 380

Val Pro Arg Asp Gly Lys Thr Met Gly Glu Ile Val Ile Lys Gly Ser
385                 390                 395                 400

Ser Leu Met Lys Gly Tyr Leu Lys Asn Pro Lys Ala Thr Ser Glu Ala
                405                 410                 415

Phe Lys His Gly Trp Leu Asn Thr Gly Asp Ile Gly Val Ile His Pro
                420                 425                 430

Asp Gly Tyr Val Glu Ile Lys Asp Arg Ser Lys Asp Ile Ile Ser
                435                 440                 445

Gly Gly Glu Asn Ile Ser Ser Ile Glu Val Glu Lys Val Leu Tyr Met
450                 455                 460

Tyr Gln Glu Val Leu Glu Ala Ala Val Val Ala Met Pro His Pro Leu
465                 470                 475                 480

Trp Gly Glu Thr Pro Cys Ala Phe Val Val Leu Lys Lys Gly Glu Glu
                485                 490                 495

Gly Leu Val Thr Ser Glu Gly Asp Leu Ile Lys Tyr Cys Arg Glu Asn
                500                 505                 510

Met Pro His Phe Met Cys Pro Lys Lys Val Val Phe Phe Gln Glu Leu
                515                 520                 525

Pro Lys Asn Ser Asn Gly Lys Ile Leu Lys Ser Lys Leu Arg Asp Ile
                530                 535                 540

Ala Lys Ala Leu Val Val Arg Glu Asp Asp Ala Gly Ser Lys Lys Val
545                 550                 555                 560

His Gln Arg Ser Ile Glu His Val Ser Ser Arg Leu
                565                 570

<210> SEQ ID NO 9
<211> LENGTH: 504
<212> TYPE: PRT
<213> ORGANISM: Bhargavaea cecembensis DSE10

<400> SEQUENCE: 9
```

```
Met Tyr Thr Asp His Gly Trp Ile Met Lys Arg Ala Asp Ile Thr Pro
1               5                   10                  15

Asp Gly Thr Ala Leu Ile Asp Val His Thr Gly Gln Arg Trp Thr Tyr
            20                  25                  30

Arg Glu Leu Ala Gly Arg Thr Ala Ala Tyr Met Glu Gln Phe Arg Ser
            35                  40                  45

Ala Gly Leu Arg Lys Gly Glu Arg Val Ala Val Leu Ser His Asn Arg
        50                  55                  60

Ile Asp Leu Phe Ala Val Leu Phe Ala Cys Ala Gly Arg Gly Leu Ile
65                  70                  75                  80

Tyr Val Pro Met Asn Trp Arg Leu Ser Glu Ser Glu Leu Arg Tyr Ile
                85                  90                  95

Val Ser Asp Ser Gly Pro Ser Leu Leu Leu His Asp His Glu His Ala
            100                 105                 110

Gly Arg Ala Ala Gly Leu Gly Ile Pro Ala Ala Leu Leu Asp Ser Val
        115                 120                 125

Pro Ala Thr Ser Val Asn Leu Arg Thr Glu Gln Ala Ala Gly Arg Leu
        130                 135                 140

Asp Asp Pro Trp Met Met Ile Tyr Thr Gly Gly Thr Thr Gly Arg Pro
145                 150                 155                 160

Lys Gly Val Val Leu Thr Phe Glu Ser Val Asn Trp Asn Ala Ile Asn
                165                 170                 175

Thr Ile Ile Ser Trp Asn Leu Ser Ala Arg Asp Cys Thr Leu Asn Tyr
            180                 185                 190

Met Pro Leu Phe His Thr Gly Gly Leu Asn Ala Leu Ser Leu Pro Ile
        195                 200                 205

Leu Met Ala Gly Gly Thr Val Val Ile Gly Arg Lys Phe Asp Pro Glu
210                 215                 220

Glu Ala Ile Arg Ala Leu Asn Asp Tyr Arg Thr Thr Ile Ser Leu Phe
225                 230                 235                 240

Val Pro Thr Met His Gln Ala Met Leu Asp Thr Asp Leu Phe Trp Glu
            245                 250                 255

Ser Asp Phe Pro Thr Val Asp Val Phe Leu Ser Gly Gly Ala Pro Cys
            260                 265                 270

Pro Gln Thr Val Tyr Asp Ala Tyr Arg Lys Lys Gly Val Arg Phe Arg
        275                 280                 285

Glu Gly Tyr Gly Met Thr Glu Ala Gly Pro Asn Asn Phe Ile Ile Asp
        290                 295                 300

Pro Asp Thr Ala Met Arg Lys Arg Gly Ala Val Gly Lys Ser Met Gln
305                 310                 315                 320

Phe Asn Glu Val Arg Ile Leu Asp Ala Lys Gly Arg Pro Cys Arg Ala
                325                 330                 335

Gly Glu Val Gly Glu Leu His Leu Arg Gly Arg His Leu Phe Ser His
            340                 345                 350

Tyr Trp Asn Asn Glu Glu Ala Thr Gln Glu Ala Leu Lys Glu Gly Trp
        355                 360                 365

Phe Ser Thr Gly Asp Leu Ala Ser Arg Asp Glu Asp Gly Asp Tyr Phe
        370                 375                 380

Ile Val Gly Arg Lys Lys Glu Met Ile Ile Ser Gly Gly Glu Asn Ile
385                 390                 395                 400

Tyr Pro Gln Glu Val Glu Gln Cys Leu Ile Gly His Asp Gly Val Arg
            405                 410                 415

Glu Ile Ala Val Ile Gly Ile Ala Asp Arg Lys Trp Gly Glu Arg Val
```

```
                420                 425                 430
Val Ala Phe Ile Val Ala Gln Pro Gly Asn Ile Pro Lys Thr Glu Glu
            435                 440                 445

Leu Leu Lys His Cys Ala Gln Thr Leu Gly Ser Tyr Lys Val Pro Lys
        450                 455                 460

Asp Phe Phe Val Gln Glu Leu Pro Ile Thr Asp Ile Gly Lys Ile
465                 470                 475                 480

Asp Lys Lys Gln Leu Ala Ile Met Ala Glu Glu Leu Lys Lys Glu Glu
                485                 490                 495

Met Gln His Pro Gly Gln Ser Gly
            500

<210> SEQ ID NO 10
<211> LENGTH: 694
<212> TYPE: PRT
<213> ORGANISM: Saccharomyces cerevisiae

<400> SEQUENCE: 10

Met Thr Glu Gln Tyr Ser Val Ala Val Gly Glu Ala Ala Asn Glu His
1               5                   10                  15

Glu Thr Ala Pro Arg Arg Asn Ile Arg Val Lys Asp Gln Pro Leu Ile
            20                  25                  30

Arg Pro Ile Asn Ser Ser Ala Ser Thr Leu Tyr Glu Phe Ala Leu Glu
        35                  40                  45

Cys Phe Thr Lys Gly Gly Lys Arg Asp Gly Met Ala Trp Arg Asp Ile
    50                  55                  60

Ile Asp Ile His Glu Thr Lys Lys Thr Ile Val Lys Arg Val Asp Gly
65                  70                  75                  80

Lys Asp Lys Pro Ile Glu Lys Thr Trp Leu Tyr Tyr Glu Leu Thr Pro
                85                  90                  95

Tyr Ile Thr Met Thr Tyr Glu Glu Met Ile Cys Val Met His Asp Ile
            100                 105                 110

Gly Arg Gly Leu Ile Lys Ile Gly Val Lys Pro Asn Gly Glu Asn Lys
        115                 120                 125

Phe His Ile Phe Ala Ser Thr Ser His Lys Trp Met Lys Thr Phe Leu
    130                 135                 140

Gly Cys Met Ser Gln Gly Ile Pro Val Val Thr Ala Tyr Asp Thr Leu
145                 150                 155                 160

Gly Glu Ser Gly Leu Ile His Ser Met Val Glu Thr Asp Ser Val Ala
                165                 170                 175

Ile Phe Thr Asp Asn Gln Leu Leu Ser Lys Leu Ala Val Pro Leu Lys
            180                 185                 190

Thr Ala Lys Asn Val Lys Phe Val Ile His Asn Glu Pro Ile Asp Pro
        195                 200                 205

Ser Asp Lys Arg Gln Asn Gly Lys Leu Tyr Lys Ala Ala Lys Asp Ala
    210                 215                 220

Val Asp Lys Ile Lys Glu Val Arg Pro Asp Ile Lys Ile Tyr Ser Phe
225                 230                 235                 240

Asp Glu Ile Ile Glu Ile Gly Lys Lys Ala Lys Asp Glu Val Glu Leu
                245                 250                 255

His Phe Pro Lys Pro Glu Asp Pro Ala Cys Ile Met Tyr Thr Ser Gly
            260                 265                 270

Ser Thr Gly Thr Pro Lys Gly Val Val Leu Thr His Tyr Asn Ile Val
        275                 280                 285
```

```
Ala Gly Ile Gly Gly Val Gly His Asn Val Ile Gly Trp Ile Gly Pro
    290             295                 300
Thr Asp Arg Ile Ile Ala Phe Leu Pro Leu Ala His Ile Phe Glu Leu
305             310                 315                 320
Thr Phe Glu Phe Glu Ala Phe Tyr Trp Asn Gly Ile Leu Gly Tyr Ala
                325                 330                 335
Asn Val Lys Thr Leu Thr Pro Thr Ser Thr Arg Asn Cys Gln Gly Asp
            340             345                 350
Leu Met Glu Phe Lys Pro Thr Val Met Val Gly Val Ala Ala Val Trp
        355                 360                 365
Glu Thr Val Arg Lys Gly Ile Leu Ala Lys Ile Asn Glu Leu Pro Gly
370             375                 380
Trp Ser Gln Thr Leu Phe Trp Thr Val Tyr Ala Leu Lys Glu Arg Asn
385             390                 395                 400
Ile Pro Cys Ser Gly Leu Leu Ser Gly Leu Ile Phe Lys Arg Ile Arg
                405                 410                 415
Glu Ala Thr Gly Gly Asn Leu Arg Phe Ile Leu Asn Gly Gly Ser Ala
            420                 425                 430
Ile Ser Ile Asp Ala Gln Lys Phe Leu Ser Asn Leu Leu Cys Pro Met
        435                 440                 445
Leu Ile Gly Tyr Gly Leu Thr Glu Gly Val Ala Asn Ala Cys Val Leu
    450                 455                 460
Glu Pro Glu His Phe Asp Tyr Gly Ile Ala Gly Asp Leu Val Gly Thr
465             470                 475                 480
Ile Thr Ala Lys Leu Val Asp Val Glu Asp Leu Gly Tyr Phe Ala Lys
                485                 490                 495
Asn Asn Gln Gly Glu Leu Leu Phe Lys Gly Ala Pro Ile Cys Ser Glu
            500                 505                 510
Tyr Tyr Lys Asn Pro Glu Glu Thr Ala Ala Ala Phe Thr Asp Asp Gly
        515                 520                 525
Trp Phe Arg Thr Gly Asp Ile Ala Glu Trp Thr Pro Lys Gly Gln Val
    530                 535                 540
Lys Ile Ile Asp Arg Lys Lys Asn Leu Val Lys Thr Leu Asn Gly Glu
545             550                 555                 560
Tyr Ile Ala Leu Glu Lys Leu Glu Ser Ile Tyr Arg Ser Asn Pro Tyr
                565                 570                 575
Val Gln Asn Ile Cys Val Tyr Ala Asp Glu Asn Lys Val Lys Pro Val
            580                 585                 590
Gly Ile Val Val Pro Asn Leu Gly His Leu Ser Lys Leu Ala Ile Glu
        595                 600                 605
Leu Gly Ile Met Val Pro Gly Glu Asp Val Glu Ser Tyr Ile His Glu
    610                 615                 620
Lys Lys Leu Gln Asp Ala Val Cys Lys Asp Met Leu Ser Thr Ala Lys
625             630                 635                 640
Ser Gln Gly Leu Asn Gly Ile Glu Leu Leu Cys Gly Ile Val Phe Phe
                645                 650                 655
Glu Glu Glu Trp Thr Pro Glu Asn Gly Leu Val Thr Ser Ala Gln Lys
            660                 665                 670
Leu Lys Arg Arg Asp Ile Leu Ala Ala Val Lys Pro Asp Val Glu Arg
        675                 680                 685
Val Tyr Lys Glu Asn Thr
    690
```

<210> SEQ ID NO 11
<211> LENGTH: 602
<212> TYPE: PRT
<213> ORGANISM: Deltaproteobacteria bacterium ADurb.Bin022

<400> SEQUENCE: 11

```
Met His Lys Phe Thr Leu Asp Lys Pro Asp Asn Leu Val Asp Trp Trp
1               5                   10                  15

Gly Glu Ser Val Thr Arg Phe Ala Asp Arg Pro Leu Phe Gly Thr Lys
            20                  25                  30

Asn Lys Glu Gly Val Tyr Lys Trp Ala Thr Tyr Lys Glu Ile Gly Asn
        35                  40                  45

Arg Ile Asp Asn Leu Arg Ala Gly Leu Thr Gln Leu Gly Ile Gly Lys
    50                  55                  60

Asp Asp Val Val Gly Ile Ile Ala Asn Asn Arg Pro Glu Trp Ala Val
65                  70                  75                  80

Ile Gly Phe Ala Thr Trp Gly Cys Leu Ala Arg Tyr Val Pro Met Tyr
                85                  90                  95

Glu Ala Glu Leu Val Gln Val Trp Lys Tyr Ile Ile Asn Asp Ser Gly
            100                 105                 110

Ala Lys Val Leu Phe Val Ser Asn Pro Ala Ile Tyr Glu Lys Ile Lys
        115                 120                 125

Asp Phe Pro Lys Asp Ile Pro Thr Leu Lys His Ile Phe Ile Ile Glu
    130                 135                 140

Ser Asp Gly Asp Asn Ser Met Ala Ser Leu Glu Lys Lys Gly Ala Ala
145                 150                 155                 160

Lys Pro Val Ala Pro Lys Ser Pro Lys Ala Glu Asp Val Ala Glu Leu
                165                 170                 175

Ile Tyr Thr Ser Gly Thr Thr Gly Asn Pro Lys Gly Val Leu Leu Met
            180                 185                 190

His Met Asn Phe Thr Ser Asn Ser His Ala Gly Leu Lys Met Tyr Pro
        195                 200                 205

Glu Leu Tyr Glu Asn Glu Val Val Ser Leu Thr Ile Leu Pro Trp Ala
    210                 215                 220

His Val Phe Gly Gln Thr Ala Glu Leu Phe Ala Ile Ile Arg Leu Gly
225                 230                 235                 240

Gly Arg Met Gly Leu Ile Glu Ser Thr Lys Thr Ile Ile Asn Asp Ile
                245                 250                 255

Val Gln Ile Lys Pro Thr Phe Ile Ile Ala Val Pro Thr Val Phe Asn
            260                 265                 270

Arg Ile Tyr Asp Gly Leu Trp Asn Lys Met Asn Lys Asp Gly Gly Leu
        275                 280                 285

Ala Arg Ala Leu Phe Val Met Gly Val Glu Ala Ala Lys Lys Lys Arg
    290                 295                 300

Ile Leu Ala Glu Lys Gly Gln Ser Asp Leu Met Thr Asn Phe Lys Val
305                 310                 315                 320

Ala Val Ala Asp Lys Ile Val Phe Lys Lys Ile Arg Glu Arg Met Gly
                325                 330                 335

Gly Arg Met Leu Gly Ser Met Thr Gly Ser Ala Ala Met Asn Val Glu
            340                 345                 350

Ile Ser Lys Phe Phe Phe Asp Ile Gly Ile Pro Ile Tyr Asp Cys Tyr
        355                 360                 365

Gly Leu Thr Glu Thr Ser Pro Gly Ile Thr Met Asn Gly Ser Gln Ala
    370                 375                 380
```

Tyr Arg Ile Gly Ser Val Gly Arg Pro Ile Asp Lys Val Lys Val Val
385                 390                 395                 400

Ile Asp Ser Ser Val Val Glu Glu Gly Ala Thr Asp Gly Glu Ile Ile
            405                 410                 415

Ala Tyr Gly Pro Asn Val Met Lys Gly Tyr His Asn Arg Pro Glu Asp
        420                 425                 430

Thr Lys Ala Ala Leu Thr Pro Asp Gly Gly Phe Arg Thr Gly Asp Arg
            435                 440                 445

Gly Arg Leu Asp Lys Asp Gly Tyr Leu Phe Ile Thr Gly Arg Ile Lys
        450                 455                 460

Glu Gln Tyr Lys Leu Glu Asn Gly Lys Phe Cys Phe Pro Val Ser Leu
465                 470                 475                 480

Glu Glu Asn Ile Cys Leu Ala Ser Phe Val Gln Gln Ala Val Val Tyr
            485                 490                 495

Gly Leu Asn Arg Pro Tyr Asn Val Cys Ile Val Pro Asp Phe Asp
        500                 505                 510

Val Leu Leu Asp Tyr Ala Lys Glu Lys Gly Leu Pro Thr Asp Ile Lys
        515                 520                 525

Thr Leu Val Glu Arg Glu Asp Ile Ile His Met Ile Ser Glu Ala Val
530                 535                 540

Thr Gly Gln Leu Lys Gly Lys Phe Gly Gly Tyr Glu Ile Pro Lys Lys
545                 550                 555                 560

Phe Ile Ile Leu Pro Glu Ala Phe Ser Leu Asp Asn Gly Met Leu Thr
                565                 570                 575

Gln Thr Met Lys Leu Lys Arg Lys Val Ile Leu Asp Lys Leu Asn Asp
            580                 585                 590

Arg Ile Glu Ala Leu Tyr Lys Glu Asp Lys
        595                 600

<210> SEQ ID NO 12
<211> LENGTH: 534
<212> TYPE: PRT
<213> ORGANISM: Alcaligenes xylosoxydans (Achromobacter xylosoxidans)

<400> SEQUENCE: 12

Met Tyr Ser Arg Ile His Glu Pro His Ala Cys Thr Leu Thr Asp Ala
1               5                   10                  15

Leu Arg Glu Trp Ala Ala Ser Arg Pro Ala Ala Pro Trp Leu Glu Asp
            20                  25                  30

Ser Gln Gly Ile Ala Phe Thr Val Gly Gln Ala Phe Thr Ser Ser Gln
        35                  40                  45

Arg Phe Ala Ser Phe Leu His His Gln Leu Gly Val Gln Pro Glu Glu
50                  55                  60

Arg Val Gly Val Phe Met Ser Asn Ser Cys Ala Met Val Ala Thr Thr
65                  70                  75                  80

Phe Gly Ile Gly Tyr Leu Arg Ala Thr Ala Val Met Leu Asn Thr Glu
                85                  90                  95

Leu Arg Ser Ser Phe Leu Arg His Gln Leu Asn Asp Cys Gln Leu Ala
            100                 105                 110

Thr Ile Val Val Asp Ser Ala Leu Val Glu His Val Ala Ser Leu Ala
        115                 120                 125

Asp Glu Leu Pro His Leu Arg Thr Leu Val Val Val Gly Asp Ala Pro
130                 135                 140

Ala Ala Val Pro Glu Arg Trp Arg Gln Val Ala Trp Met Asp Ser Ser
145                 150                 155                 160

Ala Cys Ala Pro Trp Glu Gly Pro Ala Pro Arg Pro Glu Asp Ile Phe
            165                 170                 175

Cys Ile Met Tyr Thr Ser Gly Thr Thr Gly Pro Ser Lys Gly Val Leu
            180                 185                 190

Met Pro His Cys His Cys Ala Leu Leu Gly Leu Gly Ala Ile Arg Ser
            195                 200                 205

Leu Glu Ile Thr Glu Ala Asp Lys Tyr Tyr Ile Cys Leu Pro Leu Phe
210                 215                 220

His Ala Asn Gly Leu Phe Met Gln Leu Gly Ala Thr Val Leu Ala Gly
225                 230                 235                 240

Ile Pro Ala Phe Leu Lys Gln Arg Phe Ser Ala Ser Thr Trp Leu Ala
            245                 250                 255

Asp Ile Arg Arg Ser Gly Ala Thr Leu Thr Asn His Leu Gly Thr Thr
            260                 265                 270

Ala Met Phe Val Ile Asn Gln Pro Thr Glu Gln Asp Arg Asp His
            275                 280                 285

Arg Leu Arg Ala Ser Leu Ser Ala Pro Asn Pro Ala Gln His Glu Ala
290                 295                 300

Val Phe Arg Glu Arg Phe Gly Val Lys Asp Val Leu Ser Gly Phe Gly
305                 310                 315                 320

Met Thr Glu Val Gly Ile Pro Ile Trp Gly Arg Ile Gly His Ala Ala
            325                 330                 335

Pro Asn Ala Ala Gly Trp Ala His Gly Asp Arg Phe Glu Ile Cys Ile
            340                 345                 350

Ala Asp Pro Glu Thr Asp Val Pro Val Leu Ala Gly Gln Val Gly Glu
            355                 360                 365

Ile Leu Val Arg Pro Lys Val Pro Phe Gly Phe Met Ala Gly Tyr Leu
370                 375                 380

Asn Val Pro Ala Lys Thr Val Glu Ala Trp Arg Asn Leu Trp Phe His
385                 390                 395                 400

Thr Gly Asp Ala Gly Thr Arg Asp Glu Gln Gly Leu Ile Thr Phe Val
            405                 410                 415

Asp Arg Ile Lys Asp Cys Ile Arg Arg Gly Glu Asn Ile Ser Ala
            420                 425                 430

Thr Glu Val Glu Val Val Val Gly Gln Leu Pro Gly Val His Glu Val
            435                 440                 445

Ala Ala Tyr Ala Val Pro Ala Gln Gly Ala Gly Glu Asp Glu Val
            450                 455                 460

Met Leu Ala Leu Val Pro Ser Glu Gly Ala Ala Leu Asp Met Ala Asp
465                 470                 475                 480

Ile Val Arg Gln Ala Ser Ala Gln Leu Pro Arg Phe Ala Lys Pro Arg
            485                 490                 495

Tyr Leu Arg Gln Met Asp Ser Leu Pro Lys Thr Ala Thr Gly Lys Ile
            500                 505                 510

Gln Arg Ala Val Leu Arg Gln Gln Gly Ser Ala Gly Ala Tyr Asp Ala
            515                 520                 525

Glu Ala Ala Pro Ala Arg
    530

<210> SEQ ID NO 13
<211> LENGTH: 518
<212> TYPE: PRT
<213> ORGANISM: Novosphingobium sp. MD-1

<400> SEQUENCE: 13

```
Met Gln Phe Thr Gln Gly Leu Glu Arg Ala Val Gln His His Pro Asp
1               5                   10                  15

Val Thr Ala Thr Ile Cys Arg Ala Arg Ser Gln Thr Phe Ala Glu Leu
            20                  25                  30

Tyr Glu Arg Val Thr Gly Leu Ala Gly Cys Leu Ala Ser Arg Ser Leu
        35                  40                  45

Ala Lys Gly Ala Arg Ile Ala Val Leu Ala Leu Asn Ser Asp His Tyr
    50                  55                  60

Leu Glu Val Tyr Leu Ala Thr Ala Trp Ala Gly Val Ile Val Pro
65                  70                  75                  80

Val Asn Phe Arg Trp Ser Pro Ala Glu Ile Ala Tyr Ser Leu Asn Asp
                85                  90                  95

Ala Gly Cys Val Ala Leu Met Val Asp Gln His His Ala Ala Leu Val
            100                 105                 110

Pro Thr Leu Arg Glu Gln Cys Pro Gly Leu Gln His Ile Phe Leu Met
        115                 120                 125

Gly Gly Thr Glu Glu Ser Asp Asp Leu Pro Gly Leu Asp Ala Leu Ile
130                 135                 140

Ala Ala Ala Glu Pro Leu Gln Asn Ala Gly Ala Gly Asp Asp Leu
145                 150                 155                 160

Leu Gly Ile Phe Tyr Thr Gly Gly Thr Thr Gly Arg Pro Lys Gly Val
                165                 170                 175

Met Leu Ser His Ala Asn Leu Cys Ser Ser Gly Leu Ser Met Leu Ala
            180                 185                 190

Glu Gly Val Phe Asn Glu Gly Ala Val Gly Leu His Val Ala Pro Met
        195                 200                 205

Phe His Leu Ala Asp Met Leu Leu Thr Thr Cys Leu Val Leu Arg Gly
    210                 215                 220

Cys Thr His Val Met Leu Pro Ala Phe Ser Pro Asp Ala Val Leu Asp
225                 230                 235                 240

His Val Ala Arg Phe Gly Val Thr Asp Thr Leu Val Val Pro Ala Met
                245                 250                 255

Leu Gln Ala Ile Val Asp His Pro Ala Ile Gly Asn Phe Asp Thr Ser
            260                 265                 270

Ser Leu Cys Asn Ile Leu Tyr Gly Ala Ser Pro Ala Ser Glu Thr Leu
        275                 280                 285

Leu Arg Arg Thr Met Ala Ala Phe Pro Asp Val Arg Leu Thr Gln Gly
    290                 295                 300

Tyr Gly Met Thr Glu Ser Ala Ala Phe Ile Cys Ala Leu Pro Trp His
305                 310                 315                 320

Gln His Val Val Asp Asn Asp Gly Pro Asn Arg Leu Arg Ala Ala Gly
                325                 330                 335

Arg Ser Thr Phe Asp Val His Leu Gln Ile Val Asp Pro Asp Arg
            340                 345                 350

Glu Leu Pro Arg Gly Glu Ile Gly Glu Ile Ile Val Lys Gly Pro Asn
        355                 360                 365

Val Met Gln Gly Tyr Tyr Asn Met Pro Glu Ala Thr Ala Glu Thr Leu
    370                 375                 380

Arg Gly Gly Trp Leu His Thr Gly Asp Met Ala Trp Met Asp Glu Glu
385                 390                 395                 400

Gly Tyr Val Phe Ile Val Asp Arg Ala Lys Asp Met Ile Ile Ser Gly
                405                 410                 415
```

```
Gly Glu Asn Ile Tyr Ser Ala Glu Val Glu Asn Ala Val Ala Ser His
                420             425             430

Pro Ala Val Ala Ala Asn Ala Val Ile Gly Ile Pro His Glu Gln Met
            435             440             445

Gly Glu Ala Val His Val Ala Leu Val Leu Arg Pro Gly Ser Glu Leu
450             455             460

Ser Leu Glu Ala Leu Gln Ala His Cys Arg Ala Leu Ile Ala Gly Tyr
465             470             475             480

Lys Val Pro Arg Ser Met Glu Val Arg Pro Ser Leu Pro Leu Ser Gly
                485             490             495

Ala Gly Lys Ile Leu Lys Thr Glu Leu Arg Pro Phe Trp Lys Gly
            500             505             510

Arg Asp Arg Ala Val Gly
        515

<210> SEQ ID NO 14
<211> LENGTH: 541
<212> TYPE: PRT
<213> ORGANISM: Thermus thermophilus (strain HB8 / ATCC 27634 / DSM 579)

<400> SEQUENCE: 14

Met Glu Gly Glu Arg Met Asn Ala Phe Pro Ser Thr Met Met Asp Glu
1               5               10              15

Glu Leu Asn Leu Trp Asp Phe Leu Glu Arg Ala Ala Ala Leu Phe Gly
                20              25              30

Arg Lys Glu Val Val Ser Arg Leu His Thr Gly Glu Val His Arg Thr
            35              40              45

Thr Tyr Ala Glu Val Tyr Gln Arg Ala Arg Leu Met Gly Gly Leu
50              55              60

Arg Ala Leu Gly Val Gly Val Gly Asp Arg Val Ala Thr Leu Gly Phe
65              70              75              80

Asn His Phe Arg His Leu Glu Ala Tyr Phe Ala Val Pro Gly Met Gly
                85              90              95

Ala Val Leu His Thr Ala Asn Pro Arg Leu Ser Pro Lys Glu Ile Ala
            100             105             110

Tyr Ile Leu Asn His Ala Glu Asp Lys Val Leu Leu Phe Asp Pro Asn
        115             120             125

Leu Leu Pro Leu Val Glu Ala Ile Arg Gly Glu Leu Lys Thr Val Gln
    130             135             140

His Phe Val Val Met Asp Glu Lys Ala Pro Glu Gly Tyr Leu Ala Tyr
145             150             155             160

Glu Glu Ala Leu Gly Glu Glu Ala Asp Pro Val Arg Val Pro Glu Arg
                165             170             175

Ala Ala Cys Gly Met Ala Tyr Thr Thr Gly Thr Thr Gly Leu Pro Lys
            180             185             190

Gly Val Val Tyr Ser His Arg Ala Leu Val Leu His Ser Leu Ala Ala
        195             200             205

Ser Leu Val Asp Gly Thr Ala Leu Ser Glu Lys Asp Val Val Leu Pro
    210             215             220

Val Val Pro Met Phe His Val Asn Ala Trp Cys Leu Pro Tyr Ala Ala
225             230             235             240

Thr Leu Val Gly Ala Lys Gln Val Leu Pro Gly Pro Arg Leu Asp Pro
                245             250             255

Ala Ser Leu Val Glu Leu Phe Asp Gly Glu Gly Val Thr Phe Thr Ala
```

```
                260                 265                 270
Gly Val Pro Thr Val Trp Leu Ala Leu Ala Asp Tyr Leu Glu Ser Thr
            275                 280                 285
Gly His Arg Leu Lys Thr Leu Arg Arg Leu Val Val Gly Gly Ser Ala
        290                 295                 300
Ala Pro Arg Ser Leu Ile Ala Arg Phe Glu Arg Met Gly Val Glu Val
305                 310                 315                 320
Arg Gln Gly Tyr Gly Leu Thr Glu Thr Ser Pro Val Val Gln Asn
                325                 330                 335
Phe Val Lys Ser His Leu Glu Ser Leu Ser Glu Glu Lys Leu Thr
            340                 345                 350
Leu Lys Ala Lys Thr Gly Leu Pro Ile Pro Leu Val Arg Leu Arg Val
        355                 360                 365
Ala Asp Glu Glu Gly Arg Pro Val Pro Lys Asp Gly Lys Ala Leu Gly
    370                 375                 380
Glu Val Gln Leu Lys Gly Pro Trp Ile Thr Gly Gly Tyr Tyr Gly Asn
385                 390                 395                 400
Glu Glu Ala Thr Arg Ser Ala Leu Thr Pro Asp Gly Phe Phe Arg Thr
                405                 410                 415
Gly Asp Ile Ala Val Trp Asp Glu Glu Gly Tyr Val Glu Ile Lys Asp
            420                 425                 430
Arg Leu Lys Asp Leu Ile Lys Ser Gly Gly Glu Trp Ile Ser Ser Val
        435                 440                 445
Asp Leu Glu Asn Ala Leu Met Gly His Pro Lys Val Lys Glu Ala Ala
    450                 455                 460
Val Val Ala Ile Pro His Pro Lys Trp Gln Glu Arg Pro Leu Ala Val
465                 470                 475                 480
Val Val Pro Arg Gly Lys Pro Thr Pro Glu Glu Leu Asn Glu His
                485                 490                 495
Leu Leu Lys Ala Gly Phe Ala Lys Trp Gln Leu Pro Asp Ala Tyr Val
            500                 505                 510
Phe Ala Glu Glu Ile Pro Arg Thr Ser Ala Gly Lys Phe Leu Lys Arg
        515                 520                 525
Ala Leu Arg Glu Gln Tyr Lys Asn Tyr Tyr Gly Gly Ala
    530                 535                 540

<210> SEQ ID NO 15
<211> LENGTH: 534
<212> TYPE: PRT
<213> ORGANISM: Bradyrhizobium sp. CI-41S

<400> SEQUENCE: 15

Met Asp Trp Ser Gln His Ala Ile Pro Met Arg Leu Glu Pro Arg
1               5                   10                  15
Phe Gly Asp Arg Val Val Pro Ala Phe Val Asp Arg Pro Ala Ser Leu
            20                  25                  30
Trp Ala Met Ile Ala Asp Ala Val Ala Gln Asn Gly Gly Glu Ala
        35                  40                  45
Leu Val Cys Gly Asp Ile Arg Ile Ser Trp His Glu Val Ala Arg Arg
    50                  55                  60
Ala Ala Lys Val Ala Ala Gly Phe Ala Lys Leu Gly Leu Asn Ser Gly
65                  70                  75                  80
Asp Arg Val Ala Ile Leu Leu Gly Asn Arg Ile Glu Phe Val Leu Thr
                85                  90                  95
```

```
Met Phe Ala Ala Ala His Ala Gly Leu Val Thr Val Leu Leu Ser Thr
            100                 105                 110

Arg Gln Gln Lys Pro Glu Ile Ala Tyr Val Leu Asn Asp Cys Gly Ala
        115                 120                 125

Arg Ala Leu Val His Glu Ala Thr Leu Ala Glu Arg Ile Pro Asp Ala
    130                 135                 140

Ala Asp Ile Pro Gly Leu Ala His Arg Ile Ala Val Ser Asp Asp Ala
145                 150                 155                 160

Ala Ser Gln Phe Ala Val Leu Leu Asp His Pro Ala Pro Ala Pro
                165                 170                 175

Ala Ala Val Ser Glu Glu Asp Thr Ala Met Ile Leu Tyr Thr Ser Gly
            180                 185                 190

Thr Thr Gly Arg Pro Lys Gly Ala Met Leu Ala His Cys Asn Ile Ile
        195                 200                 205

His Ser Ser Met Val Phe Ala Ser Thr Leu Arg Leu Thr Gln Ala Asp
    210                 215                 220

Arg Ser Ile Ala Ala Val Pro Leu Ala His Val Thr Gly Ala Val Ala
225                 230                 235                 240

Asn Ile Thr Thr Met Val Arg Cys Ala Gly Thr Leu Ile Ile Met Pro
                245                 250                 255

Glu Phe Lys Ala Ala Glu Tyr Leu Lys Val Ala Ala Arg Glu Arg Val
            260                 265                 270

Ser Tyr Thr Val Met Val Pro Ala Met Tyr Asn Leu Cys Leu Leu Gln
        275                 280                 285

Pro Asp Phe Asp Ser Tyr Asp Leu Ser Ser Trp Arg Ile Gly Gly Phe
    290                 295                 300

Gly Gly Ala Pro Met Pro Val Ala Thr Ile Glu Arg Leu Asp Ala Lys
305                 310                 315                 320

Ile Pro Gly Leu Lys Leu Ala Asn Cys Tyr Gly Ala Thr Glu Thr Thr
                325                 330                 335

Ser Pro Ser Thr Leu Met Pro Gly Glu Leu Thr Ala Ala His Ile Asp
            340                 345                 350

Ser Val Gly Leu Pro Cys Pro Gly Ala Glu Ile Ile Val Met Gly Pro
        355                 360                 365

Asp Gly Arg Glu Leu Pro Arg Gly Glu Ile Gly Glu Leu Trp Ile Arg
    370                 375                 380

Ser Ala Ser Val Ile Lys Gly Tyr Trp Asn Asn Pro Lys Ala Thr Ala
385                 390                 395                 400

Glu Ser Phe Thr Asp Gly Phe Trp His Ser Gly Asp Leu Gly Ser Val
            405                 410                 415

Asp Ala Glu Asn Phe Val Arg Val Phe Asp Arg Gln Lys Asp Met Ile
        420                 425                 430

Asn Arg Gly Gly Leu Lys Ile Tyr Ser Ala Glu Val Glu Ser Val Leu
    435                 440                 445

Ala Gly His Pro Ala Val Ile Glu Ser Ala Ile Ile Ala Lys Pro Cys
450                 455                 460

Pro Val Leu Gly Glu Arg Val His Ala Val Ile Val Thr Arg Thr Glu
465                 470                 475                 480

Val Asp Ala Glu Ser Leu Arg Ala Trp Cys Ala Glu Arg Leu Ser Asp
            485                 490                 495

Tyr Lys Val Pro Glu Thr Met Thr Leu Thr Thr Thr Pro Leu Pro Arg
        500                 505                 510

Asn Ala Asn Gly Lys Val Val Lys Arg Gln Leu Arg Glu Thr Leu Ala
```

Ala Gly Gln Ala Pro Ala
             530

<210> SEQ ID NO 16
<211> LENGTH: 612
<212> TYPE: PRT
<213> ORGANISM: Bradyrhizobium sp. CI-41S

<400> SEQUENCE: 16

Met Ala Gly Pro Ala Val Leu Thr Val Ala Asp Thr Ile Ala Arg Ser
1               5                   10                  15

Phe Leu Leu Ala Val Gln Thr Arg Gly Asp Arg Pro Ala Ile Arg Glu
            20                  25                  30

Lys Lys Phe Gly Ile Trp Gln Pro Thr Ser Trp Arg Glu Trp Leu Gln
        35                  40                  45

Ile Ser Lys Asp Ile Ala His Gly Leu His Ala Ser Gly Phe Arg Pro
    50                  55                  60

Gly Asp Val Ala Ser Ile Ile Ala Asn Ala Val Pro Glu Trp Val Tyr
65                  70                  75                  80

Ala Asp Met Gly Ile Leu Cys Ala Gly Gly Val Ser Ser Gly Ile Tyr
                85                  90                  95

Pro Thr Asp Ser Thr Ala Gln Val Glu Tyr Leu Val Asn Asp Ser Arg
            100                 105                 110

Thr Lys Ile Val Phe Val Glu Asp Glu Glu Gln Leu Asp Lys Val Leu
        115                 120                 125

Ala Cys Arg Ala Arg Cys Pro Thr Leu Glu Lys Ile Val Val Phe Asp
    130                 135                 140

Met Glu Gly Leu Ser Gly Phe Ser Asp Pro Met Val Leu Ser Phe Ala
145                 150                 155                 160

Glu Phe Ala Ala Leu Gly Arg Asn His Ala His Gly Asn Ala Ala Leu
                165                 170                 175

Trp Asp Glu Met Thr Gly Ser Arg Thr Ala Ser Asp Leu Ala Ile Leu
            180                 185                 190

Val Tyr Thr Ser Gly Thr Thr Gly Pro Pro Lys Gly Ala Met His Ser
        195                 200                 205

Asn Arg Ser Val Thr His Gln Met Arg His Ala Asn Asp Leu Phe Pro
    210                 215                 220

Ser Thr Asp Ser Glu Glu Arg Leu Val Phe Leu Pro Leu Cys His Val
225                 230                 235                 240

Ala Glu Arg Val Gly Gly Tyr Tyr Ile Ser Ile Ala Leu Gly Ser Val
                245                 250                 255

Met Asn Phe Ala Glu Ser Pro Gly Thr Val Pro Asp Asn Leu Arg Glu
            260                 265                 270

Val Gln Pro Thr Ala Phe Leu Ala Val Pro Arg Val Trp Glu Lys Phe
        275                 280                 285

Tyr Ser Gly Ile Thr Ile Ala Leu Lys Asp Ala Thr Pro Phe Gln Asn
    290                 295                 300

Trp Met Tyr Gly Arg Ala Leu Ala Ile Gly Asn Arg Met Thr Glu Cys
305                 310                 315                 320

Arg Leu Glu Gly Glu Thr Pro Pro Leu Ser Leu Arg Leu Ala Asn Arg
                325                 330                 335

Ala Ala Tyr Trp Leu Val Phe Arg Asn Ile Arg Arg Met Leu Gly Leu
            340                 345                 350

```
Asp Arg Cys Arg Ile Ala Leu Thr Gly Ala Ala Pro Ile Ser Pro Asp
            355                 360                 365

Leu Ile Arg Trp Tyr Leu Ala Leu Gly Leu Asp Met Arg Glu Val Tyr
    370                 375                 380

Gly Gln Thr Glu Asn Cys Gly Val Ala Thr Ile Met Pro Thr Glu Arg
385                 390                 395                 400

Ile Lys Leu Gly Ser Val Gly Lys Ala Ala Pro Trp Gly Glu Val Met
                405                 410                 415

Ile Cys Pro Lys Gly Glu Ile Leu Ile Lys Gly Asp Phe Leu Phe Met
            420                 425                 430

Gly Tyr Leu Asn Gln Pro Glu Arg Thr Ala Glu Thr Ile Asp Ala Lys
        435                 440                 445

Gly Trp Leu His Thr Gly Asp Val Gly Thr Ile Asp Asn Glu Gly Tyr
    450                 455                 460

Val Arg Ile Thr Asp Arg Met Lys Asp Ile Ile Thr Ser Gly Gly
465                 470                 475                 480

Lys Asn Val Thr Pro Ser Glu Ile Glu Asn Gln Leu Lys Phe Ser Pro
                485                 490                 495

Tyr Val Ser Asp Ala Val Ile Gly Asp Lys Arg Pro Tyr Leu Thr
            500                 505                 510

Cys Leu Ile Met Ile Asp Gln Glu Asn Val Glu Lys Phe Ala Gln Asp
            515                 520                 525

His Asp Ile Pro Phe Thr Asn Tyr Ala Ser Leu Cys Arg Ala Arg Glu
        530                 535                 540

Ile Gln Asp Leu Ile Gln Arg Glu Val Glu Ala Val Asn Thr Lys Phe
545                 550                 555                 560

Ala Arg Val Glu Thr Ile Lys Lys Phe Tyr Leu Ile Glu Arg Gln Leu
                565                 570                 575

Thr Pro Glu Asp Glu Glu Leu Thr Pro Thr Met Lys Leu Lys Arg Ser
            580                 585                 590

Phe Val Asn Lys Arg Tyr Ala Ala Glu Ile Asp Ala Met Tyr Gly Ala
        595                 600                 605

Arg Ala Val Ala
    610

<210> SEQ ID NO 17
<211> LENGTH: 513
<212> TYPE: PRT
<213> ORGANISM: Bacillus subtilis (strain 168)

<400> SEQUENCE: 17

Met Asn Leu Val Ser Lys Leu Glu Glu Thr Ala Ser Glu Lys Pro Asp
1               5                   10                  15

Ser Ile Ala Cys Arg Phe Lys Asp His Met Met Thr Tyr Gln Glu Leu
            20                  25                  30

Asn Glu Tyr Ile Gln Arg Phe Ala Asp Gly Leu Gln Glu Ala Gly Met
        35                  40                  45

Glu Lys Gly Asp His Leu Ala Leu Leu Gly Asn Ser Pro Asp Phe
    50                  55                  60

Ile Ile Ala Phe Phe Gly Ala Leu Lys Ala Gly Ile Val Val Pro
65                  70                  75                  80

Ile Asn Pro Leu Tyr Thr Pro Thr Glu Ile Gly Tyr Met Leu Thr Asn
                85                  90                  95

Gly Asp Val Lys Ala Ile Val Gly Val Ser Gln Leu Leu Pro Leu Tyr
            100                 105                 110
```

-continued

```
Glu Ser Met His Glu Ser Leu Pro Lys Val Glu Leu Ile Leu Cys
            115                 120                 125
Gln Thr Gly Glu Ala Glu Pro Glu Ala Ala Asp Pro Glu Val Arg Met
130                 135                 140
Lys Met Thr Thr Phe Ala Lys Ile Leu Arg Pro Thr Ser Ala Ala Lys
145                 150                 155                 160
Gln Asn Gln Glu Pro Val Pro Asp Asp Thr Ala Val Ile Leu Tyr Thr
                    165                 170                 175
Ser Gly Thr Thr Gly Lys Pro Lys Gly Ala Met Leu Thr His Gln Asn
                180                 185                 190
Leu Tyr Ser Asn Ala Asn Asp Val Ala Gly Tyr Leu Gly Met Asp Glu
            195                 200                 205
Arg Asp Asn Val Val Cys Ala Leu Pro Met Phe His Val Phe Cys Leu
210                 215                 220
Thr Val Cys Met Asn Ala Pro Leu Met Ser Gly Ala Thr Val Leu Ile
225                 230                 235                 240
Glu Pro Gln Phe Ser Pro Ala Ser Val Phe Lys Leu Val Lys Gln Gln
                    245                 250                 255
Gln Ala Thr Ile Phe Ala Gly Val Pro Thr Met Tyr Asn Tyr Leu Phe
                260                 265                 270
Gln His Glu Asn Gly Lys Lys Asp Asp Phe Ser Ser Ile Arg Leu Cys
            275                 280                 285
Ile Ser Gly Gly Ala Ser Met Pro Val Ala Leu Leu Thr Ala Phe Glu
290                 295                 300
Glu Lys Phe Gly Val Thr Ile Leu Glu Gly Tyr Gly Leu Ser Glu Ala
305                 310                 315                 320
Ser Pro Val Thr Cys Phe Asn Pro Phe Asp Arg Gly Arg Lys Pro Gly
                    325                 330                 335
Ser Ile Gly Thr Ser Ile Leu His Val Glu Asn Lys Val Val Asp Pro
                340                 345                 350
Leu Gly Arg Glu Leu Pro Ala His Gln Val Gly Glu Leu Ile Val Lys
            355                 360                 365
Gly Pro Asn Val Met Lys Gly Tyr Tyr Lys Met Pro Met Glu Thr Glu
370                 375                 380
His Ala Leu Lys Asp Gly Trp Leu Tyr Thr Gly Asp Leu Ala Arg Arg
385                 390                 395                 400
Asp Glu Asp Gly Tyr Phe Tyr Ile Val Asp Arg Lys Lys Asp Met Ile
                    405                 410                 415
Ile Val Gly Gly Tyr Asn Val Tyr Pro Arg Glu Val Glu Glu Val Leu
                420                 425                 430
Tyr Ser His Pro Asp Val Lys Glu Ala Val Val Ile Gly Val Pro Asp
            435                 440                 445
Pro Gln Ser Gly Glu Ala Val Lys Gly Tyr Val Val Pro Lys Arg Ser
450                 455                 460
Gly Val Thr Glu Glu Asp Ile Met Gln His Cys Glu Lys His Leu Ala
465                 470                 475                 480
Lys Tyr Lys Arg Pro Ala Ala Ile Thr Phe Leu Asp Asp Ile Pro Lys
                    485                 490                 495
Asn Ala Thr Gly Lys Met Leu Arg Arg Ala Leu Arg Asp Ile Leu Pro
                500                 505                 510
Gln
```

```
<210> SEQ ID NO 18
<211> LENGTH: 622
<212> TYPE: PRT
<213> ORGANISM: Azoarcus olearius

<400> SEQUENCE: 18

Met Glu Thr Val Ile Arg Asp Val Gly Arg Met Phe Ala Lys Pro Val
1               5                   10                  15

Val Asn Val Glu Thr Arg Gly Asp Gly Ser Arg Ile Leu Arg Ser Gly
            20                  25                  30

Ile Pro Leu Pro Asp Thr Tyr Ala Arg Cys Val Gly Glu Trp Val Glu
        35                  40                  45

Lys Trp Gly Lys Glu Thr Pro Asp Gln Leu Phe Leu Ala Glu Arg Asp
50                  55                  60

Ala Val Ser Gly Glu Trp Arg Lys Ile Thr Trp Gly Glu Thr Arg Arg
65                  70                  75                  80

Arg Val Ile Gly Ile Ala Thr Trp Leu Leu Gly Gln Lys Leu Ser Ala
                85                  90                  95

Glu Arg Pro Val Val Ile Leu Ser Asp Asn Ser Ile Glu His Ala Leu
            100                 105                 110

Leu Met Leu Ala Ala Met His Val Gly Val Pro Val Ser Ser Ile Ser
        115                 120                 125

Pro Gly Asn Ser Leu Met Ser Arg Asp His Ala Lys Leu Lys Gly Asn
    130                 135                 140

Ile Glu Leu Leu Arg Pro Gly Val Ile Phe Ala Asp Pro Val Glu Lys
145                 150                 155                 160

Phe Ala Pro Ala Leu Ala Ala Ile Arg Glu Leu His Asp Gly Val Val
                165                 170                 175

Ile Ala Gly Arg Asn Ser Gln Pro Thr Ala Gly Thr Val Pro Phe Ala
            180                 185                 190

Glu Ile Glu Val Ala Pro Asp Glu Ala Ala Val Met Ala Ala Phe Asn
        195                 200                 205

Ala Ile Thr Pro Asp Thr Ile Ala Lys Phe Leu Phe Thr Ser Gly Ser
    210                 215                 220

Val Gly Val Pro Lys Ala Val Ile Asn Thr Gln Arg Met Met Cys Ser
225                 230                 235                 240

Asn Gln Leu Ala Lys Glu Leu Val Trp Pro Phe Leu Lys Glu Asn Arg
                245                 250                 255

Pro Val Leu Val Glu Trp Leu Pro Trp Ser His Thr Phe Gly Ser Asn
            260                 265                 270

His Asn Leu Asn Met Ile Leu Arg Trp Gly Thr Ile Trp Ile Asp
        275                 280                 285

Asp Gly Lys Pro Thr Pro Ala Gly Leu Asp Lys Thr Val Lys Asn Leu
    290                 295                 300

Lys Glu Ile Ser Pro Thr Val Tyr Phe Asn Val Pro Arg Ala Tyr Asp
305                 310                 315                 320

Met Leu Val Pro Leu Leu Arg Glu Asp Lys Gln Leu Arg Glu Thr Phe
                325                 330                 335

Phe Ala Arg Leu Asn Leu Ile Phe Tyr Ala Gly Ala Ala Leu Pro His
            340                 345                 350

His Leu Trp Glu Gly Leu Glu Asp Leu Ser Glu Gln Thr Thr Gly His
        355                 360                 365

Lys Val Thr Met Val Ser Ser Trp Gly Ser Thr Glu Thr Ala Pro Met
    370                 375                 380
```

```
Cys Thr Asp Cys His Phe Glu Ala Glu Arg Pro Gly Val Ile Gly Val
385                 390                 395                 400

Pro Val Pro Gly Thr Ala Leu Lys Leu Val Pro Ser Ala Asp Lys Leu
            405                 410                 415

Glu Val Arg Val Lys Gly Pro Asn Ile Phe Pro Gly Tyr Trp Lys Gln
        420                 425                 430

Pro Asp Ile Thr Ala Lys Ser Phe Asp Glu Glu Gly Tyr Tyr Met Ile
    435                 440                 445

Gly Asp Ala Val Glu Phe Leu Asp Glu Arg Phe Pro Glu Lys Gly Leu
450                 455                 460

Leu Phe Asp Gly Arg Val Gly Glu Asp Phe Lys Leu Leu Thr Gly Thr
465                 470                 475                 480

Trp Val His Val Gly Ser Leu Arg Val Ala Gly Ile Asp Ala Met Lys
            485                 490                 495

Pro Val Ala Gln Asp Ile Val Val Thr Gly His Asp Arg Asp Glu Ile
        500                 505                 510

Gly Phe Leu Val Phe Pro Asn Ile Pro Glu Cys Arg Thr Leu Cys Pro
    515                 520                 525

Asp Leu Pro Pro Asp Ala Asp Ile Ile Asp Leu Leu Leu Asn Pro Ala
530                 535                 540

Val Arg Gln Arg Val Arg Gln Gly Met Ala Leu Met Lys Gln Ile Gly
545                 550                 555                 560

Gly Gly Ser Ser Thr Tyr Pro Ser Arg Ala Leu Leu Met Ala Glu Pro
            565                 570                 575

Pro Ser Val Glu Ala Gly Glu Ile Thr Asp Lys Gly Tyr Ile Asn Gln
        580                 585                 590

Arg Met Val Leu Asn Arg Arg Ala Asp Leu Val Glu Tyr Leu Tyr Gln
    595                 600                 605

Asp Val Val Asp Lys Thr Val Ile Thr Val His Ser Ala Ile
610                 615                 620

<210> SEQ ID NO 19
<211> LENGTH: 524
<212> TYPE: PRT
<213> ORGANISM: Microbacterium oxydans

<400> SEQUENCE: 19

Met Val Arg Ser Thr Tyr Pro Asp Val Glu Ile Pro Glu Val Ser Ile
1               5                   10                  15

His Asp Phe Leu Phe Gly Asp Leu Ser Glu Ala Glu Leu Asp Thr Val
            20                  25                  30

Ala Leu Val Asp Gly Met Ser Gly Ala Thr Thr Tyr Arg Gln Leu
        35                  40                  45

Val Gly Gln Ile Asp Leu Phe Ala Gly Ala Leu Ala Arg Gly Val
50                  55                  60

Gly Val Gly Thr Val Gly Val Leu Cys Pro Asn Val Pro Ala Phe
65                  70                  75                  80

Ala Thr Val Phe His Gly Ile Leu Arg Ala Gly Ala Thr Ala Thr Thr
            85                  90                  95

Ile Asn Ser Leu Tyr Thr Ala Asp Glu Ile Ala Asn Gln Leu Thr Asp
        100                 105                 110

Ala Gly Ala Thr Trp Leu Val Thr Val Ser Pro Leu Leu Pro Gly Ala
    115                 120                 125

Gln Ala Ala Ala Glu Lys Leu Gly Phe Asp Ala Asp His Val Ile Val
130                 135                 140
```

Leu Asp Gly Ala Glu Gly His Pro Ser Leu Pro Ala Leu Leu Gly Glu
145                 150                 155                 160

Gly Arg Gln Ala Pro Asp Val Ser Phe Asp Pro Ser Thr His Leu Ala
            165                 170                 175

Val Leu Pro Tyr Ser Ser Gly Thr Thr Gly Arg Pro Lys Gly Val Met
        180                 185                 190

Leu Thr His Arg Asn Leu Val Ala Asn Val Ser Gln Cys Gln Pro Val
    195                 200                 205

Leu Gly Val Asp Ala Ser Asp Arg Val Leu Ala Val Leu Pro Phe Phe
210                 215                 220

His Ile Tyr Gly Met Thr Val Leu Leu Asn Phe Ala Leu Arg Gln Arg
225                 230                 235                 240

Ala Gly Leu Ala Thr Met Pro Arg Phe Asp Leu Pro Glu Phe Leu Arg
            245                 250                 255

Ile Ile Ala Glu His Arg Thr Ser Trp Val Phe Val Ala Pro Pro Ile
        260                 265                 270

Ala Val Ala Leu Ala Lys His Pro Ile Val Asp Gln Tyr Asp Leu Ser
    275                 280                 285

Ala Val Lys Val Ile Phe Ser Gly Ala Ala Pro Leu Asp Gly Thr Leu
290                 295                 300

Ala Ser Ala Val Ala Asn Arg Leu Gly Cys Ile Val Thr Gln Gly Tyr
305                 310                 315                 320

Gly Met Thr Glu Thr Ser Pro Ala Val Asn Leu Ile Ser Glu Ala Arg
            325                 330                 335

Thr Glu Ile Asp Arg Ser Thr Ile Gly Pro Leu Val Pro Asn Thr Glu
        340                 345                 350

Ala Arg Leu Val Asp Pro Asp Ser Gly Glu Asp Val Val Val Pro Ala
    355                 360                 365

Glu Gly Ala Ser Glu Pro Gly Glu Leu Trp Val Arg Gly Pro Gln Val
370                 375                 380

Met Val Gly Tyr Leu Asn Arg Pro Asp Ala Thr Ala Glu Met Leu Asp
385                 390                 395                 400

Ala Asp Gly Trp Leu His Thr Gly Asp Val Ala Thr Val Thr His Asp
            405                 410                 415

Gly Ile Tyr Arg Ile Val Asp Arg Leu Lys Glu Leu Ile Lys Tyr Lys
        420                 425                 430

Gly Tyr Gln Val Ala Pro Ala Val Leu Glu Ala Val Leu Leu Glu His
    435                 440                 445

Pro Ala Ile Ala Asp Ala Ala Val Ile Gly Ala Phe Asp Asp Asp Gly
450                 455                 460

Gln Glu Val Pro Lys Ala Phe Val Val Arg Gln Pro Asp Ala Asp Leu
465                 470                 475                 480

Asp Ala Asp Ala Val Met Ala His Val Thr Ser His Val Ala Pro His
            485                 490                 495

Glu Lys Val Arg Gln Val Glu Phe Ile Asp Val Ile Pro Lys Ser Ser
        500                 505                 510

Ser Gly Lys Ile Leu Arg Lys Asp Leu Arg Ala Arg
    515                 520

<210> SEQ ID NO 20
<211> LENGTH: 708
<212> TYPE: PRT
<213> ORGANISM: Aspergillus niger (strain CBS 513.88 / FGSC A1513)

<400> SEQUENCE: 20

```
Met Leu Phe Ser Gln Gln Pro Leu His Leu Thr Arg Ala Asp Glu Leu
1               5                   10                  15

Arg Gln Ser Pro Pro Lys Gly Thr Pro Tyr Ser Val Ala Leu Pro Gly
            20                  25                  30

Thr Glu Lys Pro Gly Arg Ser Lys Val Tyr Arg Ala Trp Asn Ala Thr
        35                  40                  45

Glu Gly Val Leu Lys Ser Leu Asp Pro Gln Ile Leu Thr Ala His Asp
    50                  55                  60

Ile Phe Glu Ser Thr Ala Asn Arg Leu Pro Lys Asn His Cys Leu Gly
65                  70                  75                  80

Trp Arg Pro Tyr Asn Pro Thr Thr Lys Thr Tyr Gly Val Tyr Gln Trp
                85                  90                  95

Leu Asp Tyr Gln Thr Val Gln Lys Arg Arg Ala Ala Phe Gly Ala Gly
            100                 105                 110

Leu Val Glu Leu His His Lys His Glu Cys Ser Arg Pro Gly Gln Tyr
        115                 120                 125

Gly Ile Gly Leu Trp Cys Gln Asn Arg Pro Glu Trp Gln Ile Thr Asp
    130                 135                 140

Leu Ala Cys Met Ser Gln Ser Leu Tyr Ser Val Ser Ile Tyr Asp Val
145                 150                 155                 160

Leu Ala Pro Asp Ala Thr Glu Tyr Ile Ile Asn His Ala Glu Leu Ala
                165                 170                 175

Cys Val Val Thr Ser Leu Pro His Ile Pro Thr Leu Leu Arg Leu Lys
            180                 185                 190

Pro Gln Leu Pro Asn Leu Lys Ile Ile Val Ser Leu Asp Pro Leu Asp
        195                 200                 205

Gly Gly Glu Glu Ala Gly His Ser Lys Arg Ala Leu Leu Glu Ser Met
    210                 215                 220

Ala Ala Gly Gln Asp Val Ser Ile Tyr Thr Met Ser Gln Val Glu Glu
225                 230                 235                 240

Leu Gly Ala Ser Val Asp Arg Pro Cys Lys Pro Ala Pro Ser Asp
                245                 250                 255

Thr Ile Thr Ile Asn Tyr Thr Ser Gly Thr Thr Gly Pro Pro Lys Gly
            260                 265                 270

Val Val Leu Ala His Glu Asn Ala Val Ala Ser Ala Ser Gly Ala Leu
        275                 280                 285

Ile Asn Ser Ile Gln Lys Ala Gly Asp Thr Ile Ile Ser Tyr Leu Pro
    290                 295                 300

Leu Ala His Ile Tyr Ala Arg Met Ser Glu His Ala Ala Phe Trp Ala
305                 310                 315                 320

Gly Ala Arg Ile Gly Tyr Phe His Gly Asn Ile Leu Glu Leu Val Asp
                325                 330                 335

Asp Leu Lys Leu Leu Lys Pro Thr Gly Phe Ile Ser Val Pro Arg Leu
            340                 345                 350

Tyr Thr Arg Phe Gly Asn Ala Ile Arg Ala Ser Thr Val Glu Ala Pro
        355                 360                 365

Gly Phe Arg Gly Ala Leu Ser Arg His Ile Val Ala Thr Lys Thr Ala
    370                 375                 380

Asn Leu Lys Asn Pro Asp Pro Ser Gln Ala Thr Gly Lys His Ala Leu
385                 390                 395                 400

Tyr Asp Arg Ile Trp Ala Lys Lys Val Ala Ala Ile Gly Leu Glu
                405                 410                 415
```

```
Arg Ser Arg Met Leu Ala Ser Gly Ser Ala Pro Leu Asp Pro Ser Leu
                420                 425                 430

His Gln Phe Leu Arg Ile Ala Leu Gly Val Asp Val Gln Gly Tyr
            435                 440                 445

Gly Leu Thr Glu Thr Tyr Ala Met Ala Cys Val Gln Ser Leu Ala Asp
        450                 455                 460

Leu Thr Ala Gly His Cys Gly Gly Leu Ile Pro Ser Thr Glu Ala Cys
465                 470                 475                 480

Leu Met Ser Leu Pro Asp Met Glu Tyr Ser Val Asp Lys Pro Tyr
            485                 490                 495

Pro Arg Gly Glu Leu Met Leu Arg Gly Ala Asn Val Phe Arg Glu Tyr
                500                 505                 510

Phe Lys Asp Pro Glu Glu Thr Ala Lys Ala Val Thr Glu Asp Gly Trp
            515                 520                 525

Phe Arg Thr Gly Asp Val Cys Lys Ile Asp Glu Met Gly Arg Ile Val
            530                 535                 540

Ile Ile Asp Arg Arg Lys Asn Val Leu Lys Leu Ala Gln Gly Glu Tyr
545                 550                 555                 560

Ile Ser Pro Glu Arg Leu Glu Gly Val Tyr Met Ser Glu Met Gly Tyr
                565                 570                 575

Leu Ala Gln Gly Tyr Val His Gly Asp Ser Val Gln Thr Phe Leu Val
            580                 585                 590

Ala Ile Phe Gly Val Gln Pro Asp Thr Phe Ala Val Phe Ala Ser Lys
            595                 600                 605

Val Leu Gly Arg Thr Ile Glu Ala Thr Asp Ile Glu Gly Ile Arg Ser
            610                 615                 620

Val Leu Asn Asp Pro Lys Ile Arg Lys Ala Val Leu Lys Asp Leu Asn
625                 630                 635                 640

Arg Ile Ala Lys Lys His Lys Leu Ala Gly Tyr Glu Arg Ile Lys Asn
                645                 650                 655

Cys Ala Leu Met Ile Asp Pro Phe Thr Ile Glu Asn Asn Leu Leu Thr
            660                 665                 670

Pro Thr Leu Lys Leu Lys Arg Pro Pro Thr Thr Lys Lys Tyr Arg Gln
            675                 680                 685

Val Leu Asp Glu Leu Tyr Ala Glu Ala Leu Ala Glu Glu Ser Ala Pro
690                 695                 700

Lys Ala Lys Leu
705

<210> SEQ ID NO 21
<211> LENGTH: 559
<212> TYPE: PRT
<213> ORGANISM: Brevibacterium yomogidense

<400> SEQUENCE: 21

Met Ser Trp Phe Asp Glu Arg Pro Trp Leu Arg Thr Leu Gly Leu Thr
1               5                   10                  15

Glu Thr Glu Ala Val Pro Leu Glu Pro Ser Thr Pro Leu Arg Asp Leu
                20                  25                  30

Ala Asp Thr Val Ala Ala His Pro Thr Thr Ala Ala Trp Thr His Tyr
            35                  40                  45

Gly Gln Ser Ala Thr Tyr Ala Glu Phe Asp Arg Gln Thr Thr Ala Phe
        50                  55                  60

Ala Ala Tyr Leu Ala Glu Ser Gly Ile Arg Pro Gly Asp Ala Val Ala
```

```
                65                  70                  75                  80
        Val Tyr Ala Gln Asn Ser Pro His Phe Pro Ile Ala Thr Tyr Gly Ile
                            85                  90                  95
        Trp Lys Ala Gly Ala Val Val Pro Leu Asn Pro Met Tyr Arg Asp
                        100                 105                 110
        Glu Leu Thr His Ala Phe Ala Asp Ala Asp Val Lys Ala Ile Val Val
                        115                 120                 125
        Gln Lys Ala Leu Tyr Leu Met Arg Val Lys Glu Tyr Ala Ala Asp Leu
                    130                 135                 140
        Pro Leu Val Val Leu Ala Gly Asp Leu Asp Trp Ala Gln Asp Gly Pro
        145                 150                 155                 160
        Asp Ala Val Phe Gly Ala Tyr Ala Asp Leu Pro Asp Val Pro Leu Pro
                                165                 170                 175
        Asp Leu Arg Thr Val Val Asp Glu Arg Leu Asp Thr Asp Phe Glu Pro
                    180                 185                 190
        Leu Thr Val Arg Pro Glu Asp Pro Ala Leu Ile Gly Tyr Thr Ser Gly
                        195                 200                 205
        Thr Ser Gly Lys Ala Lys Gly Ala Leu His Pro His Ser Ser Ile Ser
            210                 215                 220
        Ser Asn Ser Arg Met Ala Ala Arg Asn Ala Gly Leu Pro Gln Gly Ala
        225                 230                 235                 240
        Gly Val Val Ser Leu Ala Pro Leu Phe His Ile Thr Gly Phe Ile Cys
                                245                 250                 255
        Gln Met Ile Ala Ser Thr Ala Asn Gly Ser Thr Leu Val Leu Asn His
                        260                 265                 270
        Arg Phe Asp Pro Ala Ser Phe Leu Asp Leu Leu Arg Gln Glu Lys Pro
                    275                 280                 285
        Ala Phe Met Ala Gly Pro Ala Thr Val Tyr Thr Ala Met Met Ala Ser
                        290                 295                 300
        Pro Ser Phe Gly Ala Asp Ala Phe Asp Ser Phe His Ser Ile Met Ser
        305                 310                 315                 320
        Gly Gly Ala Pro Leu Pro Glu Gly Leu Val Lys Arg Phe Glu Glu Lys
                                325                 330                 335
        Thr Gly His Tyr Ile Gly Gln Gly Tyr Gly Leu Thr Glu Thr Ala Ala
                        340                 345                 350
        Gln Ala Val Thr Val Pro His Ser Leu Arg Ala Pro Val Asp Pro Glu
                    355                 360                 365
        Ser Gly Asn Leu Ser Thr Gly Leu Pro Gln Arg Asp Ala Met Val Arg
            370                 375                 380
        Ile Leu Asp Asp Gly Asn Pro Val Gly Pro Arg Glu Val Gly Glu
        385                 390                 395                 400
        Val Ala Ile Ser Gly Pro Met Val Ala Thr Glu Tyr Leu Gly Asn Pro
                        405                 410                 415
        Gln Ala Thr Ala Asp Ser Leu Pro Gly Gly Glu Leu Arg Thr Gly Asp
                    420                 425                 430
        Val Gly Phe Met Asp Pro Asp Gly Trp Val Phe Ile Val Asp Arg Lys
                        435                 440                 445
        Lys Asp Met Ile Asn Ala Ser Gly Phe Lys Val Trp Pro Arg Glu Val
                    450                 455                 460
        Glu Asp Ile Leu Tyr Met His Pro Ala Val Arg Glu Gly Ala Val Val
        465                 470                 475                 480
        Gly Val Pro Asp Glu Tyr Arg Gly Glu Thr Val Val Ala Phe Val Ser
                                485                 490                 495
```

```
Leu Gln Pro Asp Ser Gln Ala Thr Ala Glu Asp Ile Ile Ala His Cys
        500                 505                 510

Lys Glu His Leu Ala Ser Tyr Lys Ala Pro Val Glu Val Thr Ile Val
        515                 520                 525

Asp Glu Leu Pro Lys Thr Ser Ser Gly Lys Ile Leu Arg Arg Thr Val
        530                 535                 540

Arg Asp Glu Ala Thr Gln Ala Arg Gln Ala Gln Pro Asp Ala His
545                 550                 555

<210> SEQ ID NO 22
<211> LENGTH: 673
<212> TYPE: PRT
<213> ORGANISM: Brevibacterium linens

<400> SEQUENCE: 22

Met Ile Asn Asn Trp Leu Ala Val Gly Leu Val Val Ser Gly Ile
1               5                   10                  15

Leu Ala Phe Asn Trp Lys Arg Lys His Pro Tyr Gly Gln Thr Val Glu
        20                  25                  30

Ile Gly Glu Lys Pro Glu Asn Gly Gly Arg Ile Arg Arg Asn Ser Ala
        35                  40                  45

Cys Ala Asp His Leu Ile Ser Phe Leu Glu Asp Asp Glu Ile Tyr Thr
50                  55                  60

Leu Tyr Asp Ser Leu Val Lys Ser Cys Lys Lys Tyr Gly Glu Arg Lys
65                  70                  75                  80

Cys Phe Gly Glu Arg Lys Lys Asp Ser Asn Gly Asn Leu Gly Lys Phe
                85                  90                  95

Glu Trp Ile Ser Tyr Asn Thr Tyr Leu Glu Arg Cys Glu Tyr Ile Gln
            100                 105                 110

Gln Gly Leu Cys Glu Leu Gly Leu Lys Pro Lys Ser Lys Val Gly Ile
        115                 120                 125

Phe Ser Lys Asn Arg Leu Glu Trp Leu Ile Val His Ser Ala Ser Phe
130                 135                 140

Ile Gln Ser Tyr Cys Val Val Ser Phe Tyr Glu Thr Leu Gly Val Glu
145                 150                 155                 160

Ser Leu Ser Tyr Val Thr Glu His Ala Glu Ile Gly Leu Ala Phe Cys
                165                 170                 175

Ser Ala Glu Thr Leu Gln Lys Thr Leu Asp Ile Ala Lys Gly Val Lys
            180                 185                 190

Val Leu Lys Thr Ile Ile Cys Phe Asp Ser Ile Asp Lys Glu His Tyr
        195                 200                 205

Asn Ile Ala Lys Glu Leu Gly Val Thr Leu Tyr Thr Tyr Asp Glu Ile
    210                 215                 220

Met Lys Lys Gly Lys Glu Ala Asn Gly Lys His Lys His Thr Pro Pro
225                 230                 235                 240

Thr Pro Asp Thr Leu Ser Thr Ile Met Tyr Thr Ser Gly Thr Thr Gly
                245                 250                 255

Pro Pro Lys Gly Val Met Ile Thr His Lys Asn Leu Thr Ser Val Val
            260                 265                 270

Cys Ala Val Ser Asp Phe Ile Lys Val Tyr Asp Thr Asp Val His Tyr
        275                 280                 285

Ser Tyr Leu Pro Tyr Ala His Val Leu Glu Arg Val Val Ile Leu Ala
    290                 295                 300

Ala Phe His Phe Gly Ala Ala Ile Gly Ile Phe Ser Gly Asp Ile Ser
```

```
                305                 310                 315                 320
        Asn Ile Leu Val Glu Val Lys Leu Leu Ser Pro Thr Leu Phe Ile Gly
                        325                 330                 335

Val Pro Arg Val Phe Glu Arg Ile Lys Thr Asn Val Phe Lys Glu Ile
                        340                 345                 350

Ser Lys Lys Pro Ala Leu Leu Arg Thr Leu Phe Asn Gly Ala Tyr Asn
                        355                 360                 365

Leu Lys Tyr Leu Ser Ile Gln His Gly Phe Lys Leu Pro Ile Ile Glu
                        370                 375                 380

Lys Val Leu Asp Leu Val Phe Phe Ser Lys Ile Lys Gln Ala Leu Gly
        385                 390                 395                 400

Gly Lys Val Arg Val Ile Leu Ser Gly Ser Ala Pro Leu Ser Phe Asp
                        405                 410                 415

Thr Glu Val Phe Leu Arg Val Val Met Cys Cys Cys Val Leu Gln Gly
                        420                 425                 430

Tyr Gly Ala Ser Glu Gly Cys Gly Gly Asp Ala Cys Lys Arg Leu Asp
                        435                 440                 445

Asp Glu Ser Val Gly Thr Ile Gly Pro Pro Phe Ala Ser Asn Glu Ile
                        450                 455                 460

Lys Leu Val Asp Val Pro Glu Leu Gly Tyr Asp Ser Asn Gly Glu Val
        465                 470                 475                 480

Gln Thr Gly Glu Val Cys Leu Arg Gly Pro Ser Ile Ser Ser Gly Tyr
                        485                 490                 495

Tyr Lys Asp Glu Glu Lys Thr Arg Glu Glu Phe Lys Asp Gly Trp Phe
                        500                 505                 510

His Thr Gly Asp Ile Gly Arg Trp Asn Arg Asp Gly Ser Leu Ser Ile
                        515                 520                 525

Val Asp Arg Lys Lys Asn Ile Phe Lys Leu Ser Gln Gly Glu Tyr Val
        530                 535                 540

Ala Val Glu Lys Ile Glu Thr Ile Val Val Lys Ser Glu Tyr Val Glu
        545                 550                 555                 560

Gln Val Cys Ile Tyr Gly Asp Ser Gln Lys Ser Cys Val Ile Ala Ile
                        565                 570                 575

Ile His Pro His Pro Glu Ser Cys Ser Glu Trp Ala Gly Ser Lys Lys
                        580                 585                 590

Thr Asp Lys Asp Ile Lys Glu Ile Cys Lys Asn Gln Asp Phe Ile Lys
                        595                 600                 605

Val Val Leu Asp Asp Ile Ile Lys Asn Cys Lys Lys Ser Gly Leu His
                        610                 615                 620

Gly Phe Glu Ile Pro Lys Ala Ile His Leu Thr Pro Glu Ala Phe Ser
        625                 630                 635                 640

Asp Gln Asn Asn Leu Leu Thr Pro Ser Phe Lys Leu Lys Arg His Glu
                        645                 650                 655

Ile Lys Lys Tyr Phe Glu Asp Glu Ile Lys Lys Leu Tyr Ser Lys Leu
                        660                 665                 670

Asp

<210> SEQ ID NO 23
<211> LENGTH: 555
<212> TYPE: PRT
<213> ORGANISM: Nocardioides simplex (Arthrobacter simplex)

<400> SEQUENCE: 23

Met Ser Phe Arg Tyr Tyr Arg Asp Leu His Pro Thr Phe Ala Asp Arg
```

-continued

```
1               5                   10                  15
Thr Glu Trp Ala Leu Pro Thr Val Leu Arg His His Ala Ala Glu Arg
                20                  25                  30

Pro Asp Ala Val Trp Leu Asp Cys Pro Glu Glu Gly Arg Thr Trp Thr
                35                  40                  45

Phe Ala Glu Thr Leu Thr Ala Ala Glu Arg Val Gly Arg Ser Leu Leu
50                      55                  60

Ala Ala Gly Ala Glu Pro Gly Asp Arg Val Val Leu Val Ala Gln Asn
65                  70                  75                  80

Ser Ser Ala Phe Val Arg Thr Trp Leu Gly Thr Ala Val Ala Gly Leu
                85                  90                  95

Val Glu Val Pro Val Asn Thr Ala Tyr Glu His Asp Phe Leu Ala His
                100                 105                 110

Gln Val Ser Thr Val Glu Ala Thr Leu Ala Val Val Asp Asp Val Tyr
                115                 120                 125

Ala Ala Arg Phe Val Ala Ile Ala Glu Ala Ala Lys Ser Ile Arg Lys
            130                 135                 140

Phe Trp Val Ile Asp Thr Gly Ser Arg Asp Gln Ala Leu Ala Thr Leu
145                 150                 155                 160

Arg Asp Ala Gly Trp Glu Ala Ala Pro Phe Glu Leu Asp Glu Ala
                165                 170                 175

Ala Thr Ala Pro Glu Val Val Asp Ala Thr Leu Ala Leu Pro Asp Val
                180                 185                 190

Arg Pro Gln Asp Leu Ala Ser Val Leu Phe Thr Ser Gly Thr Thr Gly
                195                 200                 205

Pro Ser Lys Gly Val Ala Met Pro His Ala Gln Met Tyr Phe Phe Ala
                210                 215                 220

Asp Glu Cys Val Ser Leu Val Arg Leu Thr Pro Asp Asp Ala Trp Met
225                 230                 235                 240

Ser Val Thr Pro Leu Phe His Gly Asn Ala Gln Phe Met Ala Ala Tyr
                245                 250                 255

Pro Thr Leu Val Ala Gly Ala Arg Phe Val Thr Arg Ser Arg Phe Ser
                260                 265                 270

Ala Ser Arg Trp Val Asp Gln Leu Arg Glu Ser Arg Val Thr Val Thr
                275                 280                 285

Asn Phe Ile Gly Val Met Met Asp Phe Ile Trp Lys Gln Asp Arg Arg
                290                 295                 300

Asp Asp Asp Ala Asp Asn Pro Leu Arg Val Val Phe Ala Ala Pro Thr
305                 310                 315                 320

Ala Ala Thr Leu Val Gly Pro Met Ser Glu Arg Tyr Gly Ile Glu Ala
                325                 330                 335

Phe Val Glu Val Phe Gly Leu Thr Glu Thr Ser Ala Pro Ile Ile Ser
                340                 345                 350

Pro Tyr Gly Val Asp Arg Pro Ala Gly Ala Gly Leu Ala Ala Asp
                355                 360                 365

Glu Trp Phe Asp Val Arg Leu Val Asp Pro Glu Thr Asp Glu Glu Val
                370                 375                 380

Gly Val Gly Glu Ile Gly Glu Leu Val Val Arg Pro Lys Val Pro Phe
385                 390                 395                 400

Ile Cys Ser Met Gly Tyr Phe Asn Met Pro Asp Lys Thr Val Glu Ala
                405                 410                 415

Trp Arg Asn Leu Trp Phe His Thr Gly Asp Ala Leu Arg Arg Asp Glu
                420                 425                 430
```

```
Asp Gly Trp Phe Tyr Phe Val Asp Arg Phe Lys Asp Ala Leu Arg Arg
            435                 440                 445

Arg Gly Glu Asn Ile Ser Ser Tyr Glu Ile Glu Thr Ser Ile Leu Ala
        450                 455                 460

His Pro Ala Val Val Glu Cys Ala Val Ile Ala Val Pro Ala Ser Ser
465                 470                 475                 480

Glu Ala Gly Glu Asp Glu Val Met Ala Tyr Val Ile Thr Gly Gly Asp
                485                 490                 495

Ala Pro Val Pro Thr Pro Ala Glu Leu Trp Ala His Cys Asp Gly Arg
                500                 505                 510

Ile Pro Ser Phe Ala Val Pro Arg Tyr Leu Arg Phe Val Asp Glu Met
            515                 520                 525

Pro Lys Thr Pro Ser Gln Arg Val Gln Lys Ala Lys Leu Arg Ala Leu
        530                 535                 540

Gly Val Thr Pro Asp Thr His Asp Arg Glu Ala
545                 550                 555

<210> SEQ ID NO 24
<211> LENGTH: 515
<212> TYPE: PRT
<213> ORGANISM: Pseudomonas putida (Arthrobacter siderocapsulatus)

<400> SEQUENCE: 24

Met Asn Leu Gly Lys Ile Ile Thr Arg Ser Ala Arg Tyr Trp Pro Asp
1               5                   10                  15

His Thr Ala Val Ala Asp Ser Gln Thr Arg Leu Thr Tyr Ala Gln Leu
            20                  25                  30

Glu Arg Arg Ser Asn Arg Leu Ala Ser Gly Leu Gly Ala Leu Gly Val
        35                  40                  45

Ala Thr Gly Glu His Val Ala Ile Leu Ala Ala Asn Arg Val Glu Leu
    50                  55                  60

Val Glu Ala Glu Val Ala Leu Tyr Lys Ala Ala Met Val Lys Val Pro
65                  70                  75                  80

Ile Asn Ala Arg Leu Ser Leu Asp Glu Val Val Arg Val Leu Glu Asp
                85                  90                  95

Ser Cys Ser Val Ala Leu Ile Thr Asp Ala Thr Phe Ala Gln Ala Leu
            100                 105                 110

Ala Glu Arg Arg Ala Ala Leu Pro Met Leu Arg Gln Val Ile Ala Leu
        115                 120                 125

Glu Gly Glu Gly Gly Asp Leu Gly Tyr Ala Ala Leu Leu Glu Arg Gly
    130                 135                 140

Ser Glu Ala Pro Cys Ser Leu Asp Pro Ala Asp Asp Ala Leu Ala Val
145                 150                 155                 160

Leu His Tyr Thr Ser Gly Ser Ser Gly Val Leu Lys Ala Ala Met Leu
                165                 170                 175

Ser Phe Gly Asn Arg Lys Ala Leu Val Arg Lys Ser Ile Ala Ser Pro
            180                 185                 190

Thr Arg Arg Ser Gly Pro Asp Asp Val Met Ala His Val Gly Pro Ile
        195                 200                 205

Thr His Ala Ser Gly Met Gln Ile Met Pro Leu Leu Ala Val Gly Ala
    210                 215                 220

Cys Asn Leu Leu Leu Asp Arg Tyr Asp Asp Arg Leu Leu Leu Glu Ala
225                 230                 235                 240

Ile Glu Arg Glu Arg Val Thr Arg Leu Phe Leu Val Pro Ala Met Ile
```

```
                       245                 250                 255
Asn Arg Leu Val Asn Tyr Pro Asp Val Glu Arg Phe Asp Leu Ser Ser
            260                 265                 270

Leu Lys Leu Val Met Tyr Gly Ala Ala Pro Met Ala Pro Ala Leu Val
            275                 280                 285

Lys Lys Ala Ile Glu Leu Phe Gly Pro Ile Leu Val Gln Gly Tyr Gly
            290                 295                 300

Ala Gly Glu Thr Cys Ser Leu Val Thr Val Leu Thr Glu Gln Asp His
305                 310                 315                 320

Leu Ile Glu Asp Gly Asn Tyr Gln Arg Leu Ala Ser Cys Gly Arg Cys
            325                 330                 335

Tyr Phe Glu Thr Asp Leu Arg Val Val Asn Glu Ala Phe Glu Asp Val
            340                 345                 350

Ala Pro Gly Glu Ile Gly Glu Ile Val Val Lys Gly Pro Asp Ile Met
            355                 360                 365

Gln Gly Tyr Trp Arg Ala Pro Ala Leu Thr Ala Glu Val Met Arg Asp
            370                 375                 380

Gly Tyr Tyr Leu Thr Gly Asp Leu Ala Thr Val Asp Ala Gln Gly Tyr
385                 390                 395                 400

Val Phe Ile Val Asp Arg Lys Lys Glu Met Ile Ile Ser Gly Gly Phe
            405                 410                 415

Asn Val Tyr Pro Ser Glu Val Glu Gln Val Ile Tyr Gly Phe Pro Glu
            420                 425                 430

Val Phe Glu Ala Ala Val Val Gly Val Pro Asp Glu Gln Trp Gly Glu
            435                 440                 445

Ala Val Arg Ala Val Val Val Leu Lys Pro Gly Ala Gln Leu Asp Ala
            450                 455                 460

Ala Glu Leu Ile Glu Arg Cys Gly Arg Ala Leu Ala Gly Phe Lys Lys
465                 470                 475                 480

Pro Arg Gly Val Asp Phe Val Thr Glu Leu Pro Lys Asn Pro Asn Gly
            485                 490                 495

Lys Val Val Arg Arg Leu Val Arg Glu Ala Tyr Trp Gln His Ser Asp
            500                 505                 510

Arg Arg Ile
        515

<210> SEQ ID NO 25
<211> LENGTH: 390
<212> TYPE: PRT
<213> ORGANISM: Dendrobium catenatum

<400> SEQUENCE: 25

Met Pro Ser Leu Glu Ser Ile Arg Lys Ala Pro Arg Ala Asn Gly Phe
1               5                   10                  15

Ala Ser Ile Leu Ala Ile Gly Arg Ala Asn Pro Glu Asn Phe Ile Glu
            20                  25                  30

Gln Ser Thr Tyr Pro Asp Phe Phe Arg Ile Thr Asn Ser Glu His
            35                  40                  45

Leu Val Asp Leu Lys Lys Lys Phe Gln Arg Ile Cys Asp Lys Thr Ala
50                  55                  60

Ile Arg Lys Arg His Phe Val Trp Asn Glu Glu Phe Ile Thr Thr Asn
65                  70                  75                  80

Pro Cys Leu His Thr Phe Met Asp Lys Ser Leu Asp Val Arg Gln Glu
            85                  90                  95
```

```
Val Ala Ile Arg Glu Ile Pro Lys Leu Gly Ala Lys Ala Ala Ala Lys
            100                 105                 110

Ala Ile Gln Glu Trp Gly Gln Pro Lys Ser Arg Ile Thr His Leu Ile
        115                 120                 125

Phe Cys Thr Thr Ser Gly Met Asp Leu Pro Gly Ala Asp Tyr Gln Leu
    130                 135                 140

Thr Gln Ile Leu Gly Leu Asn Pro Asn Val Glu Arg Val Met Leu Tyr
145                 150                 155                 160

Gln Gln Gly Cys Phe Ala Gly Gly Thr Thr Leu Arg Leu Ala Lys Cys
                165                 170                 175

Leu Ala Glu Ser Arg Lys Gly Ala Arg Val Leu Val Val Cys Ala Glu
            180                 185                 190

Thr Thr Thr Val Leu Phe Arg Gly Pro Ser Glu Glu His Gln Glu Asp
        195                 200                 205

Leu Val Thr Gln Ala Leu Phe Ala Asp Gly Ala Ser Ala Leu Ile Val
    210                 215                 220

Gly Ala Asp Pro Asp Glu Ala Ala His Glu Arg Ala Ser Phe Val Ile
225                 230                 235                 240

Val Ser Thr Ser Gln Val Leu Leu Pro Asp Ser Ala Gly Ala Ile Gly
                245                 250                 255

Gly His Val Ser Glu Gly Gly Leu Leu Ala Thr Leu His Arg Asp Val
            260                 265                 270

Pro Lys Ile Val Ser Lys Asn Val Glu Lys Cys Leu Glu Glu Ala Phe
        275                 280                 285

Thr Pro Phe Gly Ile Thr Asp Trp Asn Ser Ile Phe Trp Val Pro His
    290                 295                 300

Pro Gly Gly Arg Ala Ile Leu Asp Leu Val Glu Glu Arg Val Gly Leu
305                 310                 315                 320

Lys Pro Glu Lys Leu Leu Val Ser Arg His Val Leu Ala Glu Tyr Gly
                325                 330                 335

Asn Met Ser Ser Val Cys Val His Phe Ala Leu Asp Glu Met Arg Lys
            340                 345                 350

Arg Ser Ala Ile Glu Gly Lys Ala Thr Thr Gly Glu Gly Leu Glu Trp
        355                 360                 365

Gly Val Val Phe Gly Phe Gly Pro Gly Leu Thr Val Glu Thr Val Val
    370                 375                 380

Leu Arg Ser Val Pro Leu
385                 390

<210> SEQ ID NO 26
<211> LENGTH: 385
<212> TYPE: PRT
<213> ORGANISM: Cannabis sativa

<400> SEQUENCE: 26

Met Asn His Leu Arg Ala Glu Gly Pro Ala Ser Val Leu Ala Ile Gly
1               5                   10                  15

Thr Ala Asn Pro Glu Asn Ile Leu Leu Gln Asp Glu Phe Pro Asp Tyr
            20                  25                  30

Tyr Phe Arg Val Thr Lys Ser Glu His Met Thr Gln Leu Lys Glu Lys
        35                  40                  45

Phe Arg Lys Ile Cys Asp Lys Ser Met Ile Arg Lys Arg Asn Cys Phe
    50                  55                  60

Leu Asn Glu Glu His Leu Lys Gln Asn Pro Arg Leu Val Glu His Glu
65                  70                  75                  80
```

-continued

```
Met Gln Thr Leu Asp Ala Arg Gln Asp Met Leu Val Glu Val Pro
                85                  90                  95

Lys Leu Gly Lys Asp Ala Cys Ala Lys Ala Ile Lys Glu Trp Gly Gln
            100                 105                 110

Pro Lys Ser Lys Ile Thr His Leu Ile Phe Thr Ser Ala Ser Thr Thr
            115                 120                 125

Asp Met Pro Gly Ala Asp Tyr His Cys Ala Lys Leu Leu Gly Leu Ser
    130                 135                 140

Pro Ser Val Lys Arg Val Met Met Tyr Gln Leu Gly Cys Tyr Gly Gly
145                 150                 155                 160

Gly Thr Val Leu Arg Ile Ala Lys Asp Ile Ala Glu Asn Asn Lys Gly
                165                 170                 175

Ala Arg Val Leu Ala Val Cys Cys Asp Ile Met Ala Cys Leu Phe Arg
            180                 185                 190

Gly Pro Ser Glu Ser Asp Leu Glu Leu Leu Val Gly Gln Ala Ile Phe
        195                 200                 205

Gly Asp Gly Ala Ala Ala Val Ile Val Gly Ala Glu Pro Asp Glu Ser
    210                 215                 220

Val Gly Glu Arg Pro Ile Phe Glu Leu Val Ser Thr Gly Gln Thr Ile
225                 230                 235                 240

Leu Pro Asn Ser Glu Gly Thr Ile Gly Gly His Ile Arg Glu Ala Gly
                245                 250                 255

Leu Ile Phe Asp Leu His Lys Asp Val Pro Met Leu Ile Ser Asn Asn
            260                 265                 270

Ile Glu Lys Cys Leu Ile Glu Ala Phe Thr Pro Ile Gly Ile Ser Asp
        275                 280                 285

Trp Asn Ser Ile Phe Trp Ile Thr His Pro Gly Gly Lys Ala Ile Leu
    290                 295                 300

Asp Lys Val Glu Glu Lys Leu His Leu Lys Ser Asp Lys Phe Val Asp
305                 310                 315                 320

Ser Arg His Val Leu Ser Glu His Gly Asn Met Ser Ser Ser Thr Val
                325                 330                 335

Leu Phe Val Met Asp Glu Leu Arg Lys Arg Ser Leu Glu Glu Gly Lys
            340                 345                 350

Ser Thr Thr Gly Asp Gly Phe Glu Trp Gly Val Leu Phe Gly Phe Gly
        355                 360                 365

Pro Gly Leu Thr Val Glu Arg Val Val Arg Ser Val Pro Ile Lys
    370                 375                 380

Tyr
385

<210> SEQ ID NO 27
<211> LENGTH: 389
<212> TYPE: PRT
<213> ORGANISM: Arachis hypogaea

<400> SEQUENCE: 27

Met Val Ser Val Ser Gly Ile Arg Lys Val Gln Arg Ala Glu Gly Pro
1               5                   10                  15

Ala Thr Val Leu Ala Ile Gly Thr Ala Asn Pro Pro Asn Cys Ile Asp
            20                  25                  30

Gln Ser Thr Tyr Ala Asp Tyr Tyr Phe Arg Val Thr Asn Ser Glu His
        35                  40                  45

Met Thr Asp Leu Lys Lys Lys Phe Gln Arg Ile Cys Glu Arg Thr Gln
```

```
            50                  55                  60
Ile Lys Asn Arg His Met Tyr Leu Thr Glu Glu Ile Leu Lys Glu Asn
 65                  70                  75                  80

Pro Asn Met Cys Ala Tyr Lys Ala Pro Ser Leu Asp Ala Arg Glu Asp
                 85                  90                  95

Met Met Ile Arg Glu Val Pro Arg Val Gly Lys Glu Ala Ala Thr Lys
            100                 105                 110

Ala Ile Lys Glu Trp Gly Gln Pro Met Ser Lys Ile Thr His Leu Ile
        115                 120                 125

Phe Cys Thr Thr Ser Gly Val Ala Leu Pro Gly Val Asp Tyr Glu Leu
    130                 135                 140

Ile Val Leu Leu Gly Leu Asp Pro Cys Val Lys Arg Tyr Met Met Tyr
145                 150                 155                 160

His Gln Gly Cys Phe Ala Gly Gly Thr Val Leu Arg Leu Ala Lys Asp
                165                 170                 175

Leu Ala Glu Asn Asn Lys Asp Ala Arg Val Leu Ile Val Cys Ser Glu
            180                 185                 190

Asn Thr Ala Val Thr Phe Arg Gly Pro Ser Glu Thr Asp Met Asp Ser
        195                 200                 205

Leu Val Gly Gln Ala Leu Phe Ala Asp Gly Ala Ala Ile Ile Ile
    210                 215                 220

Gly Ser Asp Pro Val Pro Glu Val Glu Lys Pro Ile Phe Glu Leu Val
225                 230                 235                 240

Ser Thr Asp Gln Lys Leu Val Pro Gly Ser His Gly Ala Ile Gly Gly
                245                 250                 255

Leu Leu Arg Glu Val Gly Leu Thr Phe Tyr Leu Asn Lys Ser Val Pro
            260                 265                 270

Asp Ile Ile Ser Gln Asn Ile Asn Asp Ala Leu Asn Lys Ala Phe Asp
        275                 280                 285

Pro Leu Gly Ile Ser Asp Tyr Asn Ser Ile Phe Trp Ile Ala His Pro
    290                 295                 300

Gly Gly Arg Ala Ile Leu Asp Gln Val Glu Gln Lys Val Asn Leu Lys
305                 310                 315                 320

Pro Glu Lys Met Lys Ala Thr Arg Asp Val Leu Ser Asn Tyr Gly Asn
                325                 330                 335

Met Ser Ser Ala Cys Val Phe Phe Ile Met Asp Leu Met Arg Lys Arg
            340                 345                 350

Ser Leu Glu Glu Gly Leu Lys Thr Thr Gly Glu Gly Leu Asp Trp Gly
        355                 360                 365

Val Leu Phe Gly Phe Gly Pro Gly Leu Thr Ile Glu Thr Val Val Leu
    370                 375                 380

Arg Ser Val Ala Ile
385

<210> SEQ ID NO 28
<211> LENGTH: 497
<212> TYPE: PRT
<213> ORGANISM: Dictyostelium discoideum AX4

<400> SEQUENCE: 28

Met Asn Asn Ser Asn Val Lys Ser Ser Pro Ser Ile Val Lys Glu Glu
 1               5                  10                  15

Ile Val Thr Leu Asp Lys Asp Gln Gln Pro Leu Leu Leu Lys Glu His
            20                  25                  30
```

-continued

```
Gln His Ile Ile Ser Pro Asp Ile Arg Ile Asn Lys Pro Lys Arg
         35                  40                  45

Glu Ser Leu Ile Arg Thr Pro Ile Leu Asn Lys Phe Asn Gln Ile Thr
 50                  55                  60

Glu Ser Ile Ile Thr Pro Ser Thr Pro Ser Leu Ser Gln Ser Asp Val
 65                  70                  75                  80

Leu Lys Thr Pro Pro Ile Lys Ser Leu Asn Asn Thr Lys Asn Ser Ser
                 85                  90                  95

Leu Ile Asn Thr Pro Pro Ile Gln Ser Val Gln Gln His Gln Lys Gln
             100                 105                 110

Gln Gln Lys Val Gln Val Ile Gln Gln Gln Gln Pro Leu Ser Arg
         115                 120                 125

Leu Ser Tyr Lys Ser Asn Asn Asn Ser Phe Val Leu Gly Ile Gly Ile
 130                 135                 140

Ser Val Pro Gly Glu Pro Ile Ser Gln Gln Ser Leu Lys Asp Ser Ile
145                 150                 155                 160

Ser Asn Asp Phe Ser Asp Lys Ala Glu Thr Asn Glu Lys Val Lys Arg
                165                 170                 175

Ile Phe Glu Gln Ser Gln Ile Lys Thr Arg His Leu Val Arg Asp Tyr
             180                 185                 190

Thr Lys Pro Glu Asn Ser Ile Lys Phe Arg His Leu Glu Thr Ile Thr
         195                 200                 205

Asp Val Asn Asn Gln Phe Lys Lys Val Val Pro Asp Leu Ala Gln Gln
 210                 215                 220

Ala Cys Leu Arg Ala Leu Lys Asp Trp Gly Gly Asp Lys Gly Asp Ile
225                 230                 235                 240

Thr His Ile Val Ser Val Thr Ser Thr Gly Ile Ile Ile Pro Asp Val
                245                 250                 255

Asn Phe Lys Leu Ile Asp Leu Leu Gly Leu Asn Lys Asp Val Glu Arg
             260                 265                 270

Val Ser Leu Asn Leu Met Gly Cys Leu Ala Gly Leu Ser Ser Leu Arg
         275                 280                 285

Thr Ala Ala Ser Leu Ala Lys Ala Ser Pro Arg Asn Arg Ile Leu Val
 290                 295                 300

Val Cys Thr Glu Val Cys Ser Leu His Phe Ser Asn Thr Asp Gly Gly
305                 310                 315                 320

Asp Gln Met Val Ala Ser Ser Ile Phe Ala Asp Gly Ser Ala Ala Tyr
                325                 330                 335

Ile Ile Gly Cys Asn Pro Arg Ile Glu Glu Thr Pro Leu Tyr Glu Val
             340                 345                 350

Met Cys Ser Ile Asn Arg Ser Phe Pro Asn Thr Glu Asn Ala Met Val
         355                 360                 365

Trp Asp Leu Glu Lys Glu Gly Trp Asn Leu Gly Leu Asp Ala Ser Ile
 370                 375                 380

Pro Ile Val Ile Gly Ser Gly Ile Glu Ala Phe Val Asp Thr Leu Leu
385                 390                 395                 400

Asp Lys Ala Lys Leu Gln Thr Ser Thr Ala Ile Ser Ala Lys Asp Cys
                405                 410                 415

Glu Phe Leu Ile His Thr Gly Gly Lys Ser Ile Leu Met Asn Ile Glu
             420                 425                 430

Asn Ser Leu Gly Ile Asp Pro Lys Gln Thr Lys Asn Thr Trp Asp Val
         435                 440                 445

Tyr His Ala Tyr Gly Asn Met Ser Ser Ala Ser Val Ile Phe Val Met
```

```
                    450              455              460
Asp His Ala Arg Lys Ser Lys Ser Leu Pro Thr Tyr Ser Ile Ser Leu
465                 470              475              480

Ala Phe Gly Pro Gly Leu Ala Phe Glu Gly Cys Phe Leu Lys Asn Val
                485              490              495

Val

<210> SEQ ID NO 29
<211> LENGTH: 394
<212> TYPE: PRT
<213> ORGANISM: Spinacia oleracea

<400> SEQUENCE: 29

Met Ala Ser Val Asp Ile Ser Glu Ile His Asn Val Glu Arg Ala Lys
1               5                   10                  15

Gly Gln Ala Asn Val Leu Ala Ile Gly Thr Ala Asn Pro Pro Asn Val
                20                  25                  30

Met Tyr Gln Ala Asp Tyr Pro Asp Phe Tyr Phe Arg Leu Thr Asn Ser
            35                  40                  45

Glu His Met Thr Asp Leu Lys Ala Lys Phe Lys Arg Ile Cys Glu Lys
50                  55                  60

Thr Thr Ile Lys Lys Arg Tyr Met His Ile Ser Glu Asp Ile Leu Lys
65                  70                  75                  80

Glu Lys Pro Asp Leu Cys Asp Tyr Asn Ala Ser Ser Leu Asp Ile Arg
                85                  90                  95

Gln Val Ile Leu Ala Lys Glu Val Pro Lys Val Gly Lys Asp Ala Ala
            100                 105                 110

Met Lys Ala Ile Glu Glu Trp Gly Gln Ala Met Ser Lys Ile Thr His
        115                 120                 125

Leu Ile Phe Cys Thr Thr Ser Gly Val Asp Ile Pro Gly Ala Asp Tyr
130                 135                 140

Gln Leu Thr Met Leu Leu Gly Leu Asn Pro Ser Val Lys Arg Tyr Met
145                 150                 155                 160

Leu Cys Gln Gln Gly Cys His Ala Gly Gly Thr Val Leu Arg Leu Ala
                165                 170                 175

Lys Asp Leu Ala Glu Asn Asn Tyr Gly Ser Arg Val Leu Val Val Cys
            180                 185                 190

Ser Glu Asn Thr Thr Val Cys Phe Arg Gly Pro Thr Glu Thr His Pro
        195                 200                 205

Asp Ser Met Val Ala Gln Ala Leu Phe Ala Asp Gly Ala Gly Ala Val
210                 215                 220

Ile Val Gly Ala Tyr Pro Asp Glu Ser Leu Asn Glu Arg Pro Ile Phe
225                 230                 235                 240

Gln Ile Val Ser Thr Ala Gln Thr Ile Leu Pro Asn Ser Gln Gly Ala
                245                 250                 255

Ile Glu Gly His Leu Arg Gln Ile Gly Leu Ala Ile Gln Leu Leu Pro
            260                 265                 270

Asn Val Pro Asp Leu Ile Ser Asn Asn Ile Asp Lys Cys Leu Val Glu
        275                 280                 285

Ala Phe Asn Pro Ile Gly Ile Asn Asp Trp Asn Ser Ile Phe Trp Ile
        290                 295                 300

Ala His Pro Gly Gly Pro Ala Ile Leu Gly Gln Val Glu Ser Lys Leu
305                 310                 315                 320

Gly Leu Gln Glu Ser Lys Leu Thr Thr Thr Trp His Val Leu Arg Glu
```

```
            325                 330                 335
Phe Gly Asn Met Ser Ser Ala Cys Val Phe Phe Ile Met Asp Glu Thr
            340                 345                 350

Arg Lys Arg Ser Leu Lys Glu Gly Lys Thr Thr Thr Gly Asp Gly Phe
        355                 360                 365

Asp Trp Gly Val Leu Phe Gly Phe Gly Pro Gly Leu Thr Val Glu Thr
370                 375                 380

Val Val Leu Arg Ser Phe Pro Leu Asn Gln
385                 390

<210> SEQ ID NO 30
<211> LENGTH: 391
<212> TYPE: PRT
<213> ORGANISM: Chenopodium quinoa

<400> SEQUENCE: 30

Met Ala Ser Val Gln Glu Ile Arg Asn Ala Gln Arg Ala Asp Gly Pro
1               5                   10                  15

Ala Thr Ile Leu Ala Ile Gly Thr Ala Asn Pro Pro Asn Glu Met Tyr
            20                  25                  30

Gln Ala Glu Tyr Pro Asp Phe Tyr Phe Arg Val Thr Glu Ser Glu His
        35                  40                  45

Met Thr Asp Leu Lys Lys Lys Phe Lys Arg Met Cys Glu Arg Ser Met
50                  55                  60

Ile Lys Lys Arg Tyr Met His Val Thr Glu Glu Leu Leu Lys Glu Asn
65                  70                  75                  80

Pro His Met Cys Asp Tyr Asn Ala Ser Ser Leu Asn Thr Arg Gln Asp
                85                  90                  95

Ile Leu Ala Thr Glu Val Pro Lys Leu Gly Lys Glu Ala Ala Ile Lys
            100                 105                 110

Ala Ile Lys Glu Trp Gly Gln Pro Arg Ser Lys Ile Thr His Val Ile
        115                 120                 125

Phe Cys Thr Thr Ser Gly Val Asp Met Pro Gly Ala Asp Tyr Gln Leu
130                 135                 140

Thr Lys Leu Leu Gly Leu Arg Pro Ser Val Lys Arg Phe Met Leu Tyr
145                 150                 155                 160

Gln Gln Gly Cys Tyr Ala Gly Gly Thr Val Leu Arg Leu Ala Lys Asp
                165                 170                 175

Ile Ala Glu Asn Asn Arg Gly Ala Arg Val Leu Val Val Cys Ala Glu
            180                 185                 190

Ile Thr Val Ile Cys Phe Arg Gly Pro Thr Glu Thr His Leu Asp Ser
        195                 200                 205

Met Ile Gly Gln Ala Leu Phe Gly Asp Gly Ala Gly Ala Val Ile Val
210                 215                 220

Gly Ala Asp Val Asp Glu Ser Ile Glu Arg Pro Ile Phe Gln Leu Val
225                 230                 235                 240

Trp Ala Ala Gln Thr Ile Leu Pro Asp Ser Glu Gly Ala Ile Asp Gly
                245                 250                 255

His Leu Arg Glu Val Gly Leu Ala Phe His Leu Leu Lys Asp Val Pro
            260                 265                 270

Gly Leu Ile Ser Lys Asn Ile Glu Lys Ala Leu Val Glu Ala Phe Lys
        275                 280                 285

Pro Ile Gly Ile Asp Asp Trp Asn Ser Ile Phe Trp Val Ala His Pro
290                 295                 300
```

```
Gly Gly Pro Ala Ile Leu Asp Gln Val Glu Ser Lys Leu Glu Leu Lys
305                 310                 315                 320

Gln Asp Lys Leu Arg Asp Thr Arg His Val Leu Ser Glu Phe Gly Asn
            325                 330                 335

Met Ser Ser Ala Cys Val Leu Phe Ile Leu Asp Glu Met Arg Asn Arg
        340                 345                 350

Ser Leu Lys Glu Gly Lys Thr Thr Gly Glu Gly Leu Asp Trp Gly
        355                 360                 365

Val Leu Phe Gly Phe Gly Pro Gly Leu Thr Val Glu Thr Val Met Leu
    370                 375                 380

His Ser Val Pro Ile Thr Asn
385                 390

<210> SEQ ID NO 31
<211> LENGTH: 392
<212> TYPE: PRT
<213> ORGANISM: Cannabis sativa

<400> SEQUENCE: 31

Met Ala Ser Ile Ser Val Asp Gln Ile Arg Lys Ala Gln Arg Ala Asn
1               5                   10                  15

Gly Pro Ala Thr Val Leu Ala Ile Gly Thr Ala Asn Pro Pro Thr Ser
            20                  25                  30

Phe Tyr Gln Ala Asp Tyr Pro Asp Phe Tyr Phe Arg Val Thr Lys Asn
        35                  40                  45

Gln His Met Thr Glu Leu Lys Asp Lys Phe Lys Arg Ile Cys Glu Lys
    50                  55                  60

Thr Thr Ile Lys Lys Arg His Leu Tyr Leu Thr Glu Asp Arg Leu Asn
65                  70                  75                  80

Gln His Pro Asn Leu Leu Glu Tyr Met Ala Pro Ser Leu Asn Thr Arg
                85                  90                  95

Gln Asp Met Leu Val Val Glu Ile Pro Lys Leu Gly Lys Glu Ala Ala
            100                 105                 110

Met Lys Ala Ile Lys Glu Trp Gly Gln Pro Lys Ser Arg Ile Thr His
        115                 120                 125

Leu Ile Phe Cys Ser Thr Asn Gly Val Asp Met Pro Gly Ala Asp Tyr
    130                 135                 140

Glu Cys Ala Lys Leu Leu Gly Leu Ser Ser Ser Val Lys Arg Val Met
145                 150                 155                 160

Leu Tyr Gln Gln Gly Cys His Ala Gly Gly Ser Val Leu Arg Ile Ala
                165                 170                 175

Lys Asp Leu Ala Glu Asn Asn Lys Gly Ala Arg Ile Leu Thr Ile Asn
            180                 185                 190

Ser Glu Ile Thr Ile Gly Ile Phe His Ser Pro Asp Glu Thr Tyr Phe
        195                 200                 205

Asp Gly Met Val Gly Gln Ala Leu Phe Gly Asp Gly Ala Ser Ala Thr
    210                 215                 220

Ile Val Gly Ala Asp Pro Asp Lys Glu Ile Gly Glu Arg Pro Val Phe
225                 230                 235                 240

Glu Met Val Ser Ala Ala Gln Glu Phe Ile Pro Asn Ser Asp Gly Ala
                245                 250                 255

Val Asp Gly His Leu Thr Glu Ala Gly Leu Val Tyr His Ile His Lys
            260                 265                 270

Asp Val Pro Gly Leu Ile Ser Lys Asn Ile Glu Lys Ser Leu Val Glu
        275                 280                 285
```

Ala Leu Asn Pro Ile Gly Ile Ser Asp Trp Asn Ser Leu Phe Trp Ile
    290                 295                 300

Val His Pro Gly Gly Pro Ala Ile Leu Asn Ala Val Glu Ala Lys Leu
305                 310                 315                 320

His Leu Lys Lys Glu Lys Met Ala Asp Thr Arg His Val Leu Ser Glu
                325                 330                 335

Tyr Gly Asn Met Ser Ser Val Ser Ile Phe Phe Ile Met Asp Lys Leu
                340                 345                 350

Arg Lys Arg Ser Leu Glu Glu Gly Lys Ser Thr Thr Gly Asp Gly Phe
            355                 360                 365

Glu Trp Gly Val Leu Phe Gly Phe Gly Pro Gly Leu Thr Val Glu Thr
    370                 375                 380

Ile Val Leu His Ser Leu Ala Asn
385                 390

<210> SEQ ID NO 32
<211> LENGTH: 396
<212> TYPE: PRT
<213> ORGANISM: Plumbago indica

<400> SEQUENCE: 32

Met Ala Pro Ala Val Gln Ser Gln Ser His Gly Gly Ala Tyr Arg Ser
1               5                   10                  15

Asn Gly Glu Arg Ser Lys Gly Pro Ala Thr Val Leu Ala Ile Ala Thr
            20                  25                  30

Ala Val Pro Pro Asn Val Tyr Tyr Gln Asp Glu Tyr Ala Asp Phe Phe
        35                  40                  45

Phe Arg Val Thr Asn Ser Glu His Lys Thr Ala Ile Lys Glu Lys Phe
    50                  55                  60

Asn Arg Val Cys Gly Thr Ser Met Ile Lys Lys Arg His Met Tyr Phe
65                  70                  75                  80

Thr Glu Lys Met Leu Asn Gln Asn Lys Asn Met Cys Thr Trp Asp Asp
                85                  90                  95

Lys Ser Leu Asn Ala Arg Gln Asp Met Val Ile Pro Ala Val Pro Glu
            100                 105                 110

Leu Gly Lys Glu Ala Ala Leu Lys Ala Ile Glu Glu Trp Gly Lys Pro
        115                 120                 125

Leu Ser Asn Ile Thr His Leu Ile Phe Cys Thr Thr Ala Gly Asn Asp
    130                 135                 140

Ala Pro Gly Ala Asp Phe Arg Leu Thr Gln Leu Leu Gly Leu Asn Pro
145                 150                 155                 160

Ser Val Asn Arg Tyr Met Ile Tyr Gln Gln Gly Cys Phe Ala Gly Ala
                165                 170                 175

Thr Ala Leu Arg Ile Ala Lys Asp Leu Ala Glu Asn Asn Lys Gly Ala
            180                 185                 190

Arg Val Leu Ile Val Cys Cys Glu Ile Phe Ala Phe Ala Phe Arg Gly
        195                 200                 205

Pro His Glu Asp His Met Asp Ser Leu Ile Cys Gln Leu Leu Phe Gly
    210                 215                 220

Asp Gly Ala Ala Ala Val Ile Val Gly Gly Asp Pro Asp Glu Thr Glu
225                 230                 235                 240

Asn Ala Leu Phe Glu Leu Glu Trp Ala Asn Ser Thr Ile Ile Pro Gln
                245                 250                 255

Ser Glu Glu Ala Ile Thr Leu Arg Met Arg Glu Glu Gly Leu Met Ile

```
                  260                 265                 270
Gly Leu Ser Lys Glu Ile Pro Arg Leu Leu Gly Glu Gln Ile Glu Asp
            275                 280                 285

Ile Leu Val Glu Ala Phe Thr Pro Leu Gly Ile Thr Asp Trp Ser Ser
290                 295                 300

Leu Phe Trp Ile Ala His Pro Gly Gly Lys Ala Ile Leu Glu Ala Leu
305                 310                 315                 320

Glu Lys Lys Ile Gly Val Glu Gly Lys Leu Trp Ala Ser Trp His Val
                325                 330                 335

Leu Lys Glu Tyr Gly Asn Leu Thr Ser Ala Cys Val Leu Phe Ala Met
            340                 345                 350

Asp Glu Met Arg Lys Arg Ser Ile Lys Glu Gly Lys Ala Thr Thr Gly
        355                 360                 365

Asp Gly His Glu Tyr Gly Val Leu Phe Gly Val Gly Pro Gly Leu Thr
    370                 375                 380

Val Glu Thr Val Val Leu Lys Ser Val Pro Leu Asn
385                 390                 395

<210> SEQ ID NO 33
<211> LENGTH: 389
<212> TYPE: PRT
<213> ORGANISM: Ziziphus jujuba

<400> SEQUENCE: 33

Met Val Thr Val Asp Glu Ile Arg Glu Ala Gln Arg Ala Lys Gly Pro
1               5                   10                  15

Ala Thr Ile Met Ala Ile Gly Thr Ala Thr Pro Pro Asn Ala Ile Asp
            20                  25                  30

Gln Ser Thr Phe Thr Asp Tyr Tyr Phe Arg Ile Thr Asn Ser Asp His
        35                  40                  45

Lys Thr Asp Leu Lys Lys Lys Phe Lys Thr Ile Cys Asp Lys Ser Met
    50                  55                  60

Ile Lys Lys Arg Tyr Leu Tyr Leu Thr Glu Glu His Leu Lys Gln Asn
65                  70                  75                  80

Pro Asn Met Ser Glu Tyr Met Ala Pro Ser Leu Asp Val Arg Gln Glu
                85                  90                  95

Ile Val Ile Ala Glu Val Pro Lys Leu Gly Lys Glu Ala Ala Asn Lys
            100                 105                 110

Ala Ile Lys Glu Trp Gly Gln Pro Lys Ser Lys Ile Thr His Leu Val
        115                 120                 125

Phe Ser Thr Ile Ser Gly Val Asp Ala Pro Gly Ala Asp Tyr Gln Leu
    130                 135                 140

Thr Lys Leu Leu Gly Leu Asn Pro Ser Val Lys Arg Ile Met Val Tyr
145                 150                 155                 160

Gln Gln Gly Cys Phe Ala Gly Gly Thr Ser Leu Arg Leu Ala Lys Asp
                165                 170                 175

Leu Ala Glu Asn Asn Lys Gly Ala Arg Val Leu Val Val Cys Thr Glu
            180                 185                 190

Ile Ser Ala Ile Asn Phe Arg Gly Pro Ser Glu Thr Tyr Phe Asp Ser
        195                 200                 205

Asn Val Gly Gln Ile Leu Phe Gly Asp Gly Ala Ser Ala Val Val Val
    210                 215                 220

Gly Ser Asp Pro Leu Val Gly Val Glu Lys Pro Leu Phe Glu Leu Val
225                 230                 235                 240
```

```
Ser Ala Ser Gln Thr Ile Ile Pro Asp Ser Glu Gly Asn Ile Glu Gly
                245                 250                 255

His Ile Cys Glu Val Gly Leu Thr Ile Arg Leu Ser Lys Lys Val Pro
            260                 265                 270

Ser Leu Ile Ser Asn Asn Ile Glu Lys Ser Leu Val Glu Ala Phe Asn
        275                 280                 285

Pro Leu Gly Ile Ser Asp Trp Asn Ser Ile Phe Trp Ile Ala His Pro
    290                 295                 300

Gly Gly Pro Ala Ile Leu Asp Gln Ile Glu Leu Lys Leu Gly Leu Lys
305                 310                 315                 320

Pro Glu Lys Leu Arg Ala Ser Arg His Val Leu Ser Glu Tyr Gly Asn
                325                 330                 335

Met Ser Ser Ala Thr Val Leu Phe Ile Leu Asp Glu Met Arg Lys Lys
            340                 345                 350

Ser Ile Glu Asp Gly Leu Lys Thr Pro Gly Glu Gly Leu Glu Trp Gly
        355                 360                 365

Val Leu Phe Gly Phe Gly Pro Gly Leu Thr Val Glu Thr Val Val Leu
    370                 375                 380

His Ser Val Thr Ala
385

<210> SEQ ID NO 34
<211> LENGTH: 390
<212> TYPE: PRT
<213> ORGANISM: Anoectochilus roxburghii

<400> SEQUENCE: 34

Met Pro Ser Leu Glu Ser Ile Arg Lys Ala Pro Arg Ala Asp Gly Leu
1               5                   10                  15

Ala Ser Ile Leu Ala Ile Gly Arg Ala Asn Pro Asp Asn Phe Met Glu
            20                  25                  30

Gln Ser Ser Phe Pro Asp Phe Phe Arg Ile Thr Gly Ser Asp His
        35                  40                  45

Leu Val Asp Leu Lys Lys Lys Phe Gln Arg Ile Cys Asp Arg Thr Ala
    50                  55                  60

Ile Arg Lys Arg His Phe Val Trp Asn Glu Glu Phe Ile Lys Ala Asn
65                  70                  75                  80

Pro Cys Phe Ser Thr Phe Met Asp Asn Ser Leu Asn Val Arg Gln Glu
                85                  90                  95

Val Ala Ile Arg Glu Ile Pro Lys Leu Gly Ala Glu Ala Thr Lys
            100                 105                 110

Ala Ile Lys Glu Trp Gly Gln Pro Lys Ser Arg Ile Thr His Leu Ile
        115                 120                 125

Phe Cys Thr Thr Ser Gly Met Asp Leu Pro Gly Ala Asp Tyr Gln Leu
    130                 135                 140

Thr Arg Ile Leu Gly Leu Asn Pro Asn Val Glu Arg Val Met Leu Tyr
145                 150                 155                 160

Gln Gln Gly Cys Phe Ala Gly Gly Thr Thr Leu Arg Leu Ala Lys Cys
                165                 170                 175

Leu Ala Glu Ser Arg Lys Gly Ala Arg Val Leu Val Val Cys Ala Glu
            180                 185                 190

Thr Thr Thr Val Leu Phe Arg Ala Pro Ser Glu Glu His Gln Glu Asp
        195                 200                 205

Leu Val Thr Gln Ala Leu Phe Ala Asp Gly Ala Ser Ala Val Ile Val
    210                 215                 220
```

```
Gly Ala Asp Pro Asp Glu Glu Ala His Glu Lys Ala Ser Phe Val Ile
225                 230                 235                 240

Phe Ser Thr Ser Gln Val Leu Leu Pro Asp Ser Glu Gly Ala Ile Gly
            245                 250                 255

Gly His Val Ser Glu Gly Gly Leu Leu Ala Thr Leu His Arg Asp Val
            260                 265                 270

Pro Gln Leu Val Ser Lys Asn Val Gly Lys Cys Leu Glu Glu Ala Phe
            275                 280                 285

Thr Pro Leu Gly Ile Ser Asp Trp Asn Ser Ile Phe Trp Val Pro His
290                 295                 300

Pro Gly Gly Arg Ala Ile Leu Asp Gln Ile Glu Arg Val Gly Leu
305                 310                 315                 320

Lys Pro Glu Lys Leu Thr Thr Ser Arg His Val Leu Ala Glu Tyr Gly
            325                 330                 335

Asn Met Ser Ser Val Cys Val His Phe Val Leu Asp Glu Met Arg Lys
            340                 345                 350

Lys Ser Ser Lys Glu Gly Lys Ala Thr Thr Gly Glu Gly Leu Glu Trp
            355                 360                 365

Gly Val Leu Phe Gly Phe Gly Pro Gly Leu Thr Val Glu Thr Val Val
370                 375                 380

Leu Arg Ser Val Pro Leu
385                 390

<210> SEQ ID NO 35
<211> LENGTH: 390
<212> TYPE: PRT
<213> ORGANISM: Cymbidium hybrid cultivar

<400> SEQUENCE: 35

Met Pro Ser Leu Glu Ser Val Lys Lys Ser Asn Arg Ala Asp Gly Phe
1               5                   10                  15

Ala Ser Ile Leu Ala Ile Gly Arg Ala Asn Pro Glu Asn Phe Ile Glu
            20                  25                  30

Gln Ser Thr Tyr Pro Asp Phe Phe Arg Val Thr Asn Ser Glu His
            35                  40                  45

Leu Val Asn Leu Lys Lys Lys Phe Gln Arg Ile Cys Asp Lys Thr Ala
50                  55                  60

Ile Arg Lys Arg His Phe Val Trp Asn Glu Glu Leu Leu Asn Ala Asn
65                  70                  75                  80

Pro Cys Leu Gly Thr Phe Met Asp Asn Ser Leu Asn Val Arg Gln Glu
            85                  90                  95

Phe Ala Ile Arg Glu Ile Pro Lys Leu Gly Ala Glu Ala Thr Lys
            100                 105                 110

Ala Ile Gln Glu Trp Gly Gln Pro Lys Ser Arg Ile Thr His Leu Ile
            115                 120                 125

Phe Cys Thr Thr Ser Gly Met Asp Leu Pro Gly Ala Asp Tyr Gln Leu
130                 135                 140

Thr Gln Ile Leu Gly Leu Asn Pro Asn Ile Glu Arg Val Met Leu Tyr
145                 150                 155                 160

Gln Gln Gly Cys Phe Ala Gly Gly Thr Thr Leu Arg Leu Ala Lys Cys
            165                 170                 175

Leu Ala Glu Ser Arg Lys Gly Ala Arg Val Leu Val Val Cys Ala Glu
            180                 185                 190

Thr Thr Ala Val Leu Phe Arg Ala Pro Ser Glu Glu His Gln Asp Asp
```

```
                 195                 200                 205
Leu Val Thr Gln Ala Leu Phe Ala Asp Gly Ala Ser Ala Leu Ile Val
    210                 215                 220

Gly Ala Asp Pro Asp Glu Thr Ala His Glu Arg Ala Ser Phe Val Ile
225                 230                 235                 240

Val Ser Thr Ser Gln Val Leu Leu Pro Asp Ser Ala Gly Ala Ile Gly
                245                 250                 255

Gly His Val Ser Glu Gly Gly Leu Ile Ala Thr Leu His Arg Asp Val
            260                 265                 270

Pro Gln Ile Val Ser Lys Asn Val Gly Lys Cys Leu Glu Glu Ala Phe
        275                 280                 285

Thr Pro Leu Gly Ile Ser Asp Trp Asn Ser Ile Phe Trp Val Pro His
290                 295                 300

Pro Gly Gly Arg Ala Ile Leu Asp Gln Val Glu Glu Arg Val Gly Leu
305                 310                 315                 320

Lys Pro Glu Lys Leu Ile Val Ser Arg His Val Leu Ala Glu Tyr Gly
                325                 330                 335

Asn Met Ser Ser Val Cys Val His Phe Ala Leu Asp Glu Met Arg Lys
            340                 345                 350

Arg Ser Lys Lys Glu Gly Lys Ala Thr Thr Gly Glu Gly Leu Asp Trp
        355                 360                 365

Gly Val Leu Phe Gly Phe Gly Pro Gly Leu Thr Val Glu Thr Val Val
    370                 375                 380

Leu His Ser Val Pro Ile
385                 390

<210> SEQ ID NO 36
<211> LENGTH: 390
<212> TYPE: PRT
<213> ORGANISM: Phalaenopsis equestris

<400> SEQUENCE: 36

Met Pro Ser Leu Asp Ser Ile Lys Lys Ala Pro Arg Ala Asp Gly Phe
1               5                   10                  15

Ala Ser Ile Leu Ala Ile Gly Arg Ala Asn Pro Asp Asn Ile Ile Glu
            20                  25                  30

Gln Ser Ala Tyr Pro Asp Phe Tyr Phe Arg Val Thr Asn Ser Glu His
        35                  40                  45

Leu Val Asp Leu Lys Lys Lys Phe Gln Arg Ile Cys Glu Lys Thr Ala
    50                  55                  60

Ile Arg Lys Arg His Phe Val Trp Asn Glu Glu Phe Leu Thr Ser Asn
65                  70                  75                  80

Pro Cys Phe Ser Thr Phe Met Asp Lys Ser Leu Asn Val Arg Gln Glu
                85                  90                  95

Val Ala Ile Arg Glu Ile Pro Lys Leu Gly Ala Lys Ala Thr Lys
            100                 105                 110

Ala Ile Glu Asp Trp Gly Gln Pro Lys Ser Arg Ile Thr His Leu Ile
        115                 120                 125

Phe Cys Thr Thr Ser Gly Met Asp Leu Pro Gly Ala Asp Tyr Gln Leu
    130                 135                 140

Thr Gln Ile Leu Gly Leu Asn Pro Asn Val Glu Arg Val Met Leu Tyr
145                 150                 155                 160

Gln Gln Gly Cys Phe Ala Gly Gly Thr Thr Leu Arg Leu Ala Lys Cys
                165                 170                 175
```

```
Leu Ala Glu Ser Arg Lys Gly Ala Arg Val Leu Val Cys Ala Glu
                180                 185                 190

Thr Thr Thr Val Leu Phe Arg Ala Pro Ser Glu Glu His Gln Asp Asp
            195                 200                 205

Leu Val Thr Gln Ala Leu Phe Ala Asp Gly Ala Ser Ala Val Ile Val
        210                 215                 220

Gly Ala Asp Pro Asp Glu Ala Ala Asp Glu Arg Ala Ser Phe Val Ile
225                 230                 235                 240

Val Ser Thr Ser Gln Val Leu Pro Asp Ser Ala Gly Ala Ile Gly
                245                 250                 255

Gly His Val Ser Glu Gly Gly Leu Leu Ala Thr Leu His Arg Asp Val
                260                 265                 270

Pro Gln Ile Val Ser Lys Asn Val Gly Lys Cys Leu Glu Glu Ala Phe
            275                 280                 285

Thr Pro Phe Gly Ile Ser Asp Trp Asn Ser Ile Phe Trp Val Pro His
            290                 295                 300

Pro Gly Gly Arg Ala Ile Leu Asp Gln Val Glu Glu Arg Val Gly Leu
305                 310                 315                 320

Lys Pro Glu Lys Leu Ser Val Ser Arg His Val Leu Ala Glu Tyr Gly
                325                 330                 335

Asn Met Ser Ser Val Cys Val His Phe Ala Leu Asp Glu Met Arg Lys
                340                 345                 350

Arg Ser Ala Asn Glu Gly Lys Ala Thr Thr Gly Glu Gly Leu Glu Trp
                355                 360                 365

Gly Val Leu Phe Gly Phe Gly Pro Gly Leu Thr Val Glu Thr Val Val
            370                 375                 380

Leu Arg Ser Val Pro Leu
385                 390

<210> SEQ ID NO 37
<211> LENGTH: 390
<212> TYPE: PRT
<213> ORGANISM: Dendrobium catenatum

<400> SEQUENCE: 37

Met Pro Ser Leu Glu Ser Ile Arg Lys Ala Pro Arg Ala Asn Gly Phe
1               5                   10                  15

Ala Ser Ile Leu Ala Ile Gly Arg Ala Asn Pro Glu Asn Phe Ile Glu
                20                  25                  30

Gln Ser Thr Tyr Pro Asp Phe Phe Arg Ile Thr Asn Ser Glu His
            35                  40                  45

Leu Val Asp Leu Lys Lys Lys Phe Gln Arg Ile Cys Asp Lys Thr Ala
        50                  55                  60

Ile Arg Lys Arg His Phe Val Trp Asn Glu Glu Phe Ile Thr Thr Asn
65                  70                  75                  80

Pro Cys Leu His Thr Phe Met Asp Lys Ser Leu Asp Val Arg Gln Glu
            85                  90                  95

Val Ala Ile Arg Glu Ile Pro Lys Leu Gly Ala Lys Ala Ala Lys
            100                 105                 110

Ala Ile Gln Glu Trp Gly Gln Pro Lys Ser Arg Ile Thr His Leu Ile
            115                 120                 125

Phe Cys Thr Thr Ser Gly Met Asp Leu Pro Gly Ala Asp Tyr Gln Leu
        130                 135                 140

Thr Gln Ile Leu Gly Leu Asn Pro Asn Val Glu Arg Val Met Leu Tyr
145                 150                 155                 160
```

```
Gln Gln Gly Cys Phe Ala Gly Gly Thr Thr Leu Arg Leu Ala Lys Cys
                165                 170                 175

Leu Ala Glu Ser Arg Lys Gly Ala Arg Val Leu Val Val Cys Ala Glu
            180                 185                 190

Thr Thr Thr Val Leu Phe Arg Gly Pro Ser Glu Glu His Gln Asp Asp
        195                 200                 205

Leu Val Thr Gln Ala Leu Phe Ala Asp Gly Ala Ser Ala Leu Ile Val
    210                 215                 220

Gly Ala Asp Pro Asp Glu Ala Ala His Glu Arg Ala Ser Phe Val Ile
225                 230                 235                 240

Val Ser Thr Ser Gln Val Leu Leu Pro Asp Ser Ala Gly Ala Ile Gly
                245                 250                 255

Gly His Val Ser Glu Gly Gly Leu Leu Ala Thr Leu His Arg Asp Val
            260                 265                 270

Pro Lys Ile Val Ser Lys Asn Val Glu Lys Cys Leu Glu Glu Ala Phe
        275                 280                 285

Thr Pro Phe Gly Ile Thr Asp Trp Asn Thr Ile Phe Trp Val Pro His
    290                 295                 300

Pro Gly Gly Arg Ala Ile Leu Asp Gln Val Glu Glu Arg Met Gly Leu
305                 310                 315                 320

Lys Pro Glu Lys Leu Leu Val Ser Arg His Val Leu Ala Glu Tyr Gly
                325                 330                 335

Asn Met Ser Ser Val Cys Val His Phe Ala Leu Asp Glu Met Arg Lys
            340                 345                 350

Arg Ser Ala Ile Glu Gly Lys Ala Thr Thr Gly Glu Gly Leu Glu Trp
        355                 360                 365

Gly Val Leu Phe Gly Phe Gly Pro Gly Leu Thr Val Glu Thr Val Val
    370                 375                 380

Leu Arg Ser Val His Leu
385                 390

<210> SEQ ID NO 38
<211> LENGTH: 390
<212> TYPE: PRT
<213> ORGANISM: Oncidium hybrid cultivar

<400> SEQUENCE: 38

Met Pro Ser Leu Glu Ser Thr Lys Lys Ala Pro Arg Ser His Gly Phe
1               5                   10                  15

Ala Ser Ile Leu Ala Ile Gly Arg Ala Asn Pro Glu Asn Phe Val Glu
            20                  25                  30

Gln Asn Ala Tyr Pro Asp Leu Phe Phe Arg Ala Thr Asn Ser Lys His
        35                  40                  45

Leu Val Asn Leu Lys Lys Lys Phe Gln Arg Ile Cys Asp Lys Thr Ala
    50                  55                  60

Ile Arg Lys Arg His Phe Ala Trp Asn Glu Glu Phe Ile Thr Ala Asn
65                  70                  75                  80

Pro Cys Leu Gln Thr Phe Met Asp Asn Ser Leu Asn Val Arg Gln Glu
                85                  90                  95

Phe Ala Ile Thr Tyr Ile Pro Lys Leu Gly Ala Glu Ala Thr Lys
            100                 105                 110

Ala Ile Gln Glu Trp Gly Gln Pro Lys Ser Arg Ile Thr His Leu Ile
        115                 120                 125

Phe Cys Thr Thr Ser Gly Met Asp Leu Pro Gly Ala Asp Tyr Gln Leu
```

```
            130                 135                 140
Thr Gln Ile Leu Gly Leu Asn Pro Asn Val Glu Arg Val Met Leu Tyr
145                 150                 155                 160

Gln Gln Gly Cys Phe Ala Gly Thr Thr Leu Arg Leu Ala Lys Cys
                165                 170                 175

Leu Ala Glu Ser Arg Lys Gly Ala Arg Val Leu Val Val Cys Ala Glu
            180                 185                 190

Thr Thr Ala Val Leu Phe Arg Ala Pro Ser Glu Glu His Gln Asp Asp
        195                 200                 205

Leu Val Thr Gln Ala Leu Phe Ala Asp Gly Ala Ser Ala Leu Ile Val
        210                 215                 220

Gly Ala Asp Pro Asp Glu Ala Ala Asn Glu Arg Ala Ser Phe Ile Ile
225                 230                 235                 240

Val Ser Thr Ser Gln Val Leu Leu Pro Asp Ser Ala Gly Ala Ile Gly
                245                 250                 255

Gly His Val Ser Glu Gly Gly Leu Leu Ala Thr Leu His Arg Asp Val
            260                 265                 270

Pro Gln Ile Val Ser Lys Asn Val Gly Lys Cys Leu Glu Glu Ala Phe
        275                 280                 285

Thr Pro Leu Gly Ile Ser Asp Trp Asn Ser Ile Phe Trp Val Pro His
        290                 295                 300

Pro Gly Gly Arg Ala Ile Leu Asp Leu Val Glu Glu Arg Val Gly Leu
305                 310                 315                 320

Lys Pro Glu Lys Leu Leu Val Ser Arg His Val Leu Ala Glu Tyr Gly
                325                 330                 335

Asn Met Ser Ser Val Cys Val His Phe Ala Leu Asp Glu Met Arg Arg
            340                 345                 350

Arg Ser Ala Lys Glu Gly Lys Ala Thr Thr Gly Glu Gly Leu Asp Trp
        355                 360                 365

Gly Val Leu Phe Gly Phe Gly Pro Gly Leu Thr Val Glu Thr Val Val
        370                 375                 380

Leu His Ser Val Pro Ile
385                 390

<210> SEQ ID NO 39
<211> LENGTH: 393
<212> TYPE: PRT
<213> ORGANISM: Apostasia shenzhenica

<400> SEQUENCE: 39

Met Pro Gly Val Glu Ala Val Ala Gln Asn Ile Ser Pro Ala Arg Ser
1               5                   10                  15

Asp Gly Leu Ala Ala Ile Leu Ala Ile Gly Arg Ala Asn Pro Pro Asn
            20                  25                  30

Ile Val Glu Gln Ser Ser Phe Ala Asp Leu Tyr Phe Arg Leu His Asn
        35                  40                  45

Ser Glu His Leu Val Asp Leu Lys Lys Lys Leu Gln Arg Ile Cys Asp
    50                  55                  60

Arg Thr Ala Ile Arg Lys Arg His Phe Val Trp Asp Glu Glu Leu Leu
65                  70                  75                  80

Met Ala Asn Pro Cys Leu Arg Thr Val Thr Glu Pro Ser Leu Asn Ala
                85                  90                  95

Arg Gln Lys Val Ala Ile Thr Glu Ile Pro Lys Leu Gly Ala Ala Ala
            100                 105                 110
```

```
Ala Thr Asn Ala Ile Ala Glu Trp Gly Arg Pro Lys Ser Asp Ile Thr
            115                 120                 125

His Leu Ile Phe Cys Thr Thr Ser Gly Met Asp Leu Pro Gly Ala Asp
130                 135                 140

Tyr Gln Leu Ile Arg Leu Leu Gly Leu Asn Asp Asn Ile Gln Arg Ile
145                 150                 155                 160

Met Leu Tyr Gln Gln Gly Cys Phe Ala Gly Gly Thr Val Leu Arg Leu
                165                 170                 175

Ala Lys Val Leu Ala Glu Ser Arg Arg Ser Ala Arg Val Leu Ile Val
            180                 185                 190

Cys Ala Glu Thr Thr Thr Val Leu Val Arg Ser Pro Ser Val Glu Asn
        195                 200                 205

Gln Asp Asp Leu Val Thr Gln Ala Leu Phe Ala Asp Gly Ala Ser Ala
    210                 215                 220

Leu Ile Val Gly Ala Asp Pro Asn Ala Gly Glu Lys Pro Val Phe Ser
225                 230                 235                 240

Val Phe Ser Thr Ser Gln Val Leu Leu Pro Asp Ser Asp Gly Ala Ile
                245                 250                 255

Gly Gly His Val Gly Glu Asn Gly Leu Thr Ala Thr Leu His Arg Asp
            260                 265                 270

Val Pro Ala Val Ile Ser Lys Asn Val Gly Lys Cys Leu Glu Glu Ala
        275                 280                 285

Phe Thr Pro Leu Gly Ile Ser Asp Trp Asn Ser Ile Phe Trp Ala Ala
    290                 295                 300

His Pro Gly Gly Arg Ala Ile Leu Asp Gln Val Glu Glu Arg Val Gly
305                 310                 315                 320

Leu Lys Pro Glu Lys Met Trp Ala Ser Arg His Val Leu Ala Glu Tyr
                325                 330                 335

Gly Asn Met Ser Ser Val Ser Val His Phe Ala Leu Asp Glu Ile Arg
            340                 345                 350

Arg Arg Ser Ala Lys Glu Gly Lys Ala Thr Thr Gly Asp Gly Phe Glu
        355                 360                 365

Trp Gly Val Leu Phe Gly Phe Gly Pro Gly Leu Thr Val Glu Thr Val
    370                 375                 380

Val Leu Arg Ser Ala Pro Ile Ser Ala
385                 390

<210> SEQ ID NO 40
<211> LENGTH: 394
<212> TYPE: PRT
<213> ORGANISM: Paphiopedilum hangianum

<400> SEQUENCE: 40

Met Pro Gly Leu Glu Asn Arg Lys Lys Val Glu Ala Leu Ile Arg Ala
1               5                   10                  15

Glu Gly Leu Ala Thr Ile Met Ala Ile Gly Arg Ala Asn Pro Pro Asn
            20                  25                  30

Ala Met Glu Gln Ser Thr Phe Pro Asp Phe Tyr Phe Arg Val Thr Asn
        35                  40                  45

Ser Glu His Leu Val Gly Leu Lys Lys Phe Gln Arg Ile Cys Glu
    50                  55                  60

Lys Thr Ala Ile Arg Arg His Phe Val Trp Asn Glu Glu Ile Leu
65                  70                  75                  80

Asn Ala Asn Pro Cys Leu Arg Thr His Met Glu Pro Ser Leu Asn Val
                85                  90                  95
```

```
Arg Gln Lys Ile Ala Val Ala Glu Ile Pro Lys Leu Gly Ala Glu Ala
                100                 105                 110

Ala Ser Arg Ala Ile Glu Glu Trp Gly Gln Pro Lys Ser Arg Ile Thr
            115                 120                 125

His Leu Ile Phe Cys Thr Thr Ser Gly Met Asp Leu Pro Gly Ala Asp
130                 135                 140

Tyr Lys Leu Thr Arg Ile Leu Gly Leu Asn Pro Asn Val Gln Arg Val
145                 150                 155                 160

Met Leu Tyr Gln Gln Gly Cys Phe Ala Gly Gly Thr Val Leu Arg Leu
                165                 170                 175

Ala Lys Cys Phe Ala Glu Ser Arg Lys Gly Ala Arg Val Leu Val Val
            180                 185                 190

Cys Ser Glu Thr Thr Thr Val Leu Val Arg Ala Pro Ser Glu Asp Tyr
        195                 200                 205

Gln Asp Asp Leu Val Thr Gln Ala Leu Phe Ala Asp Gly Ala Ser Ala
    210                 215                 220

Leu Ile Val Gly Ala Asp Pro Asp Glu Glu Ala Lys Glu Arg Pro Ile
225                 230                 235                 240

Phe Thr Ile Val Ser Thr Thr Gln Val Ile Leu Pro Asp Ser Asp Gly
                245                 250                 255

Ala Ile Gly Gly His Leu Gly Glu Gly Gly Leu Thr Ala Thr Leu His
            260                 265                 270

Arg Asp Val Pro Leu Ile Ile Ser Lys Asn Val Ser Lys Cys Leu Glu
        275                 280                 285

Glu Ala Phe Ala Pro Leu Gly Ile Ser Asp Trp Asn Ser Ile Phe Trp
    290                 295                 300

Ala Pro His Pro Gly Gly Arg Ala Ile Leu Asp Gln Val Glu Glu Arg
305                 310                 315                 320

Val Gly Leu Lys Pro Glu Lys Leu Trp Ala Ser Arg His Val Leu Ala
                325                 330                 335

Glu Tyr Gly Asn Met Ser Ser Val Cys Val His Phe Val Leu Asp Glu
            340                 345                 350

Ile Arg Lys Arg Ser Ala Lys Glu Ser Lys Ala Thr Thr Gly Glu Gly
        355                 360                 365

Phe Asp Trp Gly Val Leu Phe Gly Phe Gly Pro Gly Leu Thr Val Glu
    370                 375                 380

Thr Val Ile Leu Arg Ser Val Pro Leu Asn
385                 390

<210> SEQ ID NO 41
<211> LENGTH: 393
<212> TYPE: PRT
<213> ORGANISM: Apostasia shenzhenica

<400> SEQUENCE: 41

Met Pro Gly Leu Gln Ile Ile Ser Lys Ala Ser Ser Arg Ala Ala Asp
1               5                   10                  15

Gly Leu Ala Ala Ile Leu Ala Ile Gly Arg Ala Asn Pro Pro Asn Ser
            20                  25                  30

Met Asp Gln Ser Ser Tyr Pro Glu Phe Tyr Phe Arg Val Met Asp Ser
        35                  40                  45

Asp His Leu Val Asp Leu Lys Lys Lys Phe Gln Arg Ile Cys Glu Arg
    50                  55                  60

Thr Ala Ile Arg Lys Arg His Phe Val Trp Asn Glu Glu Leu Leu Arg
```

```
                65                  70                  75                  80
Asp Asn Pro Cys Leu Arg Thr Phe Met Asp Ser Ser Leu Asn Val Arg
                    85                  90                  95

Gln Lys Val Ala Val Ala Glu Ile Pro Lys Leu Gly Ala Ala Ala Ala
                    100                 105                 110

Glu Arg Ala Ile Glu Glu Trp Gly Gln Pro Arg Ser Gly Ile Thr His
                    115                 120                 125

Leu Ile Phe Cys Thr Thr Ser Gly Met Asp Leu Pro Gly Ala Asp Tyr
                    130                 135                 140

Gln Leu Thr Lys Ile Leu Gly Leu Asn Ala Asp Val Gln Arg Val Met
145                 150                 155                 160

Leu Tyr Gln Gln Gly Cys Phe Ala Gly Gly Thr Val Leu Arg Leu Ala
                    165                 170                 175

Lys Val Leu Ala Glu Ser Arg Lys Gly Ala Arg Val Leu Val Val Cys
                    180                 185                 190

Ala Glu Thr Thr Thr Val Leu Ile Arg Ala Pro Ser Val Glu His Gln
                    195                 200                 205

Asp Asp Leu Val Thr Gln Ala Leu Phe Ala Asp Gly Ala Ser Ala Leu
                    210                 215                 220

Ile Val Gly Ala Asp Pro Val Glu Glu Val Asn Glu Arg Pro Leu Phe
225                 230                 235                 240

Ser Ile Ile Ser Ala Ser Gln Val Ile Leu Pro Asp Ser Asp Gly Ala
                    245                 250                 255

Ile Gly Gly His Leu Gly Glu Gly Gly Leu Thr Ala Thr Leu His Arg
                    260                 265                 270

Asp Val Pro Leu Ile Ile Ser Lys Asn Val Ser Lys Cys Leu Glu Asp
                    275                 280                 285

Ala Phe Ser Pro Leu Gly Ile Ser Asp Trp Asn Ser Ile Phe Trp Ala
                    290                 295                 300

Pro His Pro Gly Gly Arg Ala Ile Leu Asp Gln Val Glu Glu Arg Val
305                 310                 315                 320

Gly Leu Lys Pro Glu Lys Met Trp Ala Ser Arg His Val Leu Ala Glu
                    325                 330                 335

Tyr Gly Asn Met Ser Ser Val Cys Val His Phe Val Leu Asp Glu Met
                    340                 345                 350

Arg Lys Arg Ser Ala Lys Glu Gly Lys Pro Thr Thr Gly Glu Gly Leu
                    355                 360                 365

Glu Trp Gly Val Leu Phe Gly Phe Gly Pro Gly Leu Thr Val Glu Thr
370                 375                 380

Val Val Leu Arg Ser His Pro Ile Asn
385                 390

<210> SEQ ID NO 42
<211> LENGTH: 387
<212> TYPE: PRT
<213> ORGANISM: Phalaenopsis equestris

<400> SEQUENCE: 42

Met Pro Asn Met Glu Ser Ile Lys Lys Glu Asp Gly Leu Ala Thr Ile
1               5                   10                  15

Met Ala Ile Gly Arg Ala Leu Pro Pro Asn Ser Ile Asp Gln Asn Ser
                20                  25                  30

Phe Pro Asp Phe Tyr Phe Arg Val His Asn Ser Glu His Leu Met Asp
                35                  40                  45
```

Leu Lys Asn Lys Phe Arg Arg Ile Cys Glu Arg Thr Ala Ile Arg Lys
 50                  55                  60

Arg His Phe Val Trp Asn Glu Glu Val Leu Lys Gln Asn Pro Cys Leu
 65                  70                  75                  80

Arg Thr Phe Met Glu Pro Ser Leu Asn Thr Arg Gln Glu Ile Val Cys
                 85                  90                  95

Ser Glu Ile Pro Lys Leu Gly Ala Glu Ala Ala Arg Asn Ala Ile Arg
            100                 105                 110

Glu Trp Gly Gln Pro Glu Arg Ser Ile Thr His Leu Ile Phe Cys Thr
        115                 120                 125

Thr Ser Gly Met Asn Leu Pro Gly Ala Asp Phe Glu Ala Ala Gln Ile
130                 135                 140

Leu Gly Leu Asn His Ser Val Glu Arg Val Met Leu Tyr Gln Gln Gly
145                 150                 155                 160

Cys Phe Ala Gly Gly Thr Val Leu Arg Leu Ala Lys Cys Leu Ala Glu
                165                 170                 175

Ser Arg Arg Gly Ala Arg Val Leu Val Ile Cys Ala Glu Ser Thr Thr
            180                 185                 190

Ser Leu Val Arg Ser Pro Ser Arg Glu His Gln Tyr Asp Leu Ile Ala
        195                 200                 205

Gln Ala Leu Phe Ala Asp Gly Ala Ser Ala Leu Ile Ile Gly Thr Glu
210                 215                 220

Pro Asn Ala Glu Ala Gly Glu Arg Pro Ile Phe Ser Ile Phe Ser Thr
225                 230                 235                 240

Ala Gln Val Thr Leu Pro Asp Ser Gly Asp Ala Ile Arg Gly Tyr Leu
                245                 250                 255

Lys Glu Gly Gly Leu Ile Ala Thr Leu Ala Lys Asp Val Pro Leu Ile
            260                 265                 270

Ile Ser Glu Asn Ile Glu Arg Cys Leu Gln Glu Ala Phe Gly Pro Leu
        275                 280                 285

Gly Ile Ser Asp Trp Asn Ser Ile Phe Trp Ala Pro His Pro Gly Gly
290                 295                 300

Arg Ala Ile Leu Asp Gly Ile Glu Asp Lys Leu Gly Leu Lys Pro Glu
305                 310                 315                 320

Lys Leu Trp Ala Ala Arg His Val Leu Ala Glu Tyr Gly Asn Met Ser
                325                 330                 335

Ser Val Cys Val His Tyr Ile Leu Asp Glu Met Arg Arg Arg Asp Val
            340                 345                 350

Lys Asn Gly Lys Ala Pro Thr Gly Asp Gly Pro Glu Trp Gly Val Leu
        355                 360                 365

Phe Gly Phe Gly Pro Gly Leu Thr Val Glu Thr Val Val Leu Arg Arg
370                 375                 380

Leu Phe Leu
385

<210> SEQ ID NO 43
<211> LENGTH: 394
<212> TYPE: PRT
<213> ORGANISM: Bromheadia finlaysoniana

<400> SEQUENCE: 43

Met Ala Ser Gln Val Ser Pro Ser Ile Asn Met Ala Pro Lys Ala
1               5                   10                  15

Asp Gly Phe Ala Ser Ile Leu Ala Ile Gly Arg Ala Asn Pro Lys Asn
                20                  25                  30

```
Phe Ile Glu Gln Ser Thr Phe Pro Asp Phe Phe Arg Val Thr Asn
             35                  40                  45

Thr Glu His Met Val Asp Leu Lys Lys Lys Phe Gln Arg Ile Cys Asp
 50                  55                  60

Lys Thr Ser Ile Arg Lys Arg His Phe Ile Trp Asn Glu Glu Leu Leu
 65                  70                  75                  80

Thr Ala Asn Pro Ser Leu Cys Thr Phe Met Gly Asn Ser Leu Asn Leu
                 85                  90                  95

Arg His Glu Val Ala Val Arg Glu Ile Pro Lys Leu Gly Ala Glu Ala
            100                 105                 110

Ala Thr Lys Ala Ile Gln Glu Trp Gly Gln Pro Lys Ser Phe Ile Thr
        115                 120                 125

His Leu Val Phe Cys Thr Thr Ser Gly Met Asp Leu Pro Gly Ala Asp
    130                 135                 140

Tyr Gln Leu Thr Gln Ile Leu Gly Leu Asn Leu Asp Ile Glu Arg Val
145                 150                 155                 160

Met Leu His Gln Gln Gly Cys Phe Leu Gly Gly Thr Thr Leu Arg Leu
                165                 170                 175

Ala Lys Tyr Leu Ala Glu Ser Arg Lys Gly Ala Arg Val Leu Val Val
            180                 185                 190

Cys Ala Glu Thr Thr Thr Glu Phe Phe Arg Ala Pro Ser Glu Glu His
        195                 200                 205

Gln Glu Asp Leu Val Thr Gln Ser Leu Phe Gly Asp Gly Ala Ser Ala
    210                 215                 220

Leu Ile Val Gly Ala Asp Pro His Glu Gly Ala Arg Glu Arg Ala Ser
225                 230                 235                 240

Phe Ile Leu Val Ser Ser Ser Gln Val Leu Leu Ala Asn Ser Ala His
                245                 250                 255

Ala Ile Thr Gly His Val Ser Glu Gly Gly Ile Lys Ala Thr Leu His
            260                 265                 270

Arg Asp Val Pro Gln Ile Ile Ser Asn Asn Leu Gly Lys Cys Leu Glu
        275                 280                 285

Glu Ala Phe Thr Pro Leu Gly Ile Ser Asp Trp Asn Ser Ile Phe Trp
    290                 295                 300

Val Leu His Pro Gly Gly Arg Ala Ile Leu Asp Gln Val Glu Glu Lys
305                 310                 315                 320

Met Gly Leu Glu Pro Glu Lys Leu Leu Ile Ser Arg His Val Leu Leu
                325                 330                 335

Glu Tyr Gly Asn Met Ser Ser Val Cys Val His Phe Ala Leu Asp Glu
            340                 345                 350

Met Arg Lys Arg Ser Ser Asn Glu Gly Lys Ala Thr Thr Gly Glu Gly
        355                 360                 365

Leu Glu Trp Gly Val Leu Phe Gly Phe Gly Pro Gly Leu Thr Ile Glu
    370                 375                 380

Thr Val Val Leu Arg Ser Val Ser Ile Ser
385                 390

<210> SEQ ID NO 44
<211> LENGTH: 101
<212> TYPE: PRT
<213> ORGANISM: Cannabis sativa

<400> SEQUENCE: 44

Met Ala Val Lys His Leu Ile Val Leu Lys Phe Lys Asp Glu Ile Thr
```

-continued

```
                1               5                      10                     15
              Glu Ala Gln Lys Glu Glu Phe Phe Lys Thr Tyr Val Asn Leu Val Asn
                              20                    25                     30

Ile Ile Pro Ala Met Lys Asp Val Tyr Trp Gly Lys Asp Val Thr Gln
                              35                    40                     45

Lys Asn Lys Glu Glu Gly Tyr Thr His Ile Val Glu Val Thr Phe Glu
                              50                    55                     60

Ser Val Glu Thr Ile Gln Asp Tyr Ile Ile His Pro Ala His Val Gly
               65                    70                     75                    80

Phe Gly Asp Val Tyr Arg Ser Phe Trp Glu Lys Leu Leu Ile Phe Asp
                                    85                    90                     95

Tyr Thr Pro Arg Lys
                                  100
```

<210> SEQ ID NO 45
<211> LENGTH: 101
<212> TYPE: PRT
<213> ORGANISM: Artificial Sequence
<220> FEATURE:
<223> OTHER INFORMATION: Synthetic Construct

<400> SEQUENCE: 45

```
              Met Ala Val Lys His Leu Ile Val Ile Lys Phe Ser Asp Ser Ile Thr
                1               5                      10                     15

Glu Ala Gln Lys Glu Glu Phe Phe Lys Thr Tyr Leu Asn Leu Val Asn
                              20                    25                     30

Ile Ile Pro Ala Met Lys Asp Val Tyr Trp Gly Lys Asp Val Thr Arg
                              35                    40                     45

Arg Asn Lys Glu Glu Gly Tyr Thr His Ile Val Glu Val Thr Phe Glu
                              50                    55                     60

Ser Val Glu Thr Ile Gln Asp Tyr Ile Ile His Pro Ala His Val Gly
               65                    70                     75                    80

Phe Gly Asp Val Tyr Arg His Tyr Trp Glu Lys Leu Leu Ile Phe Asp
                                    85                    90                     95

Tyr Thr Pro Arg Lys
                                  100
```

<210> SEQ ID NO 46
<211> LENGTH: 101
<212> TYPE: PRT
<213> ORGANISM: Artificial Sequence
<220> FEATURE:
<223> OTHER INFORMATION: Synthetic Construct

<400> SEQUENCE: 46

```
              Met Ser Val Lys His Leu Ile Val Ile Lys Phe Ser Asp Glu Ile Thr
                1               5                      10                     15

Glu Ala Gln Lys Glu Glu Leu Phe Lys Thr Tyr Val Asn Leu Val Asn
                              20                    25                     30

Ile Ile Pro Ala Met Lys Asp Val Tyr Trp Gly Lys Asp Val Arg Gln
                              35                    40                     45

Arg Asn Lys Glu Glu Gly Tyr Thr His Ile Val Glu Val Thr Phe Glu
                              50                    55                     60

Ser Val Glu Thr Ile Gln Asp Tyr Ile Ile His Pro Ala His Val Gly
               65                    70                     75                    80

Phe Gly Asp Val Tyr Arg His Tyr Trp Glu Lys Leu Leu Ile Phe Asp
                                    85                    90                     95
```

Tyr Thr Pro Arg Lys
            100

<210> SEQ ID NO 47
<211> LENGTH: 101
<212> TYPE: PRT
<213> ORGANISM: Artificial Sequence
<220> FEATURE:
<223> OTHER INFORMATION: Synthetic Construct

<400> SEQUENCE: 47

Met Ser Val Lys His Leu Ile Val Ile Lys Phe Ser Asp Glu Ile Thr
1               5                   10                  15

Glu Ala Gln Lys Glu Glu Leu Phe Lys Thr Tyr Val Asn Leu Val Asn
            20                  25                  30

Ile Ile Pro Ala Met Lys Asp Val Tyr Trp Gly Lys Asp Val Thr Arg
        35                  40                  45

Arg Asn Lys Glu Glu Gly Tyr Thr His Ile Val Glu Val Thr Phe Glu
    50                  55                  60

Ser Val Glu Thr Ile Gln Asp Tyr Ile Ile His Pro Ala His Val Gly
65                  70                  75                  80

Phe Gly Asp Val Tyr Arg His Tyr Trp Glu Lys Leu Leu Ile Phe Asp
                85                  90                  95

Tyr Thr Pro Arg Lys
            100

<210> SEQ ID NO 48
<211> LENGTH: 101
<212> TYPE: PRT
<213> ORGANISM: Artificial Sequence
<220> FEATURE:
<223> OTHER INFORMATION: Synthetic Construct

<400> SEQUENCE: 48

Met Ser Val Lys His Leu Ile Val Ile Lys Phe Lys Asp Ser Ile Thr
1               5                   10                  15

Glu Ala Gln Lys Glu Glu Leu Phe Lys Thr Tyr Val Asn Leu Val Asn
            20                  25                  30

Ile Ile Pro Ala Met Lys Asp Val Tyr Trp Gly Lys Asp Val Thr Arg
        35                  40                  45

Arg Asn Lys Glu Glu Gly Tyr Thr His Ile Val Glu Val Thr Phe Glu
    50                  55                  60

Ser Val Glu Thr Ile Gln Asp Tyr Ile Ile His Pro Ala His Val Gly
65                  70                  75                  80

Phe Gly Asp Val Tyr Arg His Tyr Trp Glu Lys Leu Leu Ile Phe Asp
                85                  90                  95

Tyr Thr Pro Arg Lys
            100

<210> SEQ ID NO 49
<211> LENGTH: 101
<212> TYPE: PRT
<213> ORGANISM: Artificial Sequence
<220> FEATURE:
<223> OTHER INFORMATION: Synthetic Construct

<400> SEQUENCE: 49

Met Ser Val Lys His Leu Ile Val Ile Lys Phe Lys Asp Ser Ile Thr
1               5                   10                  15

Glu Ala Gln Lys Glu Glu Leu Phe Lys Thr Tyr Leu Asn Leu Val Asn

```
                    20                  25                  30

Ile Ile Pro Ala Met Lys Asp Val Tyr Trp Gly Lys Asp Val Thr Arg
            35                  40                  45

Arg Asn Lys Glu Glu Gly Tyr Thr His Ile Val Glu Val Thr Phe Glu
        50                  55                  60

Ser Val Glu Thr Ile Gln Asp Tyr Ile Ile His Pro Ala His Val Gly
 65                  70                  75                  80

Phe Gly Asp Val Tyr Arg Ser Tyr Trp Glu Lys Leu Leu Ile Phe Asp
                85                  90                  95

Tyr Thr Pro Arg Lys
                100

<210> SEQ ID NO 50
<211> LENGTH: 101
<212> TYPE: PRT
<213> ORGANISM: Artificial Sequence
<220> FEATURE:
<223> OTHER INFORMATION: Synthetic Construct

<400> SEQUENCE: 50

Met Ala Val Lys His Leu Ile Val Ile Lys Phe Ser Asp Ser Ile Thr
 1               5                  10                  15

Glu Ala Gln Lys Glu Glu Leu Phe Lys Thr Tyr Val Asn Leu Val Asn
                20                  25                  30

Ile Ile Pro Ala Met Lys Asp Val Tyr Trp Gly Lys Asp Val Thr Arg
            35                  40                  45

Arg Asn Lys Glu Glu Gly Tyr Thr His Ile Val Glu Val Thr Phe Glu
        50                  55                  60

Ser Val Glu Thr Ile Gln Asp Tyr Ile Ile His Pro Ala His Val Gly
 65                  70                  75                  80

Phe Gly Asp Val Tyr Arg His Tyr Trp Glu Lys Leu Leu Ile Phe Asp
                85                  90                  95

Tyr Thr Pro Arg Lys
                100

<210> SEQ ID NO 51
<211> LENGTH: 101
<212> TYPE: PRT
<213> ORGANISM: Artificial Sequence
<220> FEATURE:
<223> OTHER INFORMATION: Synthetic Construct

<400> SEQUENCE: 51

Met Ser Val Lys His Leu Ile Val Ile Lys Phe Ser Asp Ser Ile Thr
 1               5                  10                  15

Glu Ala Gln Lys Glu Gly Phe Phe Lys Thr Tyr Val Asn Leu Val Asn
                20                  25                  30

Ile Ile Pro Ala Met Lys Asp Val Tyr Trp Gly Lys Asp Val Thr Arg
            35                  40                  45

Arg Asn Lys Glu Glu Gly Tyr Thr His Ile Val Glu Val Thr Phe Glu
        50                  55                  60

Ser Val Glu Thr Ile Gln Asp Tyr Ile Ile His Pro Ala His Val Gly
 65                  70                  75                  80

Phe Gly Asp Val Tyr Arg His Tyr Trp Glu Lys Leu Leu Ile Phe Asp
                85                  90                  95

Tyr Thr Pro Arg Lys
                100
```

```
<210> SEQ ID NO 52
<211> LENGTH: 101
<212> TYPE: PRT
<213> ORGANISM: Artificial Sequence
<220> FEATURE:
<223> OTHER INFORMATION: Synthetic Construct

<400> SEQUENCE: 52

Met Ser Val Lys His Leu Ile Val Ile Lys Phe Lys Asp Ser Ile Thr
1               5                   10                  15

Glu Ala Gln Lys Glu Glu Leu Phe Lys Thr Tyr Val Asn Leu Val Asn
                20                  25                  30

Ile Ile Pro Ala Met Lys Asp Val Tyr Trp Gly Lys Asp Val Arg Arg
            35                  40                  45

Arg Asn Lys Glu Glu Gly Tyr Thr His Ile Val Glu Val Thr Phe Glu
        50                  55                  60

Ser Val Glu Thr Ile Gln Asp Tyr Ile Ile His Pro Ala His Val Gly
65                  70                  75                  80

Phe Gly Asp Val Tyr Arg Ser Tyr Trp Glu Lys Leu Leu Ile Phe Asp
                85                  90                  95

Tyr Thr Pro Arg Lys
            100

<210> SEQ ID NO 53
<211> LENGTH: 404
<212> TYPE: PRT
<213> ORGANISM: Cannabis sativa

<400> SEQUENCE: 53

Met Ser Ile Ile Ile Phe Met Gly Leu Ser Leu Val Cys Thr Phe Ser
1               5                   10                  15

Phe Gln Thr Asn Tyr His Thr Leu Leu Asn Pro His Asn Lys Asn Pro
                20                  25                  30

Lys Asn Ser Leu Leu Ser Tyr Gln His Pro Lys Thr Pro Ile Ile Lys
            35                  40                  45

Ser Ser Tyr Asp Asn Phe Pro Ser Lys Tyr Cys Leu Thr Lys Asn Phe
        50                  55                  60

His Leu Leu Gly Leu Asn Ser His Asn Arg Ile Ser Ser Gln Ser Arg
65                  70                  75                  80

Ser Ile Arg Ala Gly Ser Asp Gln Ile Glu Gly Ser Pro His His Glu
                85                  90                  95

Ser Asp Asn Ser Ile Ala Thr Lys Ile Leu Asn Phe Gly His Thr Cys
            100                 105                 110

Trp Lys Leu Gln Arg Pro Tyr Val Val Lys Gly Met Ile Ser Ile Ala
            115                 120                 125

Cys Gly Leu Phe Gly Arg Glu Leu Phe Asn Asn Arg His Leu Phe Ser
        130                 135                 140

Trp Gly Leu Met Trp Lys Ala Phe Phe Ala Leu Val Pro Ile Leu Ser
145                 150                 155                 160

Phe Asn Phe Phe Ala Ala Ile Met Asn Gln Ile Tyr Asp Val Asp Ile
                165                 170                 175

Asp Arg Ile Asn Lys Pro Asp Leu Pro Leu Val Ser Gly Glu Met Ser
            180                 185                 190

Ile Glu Thr Ala Trp Ile Leu Ser Ile Val Ala Leu Thr Gly Leu
            195                 200                 205

Ile Val Thr Ile Lys Leu Lys Ser Ala Pro Leu Phe Val Phe Ile Tyr
```

```
                210                 215                 220

Ile Phe Gly Ile Phe Ala Gly Phe Ala Tyr Ser Val Pro Pro Ile Arg
225                 230                 235                 240

Trp Lys Gln Tyr Pro Phe Thr Asn Phe Leu Ile Thr Ile Ser Ser His
                245                 250                 255

Val Gly Leu Ala Phe Thr Ser Tyr Ser Ala Thr Thr Ser Ala Leu Gly
            260                 265                 270

Leu Pro Phe Val Trp Arg Pro Ala Phe Ser Phe Ile Ile Ala Phe Met
        275                 280                 285

Thr Val Met Gly Met Thr Ile Ala Phe Ala Lys Asp Ile Ser Asp Ile
    290                 295                 300

Glu Gly Asp Ala Lys Tyr Gly Val Ser Thr Val Ala Thr Lys Leu Gly
305                 310                 315                 320

Ala Arg Asn Met Thr Phe Val Val Ser Gly Val Leu Leu Leu Asn Tyr
                325                 330                 335

Leu Val Ser Ile Ser Ile Gly Ile Ile Trp Pro Gln Val Phe Lys Ser
            340                 345                 350

Asn Ile Met Ile Leu Ser His Ala Ile Leu Ala Phe Cys Leu Ile Phe
        355                 360                 365

Gln Thr Arg Glu Leu Ala Leu Ala Asn Tyr Ala Ser Ala Pro Ser Arg
    370                 375                 380

Gln Phe Glu Phe Ile Trp Leu Leu Tyr Tyr Ala Glu Tyr Phe Val
385                 390                 395                 400

Tyr Val Phe Ile

<210> SEQ ID NO 54
<211> LENGTH: 322
<212> TYPE: PRT
<213> ORGANISM: Cannabis sativa

<400> SEQUENCE: 54

Met Ala Gly Ser Asp Gln Ile Glu Gly Ser Pro His His Glu Ser Asp
1               5                   10                  15

Asn Ser Ile Ala Thr Lys Ile Leu Asn Phe Gly His Thr Cys Trp Lys
            20                  25                  30

Leu Gln Arg Pro Tyr Val Val Lys Gly Met Ile Ser Ile Ala Cys Gly
        35                  40                  45

Leu Phe Gly Arg Glu Leu Phe Asn Asn Arg His Leu Phe Ser Trp Gly
    50                  55                  60

Leu Met Trp Lys Ala Phe Phe Ala Leu Val Pro Ile Leu Ser Phe Asn
65                  70                  75                  80

Phe Phe Ala Ala Ile Met Asn Gln Ile Tyr Asp Val Asp Ile Asp Arg
                85                  90                  95

Ile Asn Lys Pro Asp Leu Pro Leu Val Ser Gly Glu Met Ser Ile Glu
            100                 105                 110

Thr Ala Trp Ile Leu Ser Ile Ile Val Ala Leu Thr Gly Leu Ile Val
        115                 120                 125

Thr Ile Lys Leu Lys Ser Ala Pro Leu Phe Val Phe Ile Tyr Ile Phe
    130                 135                 140

Gly Ile Phe Ala Gly Phe Ala Tyr Ser Val Pro Pro Ile Arg Trp Lys
145                 150                 155                 160

Gln Tyr Pro Phe Thr Asn Phe Leu Ile Thr Ile Ser Ser His Val Gly
                165                 170                 175

Leu Ala Phe Thr Ser Tyr Ser Ala Thr Thr Ser Ala Leu Gly Leu Pro
```

```
            180                 185                 190
Phe Val Trp Arg Pro Ala Phe Ser Phe Ile Ile Ala Phe Met Thr Val
            195                 200                 205
Met Gly Met Thr Ile Ala Phe Ala Lys Asp Ile Ser Asp Ile Glu Gly
            210                 215                 220
Asp Ala Lys Tyr Gly Val Ser Thr Val Ala Thr Lys Leu Gly Ala Arg
225                 230                 235                 240
Asn Met Thr Phe Val Val Ser Gly Val Leu Leu Asn Tyr Leu Val
            245                 250                 255
Ser Ile Ser Ile Gly Ile Ile Trp Pro Gln Val Phe Lys Ser Asn Ile
            260                 265                 270
Met Ile Leu Ser His Ala Ile Leu Ala Phe Cys Leu Ile Phe Gln Thr
            275                 280                 285
Arg Glu Leu Ala Leu Ala Asn Tyr Ala Ser Ala Pro Ser Arg Gln Phe
            290                 295                 300
Phe Glu Phe Ile Trp Leu Leu Tyr Tyr Ala Glu Tyr Phe Val Tyr Val
305                 310                 315                 320
Phe Ile

<210> SEQ ID NO 55
<211> LENGTH: 333
<212> TYPE: PRT
<213> ORGANISM: Stachybotrys bisbyi

<400> SEQUENCE: 55

Met Pro Ala Thr Arg Thr Pro Ile His Pro Glu Ala Ala Tyr Lys
1               5                   10                  15
Asn Pro Arg Tyr Gln Ser Gly Pro Leu Ser Val Ile Pro Lys Ser Phe
            20                  25                  30
Val Pro Tyr Cys Glu Leu Met Arg Leu Glu Leu Pro His Gly Asn Phe
            35                  40                  45
Leu Gly Tyr Phe Pro His Leu Val Gly Leu Leu Tyr Gly Ser Ser Ala
            50                  55                  60
Ser Pro Ala Arg Leu Pro Ala Asn Glu Val Ala Phe Gln Ala Val Leu
65                  70                  75                  80
Tyr Ile Gly Trp Thr Phe Phe Met Arg Gly Ala Gly Cys Ala Trp Asn
                85                  90                  95
Asp Val Val Asp Gln Asp Phe Asp Arg Lys Thr Thr Arg Cys Arg Val
                100                 105                 110
Arg Pro Val Ala Arg Gly Ala Val Ser Thr Thr Ser Ala Asn Ile Phe
            115                 120                 125
Gly Phe Ala Met Val Ala Leu Ala Phe Ala Cys Ile Ser Pro Leu Pro
130                 135                 140
Ala Glu Cys Gln Arg Leu Gly Leu Met Thr Thr Val Leu Ser Ile Ile
145                 150                 155                 160
Tyr Pro Phe Cys Lys Arg Val Thr Asn Phe Ala Gln Val Ile Leu Gly
            165                 170                 175
Met Thr Leu Ala Ile Asn Phe Ile Leu Ala Ala Tyr Gly Ala Gly Leu
            180                 185                 190
Pro Ala Ile Glu Ala Pro Tyr Thr Val Pro Thr Ile Cys Val Thr Thr
            195                 200                 205
Ala Ile Thr Leu Leu Val Val Phe Tyr Asp Val Tyr Ala Arg Gln
            210                 215                 220
Asp Thr Ala Asp Asp Leu Lys Ser Gly Val Lys Gly Met Ala Val Leu
```

```
225                 230                 235                 240
Phe Arg Asn Tyr Val Glu Ile Leu Leu Thr Ser Ile Thr Leu Val Ile
                245                 250                 255
Ala Gly Leu Ile Ala Thr Thr Gly Val Leu Val Asp Asn Gly Pro Tyr
            260                 265                 270
Phe Phe Val Phe Ser Val Ala Gly Leu Leu Ala Ala Leu Leu Ala Met
        275                 280                 285
Ile Gly Gly Ile Arg Tyr Arg Ile Phe His Thr Trp Asn Ser Tyr Ser
290                 295                 300
Gly Trp Phe Tyr Ala Leu Ala Ile Phe Asn Leu Leu Gly Gly Tyr Leu
305                 310                 315                 320
Ile Glu Tyr Leu Asp Gln Val Pro Met Leu Asn Lys Ala
                325                 330

<210> SEQ ID NO 56
<211> LENGTH: 329
<212> TYPE: PRT
<213> ORGANISM: Stachybotrys chartarum IBT 40288

<400> SEQUENCE: 56

Met Ser Ala Lys Val Ser Pro Met Ala Tyr Thr Asn Pro Arg Tyr Glu
1               5                   10                  15
Thr Gly Pro Leu Ser Leu Ile Pro Lys Pro Ile Val Pro Tyr Phe Glu
            20                  25                  30
Leu Met Arg Phe Glu Leu Pro His Gly Tyr Tyr Leu Gly Tyr Phe Pro
        35                  40                  45
His Leu Val Gly Ile Met Tyr Gly Ala Ser Ala Gly Pro Glu Arg Leu
    50                  55                  60
Pro Ala Arg Asp Leu Val Phe Gln Ala Leu Leu Tyr Val Gly Trp Thr
65                  70                  75                  80
Phe Ala Met Arg Gly Ala Gly Cys Ala Trp Asn Asp Asn Ile Asp Gln
                85                  90                  95
Asp Phe Asp Arg Lys Thr Glu Arg Cys Arg Thr Arg Pro Ile Ala Arg
                100                 105                 110
Gly Ala Val Ser Thr Thr Ala Gly His Val Phe Ala Val Ala Gly Val
            115                 120                 125
Ala Leu Ala Phe Leu Cys Leu Ser Pro Leu Pro Thr Glu Cys His Gln
        130                 135                 140
Leu Gly Val Leu Val Thr Val Leu Ser Val Ile Tyr Pro Phe Cys Lys
145                 150                 155                 160
Arg Phe Thr Asn Phe Ala Gln Val Ile Leu Gly Met Thr Leu Ala Ala
                165                 170                 175
Asn Phe Ile Leu Ala Ala Tyr Gly Ala Gly Leu Pro Ala Leu Glu Gln
            180                 185                 190
Pro Tyr Thr Arg Pro Thr Met Ser Ala Thr Leu Ala Ile Thr Leu Leu
        195                 200                 205
Val Val Phe Tyr Asp Val Val Tyr Ala Arg Gln Asp Thr Ala Asp Asp
    210                 215                 220
Leu Lys Ser Gly Val Lys Gly Met Ala Val Leu Phe Arg Asn His Ile
225                 230                 235                 240
Glu Val Leu Leu Ala Val Leu Thr Cys Thr Ile Gly Gly Leu Leu Ala
                245                 250                 255
Ala Thr Gly Val Ser Val Gly Asn Gly Pro Tyr Tyr Phe Leu Phe Ser
            260                 265                 270
```

```
Val Ala Gly Leu Thr Val Ala Leu Leu Ala Met Ile Gly Gly Ile Arg
            275                 280                 285

Tyr Arg Ile Phe His Thr Trp Asn Gly Tyr Ser Gly Trp Phe Tyr Val
        290                 295                 300

Leu Ala Ile Ile Asn Leu Met Ser Gly Tyr Phe Ile Glu Tyr Leu Asp
305                 310                 315                 320

Asn Ala Pro Ile Leu Ala Arg Gly Ser
                325

<210> SEQ ID NO 57
<211> LENGTH: 329
<212> TYPE: PRT
<213> ORGANISM: Stachybotrys chlorohalonata (strain IBT 40285)

<400> SEQUENCE: 57

Met Ser Pro Lys Val Ser Ser Met Pro Tyr Thr Asn Pro Arg Tyr Glu
1               5                   10                  15

Ser Gly Pro Leu Ser Leu Ile Pro Lys Ser Ile Val Pro Tyr Phe Glu
            20                  25                  30

Leu Met Arg Phe Glu Leu Pro His Gly Tyr Tyr Leu Gly Tyr Phe Pro
        35                  40                  45

His Leu Val Gly Ile Met Tyr Gly Ala Ser Ala Gly Pro Glu Arg Leu
    50                  55                  60

Pro Ala Arg Asp Leu Val Phe Gln Ala Leu Leu Tyr Val Gly Trp Thr
65                  70                  75                  80

Phe Ala Met Arg Gly Ala Gly Cys Ala Trp Asn Asp Asn Ile Asp Gln
                85                  90                  95

Asp Phe Asp Arg Lys Thr Glu Arg Cys Arg Thr Arg Pro Ile Ala Arg
            100                 105                 110

Gly Ala Val Ser Thr Thr Ala Gly His Ile Phe Ala Val Ala Gly Val
        115                 120                 125

Ala Leu Ala Phe Leu Cys Leu Ser Pro Leu Pro Thr Glu Cys His Gln
    130                 135                 140

Leu Gly Val Leu Val Thr Val Leu Ser Val Ile Tyr Pro Phe Cys Lys
145                 150                 155                 160

Arg Phe Thr Asn Phe Ala Gln Val Ile Leu Gly Met Thr Leu Ala Ala
                165                 170                 175

Asn Phe Ile Leu Ala Ala Tyr Gly Ala Gly Leu Pro Ala Leu Glu Gln
            180                 185                 190

Pro Tyr Thr Arg Pro Thr Met Phe Ala Thr Leu Ala Ile Thr Leu Leu
        195                 200                 205

Val Val Phe Tyr Asp Val Val Tyr Ala Arg Gln Asp Thr Ala Asp Asp
    210                 215                 220

Leu Lys Ser Gly Val Lys Gly Met Ala Val Leu Phe Arg Asn His Ile
225                 230                 235                 240

Glu Val Leu Leu Ala Val Leu Thr Cys Thr Ile Gly Gly Leu Leu Ala
                245                 250                 255

Ala Thr Gly Val Ser Val Gly Asn Gly Pro Tyr Tyr Phe Leu Phe Ser
            260                 265                 270

Val Ala Gly Leu Thr Val Ala Leu Leu Ala Met Ile Gly Gly Ile Arg
        275                 280                 285

Tyr Arg Ile Phe His Thr Trp Asn Gly Tyr Ser Gly Trp Phe Tyr Val
    290                 295                 300

Leu Ala Ile Ile Asn Leu Met Ser Gly Tyr Phe Ile Glu Tyr Leu Asp
305                 310                 315                 320
```

-continued

Asn Ala Pro Ile Leu Ala Arg Gly Ser
                325

<210> SEQ ID NO 58
<211> LENGTH: 329
<212> TYPE: PRT
<213> ORGANISM: Stachybotrys chartarum (strain CBS 109288 / IBT 7711)

<400> SEQUENCE: 58

Met Ser Ala Lys Val Ser Pro Met Ala Tyr Thr Asn Pro Arg Tyr Glu
1               5                   10                  15

Arg Gly Pro Leu Ser Leu Ile Pro Lys Pro Ile Val Pro Tyr Phe Glu
            20                  25                  30

Leu Met Arg Phe Glu Leu Pro His Gly Tyr Tyr Leu Gly Tyr Phe Pro
        35                  40                  45

His Leu Val Gly Ile Met Tyr Gly Ala Ser Ala Gly Pro Glu Arg Leu
    50                  55                  60

Pro Ala Arg Asp Leu Val Phe Gln Ala Leu Leu Tyr Val Gly Trp Thr
65                  70                  75                  80

Phe Ala Met Arg Gly Ala Gly Cys Ala Trp Asn Asp Asn Ile Asp Gln
                85                  90                  95

Asp Phe Asp Arg Lys Thr Glu Arg Cys Arg Thr Arg Pro Ile Ala Arg
            100                 105                 110

Gly Ala Val Ser Thr Thr Ala Gly His Val Phe Ala Val Ala Gly Val
        115                 120                 125

Ala Leu Ala Phe Leu Cys Leu Ser Pro Leu Pro Thr Glu Cys His Gln
130                 135                 140

Leu Gly Val Leu Val Thr Val Leu Ser Val Ile Tyr Pro Phe Cys Lys
145                 150                 155                 160

Arg Phe Thr Asn Phe Ala Gln Val Ile Leu Gly Met Thr Leu Ala Ala
                165                 170                 175

Asn Phe Ile Leu Ala Ala Tyr Gly Ala Gly Leu Pro Ala Leu Glu Gln
            180                 185                 190

Pro Tyr Thr Arg Pro Thr Met Ser Ala Thr Leu Ala Ile Thr Leu Leu
        195                 200                 205

Val Val Phe Tyr Asp Val Val Tyr Ala Arg Gln Asp Thr Ala Asp Asp
    210                 215                 220

Leu Lys Ser Gly Val Lys Gly Met Ala Val Leu Phe Arg Asn His Ile
225                 230                 235                 240

Glu Val Leu Leu Ala Val Leu Thr Cys Thr Ile Gly Gly Leu Leu Ala
                245                 250                 255

Ala Thr Gly Val Ser Val Gly Asn Gly Pro Tyr Tyr Phe Leu Phe Ser
            260                 265                 270

Val Ala Gly Leu Thr Val Ala Leu Leu Ala Met Ile Gly Gly Ile Arg
        275                 280                 285

Tyr Arg Ile Phe His Thr Trp Asn Gly Tyr Ser Gly Trp Phe Tyr Val
    290                 295                 300

Leu Ala Ile Ile Asn Leu Met Ser Gly Tyr Phe Ile Glu Tyr Leu Asp
305                 310                 315                 320

Asn Ala Pro Ile Leu Ala Arg Gly Ser
                325

<210> SEQ ID NO 59
<211> LENGTH: 321
<212> TYPE: PRT

<213> ORGANISM: Cannabis sativa

<400> SEQUENCE: 59

Met Ala Ala Thr Thr Asn Gln Thr Glu Pro Pro Glu Ser Asp Asn His
1               5                   10                  15

Ser Val Ala Thr Lys Ile Leu Asn Phe Gly Lys Ala Cys Trp Lys Leu
            20                  25                  30

Gln Arg Pro Tyr Thr Ile Ile Ala Phe Thr Ser Cys Ala Cys Gly Leu
        35                  40                  45

Phe Gly Lys Glu Leu Leu His Asn Thr Asn Leu Ile Ser Trp Ser Leu
    50                  55                  60

Met Phe Lys Ala Phe Phe Leu Val Ala Ile Leu Cys Ile Ala Ser
65                  70                  75                  80

Phe Thr Thr Thr Ile Asn Gln Ile Tyr Asp Leu His Ile Asp Arg Ile
                85                  90                  95

Asn Lys Pro Asp Leu Pro Leu Ala Ser Gly Glu Ile Ser Val Asn Thr
            100                 105                 110

Ala Trp Ile Met Ser Ile Ile Val Ala Leu Phe Gly Leu Ile Ile Thr
        115                 120                 125

Ile Lys Met Lys Gly Gly Pro Leu Tyr Ile Phe Gly Tyr Cys Phe Gly
    130                 135                 140

Ile Phe Gly Gly Ile Val Tyr Ser Val Pro Pro Phe Arg Trp Lys Gln
145                 150                 155                 160

Asn Pro Ser Thr Ala Phe Leu Leu Asn Phe Leu Ala His Ile Ile Thr
                165                 170                 175

Asn Phe Thr Phe Tyr Tyr Ala Ser Arg Ala Ala Leu Gly Leu Pro Phe
            180                 185                 190

Glu Leu Arg Pro Ser Phe Thr Phe Leu Leu Ala Phe Met Lys Ser Met
        195                 200                 205

Gly Ser Ala Leu Ala Leu Ile Lys Asp Ala Ser Asp Val Glu Gly Asp
    210                 215                 220

Thr Lys Phe Gly Ile Ser Thr Leu Ala Ser Lys Tyr Gly Ser Arg Asn
225                 230                 235                 240

Leu Thr Leu Phe Cys Ser Gly Ile Val Leu Ser Tyr Val Ala Ala
                245                 250                 255

Ile Leu Ala Gly Ile Ile Trp Pro Gln Ala Phe Asn Ser Asn Val Met
            260                 265                 270

Leu Leu Ser His Ala Ile Leu Ala Phe Trp Leu Ile Leu Gln Thr Arg
        275                 280                 285

Asp Phe Ala Leu Thr Asn Tyr Asp Pro Glu Ala Gly Arg Arg Phe Tyr
    290                 295                 300

Glu Phe Met Trp Lys Leu Tyr Tyr Ala Glu Tyr Leu Val Tyr Val Phe
305                 310                 315                 320

Ile

<210> SEQ ID NO 60
<211> LENGTH: 322
<212> TYPE: PRT
<213> ORGANISM: Cannabis sativa

<400> SEQUENCE: 60

Met Thr Asp Thr Ala Asn Gln Thr Glu Pro Pro Glu Ser Asn Thr Lys
1               5                   10                  15

Tyr Ser Val Val Thr Lys Ile Leu Ser Phe Gly His Thr Cys Trp Lys
            20                  25                  30

Leu Gln Arg Pro Tyr Thr Phe Ile Gly Val Ile Ser Cys Ala Cys Gly
            35                  40                  45

Leu Phe Gly Arg Glu Leu Phe His Asn Thr Asn Leu Leu Ser Trp Ser
        50                  55                  60

Leu Met Leu Lys Ala Phe Ser Ser Leu Met Val Ile Leu Ser Val Asn
65                  70                  75                  80

Leu Cys Thr Asn Ile Ile Asn Gln Ile Thr Asp Leu Asp Ile Asp Arg
                85                  90                  95

Ile Asn Lys Pro Asp Leu Pro Leu Ala Ser Gly Glu Met Ser Ile Glu
            100                 105                 110

Thr Ala Trp Ile Met Ser Ile Val Ala Leu Thr Gly Leu Ile Leu
        115                 120                 125

Thr Ile Lys Leu Asn Cys Gly Pro Leu Phe Ile Ser Leu Tyr Cys Val
130                 135                 140

Ser Ile Leu Val Gly Ala Leu Tyr Ser Val Pro Pro Phe Arg Trp Lys
145                 150                 155                 160

Gln Asn Pro Asn Thr Ala Phe Ser Ser Tyr Phe Met Gly Leu Val Ile
            165                 170                 175

Val Asn Phe Thr Cys Tyr Tyr Ala Ser Arg Ala Ala Phe Gly Leu Pro
            180                 185                 190

Phe Glu Met Ser Pro Pro Phe Thr Phe Ile Leu Ala Phe Val Lys Ser
        195                 200                 205

Met Gly Ser Ala Leu Phe Leu Cys Lys Asp Val Ser Asp Ile Glu Gly
        210                 215                 220

Asp Ser Lys His Gly Ile Ser Thr Leu Ala Thr Arg Tyr Gly Ala Lys
225                 230                 235                 240

Asn Ile Thr Phe Leu Cys Ser Gly Ile Val Leu Leu Thr Tyr Val Ser
            245                 250                 255

Ala Ile Leu Ala Ala Ile Ile Trp Pro Gln Ala Phe Lys Ser Asn Val
            260                 265                 270

Met Leu Leu Ser His Ala Thr Leu Ala Phe Trp Leu Ile Phe Gln Thr
        275                 280                 285

Arg Glu Phe Ala Leu Thr Asn Tyr Asn Pro Glu Ala Gly Arg Lys Phe
        290                 295                 300

Tyr Glu Phe Met Trp Lys Leu His Tyr Ala Glu Tyr Leu Val Tyr Val
305                 310                 315                 320

Phe Ile

<210> SEQ ID NO 61
<211> LENGTH: 329
<212> TYPE: PRT
<213> ORGANISM: Humulus lupulus

<400> SEQUENCE: 61

Met Asp Gln Arg Gly Asn Ser Ile Arg Ala Ser Ala Gln Ile Glu Asp
1               5                   10                  15

Arg Pro Pro Glu Ser Gly Asn Leu Ser Ala Leu Thr Asn Val Lys Asp
            20                  25                  30

Phe Val Ser Val Cys Trp Glu Tyr Val Arg Pro Tyr Thr Ala Lys Gly
        35                  40                  45

Val Ile Ile Cys Ser Ser Cys Leu Phe Gly Arg Glu Leu Leu Glu Asn
    50                  55                  60

Pro Asn Leu Phe Ser Trp Pro Leu Ile Phe Arg Ala Leu Leu Gly Met
65                  70                  75                  80

-continued

Leu Ala Ile Leu Gly Ser Cys Phe Tyr Thr Ala Gly Ile Asn Gln Ile
                85                  90                  95

Phe Asp Met Asp Ile Asp Arg Ile Asn Lys Pro Asp Leu Pro Leu Val
            100                 105                 110

Ser Gly Arg Ile Ser Val Glu Ser Ala Trp Leu Leu Thr Leu Ser Pro
            115                 120                 125

Ala Ile Ile Gly Phe Ile Leu Ile Leu Lys Leu Asn Ser Gly Pro Leu
        130                 135                 140

Leu Thr Ser Leu Tyr Cys Leu Ala Ile Leu Ser Gly Thr Ile Tyr Ser
145                 150                 155                 160

Val Pro Pro Phe Arg Trp Lys Lys Asn Pro Ile Thr Ala Phe Leu Cys
                165                 170                 175

Ile Leu Met Ile His Ala Gly Leu Asn Phe Ser Val Tyr Tyr Ala Ser
            180                 185                 190

Arg Ala Ala Leu Gly Leu Ala Phe Val Trp Ser Pro Ser Phe Ser Phe
            195                 200                 205

Ile Thr Ala Phe Ile Thr Phe Met Thr Leu Thr Leu Ala Ser Ser Lys
        210                 215                 220

Asp Leu Ser Asp Ile Asn Gly Asp Arg Lys Phe Gly Val Glu Thr Phe
225                 230                 235                 240

Ala Thr Lys Leu Gly Ala Lys Asn Ile Thr Leu Leu Gly Thr Gly Leu
                245                 250                 255

Leu Leu Leu Asn Tyr Val Ala Ala Ile Ser Thr Ala Ile Ile Trp Pro
            260                 265                 270

Lys Ala Phe Lys Ser Asn Ile Met Leu Leu Ser His Ala Ile Leu Ala
            275                 280                 285

Phe Ser Leu Phe Phe Gln Ala Arg Glu Leu Asp Arg Thr Asn Tyr Thr
        290                 295                 300

Pro Glu Ala Cys Lys Ser Phe Tyr Glu Phe Ile Trp Ile Leu Phe Ser
305                 310                 315                 320

Ala Glu Tyr Val Val Tyr Leu Phe Ile
                325

<210> SEQ ID NO 62
<211> LENGTH: 324
<212> TYPE: PRT
<213> ORGANISM: Humulus lupulus

<400> SEQUENCE: 62

Met Pro Asn Ser Leu Thr Ala Trp Ser His Gln Ser Glu Phe Pro Ser
1               5                   10                  15

Thr Ile Val Thr Lys Gly Ser Asn Phe Gly His Ala Ser Trp Lys Phe
            20                  25                  30

Val Arg Pro Ile Pro Phe Val Ala Val Ser Ile Ile Cys Thr Ser Leu
        35                  40                  45

Phe Gly Ala Glu Leu Leu Lys Asn Pro Asn Leu Phe Ser Trp Gln Leu
    50                  55                  60

Met Phe Asp Ala Phe Gln Gly Leu Val Ile Leu Leu Tyr His Ile
65                  70                  75                  80

Tyr Ile Asn Gly Leu Asn Gln Ile Tyr Asp Leu Glu Ser Asp Arg Ile
                85                  90                  95

Asn Lys Pro Asp Leu Pro Leu Ala Ala Glu Glu Met Ser Val Lys Ser
            100                 105                 110

Ala Trp Phe Leu Thr Ile Phe Ser Ala Val Ala Ser Leu Leu Leu Met

```
                    115                 120                 125
Ile Lys Leu Lys Cys Gly Leu Phe Leu Thr Cys Met Tyr Cys Cys Tyr
    130                 135                 140

Leu Val Ile Gly Ala Met Tyr Ser Val Pro Pro Phe Arg Trp Lys Met
145                 150                 155                 160

Asn Thr Phe Thr Ser Thr Leu Trp Asn Phe Ser Glu Ile Gly Ile Gly
                    165                 170                 175

Ile Asn Phe Leu Ile Asn Tyr Ala Ser Arg Ala Thr Leu Gly Leu Pro
                180                 185                 190

Phe Gln Trp Arg Pro Pro Phe Thr Phe Ile Ile Gly Phe Val Ser Thr
                195                 200                 205

Leu Ser Ile Ile Leu Ser Ile Leu Lys Asp Val Pro Asp Val Glu Gly
    210                 215                 220

Asp Lys Lys Val Gly Met Ser Thr Leu Pro Val Ile Phe Gly Ala Arg
225                 230                 235                 240

Thr Ile Val Leu Val Gly Ser Gly Phe Phe Leu Leu Asn Tyr Val Ala
                245                 250                 255

Ala Ile Gly Val Ala Ile Met Trp Pro Gln Ala Phe Lys Gly Tyr Ile
                260                 265                 270

Met Ile Pro Ala His Ala Ile Phe Ala Ser Ala Leu Ile Phe Lys Thr
                275                 280                 285

Trp Leu Leu Asp Lys Ala Asn Tyr Ala Lys Glu Ala Ser Asp Ser Tyr
    290                 295                 300

Tyr His Phe Leu Trp Phe Leu Met Ile Ala Glu Tyr Ile Leu Tyr Pro
305                 310                 315                 320

Phe Ile Ser Thr

<210> SEQ ID NO 63
<211> LENGTH: 322
<212> TYPE: PRT
<213> ORGANISM: Artificial Sequence
<220> FEATURE:
<223> OTHER INFORMATION: Synthetic Construct

<400> SEQUENCE: 63

Met Ala Gly Ser Asp Gln Ile Glu Gly Ser Pro His His Glu Ser Asp
1               5                   10                  15

Asn Ser Ile Ala Thr Lys Ile Leu Asn Phe Gly His Thr Cys Trp Lys
                20                  25                  30

Leu Gln Arg Pro Tyr Val Val Lys Gly Met Ile Ser Ile Ala Cys Gly
            35                  40                  45

Leu Phe Gly Arg Glu Leu Phe Asn Asn Arg His Leu Phe Ser Trp Gly
50                  55                  60

Leu Met Trp Lys Ala Phe Ala Leu Val Pro Ile Leu Ser Phe Asn
65                  70                  75              80

Phe Phe Ala Ala Ile Met Asn Gln Ile Tyr Asp Val Asp Ile Asp Arg
                85                  90                  95

Ile Asn Lys Pro Asp Leu Pro Leu Val Ser Gly Glu Met Ser Ile Glu
                100                 105                 110

Thr Ala Trp Ile Leu Ser Ile Ile Val Ala Leu Thr Gly Leu Ile Val
                115                 120                 125

Thr Ile Lys Leu Lys Ser Ala Pro Leu Phe Val Phe Ile Tyr Ile Phe
                130                 135                 140

Gly Ile Phe Ala Gly Phe Ala Tyr Ser Val Pro Pro Ile Arg Trp Lys
145                 150                 155                 160
```

Gln Tyr Pro Phe Thr Asn Phe Leu Ile Thr Ile Ser Ser His Val Gly
            165                 170                 175

Leu Ala Phe Thr Ser Tyr Ser Ala Thr Thr Ser Ala Leu Gly Leu Pro
            180                 185                 190

Phe Val Trp Arg Pro Ala Phe Ser Phe Ile Ile Ala Phe Met Thr Val
            195                 200                 205

Met Gly Met Thr Ile Ala Phe Cys Lys Asp Val Ser Asp Ile Glu Gly
        210                 215                 220

Asp Ser Lys His Gly Ile Ser Thr Leu Ala Thr Arg Tyr Gly Ala Lys
225                 230                 235                 240

Asn Ile Thr Phe Leu Cys Ser Gly Ile Val Leu Leu Thr Tyr Val Ser
            245                 250                 255

Ala Ile Leu Ala Ala Ile Ile Trp Pro Gln Val Phe Lys Ser Asn Ile
            260                 265                 270

Met Ile Leu Ser His Ala Ile Leu Ala Phe Cys Leu Ile Phe Gln Thr
            275                 280                 285

Arg Glu Leu Ala Leu Ala Asn Tyr Ala Ser Ala Pro Ser Arg Gln Phe
            290                 295                 300

Phe Glu Phe Ile Trp Leu Leu Tyr Tyr Ala Glu Tyr Phe Val Tyr Val
305                 310                 315                 320

Phe Ile

<210> SEQ ID NO 64
<211> LENGTH: 322
<212> TYPE: PRT
<213> ORGANISM: Artificial Sequence
<220> FEATURE:
<223> OTHER INFORMATION: Synthetic Construct

<400> SEQUENCE: 64

Met Ala Gly Ser Asp Gln Ile Glu Gly Ser Pro His His Glu Ser Asp
1               5                   10                  15

Asn Ser Ile Ala Thr Lys Ile Leu Asn Phe Gly His Thr Cys Trp Lys
            20                  25                  30

Leu Gln Arg Pro Tyr Val Val Lys Gly Met Ile Ser Ile Ala Cys Gly
            35                  40                  45

Leu Phe Gly Arg Glu Leu Phe Asn Asn Arg His Leu Phe Ser Trp Gly
        50                  55                  60

Leu Met Trp Lys Ala Phe Phe Ala Leu Val Pro Ile Leu Ser Phe Asn
65                  70                  75                  80

Phe Phe Ala Ala Ile Met Asn Gln Ile Tyr Asp Val Asp Ile Asp Arg
            85                  90                  95

Ile Asn Lys Pro Asp Leu Pro Leu Val Ser Gly Glu Met Ser Ile Glu
            100                 105                 110

Thr Ala Trp Ile Leu Ser Ile Ile Val Ala Leu Thr Gly Leu Ile Val
            115                 120                 125

Thr Ile Lys Leu Lys Ser Ala Pro Leu Phe Val Phe Ile Tyr Ile Phe
        130                 135                 140

Gly Ile Phe Ala Gly Phe Ala Tyr Ser Val Pro Pro Ile Arg Trp Lys
145                 150                 155                 160

Gln Tyr Pro Phe Thr Asn Phe Leu Ile Thr Ile Ser Ser His Val Gly
            165                 170                 175

Leu Ala Phe Thr Ser Tyr Ser Ala Thr Thr Ser Ala Leu Gly Leu Pro
            180                 185                 190

```
Phe Val Trp Arg Pro Ala Phe Ser Phe Ile Ile Ala Phe Met Thr Val
            195                 200                 205
Met Gly Met Thr Ile Ala Phe Leu Lys Asp Val Pro Asp Val Glu Gly
210                 215                 220
Asp Lys Lys Val Gly Met Ser Thr Leu Pro Val Ile Phe Gly Ala Arg
225                 230                 235                 240
Thr Ile Val Leu Val Gly Ser Gly Phe Phe Leu Leu Asn Tyr Val Ala
                    245                 250                 255
Ala Ile Gly Val Ala Ile Met Trp Pro Gln Ala Phe Lys Gly Tyr Ile
                260                 265                 270
Met Ile Pro Ala His Ala Ile Phe Ala Ser Ala Leu Ile Phe Lys Thr
            275                 280                 285
Arg Glu Leu Ala Leu Ala Asn Tyr Ala Ser Ala Pro Ser Arg Gln Phe
        290                 295                 300
Phe Glu Phe Ile Trp Leu Leu Tyr Tyr Ala Glu Tyr Phe Val Tyr Val
305                 310                 315                 320
Phe Ile

<210> SEQ ID NO 65
<211> LENGTH: 568
<212> TYPE: PRT
<213> ORGANISM: Zymomonas mobilis

<400> SEQUENCE: 65

Met Ser Tyr Thr Val Gly Thr Tyr Leu Ala Glu Arg Leu Val Gln Ile
1               5                   10                  15
Gly Leu Lys His His Phe Ala Val Ala Gly Asp Tyr Asn Leu Val Leu
            20                  25                  30
Leu Asp Asn Leu Leu Leu Asn Lys Asn Met Glu Gln Val Tyr Cys Cys
        35                  40                  45
Asn Glu Leu Asn Cys Gly Phe Ser Ala Glu Gly Tyr Ala Arg Ala Lys
    50                  55                  60
Gly Ala Ala Ala Ala Val Val Thr Tyr Ser Val Gly Ala Leu Ser Ala
65                  70                  75                  80
Phe Asp Ala Ile Gly Gly Ala Tyr Ala Glu Asn Leu Pro Val Ile Leu
                85                  90                  95
Ile Ser Gly Ala Pro Asn Asn Asn Asp His Ala Ala Gly His Val Leu
            100                 105                 110
His His Ala Leu Gly Lys Thr Asp Tyr His Tyr Gln Leu Glu Met Ala
        115                 120                 125
Lys Asn Ile Thr Ala Ala Ala Glu Ala Ile Tyr Thr Pro Glu Glu Ala
    130                 135                 140
Pro Ala Lys Ile Asp His Val Ile Lys Thr Ala Leu Arg Glu Lys Lys
145                 150                 155                 160
Pro Val Tyr Leu Glu Ile Ala Cys Asn Ile Ala Ser Met Pro Cys Ala
                165                 170                 175
Ala Pro Gly Pro Ala Ser Ala Leu Phe Asn Asp Glu Ala Ser Asp Glu
            180                 185                 190
Ala Ser Leu Asn Ala Ala Val Glu Glu Thr Leu Lys Phe Ile Ala Asn
        195                 200                 205
Arg Asp Lys Val Ala Val Leu Val Gly Ser Lys Leu Arg Ala Ala Gly
    210                 215                 220
Ala Glu Glu Ala Ala Val Lys Phe Ala Asp Ala Leu Gly Gly Ala Val
225                 230                 235                 240
```

```
Ala Thr Met Ala Ala Lys Ser Phe Phe Pro Glu Glu Asn Pro His
            245                 250                 255

Tyr Ile Gly Thr Ser Trp Gly Glu Val Ser Tyr Pro Gly Val Glu Lys
        260                 265                 270

Thr Met Lys Glu Ala Asp Ala Val Ile Ala Leu Ala Pro Val Phe Asn
            275                 280                 285

Asp Tyr Ser Thr Thr Gly Trp Thr Asp Ile Pro Asp Pro Lys Lys Leu
        290                 295                 300

Val Leu Ala Glu Pro Arg Ser Val Val Asn Gly Ile Arg Phe Pro
305                 310                 315                 320

Ser Val His Leu Lys Asp Tyr Leu Thr Arg Leu Ala Gln Lys Val Ser
                325                 330                 335

Lys Lys Thr Gly Ala Leu Asp Phe Phe Lys Ser Leu Asn Ala Gly Glu
            340                 345                 350

Leu Lys Lys Ala Ala Pro Ala Asp Pro Ser Ala Pro Leu Val Asn Ala
        355                 360                 365

Glu Ile Ala Arg Gln Val Glu Ala Leu Leu Thr Pro Asn Thr Thr Val
            370                 375                 380

Ile Ala Glu Thr Gly Asp Ser Trp Phe Asn Ala Gln Arg Met Lys Leu
385                 390                 395                 400

Pro Asn Gly Ala Arg Val Glu Tyr Glu Met Gln Trp Gly His Ile Gly
                405                 410                 415

Trp Ser Val Pro Ala Ala Phe Gly Tyr Ala Val Gly Ala Pro Glu Arg
            420                 425                 430

Arg Asn Ile Leu Met Val Gly Asp Gly Ser Phe Gln Leu Thr Ala Gln
        435                 440                 445

Glu Val Ala Gln Met Val Arg Leu Lys Leu Pro Val Ile Ile Phe Leu
    450                 455                 460

Ile Asn Asn Tyr Gly Tyr Thr Ile Glu Val Met Ile His Asp Gly Pro
465                 470                 475                 480

Tyr Asn Asn Ile Lys Asn Trp Asp Tyr Ala Gly Leu Met Glu Val Phe
                485                 490                 495

Asn Gly Asn Gly Gly Tyr Asp Ser Gly Ala Gly Lys Gly Leu Lys Ala
            500                 505                 510

Lys Thr Gly Gly Glu Leu Ala Glu Ala Ile Lys Val Ala Leu Ala Asn
        515                 520                 525

Thr Asp Gly Pro Thr Leu Ile Glu Cys Phe Ile Gly Arg Glu Asp Cys
    530                 535                 540

Thr Glu Glu Leu Val Lys Trp Gly Lys Arg Val Ala Ala Ala Asn Ser
545                 550                 555                 560

Arg Lys Pro Val Asn Lys Leu Leu
                565

<210> SEQ ID NO 66
<211> LENGTH: 713
<212> TYPE: PRT
<213> ORGANISM: Saccharomyces cerevisiae

<400> SEQUENCE: 66

Met Ser Pro Ser Ala Val Gln Ser Lys Leu Glu Glu Gln Ser Ser
1               5                   10                  15

Glu Ile Asp Lys Leu Lys Ala Lys Met Ser Gln Ser Ala Ser Thr Ala
            20                  25                  30

Gln Gln Lys Lys Glu His Glu Tyr Glu His Leu Thr Ser Val Lys Ile
        35                  40                  45
```

```
Val Pro Gln Arg Pro Ile Ser Asp Arg Leu Gln Pro Ala Ile Ala Thr
     50                  55                  60

His Tyr Ser Pro His Leu Asp Gly Leu Gln Asp Tyr Gln Arg Leu His
 65                  70                  75                  80

Lys Glu Ser Ile Glu Asp Pro Ala Lys Phe Phe Gly Ser Lys Ala Thr
                 85                  90                  95

Gln Phe Leu Asn Trp Ser Lys Pro Phe Asp Lys Val Phe Ile Pro Asp
                100                 105                 110

Ser Lys Thr Gly Arg Pro Ser Phe Gln Asn Asn Ala Trp Phe Leu Asn
            115                 120                 125

Gly Gln Leu Asn Ala Cys Tyr Asn Cys Val Asp Arg His Ala Leu Lys
            130                 135                 140

Thr Pro Asn Lys Lys Ala Ile Ile Phe Glu Gly Asp Glu Pro Gly Gln
145                 150                 155                 160

Gly Tyr Ser Ile Thr Tyr Lys Glu Leu Leu Glu Glu Val Cys Gln Val
                165                 170                 175

Ala Gln Val Leu Thr Tyr Ser Met Gly Val Arg Lys Gly Asp Thr Val
                180                 185                 190

Ala Val Tyr Met Pro Met Val Pro Glu Ala Ile Ile Thr Leu Leu Ala
            195                 200                 205

Ile Ser Arg Ile Gly Ala Ile His Ser Val Val Phe Ala Gly Phe Ser
            210                 215                 220

Ser Asn Ser Leu Arg Asp Arg Ile Asn Asp Gly Asp Ser Lys Val Val
225                 230                 235                 240

Ile Thr Thr Asp Glu Ser Asn Arg Gly Gly Lys Val Ile Glu Thr Lys
                245                 250                 255

Arg Ile Val Asp Asp Ala Leu Arg Glu Thr Pro Gly Val Arg His Val
            260                 265                 270

Leu Val Tyr Arg Lys Thr Asn Asn Pro Ser Val Ala Phe His Ala Pro
            275                 280                 285

Arg Asp Leu Asp Trp Ala Thr Glu Lys Lys Lys Tyr Lys Thr Tyr Tyr
290                 295                 300

Pro Cys Thr Pro Val Asp Ser Glu Asp Pro Leu Phe Leu Leu Tyr Thr
305                 310                 315                 320

Ser Gly Ser Thr Gly Ala Pro Lys Gly Val Gln His Ser Thr Ala Gly
                325                 330                 335

Tyr Leu Leu Gly Ala Leu Leu Thr Met Arg Tyr Thr Phe Asp Thr His
            340                 345                 350

Gln Glu Asp Val Phe Phe Thr Ala Gly Asp Ile Gly Trp Ile Thr Gly
            355                 360                 365

His Thr Tyr Val Val Tyr Gly Pro Leu Leu Tyr Gly Cys Ala Thr Leu
370                 375                 380

Val Phe Glu Gly Thr Pro Ala Tyr Pro Asn Tyr Ser Arg Tyr Trp Asp
385                 390                 395                 400

Ile Ile Asp Glu His Lys Val Thr Gln Phe Tyr Val Ala Pro Thr Ala
                405                 410                 415

Leu Arg Leu Leu Lys Arg Ala Gly Asp Ser Tyr Ile Glu Asn His Ser
            420                 425                 430

Leu Lys Ser Leu Arg Cys Leu Gly Ser Val Gly Glu Pro Ile Ala Ala
            435                 440                 445

Glu Val Trp Glu Trp Tyr Ser Glu Lys Ile Gly Lys Asn Glu Ile Pro
450                 455                 460
```

```
Ile Val Asp Thr Tyr Trp Gln Thr Glu Ser Gly Ser His Leu Val Thr
465                 470                 475                 480

Pro Leu Ala Gly Gly Val Thr Pro Met Lys Pro Gly Ser Ala Ser Phe
            485                 490                 495

Pro Phe Phe Gly Ile Asp Ala Val Val Leu Asp Pro Asn Thr Gly Glu
            500                 505                 510

Glu Leu Asn Thr Ser His Ala Glu Gly Val Leu Ala Val Lys Ala Ala
            515                 520                 525

Trp Pro Ser Phe Ala Arg Thr Ile Trp Lys Asn His Asp Arg Tyr Leu
            530                 535                 540

Asp Thr Tyr Leu Asn Pro Tyr Pro Gly Tyr Tyr Phe Thr Gly Asp Gly
545                 550                 555                 560

Ala Ala Lys Asp Lys Asp Gly Tyr Ile Trp Ile Leu Gly Arg Val Asp
            565                 570                 575

Asp Val Val Asn Val Ser Gly His Arg Leu Ser Thr Ala Glu Ile Glu
            580                 585                 590

Ala Ala Ile Ile Glu Asp Pro Ile Val Ala Glu Cys Ala Val Val Gly
            595                 600                 605

Phe Asn Asp Asp Leu Thr Gly Gln Ala Val Ala Phe Val Val Leu
610                 615                 620

Lys Asn Lys Ser Asn Trp Ser Thr Ala Thr Asp Asp Glu Leu Gln Asp
625                 630                 635                 640

Ile Lys Lys His Leu Val Phe Thr Val Arg Lys Asp Ile Gly Pro Phe
            645                 650                 655

Ala Ala Pro Lys Leu Ile Ile Leu Val Asp Asp Leu Pro Lys Thr Arg
            660                 665                 670

Ser Gly Lys Ile Met Arg Arg Ile Leu Arg Lys Ile Leu Ala Gly Glu
            675                 680                 685

Ser Asp Gln Leu Gly Asp Val Ser Thr Leu Ser Asn Pro Gly Ile Val
            690                 695                 700

Arg His Leu Ile Asp Ser Val Lys Leu
705                 710

<210> SEQ ID NO 67
<211> LENGTH: 500
<212> TYPE: PRT
<213> ORGANISM: Saccharomyces cerevisiae

<400> SEQUENCE: 67

Met Thr Lys Leu His Phe Asp Thr Ala Glu Pro Val Lys Ile Thr Leu
1               5                   10                  15

Pro Asn Gly Leu Thr Tyr Glu Gln Pro Thr Gly Leu Phe Ile Asn Asn
            20                  25                  30

Lys Phe Met Lys Ala Gln Asp Gly Lys Thr Tyr Pro Val Glu Asp Pro
            35                  40                  45

Ser Thr Glu Asn Thr Val Cys Glu Val Ser Ser Ala Thr Thr Glu Asp
            50                  55                  60

Val Glu Tyr Ala Ile Glu Cys Ala Asp Arg Ala Phe His Asp Thr Glu
65                  70                  75                  80

Trp Ala Thr Gln Asp Pro Arg Glu Arg Gly Arg Leu Leu Ser Lys Leu
            85                  90                  95

Ala Asp Glu Leu Glu Ser Gln Ile Asp Leu Val Ser Ser Ile Glu Ala
            100                 105                 110

Leu Asp Asn Gly Lys Thr Leu Ala Leu Ala Arg Gly Asp Val Thr Ile
            115                 120                 125
```

Ala Ile Asn Cys Leu Arg Asp Ala Ala Tyr Ala Asp Lys Val Asn
            130                 135                 140

Gly Arg Thr Ile Asn Thr Gly Asp Gly Tyr Met Asn Phe Thr Thr Leu
145                 150                 155                 160

Glu Pro Ile Gly Val Cys Gly Gln Ile Ile Pro Trp Asn Phe Pro Ile
                165                 170                 175

Met Met Leu Ala Trp Lys Ile Ala Pro Ala Leu Ala Met Gly Asn Val
            180                 185                 190

Cys Ile Leu Lys Pro Ala Ala Val Thr Pro Leu Asn Ala Leu Tyr Phe
            195                 200                 205

Ala Ser Leu Cys Lys Lys Val Gly Ile Pro Ala Gly Val Val Asn Ile
210                 215                 220

Val Pro Gly Pro Gly Arg Thr Val Gly Ala Ala Leu Thr Asn Asp Pro
225                 230                 235                 240

Arg Ile Arg Lys Leu Ala Phe Thr Gly Ser Thr Glu Val Gly Lys Ser
                245                 250                 255

Val Ala Val Asp Ser Ser Glu Ser Asn Leu Lys Lys Ile Thr Leu Glu
            260                 265                 270

Leu Gly Gly Lys Ser Ala His Leu Val Phe Asp Asp Ala Asn Ile Lys
            275                 280                 285

Lys Thr Leu Pro Asn Leu Val Asn Gly Ile Phe Lys Asn Ala Gly Gln
290                 295                 300

Ile Cys Ser Ser Gly Ser Arg Ile Tyr Val Gln Glu Gly Ile Tyr Asp
305                 310                 315                 320

Glu Leu Leu Ala Ala Phe Lys Ala Tyr Leu Glu Thr Glu Ile Lys Val
                325                 330                 335

Gly Asn Pro Phe Asp Lys Ala Asn Phe Gln Gly Ala Ile Thr Asn Arg
            340                 345                 350

Gln Gln Phe Asp Thr Ile Met Asn Tyr Ile Asp Ile Gly Lys Lys Glu
            355                 360                 365

Gly Ala Lys Ile Leu Thr Gly Gly Glu Lys Val Gly Asp Lys Gly Tyr
370                 375                 380

Phe Ile Arg Pro Thr Val Phe Tyr Asp Val Asn Glu Asp Met Arg Ile
385                 390                 395                 400

Val Lys Glu Glu Ile Phe Gly Pro Val Val Thr Val Ala Lys Phe Lys
                405                 410                 415

Thr Leu Glu Glu Gly Val Glu Met Ala Asn Ser Ser Glu Phe Gly Leu
            420                 425                 430

Gly Ser Gly Ile Glu Thr Glu Ser Leu Ser Thr Gly Leu Lys Val Ala
            435                 440                 445

Lys Met Leu Lys Ala Gly Thr Val Trp Ile Asn Thr Tyr Asn Asp Phe
450                 455                 460

Asp Ser Arg Val Pro Phe Gly Gly Val Lys Gln Ser Gly Tyr Gly Arg
465                 470                 475                 480

Glu Met Gly Glu Glu Val Tyr His Ala Tyr Thr Glu Val Lys Ala Val
                485                 490                 495

Arg Ile Lys Leu
            500

<210> SEQ ID NO 68
<211> LENGTH: 398
<212> TYPE: PRT
<213> ORGANISM: Saccharomyces cerevisiae

<400> SEQUENCE: 68

```
Met Ser Gln Asn Val Tyr Ile Val Ser Thr Ala Arg Thr Pro Ile Gly
1               5                   10                  15

Ser Phe Gln Gly Ser Leu Ser Ser Lys Thr Ala Val Glu Leu Gly Ala
            20                  25                  30

Val Ala Leu Lys Gly Ala Leu Ala Lys Val Pro Glu Leu Asp Ala Ser
        35                  40                  45

Lys Asp Phe Asp Glu Ile Ile Phe Gly Asn Val Leu Ser Ala Asn Leu
    50                  55                  60

Gly Gln Ala Pro Ala Arg Gln Val Ala Leu Ala Gly Leu Ser Asn
65                  70                  75                  80

His Ile Val Ala Ser Thr Val Asn Lys Val Cys Ala Ser Ala Met Lys
                85                  90                  95

Ala Ile Ile Leu Gly Ala Gln Ser Ile Lys Cys Gly Asn Ala Asp Val
            100                 105                 110

Val Val Ala Gly Gly Cys Glu Ser Met Thr Asn Ala Pro Tyr Tyr Met
        115                 120                 125

Pro Ala Ala Arg Ala Gly Ala Lys Phe Gly Gln Thr Val Leu Val Asp
    130                 135                 140

Gly Val Glu Arg Asp Gly Leu Asn Asp Ala Tyr Asp Gly Leu Ala Met
145                 150                 155                 160

Gly Val His Ala Glu Lys Cys Ala Arg Asp Trp Asp Ile Thr Arg Glu
                165                 170                 175

Gln Gln Asp Asn Phe Ala Ile Glu Ser Tyr Gln Lys Ser Gln Lys Ser
            180                 185                 190

Gln Lys Glu Gly Lys Phe Asp Asn Glu Ile Pro Val Thr Ile Lys
        195                 200                 205

Gly Phe Arg Gly Lys Pro Asp Thr Gln Val Thr Lys Asp Glu Glu Pro
    210                 215                 220

Ala Arg Leu His Val Glu Lys Leu Arg Ser Ala Arg Thr Val Phe Gln
225                 230                 235                 240

Lys Glu Asn Gly Thr Val Thr Ala Ala Asn Ala Ser Pro Ile Asn Asp
                245                 250                 255

Gly Ala Ala Ala Val Ile Leu Val Ser Glu Lys Val Leu Lys Glu Lys
            260                 265                 270

Asn Leu Lys Pro Leu Ala Ile Ile Lys Gly Trp Gly Glu Ala Ala His
        275                 280                 285

Gln Pro Ala Asp Phe Thr Trp Ala Pro Ser Leu Ala Val Pro Lys Ala
    290                 295                 300

Leu Lys His Ala Gly Ile Glu Asp Ile Asn Ser Val Asp Tyr Phe Glu
305                 310                 315                 320

Phe Asn Glu Ala Phe Ser Val Val Gly Leu Val Asn Thr Lys Ile Leu
                325                 330                 335

Lys Leu Asp Pro Ser Lys Val Asn Val Tyr Gly Gly Ala Val Ala Leu
            340                 345                 350

Gly His Pro Leu Gly Cys Ser Gly Ala Arg Val Val Thr Leu Leu
        355                 360                 365

Ser Ile Leu Gln Gln Glu Gly Gly Lys Ile Gly Val Ala Ala Ile Cys
    370                 375                 380

Asn Gly Gly Gly Gly Ala Ser Ser Ile Val Ile Glu Lys Ile
385                 390                 395
```

<210> SEQ ID NO 69

<211> LENGTH: 491
<212> TYPE: PRT
<213> ORGANISM: Saccharomyces cerevisiae

<400> SEQUENCE: 69

```
Met Lys Leu Ser Thr Lys Leu Cys Trp Cys Gly Ile Lys Gly Arg Leu
1               5                   10                  15

Arg Pro Gln Lys Gln Gln Leu His Asn Thr Asn Leu Gln Met Thr
            20                  25                  30

Glu Leu Lys Lys Gln Lys Thr Ala Glu Gln Lys Thr Arg Pro Gln Asn
            35                  40                  45

Val Gly Ile Lys Gly Ile Gln Ile Tyr Ile Pro Thr Gln Cys Val Asn
50                  55                  60

Gln Ser Glu Leu Glu Lys Phe Asp Gly Val Ser Gln Gly Lys Tyr Thr
65                  70                  75                  80

Ile Gly Leu Gly Gln Thr Asn Met Ser Phe Val Asn Asp Arg Glu Asp
                85                  90                  95

Ile Tyr Ser Met Ser Leu Thr Val Leu Ser Lys Leu Ile Lys Ser Tyr
                100                 105                 110

Asn Ile Asp Thr Asn Lys Ile Gly Arg Leu Glu Val Gly Thr Glu Thr
            115                 120                 125

Leu Ile Asp Lys Ser Lys Ser Val Lys Ser Val Leu Met Gln Leu Phe
130                 135                 140

Gly Glu Asn Thr Asp Val Gly Ile Asp Thr Leu Asn Ala Cys Tyr
145                 150                 155                 160

Gly Gly Thr Asn Ala Leu Phe Asn Ser Leu Asn Trp Ile Glu Ser Asn
                165                 170                 175

Ala Trp Asp Gly Arg Asp Ala Ile Val Val Cys Gly Asp Ile Ala Ile
            180                 185                 190

Tyr Asp Lys Gly Ala Ala Arg Pro Thr Gly Gly Ala Gly Thr Val Ala
        195                 200                 205

Met Trp Ile Gly Pro Asp Ala Pro Ile Val Phe Asp Ser Val Arg Ala
210                 215                 220

Ser Tyr Met Glu His Ala Tyr Asp Phe Tyr Lys Pro Asp Phe Thr Ser
225                 230                 235                 240

Glu Tyr Pro Tyr Val Asp Gly His Phe Ser Leu Thr Cys Tyr Val Lys
                245                 250                 255

Ala Leu Asp Gln Val Tyr Lys Ser Tyr Ser Lys Lys Ala Ile Ser Lys
            260                 265                 270

Gly Leu Val Ser Asp Pro Ala Gly Ser Asp Ala Leu Asn Val Leu Lys
        275                 280                 285

Tyr Phe Asp Tyr Asn Val Phe His Val Pro Thr Cys Lys Leu Val Thr
290                 295                 300

Lys Ser Tyr Gly Arg Leu Leu Tyr Asn Asp Phe Arg Ala Asn Pro Gln
305                 310                 315                 320

Leu Phe Pro Glu Val Asp Ala Glu Leu Ala Thr Arg Asp Tyr Asp Glu
                325                 330                 335

Ser Leu Thr Asp Lys Asn Ile Glu Lys Thr Phe Val Asn Val Ala Lys
            340                 345                 350

Pro Phe His Lys Glu Arg Val Ala Gln Ser Leu Ile Val Pro Thr Asn
        355                 360                 365

Thr Gly Asn Met Tyr Thr Ala Ser Val Tyr Ala Ala Phe Ala Ser Leu
370                 375                 380

Leu Asn Tyr Val Gly Ser Asp Asp Leu Gln Gly Lys Arg Val Gly Leu
```

```
               385                 390                 395                 400
        Phe Ser Tyr Gly Ser Gly Leu Ala Ala Ser Leu Tyr Ser Cys Lys Ile
                            405                 410                 415

Val Gly Asp Val Gln His Ile Ile Lys Glu Leu Asp Ile Thr Asn Lys
                            420                 425                 430

Leu Ala Lys Arg Ile Thr Glu Thr Pro Lys Asp Tyr Glu Ala Ala Ile
                            435                 440                 445

Glu Leu Arg Glu Asn Ala His Leu Lys Lys Asn Phe Lys Pro Gln Gly
                450                 455                 460

Ser Ile Glu His Leu Gln Ser Gly Val Tyr Tyr Leu Thr Asn Ile Asp
        465                 470                 475                 480

Asp Lys Phe Arg Arg Ser Tyr Asp Val Lys Lys
                            485                 490

<210> SEQ ID NO 70
<211> LENGTH: 527
<212> TYPE: PRT
<213> ORGANISM: Saccharomyces cerevisiae

<400> SEQUENCE: 70

Met Ala Ala Asp Gln Leu Val Lys Thr Glu Val Thr Lys Lys Ser Phe
        1               5                   10                  15

Thr Ala Pro Val Gln Lys Ala Ser Thr Pro Val Leu Thr Asn Lys Thr
                        20                  25                  30

Val Ile Ser Gly Ser Lys Val Lys Ser Leu Ser Ser Ala Gln Ser Ser
                    35                  40                  45

Ser Ser Gly Pro Ser Ser Ser Ser Glu Glu Asp Ser Arg Asp Ile
            50                  55                  60

Glu Ser Leu Asp Lys Lys Ile Arg Pro Leu Glu Glu Leu Glu Ala Leu
        65                  70                  75                  80

Leu Ser Ser Gly Asn Thr Lys Gln Leu Lys Asn Lys Glu Val Ala Ala
                        85                  90                  95

Leu Val Ile His Gly Lys Leu Pro Leu Tyr Ala Leu Glu Lys Lys Leu
                    100                 105                 110

Gly Asp Thr Thr Arg Ala Val Ala Val Arg Arg Lys Ala Leu Ser Ile
                115                 120                 125

Leu Ala Glu Ala Pro Val Leu Ala Ser Asp Arg Leu Pro Tyr Lys Asn
        130                 135                 140

Tyr Asp Tyr Asp Arg Val Phe Gly Ala Cys Cys Glu Asn Val Ile Gly
        145                 150                 155                 160

Tyr Met Pro Leu Pro Val Gly Val Ile Gly Pro Leu Val Ile Asp Gly
                        165                 170                 175

Thr Ser Tyr His Ile Pro Met Ala Thr Thr Glu Gly Cys Leu Val Ala
                    180                 185                 190

Ser Ala Met Arg Gly Cys Lys Ala Ile Asn Ala Gly Gly Gly Ala Thr
                195                 200                 205

Thr Val Leu Thr Lys Asp Gly Met Thr Arg Gly Pro Val Val Arg Phe
        210                 215                 220

Pro Thr Leu Lys Arg Ser Gly Ala Cys Lys Ile Trp Leu Asp Ser Glu
        225                 230                 235                 240

Glu Gly Gln Asn Ala Ile Lys Lys Ala Phe Asn Ser Thr Ser Arg Phe
                        245                 250                 255

Ala Arg Leu Gln His Ile Gln Thr Cys Leu Ala Gly Asp Leu Leu Phe
                    260                 265                 270
```

```
Met Arg Phe Arg Thr Thr Thr Gly Asp Ala Met Gly Met Asn Met Ile
            275                 280                 285

Ser Lys Gly Val Glu Tyr Ser Leu Lys Gln Met Val Glu Glu Tyr Gly
        290                 295                 300

Trp Glu Asp Met Glu Val Val Ser Val Ser Gly Asn Tyr Cys Thr Asp
305                 310                 315                 320

Lys Lys Pro Ala Ala Ile Asn Trp Ile Glu Gly Arg Gly Lys Ser Val
                325                 330                 335

Val Ala Glu Ala Thr Ile Pro Gly Asp Val Val Arg Lys Val Leu Lys
                340                 345                 350

Ser Asp Val Ser Ala Leu Val Glu Leu Asn Ile Ala Lys Asn Leu Val
                355                 360                 365

Gly Ser Ala Met Ala Gly Ser Val Gly Gly Phe Asn Ala His Ala Ala
        370                 375                 380

Asn Leu Val Thr Ala Val Phe Leu Ala Leu Gly Gln Asp Pro Ala Gln
385                 390                 395                 400

Asn Val Glu Ser Ser Asn Cys Ile Thr Leu Met Lys Glu Val Asp Gly
                405                 410                 415

Asp Leu Arg Ile Ser Val Ser Met Pro Ser Ile Glu Val Gly Thr Ile
                420                 425                 430

Gly Gly Gly Thr Val Leu Glu Pro Gln Gly Ala Met Leu Asp Leu Leu
        435                 440                 445

Gly Val Arg Gly Pro His Ala Thr Ala Pro Gly Thr Asn Ala Arg Gln
        450                 455                 460

Leu Ala Arg Ile Val Ala Cys Ala Val Leu Ala Gly Glu Leu Ser Leu
465                 470                 475                 480

Cys Ala Ala Leu Ala Ala Gly His Leu Val Gln Ser His Met Thr His
                485                 490                 495

Asn Arg Lys Pro Ala Glu Pro Thr Lys Pro Asn Asn Leu Asp Ala Thr
                500                 505                 510

Asp Ile Asn Arg Leu Lys Asp Gly Ser Val Thr Cys Ile Lys Ser
                515                 520                 525

<210> SEQ ID NO 71
<211> LENGTH: 443
<212> TYPE: PRT
<213> ORGANISM: Saccharomyces cerevisiae

<400> SEQUENCE: 71

Met Ser Leu Pro Phe Leu Thr Ser Ala Pro Gly Lys Val Ile Ile Phe
1               5                   10                  15

Gly Glu His Ser Ala Val Tyr Asn Lys Pro Ala Val Ala Ala Ser Val
                20                  25                  30

Ser Ala Leu Arg Thr Tyr Leu Leu Ile Ser Glu Ser Ser Ala Pro Asp
        35                  40                  45

Thr Ile Glu Leu Asp Phe Pro Asp Ile Ser Phe Asn His Lys Trp Ser
    50                  55                  60

Ile Asn Asp Phe Asn Ala Ile Thr Glu Asp Gln Val Asn Ser Gln Lys
65                  70                  75                  80

Leu Ala Lys Ala Gln Gln Ala Thr Asp Gly Leu Ser Gln Glu Leu Val
                85                  90                  95

Ser Leu Leu Asp Pro Leu Leu Ala Gln Leu Ser Glu Ser Phe His Tyr
                100                 105                 110

His Ala Ala Phe Cys Phe Leu Tyr Met Phe Val Cys Leu Cys Pro His
            115                 120                 125
```

```
Ala Lys Asn Ile Lys Phe Ser Leu Lys Ser Thr Leu Pro Ile Gly Ala
            130                 135                 140

Gly Leu Gly Ser Ser Ala Ser Ile Ser Val Ser Leu Ala Leu Ala Met
145                 150                 155                 160

Ala Tyr Leu Gly Gly Leu Ile Gly Ser Asn Asp Leu Glu Lys Leu Ser
                165                 170                 175

Glu Asn Asp Lys His Ile Val Asn Gln Trp Ala Phe Ile Gly Glu Lys
            180                 185                 190

Cys Ile His Gly Thr Pro Ser Gly Ile Asp Asn Ala Val Ala Thr Tyr
        195                 200                 205

Gly Asn Ala Leu Leu Phe Glu Lys Asp Ser His Asn Gly Thr Ile Asn
    210                 215                 220

Thr Asn Asn Phe Lys Phe Leu Asp Asp Phe Pro Ala Ile Pro Met Ile
225                 230                 235                 240

Leu Thr Tyr Thr Arg Ile Pro Arg Ser Thr Lys Asp Leu Val Ala Arg
                245                 250                 255

Val Arg Val Leu Val Thr Glu Lys Phe Pro Glu Val Met Lys Pro Ile
            260                 265                 270

Leu Asp Ala Met Gly Glu Cys Ala Leu Gln Gly Leu Glu Ile Met Thr
        275                 280                 285

Lys Leu Ser Lys Cys Lys Gly Thr Asp Asp Glu Ala Val Glu Thr Asn
    290                 295                 300

Asn Glu Leu Tyr Glu Gln Leu Leu Glu Leu Ile Arg Ile Asn His Gly
305                 310                 315                 320

Leu Leu Val Ser Ile Gly Val Ser His Pro Gly Leu Glu Leu Ile Lys
                325                 330                 335

Asn Leu Ser Asp Asp Leu Arg Ile Gly Ser Thr Lys Leu Thr Gly Ala
            340                 345                 350

Gly Gly Gly Gly Cys Ser Leu Thr Leu Leu Arg Arg Asp Ile Thr Gln
        355                 360                 365

Glu Gln Ile Asp Ser Phe Lys Lys Lys Leu Gln Asp Asp Phe Ser Tyr
    370                 375                 380

Glu Thr Phe Glu Thr Asp Leu Gly Gly Thr Gly Cys Cys Leu Leu Ser
385                 390                 395                 400

Ala Lys Asn Leu Asn Lys Asp Leu Lys Ile Lys Ser Leu Val Phe Gln
                405                 410                 415

Leu Phe Glu Asn Lys Thr Thr Thr Lys Gln Gln Ile Asp Asp Leu Leu
            420                 425                 430

Leu Pro Gly Asn Thr Asn Leu Pro Trp Thr Ser
        435                 440

<210> SEQ ID NO 72
<211> LENGTH: 451
<212> TYPE: PRT
<213> ORGANISM: Saccharomyces cerevisiae

<400> SEQUENCE: 72

Met Ser Glu Leu Arg Ala Phe Ser Ala Pro Gly Lys Ala Leu Leu Ala
1               5                   10                  15

Gly Gly Tyr Leu Val Leu Asp Pro Lys Tyr Glu Ala Phe Val Val Gly
                20                  25                  30

Leu Ser Ala Arg Met His Ala Val Ala His Pro Tyr Gly Ser Leu Gln
            35                  40                  45

Glu Ser Asp Lys Phe Glu Val Arg Val Lys Ser Lys Gln Phe Lys Asp
```

```
            50                  55                  60
Gly Glu Trp Leu Tyr His Ile Ser Pro Lys Thr Gly Phe Ile Pro Val
 65                  70                  75                  80

Ser Ile Gly Gly Ser Lys Asn Pro Phe Ile Glu Lys Val Ile Ala Asn
                 85                  90                  95

Val Phe Ser Tyr Phe Lys Pro Asn Met Asp Asp Tyr Cys Asn Arg Asn
                    100                 105                 110

Leu Phe Val Ile Asp Ile Phe Ser Asp Asp Ala Tyr His Ser Gln Glu
                115                 120                 125

Asp Ser Val Thr Glu His Arg Gly Asn Arg Arg Leu Ser Phe His Ser
            130                 135                 140

His Arg Ile Glu Glu Val Pro Lys Thr Gly Leu Gly Ser Ser Ala Gly
145                 150                 155                 160

Leu Val Thr Val Leu Thr Thr Ala Leu Ala Ser Phe Phe Val Ser Asp
                165                 170                 175

Leu Glu Asn Asn Val Asp Lys Tyr Arg Glu Val Ile His Asn Leu Ser
                180                 185                 190

Gln Val Ala His Cys Gln Ala Gln Gly Lys Ile Gly Ser Gly Phe Asp
                195                 200                 205

Val Ala Ala Ala Tyr Gly Ser Ile Arg Tyr Arg Arg Phe Pro Pro
210                 215                 220

Ala Leu Ile Ser Asn Leu Pro Asp Ile Gly Ser Ala Thr Tyr Gly Ser
225                 230                 235                 240

Lys Leu Ala His Leu Val Asn Glu Glu Asp Trp Asn Ile Thr Ile Lys
                245                 250                 255

Ser Asn His Leu Pro Ser Gly Leu Thr Leu Trp Met Gly Asp Ile Lys
                260                 265                 270

Asn Gly Ser Glu Thr Val Lys Leu Val Gln Lys Val Lys Asn Trp Tyr
                275                 280                 285

Asp Ser His Met Pro Glu Ser Leu Lys Ile Tyr Thr Glu Leu Asp His
                290                 295                 300

Ala Asn Ser Arg Phe Met Asp Gly Leu Ser Lys Leu Asp Arg Leu His
305                 310                 315                 320

Glu Thr His Asp Asp Tyr Ser Asp Gln Ile Phe Glu Ser Leu Glu Arg
                325                 330                 335

Asn Asp Cys Thr Cys Gln Lys Tyr Pro Glu Ile Thr Glu Val Arg Asp
                340                 345                 350

Ala Val Ala Thr Ile Arg Arg Ser Phe Arg Lys Ile Thr Lys Glu Ser
                355                 360                 365

Gly Ala Asp Ile Glu Pro Pro Val Gln Thr Ser Leu Leu Asp Asp Cys
370                 375                 380

Gln Thr Leu Lys Gly Val Leu Thr Cys Leu Ile Pro Gly Ala Gly Gly
385                 390                 395                 400

Tyr Asp Ala Ile Ala Val Ile Ala Lys Gln Asp Val Asp Leu Arg Ala
                405                 410                 415

Gln Thr Ala Asp Asp Lys Arg Phe Ser Lys Val Gln Trp Leu Asp Val
                420                 425                 430

Thr Gln Ala Asp Trp Gly Val Arg Lys Glu Lys Asp Pro Glu Thr Tyr
                435                 440                 445

Leu Asp Lys
    450

<210> SEQ ID NO 73
```

```
<211> LENGTH: 396
<212> TYPE: PRT
<213> ORGANISM: Saccharomyces cerevisiae

<400> SEQUENCE: 73

Met Thr Val Tyr Thr Ala Ser Val Thr Ala Pro Val Asn Ile Ala Thr
1               5                   10                  15

Leu Lys Tyr Trp Gly Lys Arg Asp Thr Lys Leu Asn Leu Pro Thr Asn
            20                  25                  30

Ser Ser Ile Ser Val Thr Leu Ser Gln Asp Asp Leu Arg Thr Leu Thr
        35                  40                  45

Ser Ala Ala Thr Ala Pro Glu Phe Glu Arg Asp Thr Leu Trp Leu Asn
    50                  55                  60

Gly Glu Pro His Ser Ile Asp Asn Glu Arg Thr Gln Asn Cys Leu Arg
65                  70                  75                  80

Asp Leu Arg Gln Leu Arg Lys Glu Met Glu Ser Lys Asp Ala Ser Leu
                85                  90                  95

Pro Thr Leu Ser Gln Trp Lys Leu His Ile Val Ser Glu Asn Asn Phe
            100                 105                 110

Pro Thr Ala Ala Gly Leu Ala Ser Ser Ala Ala Gly Phe Ala Ala Leu
        115                 120                 125

Val Ser Ala Ile Ala Lys Leu Tyr Gln Leu Pro Gln Ser Thr Ser Glu
130                 135                 140

Ile Ser Arg Ile Ala Arg Lys Gly Ser Gly Ser Ala Cys Arg Ser Leu
145                 150                 155                 160

Phe Gly Gly Tyr Val Ala Trp Glu Met Gly Lys Ala Glu Asp Gly His
                165                 170                 175

Asp Ser Met Ala Val Gln Ile Ala Asp Ser Ser Asp Trp Pro Gln Met
            180                 185                 190

Lys Ala Cys Val Leu Val Val Ser Asp Ile Lys Lys Asp Val Ser Ser
        195                 200                 205

Thr Gln Gly Met Gln Leu Thr Val Ala Thr Ser Glu Leu Phe Lys Glu
210                 215                 220

Arg Ile Glu His Val Val Pro Lys Arg Phe Glu Val Met Arg Lys Ala
225                 230                 235                 240

Ile Val Glu Lys Asp Phe Ala Thr Phe Ala Lys Glu Thr Met Met Asp
                245                 250                 255

Ser Asn Ser Phe His Ala Thr Cys Leu Asp Ser Phe Pro Pro Ile Phe
            260                 265                 270

Tyr Met Asn Asp Thr Ser Lys Arg Ile Ile Ser Trp Cys His Thr Ile
        275                 280                 285

Asn Gln Phe Tyr Gly Glu Thr Ile Val Ala Tyr Thr Phe Asp Ala Gly
290                 295                 300

Pro Asn Ala Val Leu Tyr Tyr Leu Ala Glu Asn Glu Ser Lys Leu Phe
305                 310                 315                 320

Ala Phe Ile Tyr Lys Leu Phe Gly Ser Val Pro Gly Trp Asp Lys Lys
                325                 330                 335

Phe Thr Thr Glu Gln Leu Glu Ala Phe Asn His Gln Phe Glu Ser Ser
            340                 345                 350

Asn Phe Thr Ala Arg Glu Leu Asp Leu Glu Leu Gln Lys Asp Val Ala
        355                 360                 365

Arg Val Ile Leu Thr Gln Val Gly Ser Gly Pro Gln Glu Thr Asn Glu
370                 375                 380

Ser Leu Ile Asp Ala Lys Thr Gly Leu Pro Lys Glu
```

385              390              395

<210> SEQ ID NO 74
<211> LENGTH: 288
<212> TYPE: PRT
<213> ORGANISM: Saccharomyces cerevisiae

<400> SEQUENCE: 74

Met Thr Ala Asp Asn Asn Ser Met Pro His Gly Ala Val Ser Tyr
1               5                   10                  15

Ala Lys Leu Val Gln Asn Gln Thr Pro Glu Asp Ile Leu Glu Phe
                20                  25                  30

Pro Glu Ile Ile Pro Leu Gln Arg Pro Asn Thr Arg Ser Ser Glu
            35                  40                  45

Thr Ser Asn Asp Glu Ser Gly Glu Thr Cys Phe Ser Gly His Asp Glu
    50                  55                  60

Glu Gln Ile Lys Leu Met Asn Glu Asn Cys Ile Val Leu Asp Trp Asp
65                  70                  75                  80

Asp Asn Ala Ile Gly Ala Gly Thr Lys Lys Val Cys His Leu Met Glu
                85                  90                  95

Asn Ile Glu Lys Gly Leu Leu His Arg Ala Phe Ser Val Phe Ile Phe
            100                 105                 110

Asn Glu Gln Gly Glu Leu Leu Leu Gln Gln Arg Ala Thr Glu Lys Ile
        115                 120                 125

Thr Phe Pro Asp Leu Trp Thr Asn Thr Cys Cys Ser His Pro Leu Cys
130                 135                 140

Ile Asp Asp Glu Leu Gly Leu Lys Gly Lys Leu Asp Asp Lys Ile Lys
145                 150                 155                 160

Gly Ala Ile Thr Ala Ala Val Arg Lys Leu Asp His Glu Leu Gly Ile
                165                 170                 175

Pro Glu Asp Glu Thr Lys Thr Arg Gly Lys Phe His Phe Leu Asn Arg
            180                 185                 190

Ile His Tyr Met Ala Pro Ser Asn Glu Pro Trp Gly Glu His Glu Ile
        195                 200                 205

Asp Tyr Ile Leu Phe Tyr Lys Ile Asn Ala Lys Glu Asn Leu Thr Val
    210                 215                 220

Asn Pro Asn Val Asn Glu Val Arg Asp Phe Lys Trp Val Ser Pro Asn
225                 230                 235                 240

Asp Leu Lys Thr Met Phe Ala Asp Pro Ser Tyr Lys Phe Thr Pro Trp
                245                 250                 255

Phe Lys Ile Ile Cys Glu Asn Tyr Leu Phe Asn Trp Trp Gln Leu
            260                 265                 270

Asp Asp Leu Ser Glu Val Glu Asn Asp Arg Gln Ile His Arg Met Leu
        275                 280                 285

<210> SEQ ID NO 75
<211> LENGTH: 357
<212> TYPE: PRT
<213> ORGANISM: Streptomyces aculeolatus

<400> SEQUENCE: 75

Met Thr Thr Glu Val Thr Ser Phe Thr Gly Ala Gly Pro His Pro Ala
1               5                   10                  15

Ala Ser Val Arg Arg Ile Thr Asp Asp Leu Leu Gln Arg Val Glu Asp
                20                  25                  30

Lys Leu Ala Ser Phe Leu Thr Ala Glu Arg Asp Arg Tyr Ala Ala Met

-continued

```
                35                    40                    45
Asp Glu Arg Ala Leu Ala Ala Val Asp Ala Leu Thr Asp Leu Val Thr
        50                    55                    60
Ser Gly Gly Lys Arg Val Arg Pro Thr Phe Cys Ile Thr Gly Tyr Leu
65                    70                    75                    80
Ala Ala Gly Gly Asp Ala Gly Asp Pro Gly Ile Val Ala Ala Ala Ala
                85                    90                    95
Gly Leu Glu Met Leu His Val Ser Ala Leu Ile His Asp Asp Ile Leu
                100                   105                   110
Asp Asn Ser Ala Gln Arg Arg Gly Lys Pro Thr Ile His Thr Leu Tyr
            115                   120                   125
Gly Asp Leu His Asp Ser His Gly Trp Arg Gly Glu Ser Arg Arg Phe
    130                   135                   140
Gly Glu Gly Ile Gly Ile Leu Ile Gly Asn Leu Ala Leu Val Tyr Ser
145                   150                   155                   160
Gln Glu Leu Val Cys Gln Ala Pro Pro Ala Val Leu Ala Glu Trp His
                165                   170                   175
Arg Leu Cys Ser Glu Val Asn Ile Gly Gln Cys Leu Asp Val Cys Ala
            180                   185                   190
Ala Ala Glu Phe Ser Ala Asp Pro Glu Leu Ser Arg Leu Val Ala Leu
        195                   200                   205
Ile Lys Ser Gly Arg Tyr Thr Ile His Arg Pro Leu Val Met Gly Ala
    210                   215                   220
Asn Ala Ala Ser Arg Pro Asp Leu Ala Ala Tyr Val Glu Tyr Gly
225                   230                   235                   240
Glu Ala Val Gly Glu Ala Phe Gln Leu Arg Asp Asp Leu Leu Asp Ala
                245                   250                   255
Phe Gly Asp Ser Thr Glu Thr Gly Lys Pro Thr Gly Leu Asp Phe Thr
            260                   265                   270
Gln His Lys Met Thr Leu Leu Leu Gly Trp Ala Met Gln Arg Asp Thr
        275                   280                   285
His Ile Arg Thr Leu Met Thr Glu Pro Gly His Thr Pro Glu Glu Val
    290                   295                   300
Arg Arg Arg Leu Glu Asp Thr Glu Val Pro Lys Asp Val Glu Arg His
305                   310                   315                   320
Ile Ala Asp Leu Val Glu Gln Gly Arg Ala Ala Ile Ala Asp Ala Pro
                325                   330                   335
Ile Asp Pro Gln Trp Arg Gln Glu Leu Ala Asp Met Val Arg Ala
            340                   345                   350
Ala Tyr Arg Thr Asn
            355
```